United States Patent

Vinci

[19]

[11] Patent Number: 5,875,413
[45] Date of Patent: Feb. 23, 1999

[54] DIGITAL REMOTE GAUGE ASSEMBLY

[75] Inventor: Peter Vinci, Kirkwood, Pa.

[73] Assignee: Waekon Corporation, Kirkwood, Pa.

[21] Appl. No.: 857,619

[22] Filed: May 16, 1997

Related U.S. Application Data

[60] Provisional application No. 60/017,138 May 17, 1996.
[51] Int. Cl.[6] .............................. G01R 1/04; G01D 11/24
[52] U.S. Cl. .............................. 702/91; 702/130; 73/431; 73/1.88; 324/149
[58] Field of Search ................................. 364/557, 558, 364/551.01; 324/115, 149, 156; 250/231.11, 231.14, 231.18, 231.19; 702/91, 130; 73/1.88, 431

[56] References Cited

U.S. PATENT DOCUMENTS

| | | | |
|---|---|---|---|
| 3,946,613 | 3/1976 | Silver | 73/431 |
| 4,086,488 | 4/1978 | Hill | 250/231.19 |
| 4,476,721 | 10/1984 | Hochreuther et al. | 73/431 |
| 4,571,995 | 2/1986 | Timme | 250/231.19 |
| 4,577,512 | 3/1986 | Löwenheck | 73/431 |
| 4,696,189 | 9/1987 | Hochreuther . | |
| 4,757,463 | 7/1988 | Ballou et al. | 364/551.01 |
| 5,044,770 | 9/1991 | Haghkar | 374/208 |
| 5,089,979 | 2/1992 | McEachern et al. . | |
| 5,347,476 | 9/1994 | McBean . | |
| 5,354,200 | 10/1994 | Klein et al. | 433/72 |
| 5,365,462 | 11/1994 | McBean . | |
| 5,375,073 | 12/1994 | McBean . | |
| 5,377,128 | 12/1994 | McBean . | |
| 5,686,831 | 11/1997 | Vandervalk | 324/115 |

OTHER PUBLICATIONS

Omega Engineering, Inc –1995, "The Pressure Strain and Force" pp. D–27 & D–28 (vol. 29).

*Primary Examiner*—John E. Barlow, Jr.
*Assistant Examiner*—Bryan Bui
*Attorney, Agent, or Firm*—Michael, Best & Friedrich

[57] ABSTRACT

The present invention includes a portable, damage resistant, palm-held, low cost, high sensitivity ergonomically dimensioned digital remote gauge assembly unit for the measurement of external parameters that include by way of example temperature, pressure, and vacuum; a kit having a digital remote gauge assembly unit, a variety of probes and adapters that provide for the communication signals to the unit in response to externally measured parameters, and a communication link between a respective probe and the digital remote gauge assembly unit; and, a method of utilizing the kit and device to facilitate the rapid measurement of a variety of external parameters. The digital pressure gauge includes a gauge body dimensioned to be held in the palm of a user's hand. The gauge body has microprocessor controlled circuitry therein, an altitude and temperature compensated pressure transducer in communication with the microprocessor, and keys for actuating the microprocessor. The body also includes a display for informing the user of readings taken in a mode of operation of the device, a probe assembly; and, a multi-conductor shielded cable connecting the gauge body and the probe assembly. The gauge also includes routines providing a plurality of the modes of operation of the gauge including a PSI mode, a KPA mode, a PEAK HOLD mode, a HI/LO resolution mode, and a temperature mode in which the display presents a temperature of a fluid being tested in either °C. (Centigrade) or °F. (Fahrenheit).

31 Claims, 34 Drawing Sheets

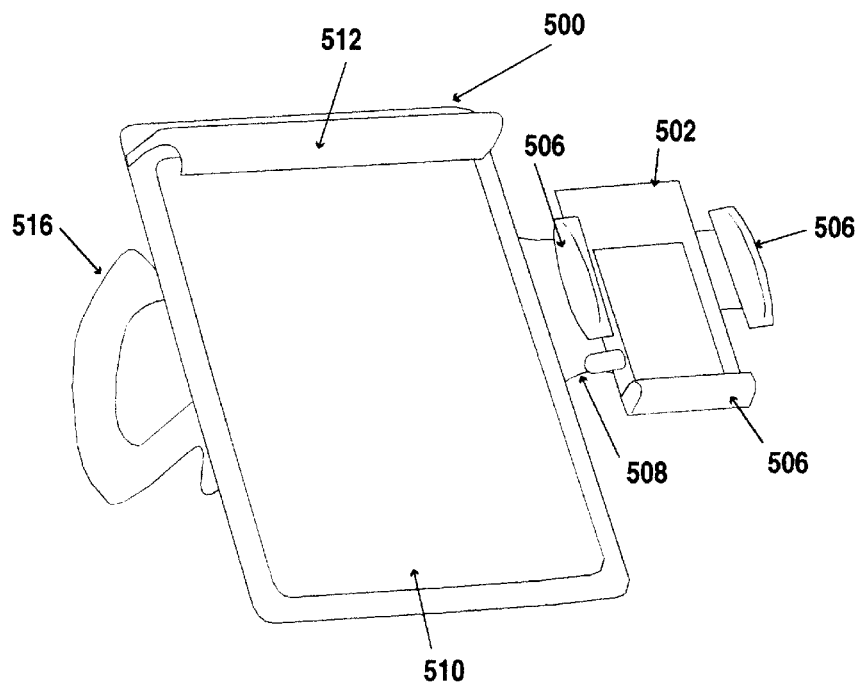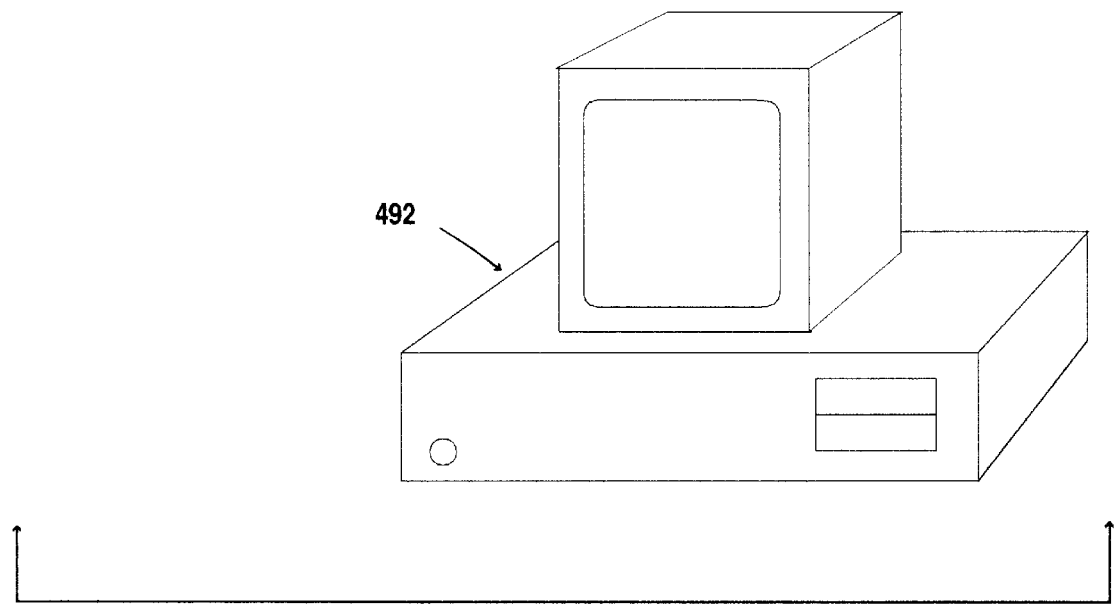
FIG. 28

DIGITAL REMOTE GAUGE ASSEMBLY

CONTINUING DATA

This application claims priority to U.S. provisional patent application Ser. No. 60/017,138 entitled "Digital Remote Gauge Assembly," filed on May 17, 1996 by Peter Vinci.

BACKGROUND OF THE INVENTION

This invention generally relates to remote sensing gauges, and gauge assembly systems; and, more particularly, it relates to a digital remote gauge assembly, a kit used in the remote sensing of external parameters, and method of utilization thereof.

Various instruments are known including those described in U.S. Pat. Nos. 4,696,189, 5,377,128, 5,375,073, 5,365,462, 5,089,979, and 5,347,476. Traditional remote gauge assembly systems have problems associated with the manufacture and usage thereof that include, by way of example, high cost, bulkiness, and a lack of portability and maneuverability. It is an object of the present invention to solve these and other problems in the art.

SUMMARY OF THE INVENTION

The present invention provides an ergonomic, lightweight, portable, readily maneuverable, self-powered, palm-held, digital remote gauge assembly unit; a kit having a digital remote gauge assembly unit, a variety of probes that communicate signals to the unit in response to externally measured parameters, and a communication link between a respective probe and the digital remote gauge assembly unit; and, a method of utilizing the kit and device to facilitate the rapid measurement of a variety of external parameters including by way of example, temperature, pressure, and vacuum. The digital gauge assembly provides an untrained or unskilled user with a rapid means for measuring and rapidly quantifying a plurality of different parameters without need for extensive training in the use of the device.

It is yet another object of the invention to provide a digital pressure gauge that includes a gauge body dimensioned to be held in the palm of a user's hand. The gauge body has microprocessor controlled circuitry therein, an altitude and temperature compensated pressure transducer in communication with the microprocessor, and keys for actuating the microprocessor. A display is disposed on the gauge body for informing the user of readings taken in a mode of operation of the device. The gauge body also includes a probe assembly; and, a multi-conductor shielded cable connecting the gauge body and the probe assembly. The cable provides a communication link between the probe assembly and the circuitry, and is dimensioned and constructed to allow a user to manipulate the keys on the gauge body while the probe assembly is in an actual test position on a component of a vehicle, while the vehicle is in motion and while the user is operating the vehicle.

It is yet a further object of the invention to provide a digital pressure gauge of having a plurality of the modes of operation of the gauge. The modes of operation of the gauge include a PSI mode in which the display presents a pressure read in pounds per square inch measurement, a KPA mode in which the display presents a pressure reading in kilo pascal, a PEAK HOLD mode in which the display presents a highest pressure read during a sample of measurements taken by the gauge, a HI/LO resolution mode in which the display displays one of a LO resolution mode in which the display presents an average pressure taken from a batch of at least 8 consecutive readings or a HI resolution mode in which the display presents the pressure in a system being measured in real time, and a temperature mode in which the display presents a temperature of a fluid being tested in either °C. (Centigrade) or °F. (Fahrenheit).

The probe assembly houses the pressure transducer and a temperature compensation component, includes a JIC connector, and is constructed of a heat passive alloy.

The invention also provides a kit for remotely measuring pressure or temperature. The kit includes the digital remote pressure gauge described herein, and at least in the range of three or more digital remote pressure gauge accessories. The accessories are selected from the group consisting of lithium batteries (CR2032), a gauge boot, an adapter kit manual & look-up tables; adapters selected from the group consisting of an F1AS adapter, an F2AS adapter, an F3AS adapter, an F4AS adapter, an F5AS adapter, anF6 adapter, an F7AS adapter, an F8 adapter, an F9 adapter, an F10AS adapter, an F11 adapter, an F12 adapter, an F13AS adapter, an F14 adapter, an F15 adapter, an F16AS adapter, an F17AS adapter, an F18AS adapter, an F19AS adapter, an F20AS adapter, an F21AS adapter, an F22AS adapter, an F23 adapter, an F24AS adapter, an F25 adapter, an F26AS/2 adapter, screws (M6×1.0×50 mm), an F27 adapter, an F28 adapter, an F29 adapter, an F30AS adapter, an F31 adapter, an F32 adapter, a 45° elbow, a 90° elbow, hose clamps, a ⅜" ID Hose/3" length, a ¼" ID Hose/3" length, ¼" ID fuel flex tubing, a w/male 7/16 JIC/4" length, a manifold assembly, a manifold extension hose, an accessory gag, 5" Zip strips, 8" Zip strips, a knee-board attachment, an air chuck, a bottle, and a blow-molded case.

It is yet a further object of the invention to provide a method of measuring a pressure or temperature on a component of a vehicle while the vehicle is moving and in operation. The method includes the steps of providing a digital pressure gauge, the digital pressure gauge having a gauge body dimensioned to be held in the palm of a user's hand, the gauge body having microprocessor controlled circuitry therein, an altitude and temperature compensated pressure transducer in communication with the microprocessor, and keys for actuating the microprocessor; a display disposed on the gauge body for informing the user of readings taken in a mode of operation of the device; a probe assembly; and, a multi-conductor shielded cable connecting the gauge body and the probe assembly, the cable providing a communication link between the probe assembly and the circuitry, and the cable of a length sufficient to allow a user to manipulate the keys on the gauge body while the probe assembly is in an actual test position on a component of a vehicle and while the vehicle is actually in motion and while the user is operating the vehicle; connecting the probe assembly to the component of the vehicle while the vehicle is stationary, the component being remote from a passenger compartment of the vehicle; positioning the gauge body in a convenient, easily viewable position with respect to the user in the passenger compartment of the vehicle; actuating movement of the vechicle; and, viewing readings on the display in response to actuating the keys on the gauge while the vehicle is moving.

The objects and features of the present invention, other than those specifically set forth above, will become apparent in the detailed description of the invention set forth below.

BRIEF DESCRIPTION OF THE DRAWINGS

FIG. 28 illustrates a variant of the kneeboard of FIG. 27;

DETAILED DESCRIPTION OF THE INVENTION

Figure 1:
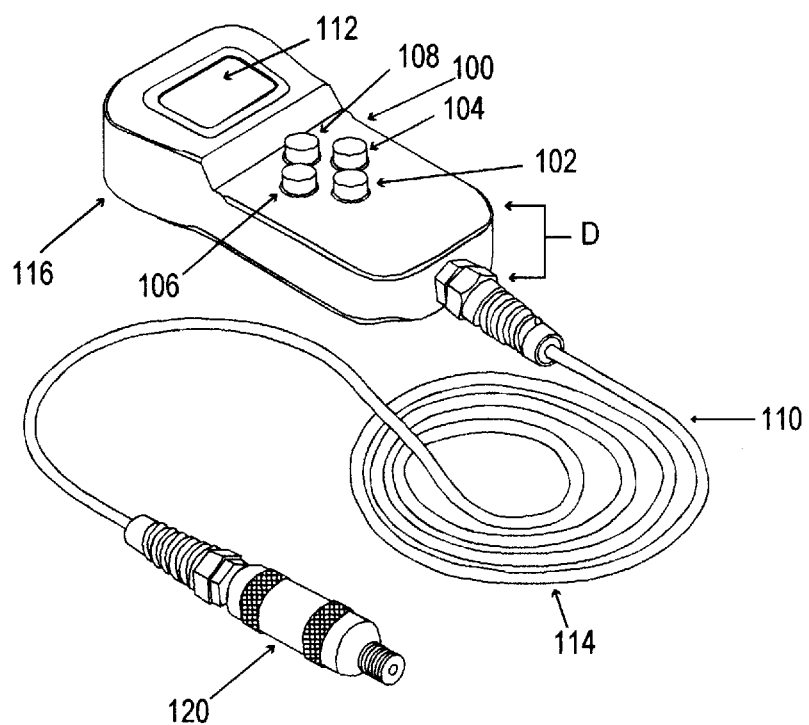
FIG. 1 illustrates a perspective view of the digital remote gauge assembly unit of the present invention.
Figure 2:
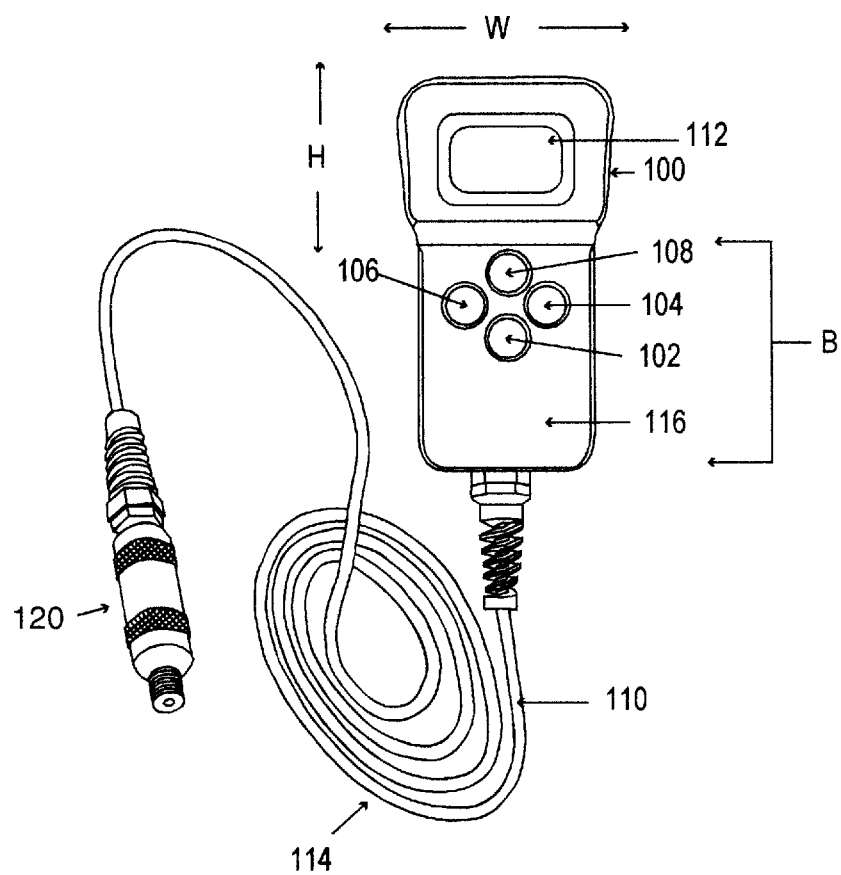
FIG. 2 illustrates a top plan view of the digital remote gauge assembly unit of FIG. 1 and a perspective view of a communication link between a probe and the unit.
Figure 3:
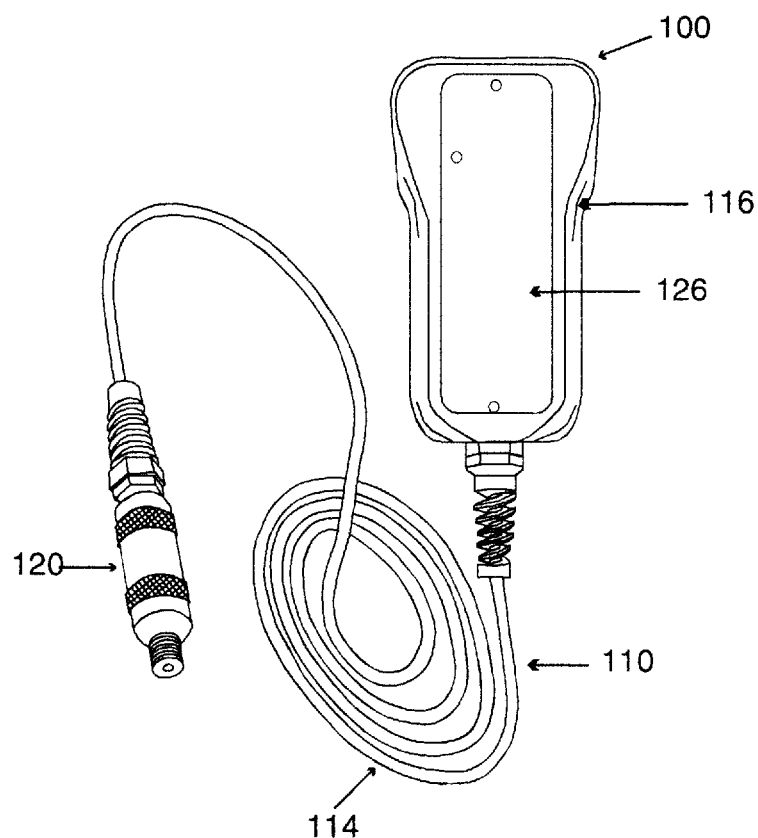
FIG. 3 illustrates a top plan view of the rear of the digital remote gauge assembly unit of FIGS. 1 and 2.

FIGS. 1–3 illustrate a perspective view, top plan and bottom plan view of digital remote gauge assembly unit 100.

The theory of operation of digital remote gauge assembly unit 100 is as follows:

Gauge 100 includes ON/OFF button 102 (FIGS. 1 and 2). Button 102 is used to power up (turn unit 100 ON) and power down (turn unit 100 OFF). If unit 100 is in the off mode, pressing button 102 will turn it on. If unit 100 is in the on mode pressing button 102 will turn it off. Unit 100 must be powered up or ON for the function of any of the other buttons 104, 106, 108 to work. The only exception is back light which is designed to light the LCD irrespective of the mode unit 100 is in at any given time.

PEAK HOLD button 104 enables or disables the Peak Hold function or mode of unit 100. This feature allows a user to display the highest pressure reading on the LCD 112 of all the samples taken, and functions by comparing a new pressure reading with a old highest pressure reading still on the LCD 112. If the new reading is greater than the old highest pressure reading on the LCD 112 then the new value is placed on the LCD 112. This process repeats itself with every sample taken and an audible 'BEEP' or other signal can be heard every time the value changes on the LCD 112. The user presses button 104 again to turn this feature off and unit 100 then returns to updating the LCD 112 with every new sample taken.

AVERAGING/MODE button 106 enables and disables the Averaging or Temperature function or mode of unit 100. In the Averaging Mode, a number of pressure samples are taken and the average value of those samples is displayed on the LCD 112. During this time, while the new pressure samples are being taken, the previous result is displayed on the LCD 112. An audible 'BEEP' emanating from unit 100 can be heard every time the LCD 112 is updated.

Temperature can also be measured using the same probe assembly 110 (FIGS. 1–3). Temperature will be displayed either in degrees Centigrade or degrees Fahrenheit on display 112 (FIGS. 1–2). The user may choose the mode of operation of unit 100 by pressing the mode switch 106 multiple times and scrolling through the different features.

When unit 100 is in averaging mode a '+' sign is displayed on the left hand side of the LCD 112. When in Centigrade a "degrees C" is displayed on the LCD 112 and when in Fahrenheit a "degrees F" is displayed on the LCD 112.

LIGHT button 108 button activates a backlight behind the LCD 112. The backlight remains on as long as the user is pressing button 108. This feature will work irrespective of the current mode of operation unit 100 is in.

A general description of operation of the unit and its method of operation is as follows: A user presses On/Off button 102 to power up the unit 100. To zero unit 100, a user holds down Peak Hold button 104 while turning unit 100 on. Unit 100 provides a self zeroing feature that eliminates all of the effects of altitude and temperature on unit 100. All readings from this point on will be calculated based on these readings. Although the temperature reading is recalibrated periodically, e.g. every minute of operation, to allow for any temperature changes at the pressure sensing die.

Probe 120 having communication link 114 is then attached to a relevant port to measure the desired pressure. Communication link 114 includes a variety of communication links. Preferably communication link 114 is a communication link that provides strain relief. "Strain relief" communication links and portions thereof, include by way of example, components commercially available from Heyco Molded Products of Kenilworth, N.J. and coaxial-shielded cables available from C & M, Inc. of Wauregan, Conn. Right angle LED's used in the present invention are commercially available from Lumex, Inc. (model number ssf-lxh3051d-tr. In a normal mode, display 112 is updated periodically, e.g. approximately every second.

Unit 100 also has a power saving feature that enables it to turn itself off automatically after five (5) minutes or other appropriate period of time. This feature is enabled when unit 100 fails to measure a pressure reading during any five minute or other appropriate time period.

The designation "S" generally includes a routine step utilized in the present invention. It is understood that various algorithms that will produce an analogous mode of operation are used in the present invention without departing from the invention's spirit and scope. Unit 100 features the following exemplary routine:

1—Power on—Set up all registers and counters—S100.
2—Display '888' on LCD 112 with battery symbol—S200.
3—Take a pressure reading—S300.
4—Take a temperature reading—S400.
5—Take a battery reading—S500.
  If the battery reading at S500 is low then display the battery symbol (not shown) on LCD 112—S600.
6—Check to see if Peak Hold button 104 in pressed—S700
  If YES, zero all readings and store values—S800.
  If NO, use current readings—S900.
7—Wait half second (or other appropriate period of time) —checking to see if Peak Hold button 104 and Averaging button 106 are being pushed—S1000.
8—Take a pressure reading S1100.
9—If Peak Hold button 104 pushed go to Peak Hold section S1200.
10—If Averaging selected go to Averaging section S1300.
11—If Temperature selected go to Temperature section S1400.
12—If nothing selected then calculate pressure using values obtained from pressure reading and temperature reading S1500.
13—Go to display routine and display pressure S1600.
14—Check pressure value S1700 —If it is zero then start five minute counter S1800. If it is not zero then reset five minute counter S1900.
15—Go to 7 and repeat.

The Peak Hold section S1200 includes the following routine:

1—Calculate pressure using values obtained from pressure reading and temperature reading sensors PHS 100.
2—Compare old reading with new reading PHS 200.
3—If new reading is greater than old reading then store it for comparison of next new reading and display value PHS 300.
  If new reading is less than old reading then display old reading PHS 400.
4—Go to 7 and repeat.

The Averaging section S1300 includes the following routine:

1—Add new pressure reading to previous pressure readings AS100.
2—Repeat step 1 for desired number of samples AS 200.
3—If desired number of samples has been taken, then divide the final number by the number of samples taken AS 300.
4—Calculate pressure using values obtained from the samples and temperature reading and display this value AS 400.
5—Go to 7 and repeat AS 500.

The Temperature section 1400 includes the following routine:

1—Take a temperature reading TS 100.
2—Calculate value TS 200.
3—Display value TS 300.
4—Go to 7 and repeat TS 400.

The operation of unit 100 includes a gauge usage mode. In the gauge usage mode a user presses On/Off button 102 to power up unit 100. Unit 100 immediately performs a self zeroing function to eliminate the effects of altitude and temperature. Probe 120 is then inserted into the relevant port for measuring the desired pressure.

Display 112 is updated periodically, e.g. approximately every second, for an appropriate or desired period of time, e.g. period of 10 minutes. This update speed can become confusing to the inexperienced user, with very quick fluctuations, therefore an averaging mode of operation has been included with unit 100. The averaging mode of operation limits the display update of unit 100 to update every 10 seconds for the 10 minute period, thus giving a reading which is more stable. Of course, other period updates at desired time periods are also used herein.

Probe 120 can include a variety of sensors and probes for measuring various characteristics of a system, e.g. pressure, temperature, etc. An optional probe 122 (not shown) is attached to unit 100 for measuring temperature. This feature is accessed using the MODE switch 106 of unit 100 to switch to the temperature reading system. Temperature will be displayed either in degrees Centigrade or degrees Farenheight on LCD 112. The user may choose this feature by pressing mode switch 106. Mode switch may optionally be a separate button from the buttons 104–108. The display screen 112 is updated periodically, e.g. every second for the 10 minute time period with the option of actuating the average mode.

A backlight feature of unit 100 facilitates viewing display 112 in the dark or low light environment, and is enabled for as long as light switch 108 is actuated.

Unit 100 includes a unique mode of gauge operation. The object of the design of unit 100 and the circuitry utilized herein is to provide 0.1% pressure resolution and +/−0.5% accuracy in a 100 psi full scale gauge at low cost. The key to the performance of this gauge is the use of a silicon pressure sensor that, while having a highly variable offset and sensitivity, is relatively linear. A microcomputer is used to zero the offset for each reading. The unit also includes a feature that applies a calibration to correct the sensor sensitivity and the tolerance of the other components such as the integrating capacitor, the op amp and the comparator.

Pressure is sensed by a silicon bridge pressure transducer. The sensor output is amplified by a factor of about 14 in a standard instrumentation amplifier configuration using three sections of IC2, an LM324 quad op amp. Resisters R1, R2 and R3 set the gain with R2 also setting enough offset to assure that even if the offset of the sensor is at the worst case end of the specification, there will be a positive signal to measure. This offset is set to about 66 mV to cover the specified 32 mV offset times the gain of the amplifier plus a margin. Power to the sensor and the amplifier is controlled by the microcomputer port pin RA5 to apply power only when a reading is being taken. Capacitor C4 is a local bypass for this power.

To achieve the desired resolution, at low cost, a simple integrating A/D is used. The A/D consists of Resistor R10 and film capacitor C1 feeding comparator IC3. The charging and discharging of the integrator is controlled by a microcomputer port pin RA3. Because the usable input range of the comparator and amplifier is from 0 to 2.5 Volts from the 4 Volt power supply, the integrator capacitor is first charged to the full supply voltage. The time for the capacitor to be discharged is measured by the microcomputer. Resistors R11 and R13 provide a small amount of hysteresis to keep the comparator from oscillating at the transition. The transition of the comparator is fed to the microcomputer port pin RC2 which is the capture timer input. The capture function in the microcomputer allows precise timing because the timer value is captured at the transition even if the microcomputer is otherwise occupied.

To provide temperature compensation of the pressure sensor, a thermistor is used along with resister R5 as divider. The temperature sensor is powered by microcomputer port pin RA2 when a temperature reading is taken. To keep the pressure sensor output from affecting the temperature reading, the signal from the pressure sensor is eliminated by grounding it using microcomputer port pin RA4. Resistor R12 protects the output of the op amp and prevents excessive power supply drain.

Battery voltage is sensed through a high impedance resistor divider consisting of R6 and R7 to minimize the load on the battery to about 2 uA. This divider keeps the battery voltage within the input range of an op amp which is the fourth section of IC2. The battery voltage amplifier is coupled to the A/D input through resistors R8 and R16. When a voltage reading is to be taken, the power to the thermistor is turned off by making RA2 an input, the output of the pressure sensor is shorted with RA4, and RA0 is made an input to allow the battery signal to the A.D.

When the battery voltage is not being read, RA0 is made a low output to keep the output of the amplifier from influencing the other readings. Power is supplied from the batteries through a 4 Volt regulator which has very low quiescent current to minimize battery drain. Capacitors C2 and C3 keep the regulator stable. The sounder is driven directly from the microcomputer through port pin RC0. The microcomputer generates a 4 kHz square wave signal to drive the sounder.

The clock for the microcomputer is generated with a ceramic resonator CR along with capacitors C5 and C6 and circuits in the microcomputer to form an oscillator.

The microcomputer reset circuit consists of pull up resistor R15 and switch S1. At the end of each reading cycle, the microcomputer is put in sleep mode which is a very low power consumption mode. When the switch is closed and released, the microcomputer is reset and starts a new cycle.

Switches S2 through S5 provide extra functionality to the product. S2 provides a MODE function though which is accessed alternate features such as temperature reading options. S3 enables an Averaging mode in which the readings are sampled, averaged and the display updated approximately 10 times less frequently than in standard mode. S4 gives a Backlight function for the display. S5 is multiplexed to the sounder output and has yet to be defined.

The display is a two-level multiplexed LCD. The display segments are driven by microcomputer port pins RB0 to RB7 and RC5 to RC8. The two planes are driven by RC1 and RC3. To provide the intermediate voltage on the plane lines, resistors R17 to R20 form a pair of voltage dividers.

The timing of the drive signals from the plane and segment drivers is such as to provide a 4 volt AC wave form for segments that are off. This conforms to the requirements that there be AC signals only on each segment. The timing is critical so the display is turned off during A/D conversions so the AC waveforms are not interfered with by the reading processes.

Unit 100 features a test and calibration mode of operation. The test system is driven by a National Instruments PC-LPM-16 A/D and digital I/O cared in an IBM compatible personal computer. A series of tests and measurements are performed and calibration factors are calculated and then programmed into the EPROM in the microcomputer on the gauge. The test system consists of a program running on the PC written with National Instruments LabWindows for DOS and Microsoft Basic and a test program in the pressure gauge that interacts to provide a series of measurements to test the gauge performance and support the calculation of calibration factors.

A first test mode of operation is used to verify that the voltage regulator is functioning within limits. The microcomputer is taken out of reset with voltage applied to the op amp power port pin RA5. This invokes the test software in the microcomputer. The transition from one test to the next is caused by raising and lowering the voltage on the port pin RB6. The tests run include taking a zero pressure reading, a temperature reading, a battery voltage reading and a reading from applying a known voltage to the A/D with the other sources disabled. Then a standard pressure is applied and readings taken. For the zero pressure, reference voltage, and the test pressure, the digital value measured by the microcomputer is read out by clocking RBI and reading the 16 bit data on RBI on bit at a time.

The calibration table for the pressure readings consists of a piece-wise linear model of the exponential curve of the RCA integrating A/D. There are 55 table entries that are calculated from the test readings as well as calculated values of a calibration factor for sensitivity and low battery voltage as well as a fixed temperature compensation factor are set up in an array.

There is provision for four sets of calibration factors. A byte in the beginning of program memory (location 02H) is used to indicate which tables are available. A bit is programmed for each table used. The microcomputer is put into programming mode by raising the reset line to 12 Volts. The memory table byte is first read. This directs the PC program as to how many memory locations to index before starting the programming process. Each byte is verified after programming.

Each test is reported on the screen. Only if all of the tests are passed does the programming proceed. Any failure designation points to the section of the circuit as described above.

The pressure sensor wiring is particularly fragile. A failure of the pressure offset or pressure test will often be due to a broken wire or a solder short. This can be traced by looking at the two output lines. No voltage on either of them suggests that the supply line is open. Likewise, both high suggests that the ground line is open. If one line is at around 2 Volts and the other is high or low, there is an open or short on that line.

The circuitry and functionality of unit 100 facilitates for rapid, low cost, universal expansion of the capabilities of the unit 100. In that regard a variant of unit 100 provides for a 4 Digit display allowing pressures up to 4000 PSI by an RS232 communication link or other appropriate communication link to a host computer (not shown) from unit 100. Multiple units 100 are also contained in the same package. Unit 100 also includes circuitry and routines that allow for simultaneous temperature and pressure readings to be taken and displayed on unit 100. The present invention also utilizes interchangeable probes 120 having different sensing capabilities that are universally adaptable to communication link 114 for provision of signals to unit 100.

In the field, a user presses On/Off button 102 to power up or power down unit 100. A zeroing function is automatically activated to eliminate the effects of altitude and temperature. Optionally, the zeroing function is manually activated by the user on an as needed basis.

Probe 120, or other appropriate sensor, is inserted into the relevant port for measuring the desired pressure. The temperature is measured automatically, on a regular basis, so as to adjust for this variable. Display 112 is updated approximately every second for a period of 1 Hour. This update speed can become confusing to the inexperienced user, with very quick fluctuations, therefore an averaging mode has been included. The average mode limits the display to update at a much slower rate for the 1 Hour period, thus giving a reading which is more stable. An optional probe (not shown) may be attached to the unit for measuring temperature. The feature is accessed using MODE switch 106 to the temperature reading system.

Temperature will be displayed either in Deg. Centigrade or De. Farenheight. The user may choose between the two systems by pressing the mode switch 106. Screen 112 is updated every second for the 1 Hour time period with the option of actuating the average mode. A backlight facilitates viewing the display in a dark environment. It is enabled for as long as the light switch is held. Backlighting is accomplished using Light Emitting Diodes or an Electrical Luminescent material.

The circuit operation of unit 100 is as follows: The object of this design is to provide 0.1% pressure resolution and +/−0.5% accuracy in the full scale pressure range of the gauge. The key to the performance of this gauge is the use of a silicon pressure sensor that, while having a highly variable offset and sensitivity, is relatively linear. A microcomputer is used to zero the offset for each reading. It also applies a calibration factor to correct for the sensor sensitivity and the tolerance of the other components such as the integrating capacitor, the amplifier and the comparator.

The pressure is sensed by a silicon bridge pressure transducer. The sensor output is amplified by a standard instrumentation amplifier configuration using three operational amplifiers. Resisters set the gain and the offset in such a fashion so as to assure that even if the offset of the sensor is at the worst case end of the specification, there will be a positive signal to measure. Power to the sensor and the amplifier is controlled by the microcomputer so as to apply power only when a reading is being taken. A capacitor provides a local bypass for this power.

To achieve the desired resolution an integrating ADC (Analog to Digital Converter) is used. The ADC consists of a resistor and a film capacitor feeding a comparator. The charging and discharging of the integrator is controlled by the microcomputer.

The usable input range of the comparator and amplifier is limited therefore, the integrator capacitor is first charged to the full supply voltage. The time for the capacitor to be discharged is measured by the microcomputer. A resistors network provides a small amount of hysteresis to keep the comparator from oscillating at the transition. The transition of the comparator is fed to the microcomputer capture timer input.

The capture function in the microcomputer allows precise timing because the timer value is captured at the transition even if the microcomputer is otherwise occupied.

Temperature compensation of the pressure sensor is achieved using a thermistor with a resister. The temperature sensor is powered by the microcomputer when a temperature reading is taken. To keep the pressure sensor output from affecting the temperature reading, the signal from the pressure sensor is eliminated by grounding it using a microcomputer port pin.

A limiting resistor protects the output of the op amp and prevents excessive power supply drain.

The battery voltage is sensed through a high impedance resistor divider network to minimize the load on the battery to about 2 uA. This network keeps the battery voltage within the input range of the measuring operational amplifier.

The amplifier is coupled to the ACD input through two resistors. One resistor allows the output to be shorted to ground thus disabling this signal. The other resistor buffers the ADC input when this signal is disabled.

When a voltage reading is to be taken, the power to the thermistor is turned off. The output of the pressure amplifier is shorted to ground and the battery signal is allowed to the ADC. When the battery voltage is not being read the output of the amplifier is disabled to keep it from influencing the other readings.

Power is supplied from the batteries through a 4 Volt regulator which has very low quiescent current to minimize battery drain. Bypass capacitors keep the regulator stable.

The sounder is driven directly from the microcomputer by it generating a 4 kHz square wave signal.

The clock for the microcomputer is generated with a ceramic resonator with its two associated capacitors, and the relevant circuits in the microcomputer to form an oscillator.

The microcomputer reset circuit consists of a pull up resistor and a switch. This switch enables the unit to be turned On and Off. When the switch is closed and released, the microcomputer is reset. Flags are set up in the microcomputer which indicate the desired state of functionality, i.e. On or Off, such that when it is reset the relevant state is entered into.

Four other switches provide extra functionality to unit 100:

1. One switch provides an Averaging or Mode function in which the readings are sampled, averaged and the display updated less frequently than in standard mode. This switch also enables the zeroing feature for the user. When the unit is turned on, with this switch pressed at the same time, the meter is zeroed to the ambient pressure and temperature.
2. The second switch gives a backlight function for the display.
3. The third switch gives a peak hold function where the highest reading is updated to the display.
4. The fourth switch is multiplexed to the sounder output.

Display 112 is a two-level multiplexed LCD. The display segments are driven by the microcomputer or microprocessor (a single or multiple microprocessors are used herein). The two backplanes are driven in a half bias fashion. To provide the intermediate voltage on the backplane lines resistor networks form a pair of voltage dividers. The timing of the drive signals from the plane and segment drivers is such as to provide a signal that is out of phase with relation to the backplane voltages for segments that are to be turned on and a signal that is in phase for segments that are off. This also conforms to the requirements that there be AC signals only on each segment. The timing is critical so the display is turned off during A/D conversions so the AC waveforms are not interfered with by the reading processes.

Test and calibration features of the invention are as follows: The test system is driven by an ADC and digital I/O card in a platform computer. A series of tests and measurements are performed. Calibration factors are calculated and then programmed into the EPROM in the microcomputer on the gauge. The test system consists of a program running on the platform computer and a test procedure in the pressure gauge that interact to provide a series of measurements to test the gauge performance and support the calculation of calibration factors.

The first test is to verify that the voltage regulator is functioning within limits. Then the microcomputer is taken out of reset with a voltage applied to the op amp power rail. This invokes the test software or firmware in the microcomputer. The transition from one test to the next is caused by raising and lowering the voltage on one of the microcomputer pins. The tests include taking a zero pressure reading, a temperature reading, a battery voltage reading and a reading from applying a known voltage to the ADC with the other sources disabled. Then a standard pressure is applied and readings taken. For the zero pressure, reference voltage, and the test pressure, the digital value measured by the microcomputer is read out by clocking the microcomputer pin and reading the data on a second pin, one bit at a time.

The calibration table for the pressure readings consists of a piece-wise linear model of the exponential curve of the RCA integrating ADC. There are 55 table entries that are calculated from the test readings as well as calculated values of a calibration factor for sensitivity and low battery voltage as well as a fixed temperature compensation factor are set up in an array.

There is provision for four sets of calibration factors. A byte in the beginning of program memory is used to indicate which tables are available. A bit is programmed for each table used. The microcomputer is put into programming mode by raising the reset line to 12 Volts. The memory table byte is first read. This directs the PC program as to how many memory locations to index before starting the programming process. Each byte is verified after programming.

Each test is reported on the screen. Only if all of the tests are passed does the programming proceed. Any failure designation should point to the section of the circuit as described above. The pressure sensor wring is particularly fragile. A failure of the pressure offset or pressure test will often be due to a broken wire or a solder short. This can be traced by looking at the two output lines. No voltage on either of them suggests that the supply line is open. Likewise, both high suggests that the ground line is open. If one line is at around 2 Volts and the other is high or low, there is an open or short on that line.

Unit 100, the routines associated with the mode of operation of the unit and the circuitry provide unique features that include unlimited mobility and portability (where a battery is used herein a rechargeable, portable energy source is used); unit 100 covers a multitude of applications using the same gauge assembly with a variety of different adapters. Other unique features include the remote transducer of the present invention; remote altitude compensation (real-time); remote temperature compensation; 3 or 4 digit display on display 112; automatic and continual conversion to KPa and PSI; temperature measurement using the same probe assembly; and the backlight feature described above.

Unit 100 includes a power saving mode of operation. In this mode of operation unit 100 turns off after a predetermined time when reading less than 0.5% of full scale (5 Minutes). Unit 100 turns off after a predetermined time (1 Hour). As described above, the different modes of operation include a regular mode of operation, an averaging mode of operation, a peak hold mode of operation, a pressure sensing mode of operation, and a temperature sensing mode of operation. Unit 100 provides the advantage of being accurate to 0.5% over its full range or measurement.

Another unique feature of unit 100 includes the fact that housing 116 of unit 100 is manufactured of aluminum. This feature provides the unit with excellent RFI and EMI shielding properties, lightness of weight, and creates a very sturdy damage resistant unit 100. Unit 100 is also ergonomically shaped and dimensioned to readily fit into the palm of the hand of a user. By way of example, the height H of the top portion of unit 100 in preferably in the range of about 1.8–2.5 inches, the width W of the top portion of unit 100 is in the range of 2.5–3.5 inches (FIG. 2). Bottom portion B of unit 100 (FIG. 2) is generally dimensioned to readily fit into the palm of an adult male/female and be readily grasped thereby. The depth D of unit 100 is preferably in the range of 0.5 to 1.0 inches. These dimensions are only exemplary and other dimensions are also contemplated herein.

Optionally, casing or housing 116 is anodized to give a visually appealing finish and added durability. Unit 100 further includes an optional magnet 126 (FIG. 3) on the back of unit 100 that facilitates sticking or removable retention of unit 100 to ferrous surfaces that include tool boxes, automobile components, and the like.

Optional features of the invention includes the ability to measure pressures up to 4000 PSI, the addition of vacuum measurements, RS232 (or other communication to a host computer (not shown), the utilization of multiple units 100 in the same package of kit, the use of a communication link that utilizes telemetry between the remote probe 120, and the gauge assembly unit 100, and/or a remote personal computer.

The present invention also includes a Digital Remote Gauge assembly kit that is packaged in a variety of different formats and that includes unit 100, a communication link 114, and a plurality of probes, e.g. probe 120, and other probes for measuring external parameters. The kit includes, but is not limited to, a combination of different kits which include a variety of different adapters suited to taking readings from different sources utilizing different source ports.

The kit includes sensors or probes that are compatible with different sources of pressure that include, but are not limited to, oil pressure, air pressure, transmission fluid pressure, power steering fluid pressure, brake line pressure, fuel injection pressure, and/or combinations thereof. The various adapters that are used in the kit of the present invention include, but are not limited to, Swivel Female JIC adapters, Air pressure (Schrader valves) adapters, NPT fittings, and other adapters known in the art. It is further appreciated that the unit provides for increased measurement sensitivity at low cost.

Figure 4A:
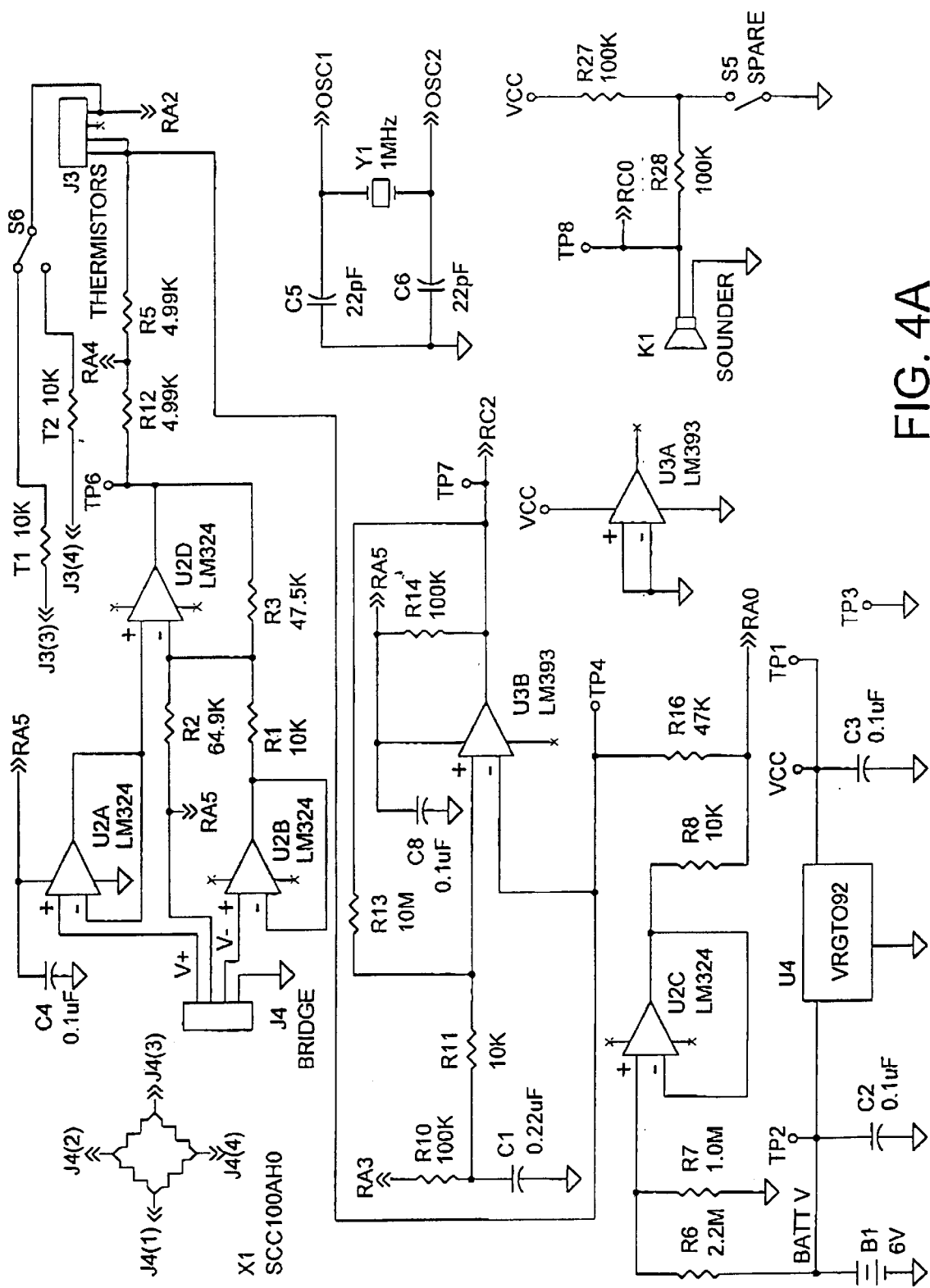
FIGS. 4A–4B illustrates an electrical schematic of the digital remote gauge assembly unit of FIG. 1.
Figure 4B:
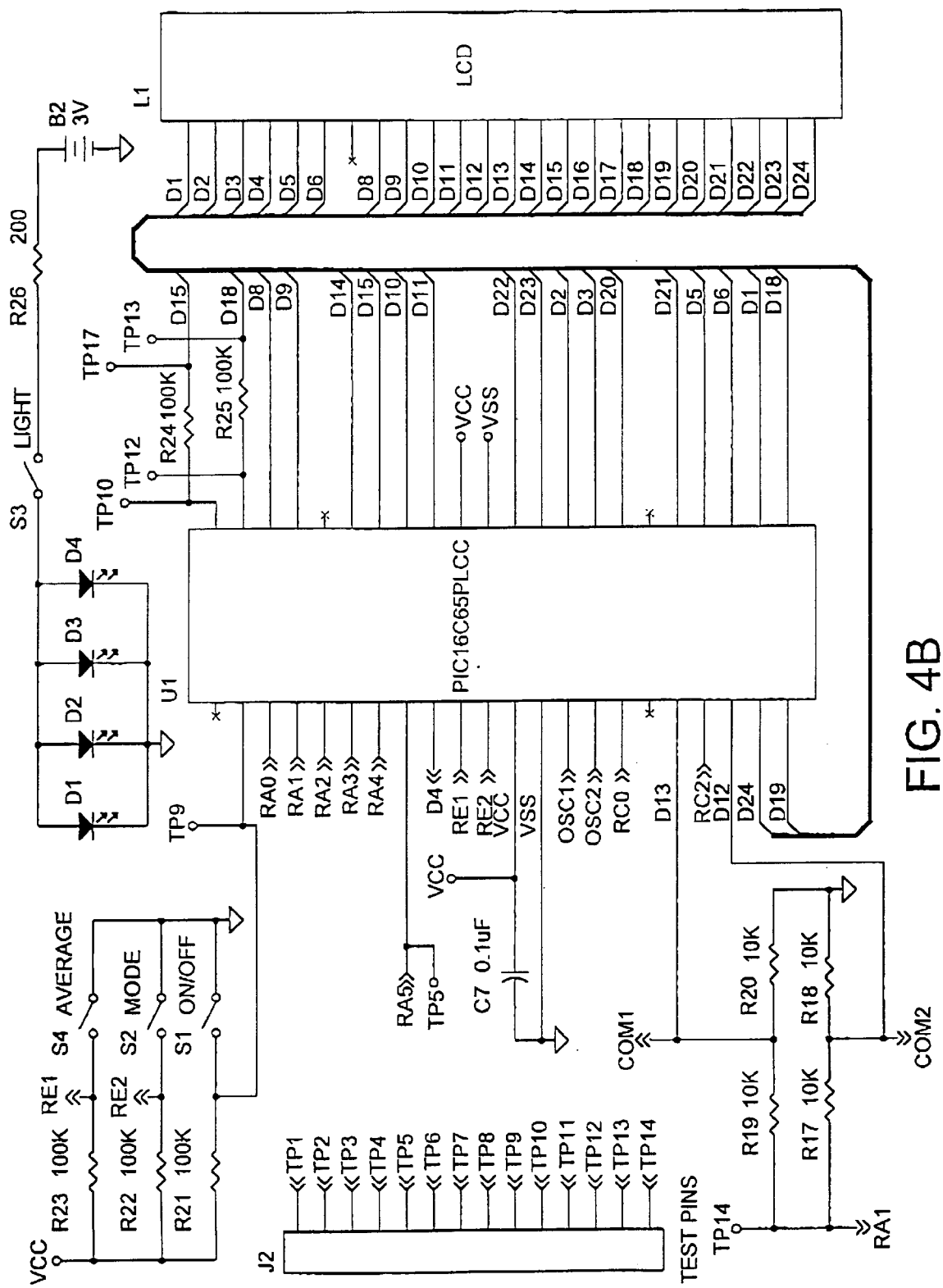

FIGS. 4A–4B illustrates an electrical schematic of the digital remote gauge assembly 100 of FIGS. 1–3. The key to the performance of gauge 100 is the use of a silicon pressure transducer SCC100AH0 that, while having a highly variable offset and sensitivity, is relatively linear. The silicon pressure transducer is commercially available from Sensym, Inc. of Milpitas, Calif. The microcomputer U1 is used to zero the offset for each reading and also applies a calibration to correct the sensor sensitivity and the tolerance of the integrating capacitor C8, the op amp U2c and the comparator U3b.

The pressure is sensed by a silicon bridge pressure transducer SCC100AH0 connected to J4. The transducer SCC100AH0 output is amplified by a factor of about 14 in a standard instrument amplifier configuration using U2a, U2b, and U2d which are three sections of an LM324 quad op amp.

Resisters R1, R2 and R3 set the gain where R2 also provides an offset to assure that even if the offset of the sensor is in a worst case state, there will be a positive signal to measure. This offset is set to about 600 mV to cover the specified 32 mV offset multiplied by the gain of the amplifier U3b plus an additional margin. Power to the sensor and the amplifier is controlled by the microcomputer U1 port pin RA5 to apply power only when a reading is being taken. Capacitor C4 is a local bypass for this power.

To achieve the desired resolution, at low cost, a simple integrating analog to digital (A/D) converting circuit is used. The A/D circuit consists of resistor R10 and a film capacitor C1 feeding comparator U3b. The charging and discharging of the integrating circuit is controlled by microcomputer U1 port pin RA3. Because the usable input range of the comparator U3b and amplifier U2d is from 0 to 2.5 Volts from the 4 Volt power supply. The integrator capacitor C1 is first charged to the full supply voltage. The time for the capacitor C1 to be discharged is measured by the microcomputer U1. Resistors R11 and R13 provide a small amount of hysteresis to keep the comparator U3b from oscillating at the transition point. The transition of the comparator U3b is fed to the microcomputer U1 port pin RC2 which is the capture timer input. The capture function in the microcomputer U1 allows precise timing because the timer value is captured at the transition even if the microcomputer U1 is otherwise occupied.

To provide temperature compensation, of the pressure sensor SCC100AH0, a thermistor T1 is used along with resister R5 as divider. An attachable temperature sensor connected to J33 and J34 is powered by microcomputer U1 port pin RA2 when temperature reading is taken. To keep the pressure sensor SCC100AH0 output from affecting the temperature reading, the signal from the pressure sensor SCC100AH0 is eliminated by grounding it using microcomputer U1 port pin RA4. Resistor R12 protects the output of op amp U2d and prevents excessive power supply drainage.

Battery B1 voltage is sensed through a high impedance resistor divider consisting of R6 and R7 to minimize the load on the battery B1 to about 2 uA. This divider keeps the battery voltage within the input range of op amp IC2d. The battery voltage amplifier U2c is coupled to the A/D circuit input through resistors R8 and R16. When a voltage reading is to be taken the power to the thermistor T2 is turned off by switch S6, making RA2 an input. The pressure sensor SCC100AH0 is shorted with RA4, and RA0 is made an input to allow the battery signal to the A/D circuit. When the battery voltage is not being read, RA0 is made a low output to keep the output of the battery voltage amplifier U2d from influencing the other readings.

Power is supplied from battery B1 through a 4 Volt regulator U4 which has very low quiescent current to minimize battery drain. Capacitors C2 and C3 keep the regulator stable. Further, power is supplied to microcomputer U1 port pin 1 via Comparator U3a serving as a current source.

The sounder is driven directly from the microcomputer U1 through port pin RC0. The microcomputer U1 generates a 4 kHz square wave signal to drive sounder K1.

The clock for the microcomputer is generated by a 1 Mhz ceramic resonator X1 along with capacitors C5, C6 and circuits in the microcomputer to form an oscillator driving microcomputer U1 port pins OSC1/C1 and OSC/C0.

The microcomputer reset circuit consists of pull-up resistor R15 and switch S1. At the end of each reading cycle, the microcomputer U1 is put in sleep mode which is a very low power consumption mode. When the switch S1 is closed and released, the microcomputer U1 is reset and starts a new cycle.

Switches S2 through S5 provide extra functionality to this invention. Switch S2 provides a function to which to accesses alternate features such as temperature reading options. Switch S4 enables an Averaging mode on which the readings are sampled, averaged and the display is updated approximately 10 times less frequently than in the inventions standard operating mode. S4 gives a Backlight function for the LCD display L1. Switch S5 is multiplexed to the sounder output and has yet to be defined. Switch S3 turns on LEDs D1, D2, D3 and D4.

The display L1 is a two-level multiplexed LCD, having a first plane and a second plane, whereon each plane has predefined plane lines. The display segments are driven by microcomputer U1 port pins RB0 to RB7 and RC5 to RC8. The two planes are driven by RC1 and RC3. To provide the intermediate voltage between on the planes lines, resistors R17 to R20 form a pair of voltage dividers. Ports Com1 and Com2 provide RS232 communication with an external device. It is further appreciated that a wide range of temperatures and pressures can be measured utilizing the present invention.

Before connecting fuel line and JIC fittings, a few drops of clean engine oil are applied to JIC ends to ensure proper connection with female connectors. Whenever connecting or disconnecting from a fuel system, a shop towel is optionally used to catch any fuel that may leak out of line or JIC fittings and the towel is disposed of in approved container when finished. If leakage is observed during testing with gauge 100, the ignition is turned off or foci pump is disabled and foci pressure is relieved, if necessary. Spilled fuel is wiped up and leaks are connected before continuing. When using hose adapters, hose is secured with hose clamps to ensure leak-free connections.

With respect to reading temperature gauge 100 comes with the capacity to read the temperature (°C. or °F.) of the fluid being tested. Gauge 100 utilizes heat passive alloy in the construction of probe assembly 226. Several minutes pass for the temperature of the fluid sensed to reach the temperature sensing element in probe body 120 and a lag time in reading a response is experienced. Allowance for this lag time is made before reading temperature.

Assembly 100 has been calibrated for pressure and temperature. This procedure allows for the use of oil. Threaded cap 230 has been provided on probe end 232 to prevent leakage of excess oil. Cap 230 must be removed before attaching gauge 100 to a manifold.

The digital remote fuel pressure gauge assembly 100 provides a technician with an accurate and efficient method of testing a variety of program applications on cars and light trucks, remotely displaying system pressure while a vehicle is being driven. For the digital remote fuel pressure gauge assembly 100 to be useful, the technician must be able to read the pressure while the vehicle is driven under load. Pressure gauge 100 gives the technician the ability to duplicate the problem the customer has described and see the problem firsthand. This reduces the guesswork when diagnosing system pressure problems.

Gauge assembly 100 displays pressure readings from 0 to 100 PSI (pounds per square inch) in increments of tenths of a PSI, or in the equivalent KPA (Kilo Pascal) measurement. The accuracy is about 1% over the full temperature range. Gauge 100 is microprocessor 234 controlled, and is temperature and altitude compensated. Digital remote fuel pressure gauge assembly 100 has the capacity to read the temperature of the fluid being tested in either °C. or °F.

Some typical applications where the digital remote fuel pressure gauge assembly will provide a revolutionary method of reading pressure are in reading oil pressure, air pressure, fuel line pressure and coolant pressure. Assembly 100 gives the technician the ability to have the vehicle test driven and gather the information needed to diagnose the problem without time consuming and costly guesswork.

Digital remote fuel pressure gauge assembly 100 provides a unique ergonomically designed case made of anodized aluminum, is accurate to =1% over the working pressure range of 100 PSI, 1/Loth psi resolution, provides surface mount technology that offers a high degree of reliability, is microprocessor 234 controlled, is temperature and altitude compensated, has a polarized LCD display 112, features KPA/PSI conversion, provides a peak hold feature, provides a HI/LO resolution feature that allows instant or averaged sampling control, provides an electroluminescent backlight, low battery indicator, 2 lithium coin cell batteries for about 120 hours of sustained use, and reads temperature of fluid being tested in either °C. or °F. Digital remote probe assembly includes JIC quick disconnect with fittings and a coupler allows quick and easy attachment to adapters shown herein, and is made of a rugged heat passive alloy 238.

The pressure transducer is temperature and altitude compensated when used in conjunction with digital remote fuel pressure gauge 100. Gauge 100 provides rapid engine installation, via multi-conductor shielded cable 242 (which can be in the range of five to twenty feet in length) is connected to hand-held gauge 100, cable 242 allows monitoring from within the vehicle. Rugged strain relief members 244, 244' make probe assembly 100 extremely durable. Sliding protective cable sleeve 246 protects cables 114, 242 when passed through the passenger window during remote use. Multi-conductor cable 114, 242 is constructed to withstand a temperature range of −20° F. to 280° F. continuously.

Figure 19:
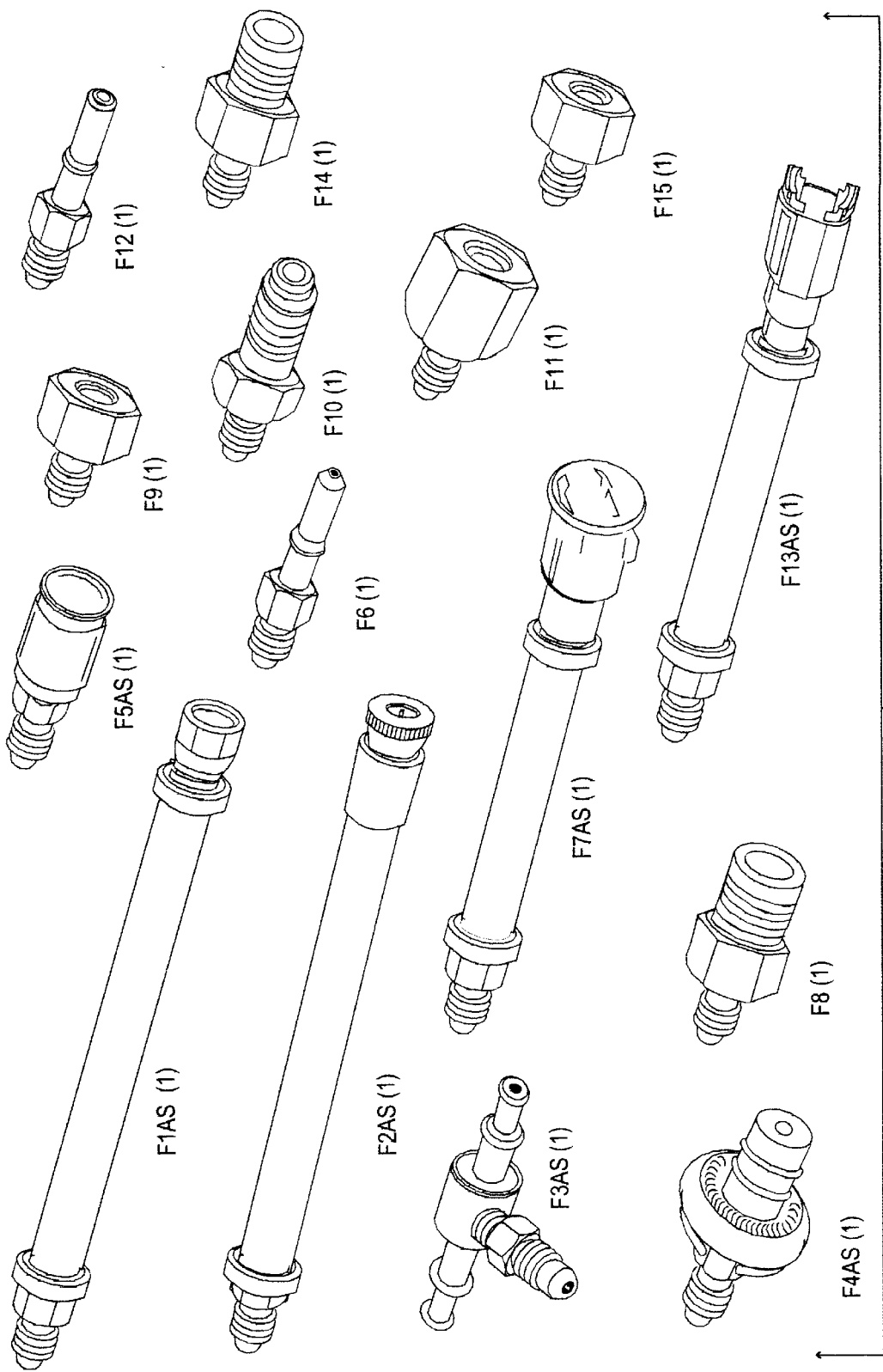
FIGS. 19–21 illustrate various adapters, manifolds and accessories of the present invention.
Figure 20:
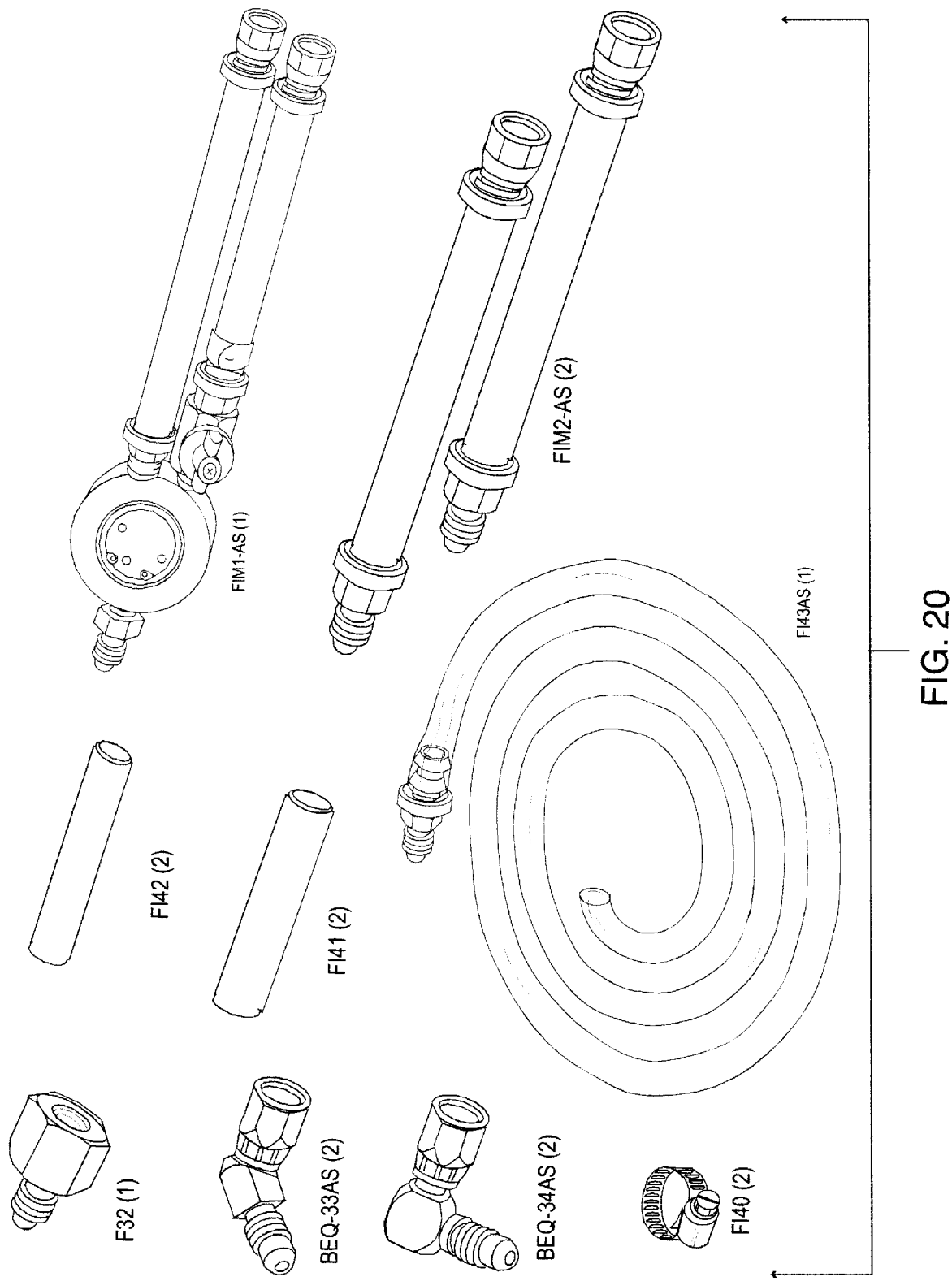
Figure 21:
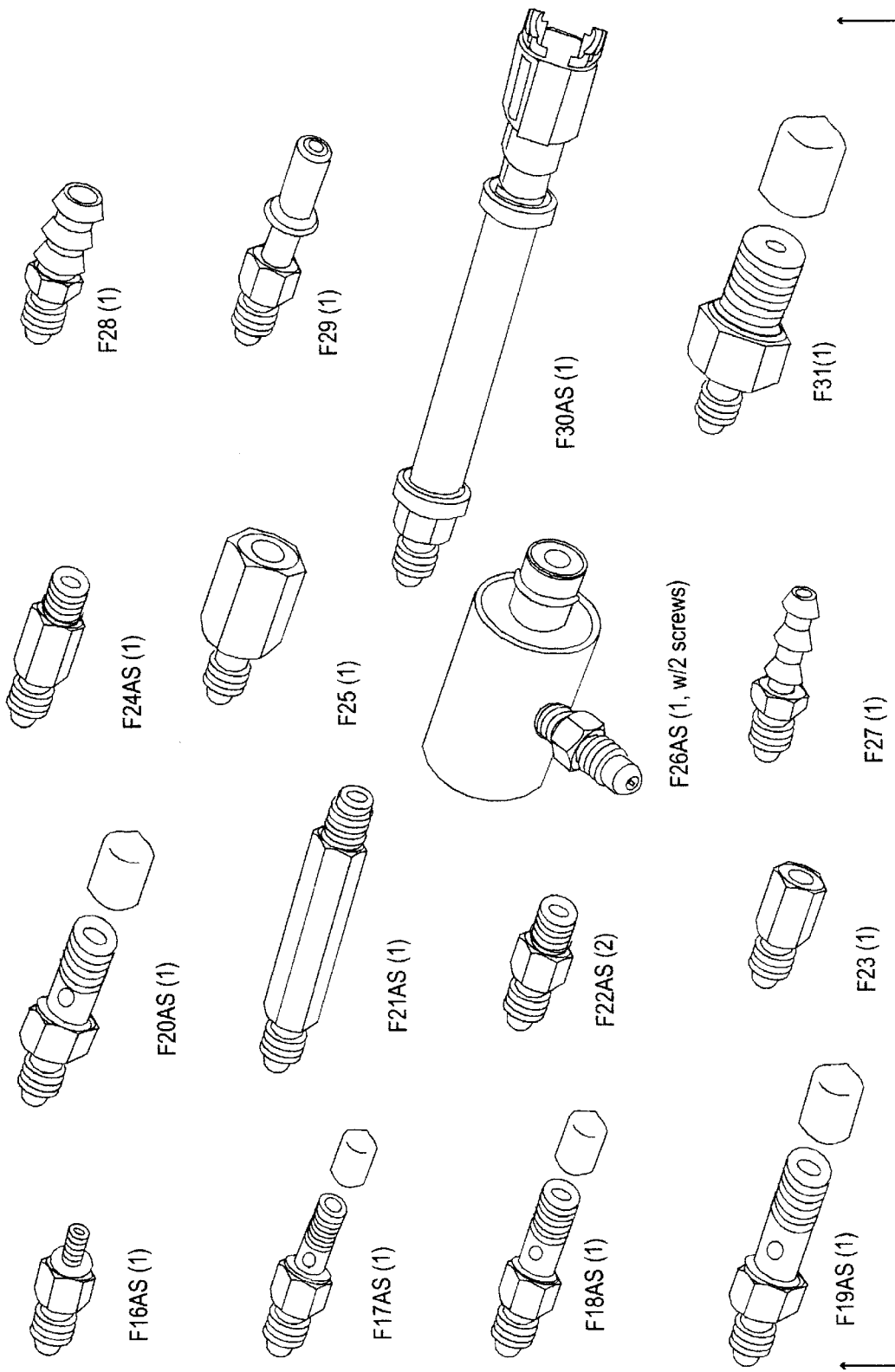

Gauge assembly 100 provides adapter kits the parts of which are illustrated in FIGS. 19–21. The adapter kits are designed for use with digital remote fuel pressure gauge 100. Kits include hoses, quick disconnect couplers and adapters, both male and female, needed to access the fuel supply of the fuel injection systems for each particular kit. Kits also includes a vehicle application look-up tables 256 (attached hereto as Appendix A), outlining specific guidelines for the application and usage of the manifold (FIGS. 22–25) and adapters 254 for the kit 256. Vehicle look-up tables 256 include make, model and years for easy vehicle identification, as well as the pressure readings needed for the particular vehicle.

Several kits are provided including a grand master kit with digital remote fuel pressure gauge 100. Kit is the most complete and versatile adapter kit available. Domestic master kit includes a combination of adapters to access all domestic fuel injection systems on vehicles from 1980–86. Foreign master kit includes a combination of adapters to access all import fuel injection systems on vehicles from 1977–96. Domestic basic kit includes adapters needed to access most domestic fuel injection systems on most GM/Saturn, Ford and Chrysler vehicles. Foreign basic kit includes adapters (FIGS. 19–21) needed to access most foreign fuel injection systems including: Geo, Honda, Hyundai, Infiniti, Isuzu, Mazda, Mitsubishi & Nissan.

Optional accessories include knee board attachment (not shown) that allows the user to hold and read gauge 100 with hands free to make notes on the attached pad, air chuck, a snap-on adapter quick disconnect to JIC converters, ⅛" NPT to JIC for snap-on gauge conversion, a 1 liter bottle used for volume testing, and 2 snap-on quick disconnect to snap-on FI Series adapters.

Gauge assembly 100 includes a number of commands and modes of operation. The PSI mode is one in which the LCD screen 112 shows a pressure read in PSI (pounds per square inch) measurement. The KPA mode is one in which the LCD screen 112 which shows a pressure read in KPA (kilo pascal). The PEAK HOLD mode is a function of the unit which is displayed on LCD screen 112 and shows the highest pressure read during the sample taken. The HI/LO RES (Resolution) mode is a function of the unit which is displayed on LCD screen 112 and gives the technician a choice of LO RES which shows the average pressure from a sample of 8 consecutive readings or HI Res which shows the ranging of the pressure in the fuel system in real time. The Temperature mode is a function of the unit which reads the temperature of the fluid being tested in either °C. (Centigrade) or °F. (Fahrenheit).

Figure 5:
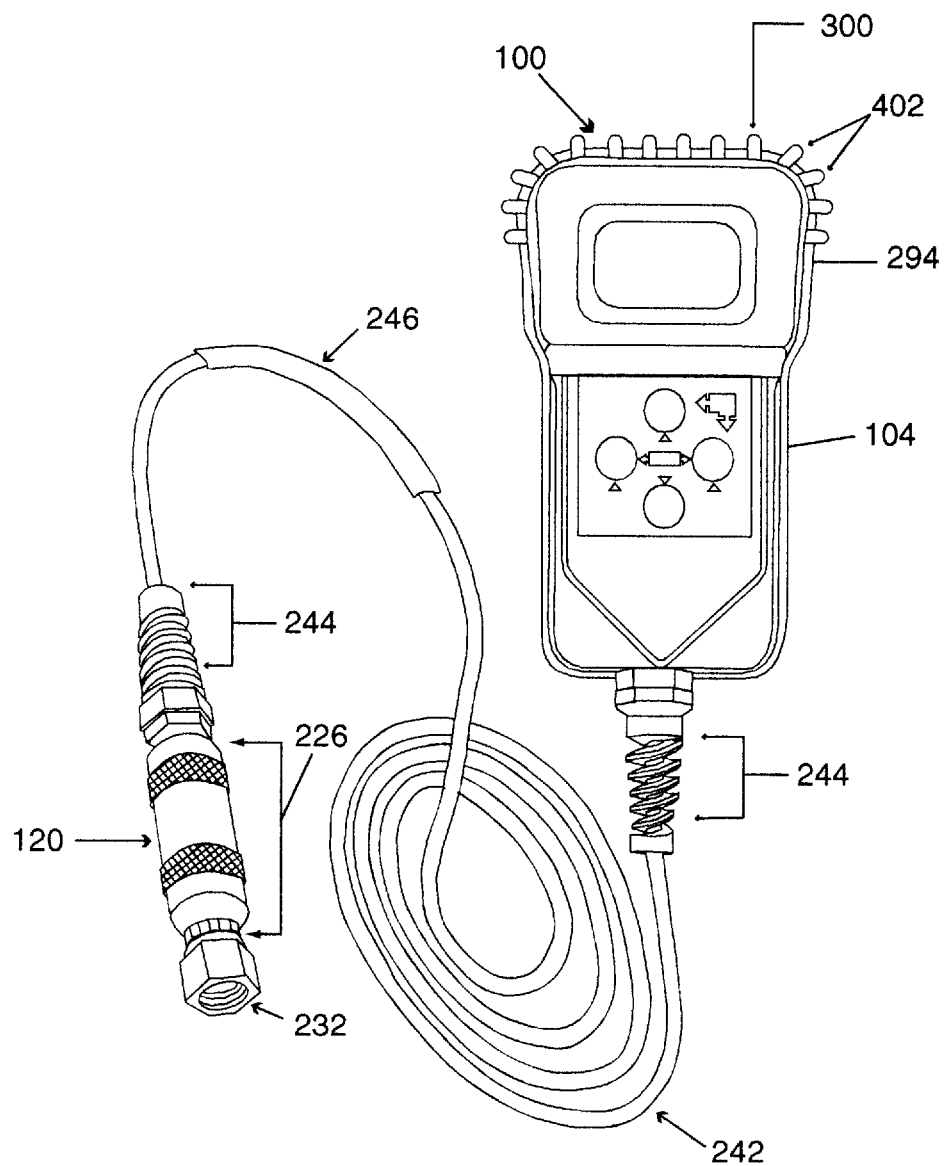
FIG. 5 illustrates a front perspective view of the digital remote gauge assembly of the present invention having a sleeve and optional boot.

FIGS. 1 and 5 are a front view of gauge assembly 100. Gauge assembly 100 includes gauge body 116 which is an anodized aluminum casing which houses microprocessor 234, internal electronics 292 and LCD window 294 of display 112. Other appropriate materials may also be used to construct gauge body such as rugged and durable plastics and the like.

LCD Screen 112 includes a liquid crystal display which shows pressure in 0–100 PSI increments of tenths of a PSI, or in the equivalent KPA measurement. Temperature can also be displayed here in °C. and °F. Screen 112 shows a steady display when in LO RES Mode and blinks when in HI RES Mode.

Function buttons 102, 104, 106, and 108 include 4 pressure sensitive rubber buttons which access unit 100 functions. Strain relief is provided by a pliable, water-resistant seal 296 which protects connection between cable 114 and gauge body 116 and/or probe assembly 120. Cable 114 is a 12 foot multi-conductor shielded cable between gauge body 116 and probe assembly 120 in one variant which gives unit 100 the convenient required distance between actual test position and read-out. Probe assembly 100 is made of a heat passive alloy, assembly 100 houses pressure transducer 240 and temperature compensation component 298; complete with JIC connector.

A durable and pliable protective sleeve 246 is provided for the protection of cable 114 when unit 100 is used remotely. Sleeve 246 slides along cable 114 to enable it to be positioned where the window of the passenger side window closes on the cable when the unit is being used to read pressure while test driving this vehicle. A removable protective boot cable sleeve 300 made from a molded case of black PVC material is provided to add protection to the gauge body 116. Boot 300 is molded to fit gauge body 116 snugly and designed for a comfortable and effective hand grip.

Figure 6:
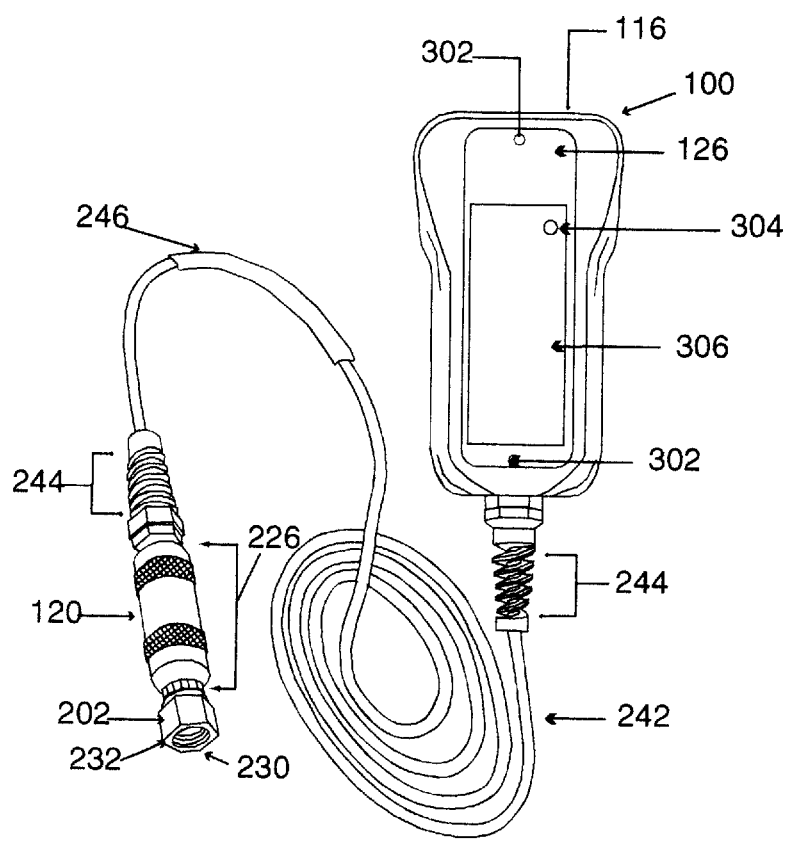
FIG. 6 illustrates a rear perspective view of the gauge assembly of FIG. 5.
Figure 7:
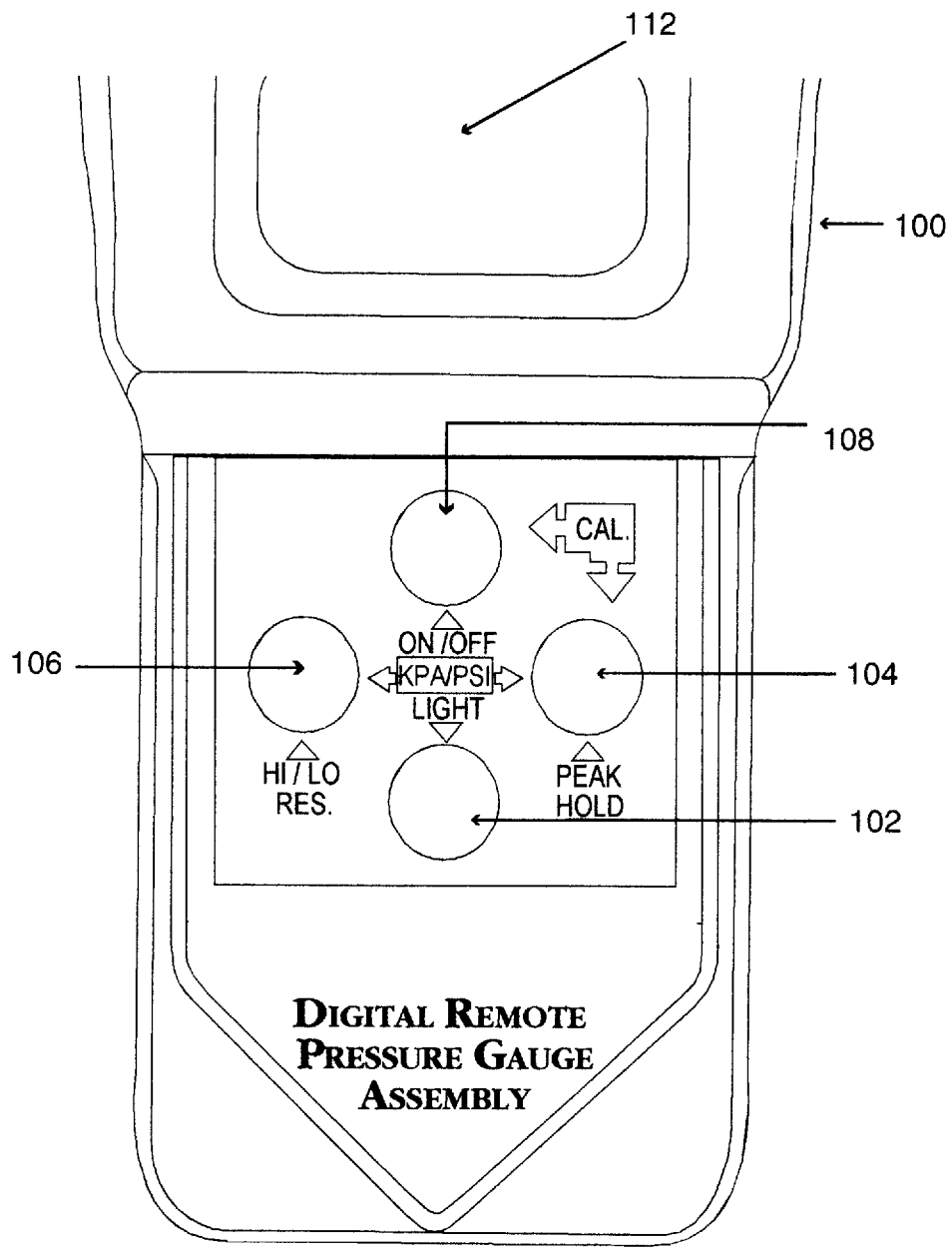
FIG. 7 illustrates a close-up view of the gauge assembly of FIG. 6 without the boot.

FIG. 6 provides a back view of gauge 100 with boot 300 removed. Boot 300 is illustrated in FIG. 5 and includes a number of gripping protuberances 402. A battery cover includes removable plate 126 which unscrews at screws 302 to allow access to replace the 2-# CR2032 lithium coin cell batteries which are located inside body 116. Other battery sources of power are also contemplated herein.

Screws 302 hold gauge body 116 together, and are removed during battery replacement. Piezo buzzer opening 304 is an opening from which audible "buzzer" sounds emanate. Optional magnet 306 enables gauge body 116 to adhere to any convenient magnetic surface and to attach unit 100 to where it best suits use. Magnet 306 is applied to back of boot 300.

On/Off button 108 is used to turn unit 100 on and off, and is also used in conjunction with Peak/Hold button 104, to calibrate. Peak/Hold button 104 activates the Peak/Hold Mode and aids in calibration. Button 104 aids in choosing a PSI or KPA Mode for display of pressure readout and in accessing Temperature Mode. HI/LO Res button 106 activates the HI/LO Resolution Mode and aids in choosing the PSI or KPA Mode for display of pressure readout and is used in accessing Temperature Mode. Light button 102 illuminates LCD screen 112 for easy reading when visibility is poor.

Figure 8:
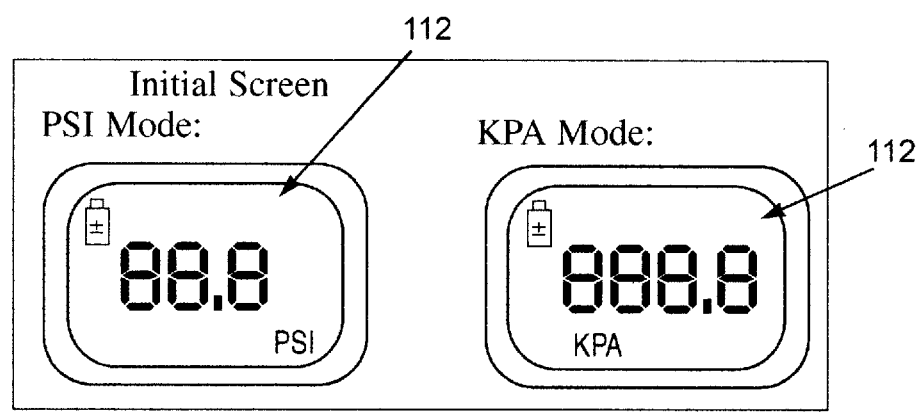
FIG. 8 illustrates an initial screen of the gauge assembly of FIG. 5.
Figure 9:
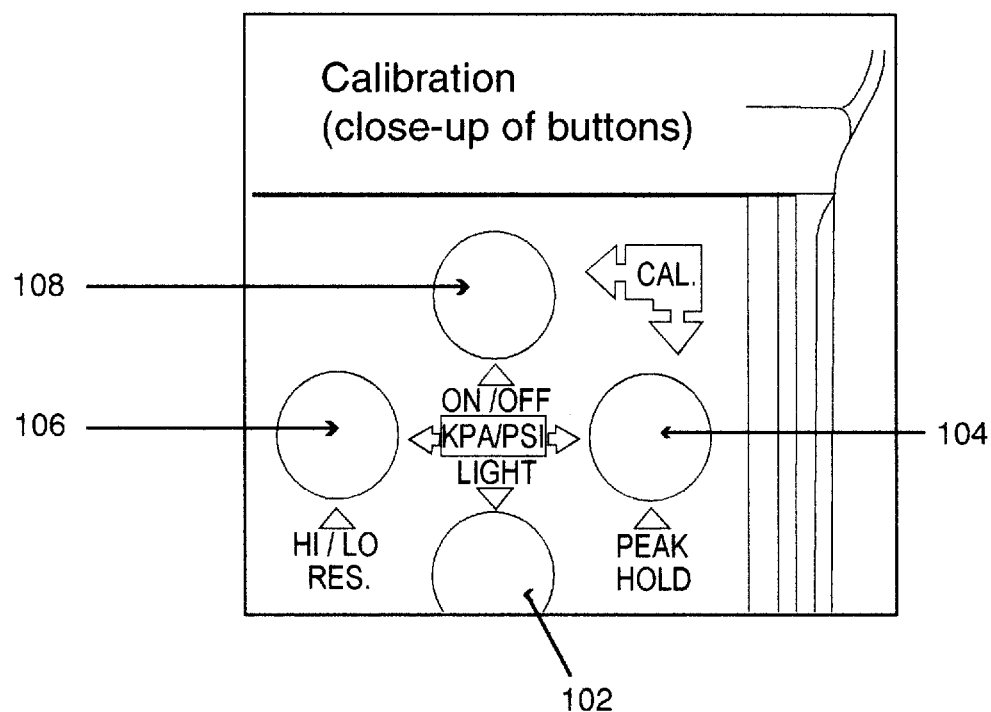
FIG. 9 illustrates a close-up view of the buttons used for calibration of the gauge assembly of FIG. 5.

General usage instructions for gauge 100 are as follows: A user turns the digital remote fuel pressure gauge 100 ON by pressing button 108 once and releasing it. Unit 100 will then make an audible 'beep'. Gauge 100 turns on and displays one of the following screens on LCD screen 112 for one second (the screen shown indicates either PSI or KPA) (FIG. 8). The PSI Mode displays 3 digits and a decimal point for readings over 99.9 (same as KPA display).

Figure 11:
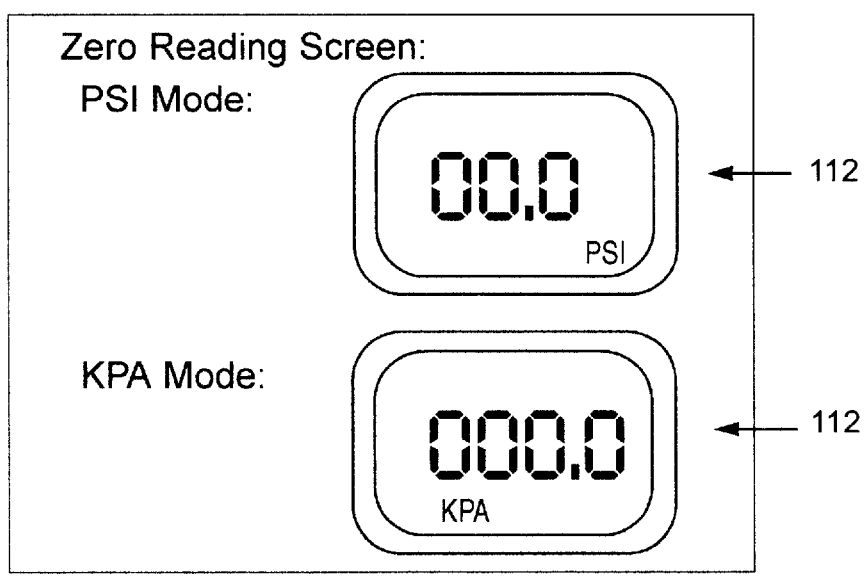
FIG. 11 illustrates a zero reading screen of the gauge assembly of FIG. 5.

LCD screen 112 shows a zero reading (the placement of the decimal point will be determined by the mode the screen is in) (FIG. 11). If screen 112 does not show a zero reading, calibration of the unit is recommended. Unit 100 will start up in the LO Res (Average) Mode and will show a continuous display until other modes are chosen. To turn the unit off the user presses button 108 once and releases it. The display 112 will be blank, and the unit is now off.

Figure 10:
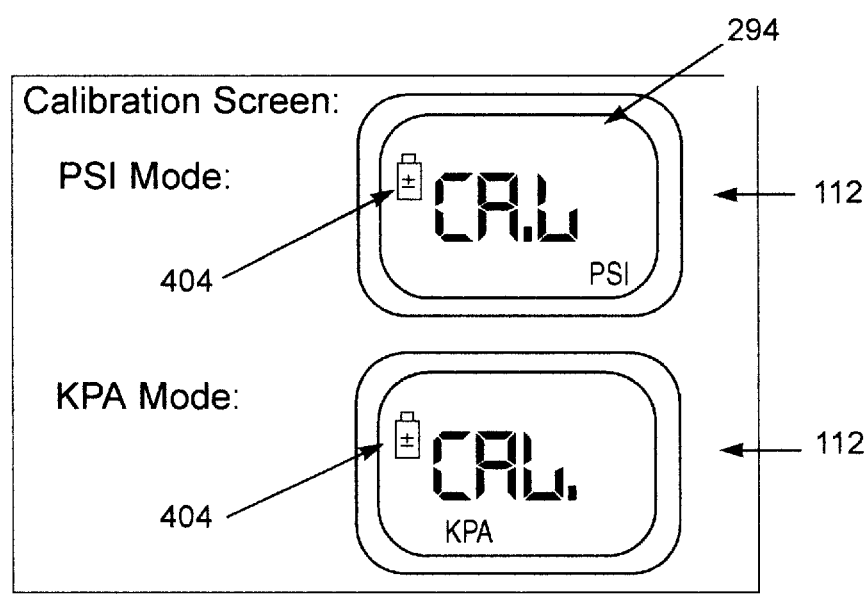
FIG. 10 illustrates a calibration screen of the gauge assembly of FIG. 5.

To calibrate digital remote fuel pressure gauge 100, a user initially calibrates unit 100 in order to compensate for altitude. To calibrate gauge 100, the unit is turned off, button 104 is depressed and held. Unit 100 is turned on by depressing both buttons 108 and 104. Button 108 is then released while continuing to hold button 104. Display 112 will show one of the following screens as shown in FIG. 10 (the screen shown will be determined by the mode currently chosen).

Now button 104 is released. Screen 112 shows a zero reading screen (the position of decimal point will be determined by the mode the screen is in). LCD screen 112 displays one of the following screens as shown in FIG. 11. Unit 100 is now calibrated to ambient temperature and altitude (temperature will be automatically calibrated). A user is now ready to read accurate pressure. A low battery symbol 404 shows during the calibration sequence, indicating that the low battery test has started.

Unit 100 includes an automatic temperature compensation function. Unit 100 automatically compensates for temperature while a user uses gauge assembly 100. This automatic temperature compensation is provided by the microprocessor to maintain accuracy over the temperature range. As the engine compartment heats up where probe 226 is located and the temperature increases, changes to the sensing ability of pressure probe 226 will occur. To compensate for the environment pressure probe 226 will have to endure, this temperature compensation feature has been added to maintain the accuracy of the gauge. Temperature compensation is an added feature of the digital remote fuel pressure gauge 100.

Use of the digital remote fuel pressure gauge 100 is straight forward. Turn unit 100 on and determine if calibration is needed. (This is indicated in LCD screen 112 if screen 112 does not display a zero reading). If screen 112 shows a zero reading a user is ready to continue. Unit 100 is periodically recalibrated, possibly once each day unit 100 is used. Frequent recalibration will not harm unit 100. It is not necessary to recalibrates each time unit 100 is turned on, even though barometric pressure might change. If very accurate pressure readings are desired, recalibration is recommended.

A user enters a PSI or KPA Mode and an Access Temperature Mode. While unit 100 is on, a user presses and holds both buttons 106 and 104 (FIG. 13) for one second and then releases both buttons. The window 112 will display a blank screen except for the designation of the mode (PSI in the lower right or KPA in the lower left, °C. or °F. in upper right). A numerical value will not show until a user has chosen the mode. Button 104 (FIG. 13) is used to select the desired unit of measurement (PSI or KPA) and to access the Temperature Mode (°C. or °F.). Each time button 104 is pressed and released display 112 will toggle between the 4 screens in sequence (KPA, °C., °F., PSI, KPA, . . . ). When LCD window 112 shows the desired screen, depress and release Button 106. This will hold the screen in the desired method of measurement or temperature.

Figure 12:
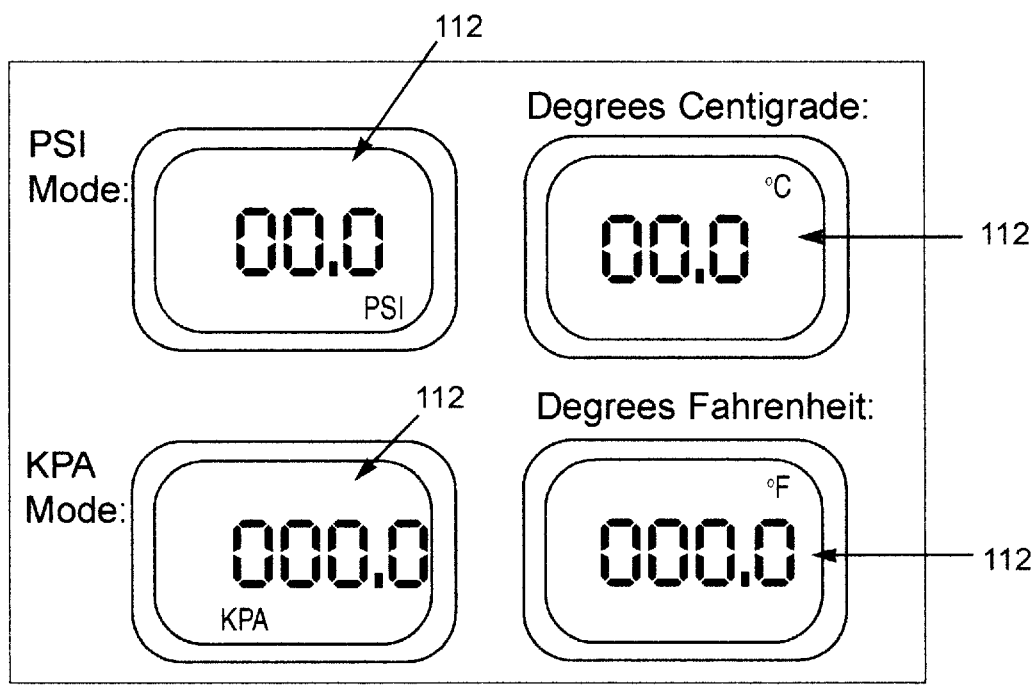
FIG. 12 illustrates pressure and temperature mode access screens of the gauge assembly of FIG. 5.
Figure 13:
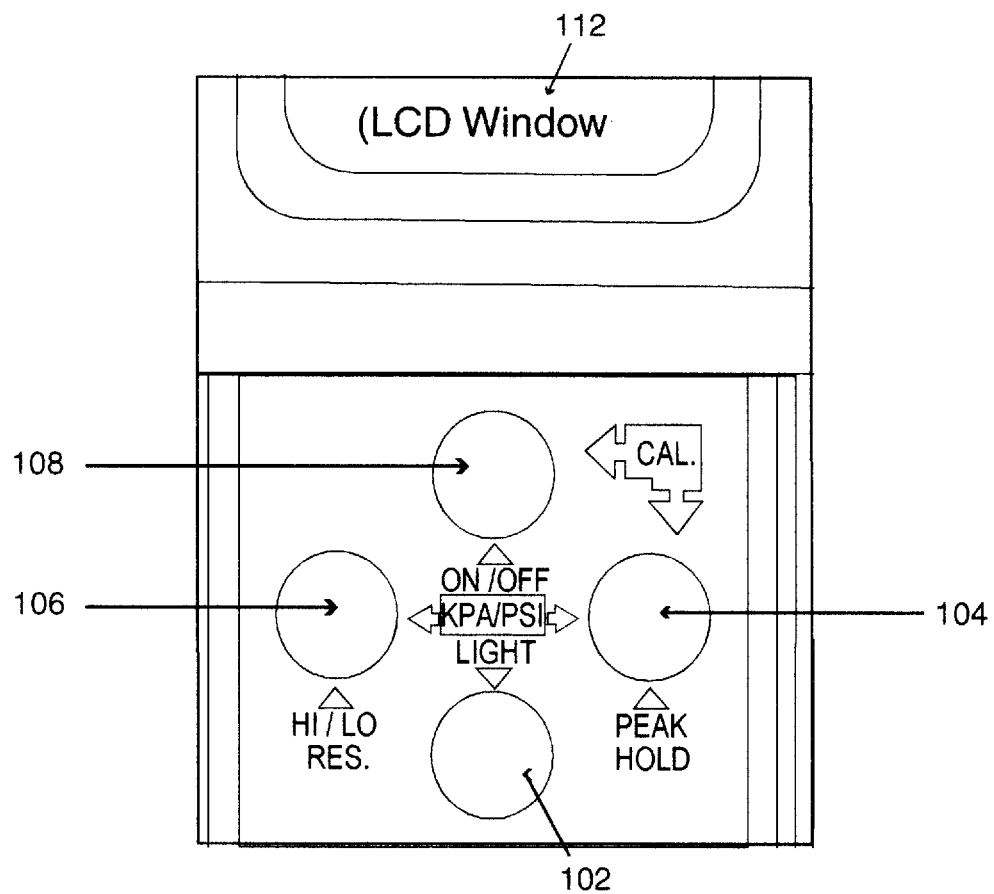
FIG. 13 illustrates a close-up view of the buttons used to access the screens of FIG. 12 of the gauge assembly of FIG. 5.
Figure 14:
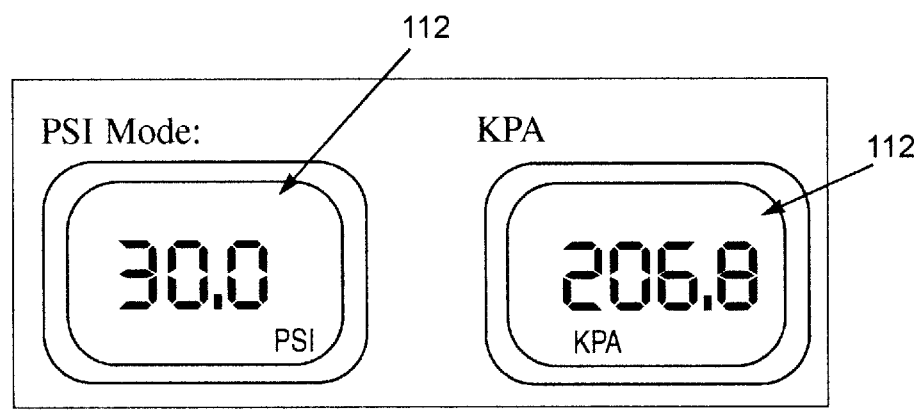
FIG. 14 illustrates pressure mode screens of the gauge assembly of FIG. 5.
Figure 16:
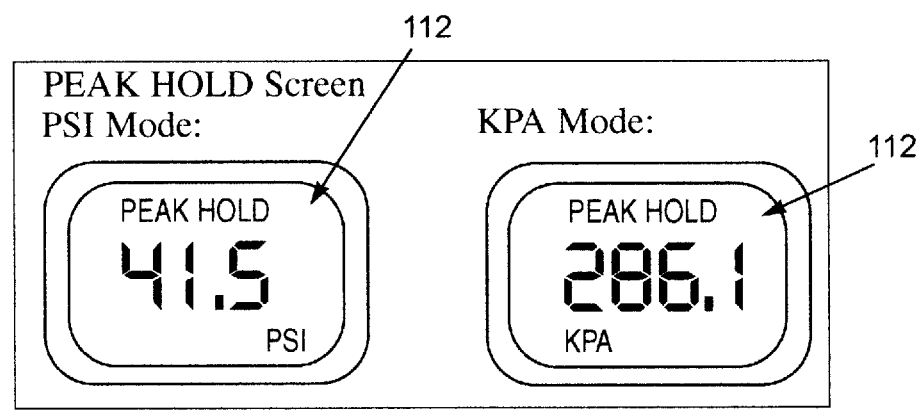
FIG. 16 illustrates a PEAK HOLD screen of the gauge assembly of FIG. 5.

FIG. 13 is a close-up of buttons of gauge 100. When in PSI or KPA mode screen shows the zero reading in the chosen mode and a user is ready to read pressure in that mode (FIG. 12). To change screens (from PSI to KPA or for temperature) the procedure is repeated; a user presses and holds buttons 106 and 104 together (FIG. 13), then releases them. The user presses and releases button 104 (FIG. 13) until the desired screen is shown, then presses button 106 (FIG. 13) to hold the screen. These settings can be changed during use without affecting the calibration. If switching the mode while already reading pressure on the gauge, the screen will not show a zero reading but will indicate the current pressure reading being taken. The samples on the following page are of possible readings when this is done (FIG. 16).

The Temperature Mode will be activated as soon as the screen is chosen and temperature will show on the screen as sensed by probe 226 (FIG. 11) in the chosen method (i.e. °C. or °F.).

After setting digital remote fuel pressure gauge 100 to the desired mode of measurement, a user connects probe end 120 into the appropriate adapter (FIGS. 19–21). A user is now ready to read pressure/temperature. Screen 112 shows the pressure/temperature in the mode the user has selected (PSI, KPA, °C. or °F.). Gauge 100 takes a pressure/temperature sample approximately once each second.

A user can now choose to use the PEAK HOLD or HI/LO RES mode for normal function, depending on the application needed. Temperature continues to be taken as long as either the °C. or °F. screen is activated. The automatic shut-down feature of unit 100 does not activate from either of these screens. A user manually shuts off unit 100 to save battery life, or switches to another mode and the automatic shut-down feature will activate as described herein.

A user can select a PEAK HOLD Mode, LCD screen 112 will display the highest reading sampled while in this mode (FIG. 16). This mode would be used while testing the engine under load. Since the highest reading is retained, gauge 100 does not need to be visually monitored continuously.

Figure 15:
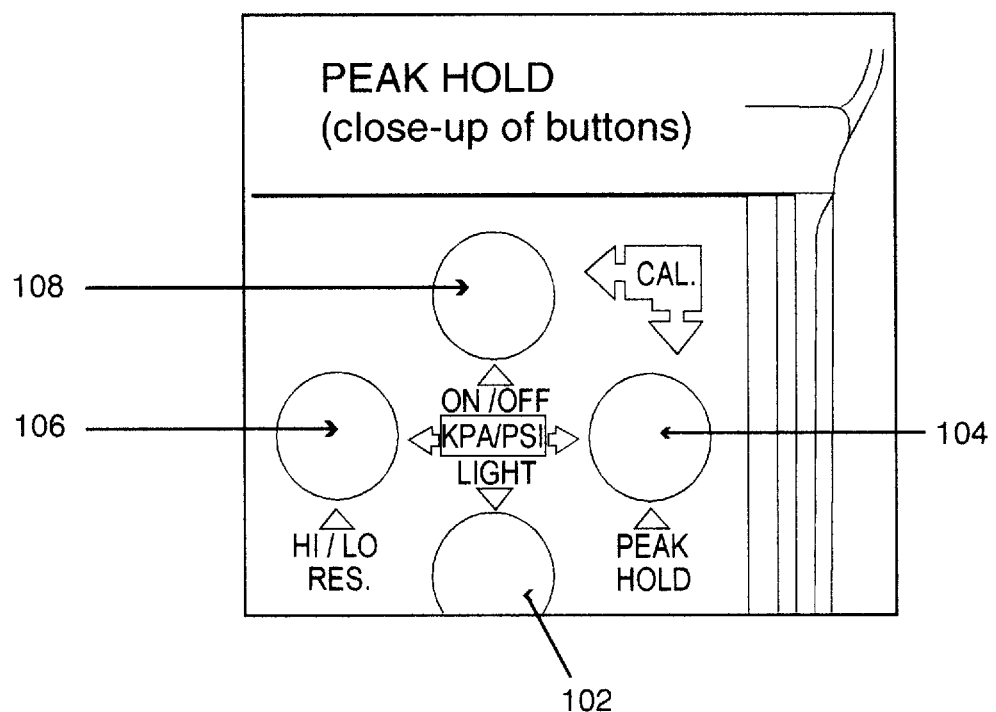
FIG. 15 illustrates a close-up view of the buttons used to access the screens of FIG. 14 of the gauge assembly of FIG. 5.

To use the PEAK HOLD mode, a user presses the following series of buttons: While unit 100 is on and pressure readings are being taken, a user presses and releases button 104 (FIG. 15). Gauge 100 now retains the highest measured reading and the words PEAK HOLD will show on LCD screen 112 (FIG. 16). An audible 'beep' will sound with each new peak reading achieved. Unit 100 will continue to read and display the current peak reading as long as PEAK HOLD mode is operating. The words PEAK HOLD will only be visible on the screen when PEAK HOLD mode is activated. PEAK HOLD mode is accessible from either screen.

Figure 17:
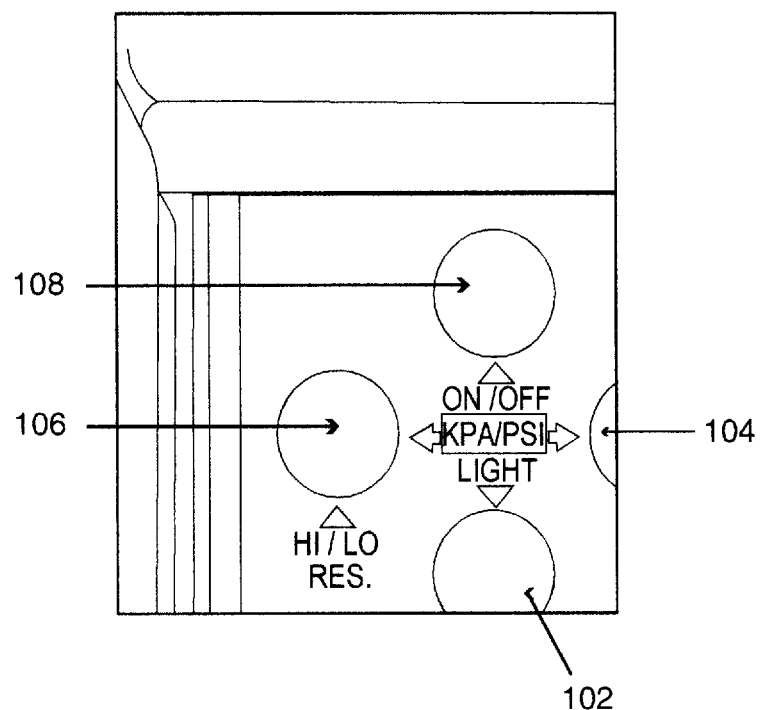
FIG. 17 illustrates a close-up view of the buttons used to access the screens of FIG. 16 of the gauge assembly of FIG. 5.

A user can select a HI/LO RES Mode of gauge 100. When the digital remote pressure gauge 100 is first turned on, it is in low resolution or standard operating mode. The pressure is being sampled at approximately 1 second intervals. Unit 100 will average 4 samples, displaying that average pressure on the screen in 0.5 PSI increments to give a more stable reading. Screen 112 updates this information every 4 samples. If a user wants to read real time pressure, he uses the HI RES mode (FIG. 17). If the user would like a stable reading, a user uses the LO RES mode. These Modes provide for provider sampling of pressure.

When in the HI RES Mode, LCD screen 112 blinks. This blinking will indicate that the user is sampling pressure at 1 sample every second, and the screen will update display 112 with every blink. In this mode a user may notice that the fuel pressure is wandering. There is nothing wrong with the fuel pressure gauge. What the user is seeing is the pulsing of the fuel pump and the spring movement of the fuel pressure regulator. If the user lets the engine idle he will notice that the ranging will settle down and a more stable reading will be displayed. Being able to see the ranging of the fuel system in this way is a first time experience. Because of the accuracy and the rapid real time updating, a user will see how the internals of the fuel system are operating.

Figure 18:
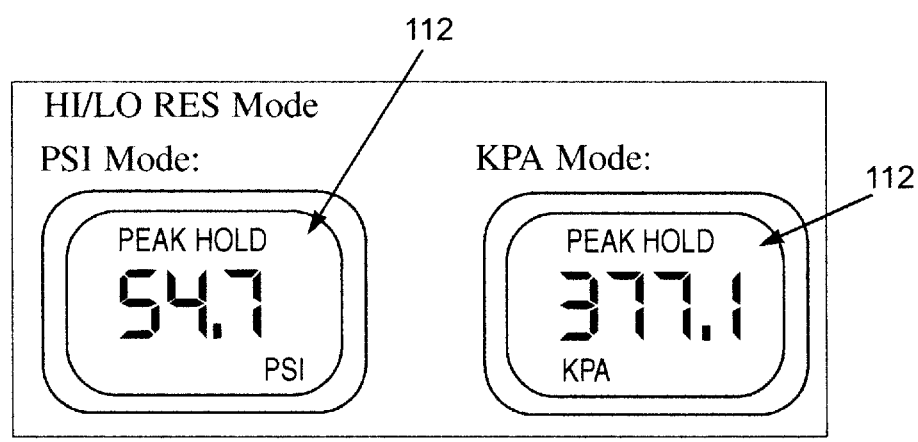
FIG. 18 illustrates a HI/LO RES Mode screen of the gauge assembly of FIG. 5.

To use the HI/LO RES Mode of gauge 100 the user presses a series of buttons. Some situations may require the use of a faster screen update for which the HI/LO RES Mode is used. Pressing Button 106 (FIG. 17) switches unit 100 into its high resolution mode. Screen 112 blinks every time a sample is taken and it is updated with every new sample immediately. In the high resolution mode, the pressure readings will range and vary with the pressure being measured. This mode is accessible from either the PSI screen or the KPA screen and can be used in conjunction with the PEAK HOLD mode. When taking an average reading while also in PEAK HOLD mode, it is advisable to wait until the 1st audible 'beep' before reading the display. This enables the HI/LO RES mode to read the needed 8 samples to provide a correct average reading. Screen 112 indicates all modes that are currently activated (FIG. 18).

Gauge 100 also includes an auto turn-off feature. Digital remote pressure gauge assembly 100 continues to operate as long as unit 100 is turned on and sensing pressure. If gauge 100 is disconnected from the system under test for approximately 2½ minutes, or if the pressure falls below about ½ of a PSI (or equivalent KPA) for approximately 2½ minutes, unit 100 will give an audible 'beep' and shut down. This automatic shut-down feature helps to save the life of the batteries 236. The digital remote fuel pressure gauge 100 is designed to withstand the rigors of a shop environment.

The backlight feature allows the user to read screen 112 when visibility is poor. The backlight is electroluminescent. To use the backlight the user presses and holds Button 102. This will illuminate screen 112 in whatever mode is currently operating.

Gauge 100 also includes a low battery indicator feature that is a battery symbol 404 appearing on screen 112. Battery symbol 404 will be visible in the upper left of LCD screen 112 if batteries 236 are low and need replacement, regardless of mode or screen selected. The only time this visible indication does not mean battery is low is when the very first screen is visible upon turning on unit 100, and when the calibration screen is activated. When either of these screens are visible, the battery symbol will disappear from view after the changes; if it remains on the screen and continues to show on the screen then it is an indication of low batteries and replacement is recommended. During final testing and calibration, each unit is individually calibrated. The calibration data is stored in non-volatile memory within microprocessor 234. Replacing batteries 236 does not degrade the accuracy of measurement of gauge 100. Gauge 100 is useful in fuel injection trouble shooting.

Before beginning the fuel injection troubleshooting process with gauge 100 a user should be sure some of the more obvious problems have been checked. When the user has a poor running vehicle, or a performance problem, the user should plan his methodology. The symptoms of the performance problem can be specific, but there may be many causes. The user should inspect all the basics: spark plugs, wires, cap, rotor, ignition timing, compression, valve timing, air filter, transmission fluid, brake drag and check for a clogged catalytic converter by testing for excessive back pressure in the exhaust using the Back Pressure Tester (EEPV500A). All of the above can give the same poor power and performance symptoms as a fuel injection problem.

Once a user has determined that the above elements are in good condition and set to the proper specifications, the user should next check the fuel injection system. As standard practice, and as part of the fuel injection troubleshooting process, the user looks at the fuel filter. If there are any questions as to the age or condition of the filter, the user changes it and test drives the vehicle. The user also checks the fuel level and makes sure there is enough fuel in the tank. After the user has completed all the above pre-fuel injection test inspection items, the user is ready to begin using application guide and vehicle look-up tables 256.

The user also performs a preliminary inspection of the vehicle. The user inspects all fuel hoses, connections and pipes from the fuel tank to the engine for signs of leakage or deterioration, and repairs or replaces them as needed. The user inspects the quality and quantity of fuel in the fuel tank and inspects the condition of the fuel filter, battery cranking system, ignition system, related electrical wiring and connections, and engine grounds.

Before connecting fuel pressure gauge 100, residual fuel pressure in the system being tested is released. On most vehicles (automobiles, trucks, construction equipment, ships, airplanes) this can be accomplished by removing the fuel cap, disabling the fuel pump, and cranking the engine for at least 30 seconds. On certain CPI and SCPI vehicles there will still be pressure in the system, so be careful when making connections to these systems. The user holds a shop towel around the fittings when making the gauge connection or disconnecting lines, to absorb any spilled fuel.

The user next installs the digital remote fuel pressure gauge 100 (FIGS. 22–25). All systems need to have gauge 100 installed without interrupting the normal fuel flow to the injector(s) where injector(s) are present. Some vehicles have fittings for connecting gauge 100, others don't have these fittings. On the vehicles that don't have fittings, gauge 100 must be tied into the pressure line of the system.

On some vehicles, the manifold and valve assembly will be used with only one leg of the manifold attached to the vehicle (FIGS. 22–25). In these cases, the user should be certain that the valve is positioned so the unattached hose is blocked.

Figure 22:
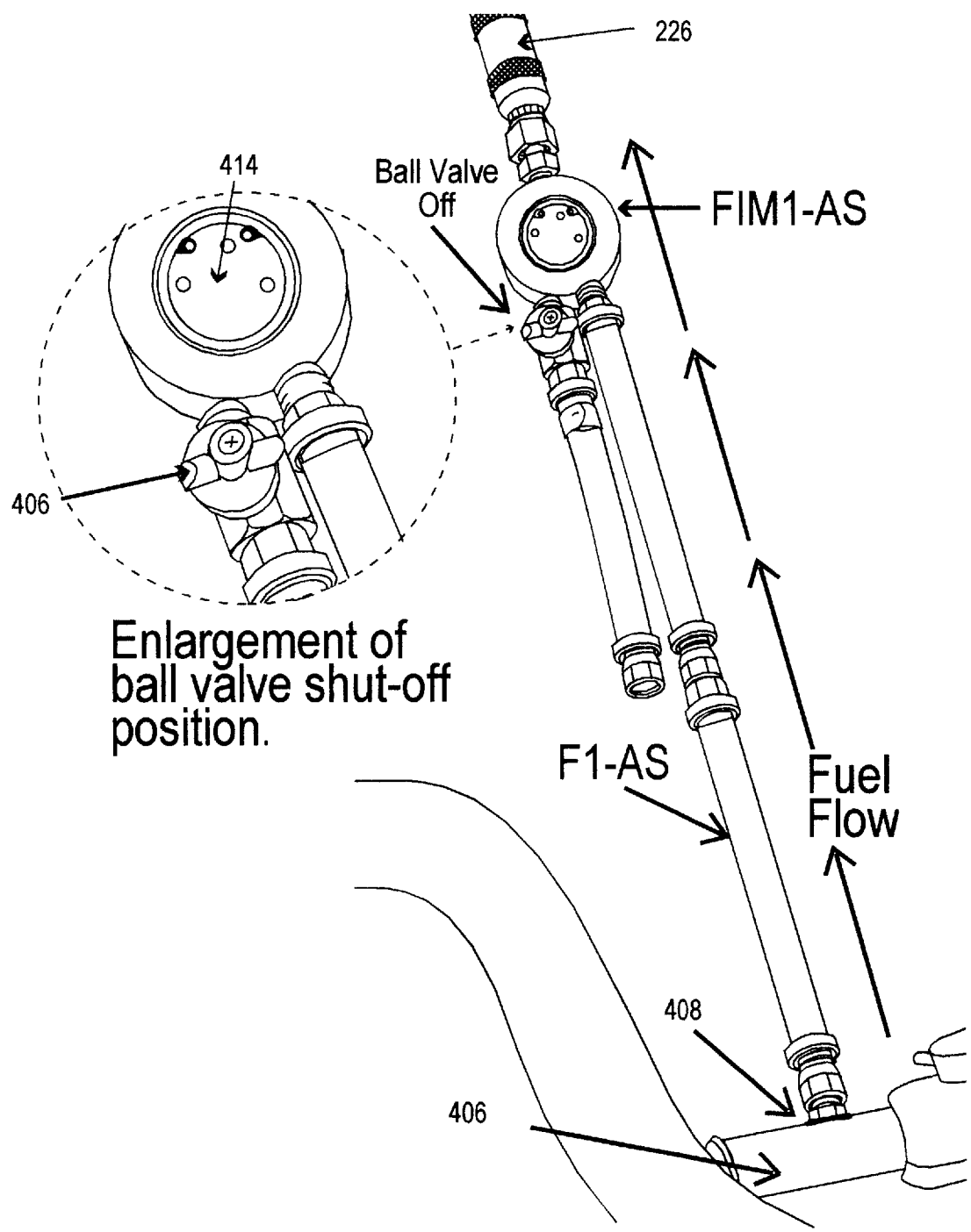
FIG. 22 illustrates installation of a manifold of the present invention.
Figure 23:
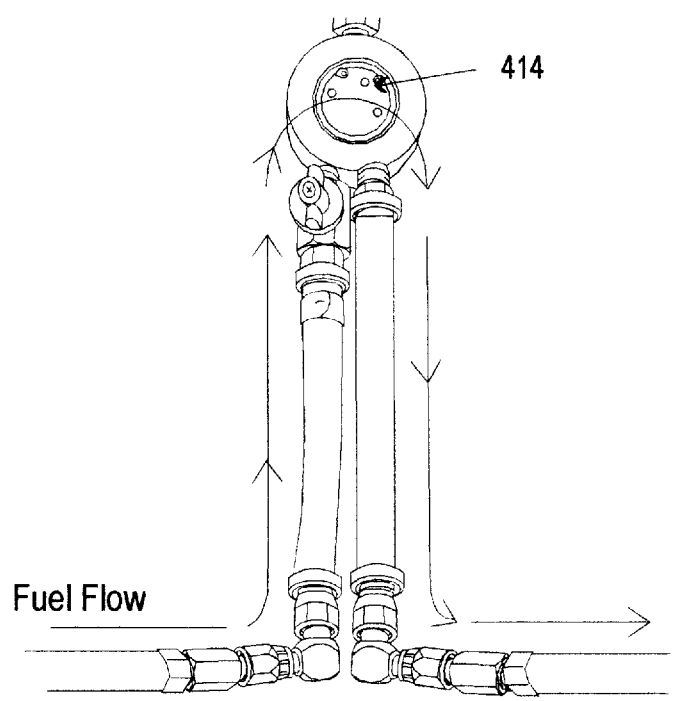
FIG. 23 illustrates fuel flow through a manifold of the present invention.
Figure 24:
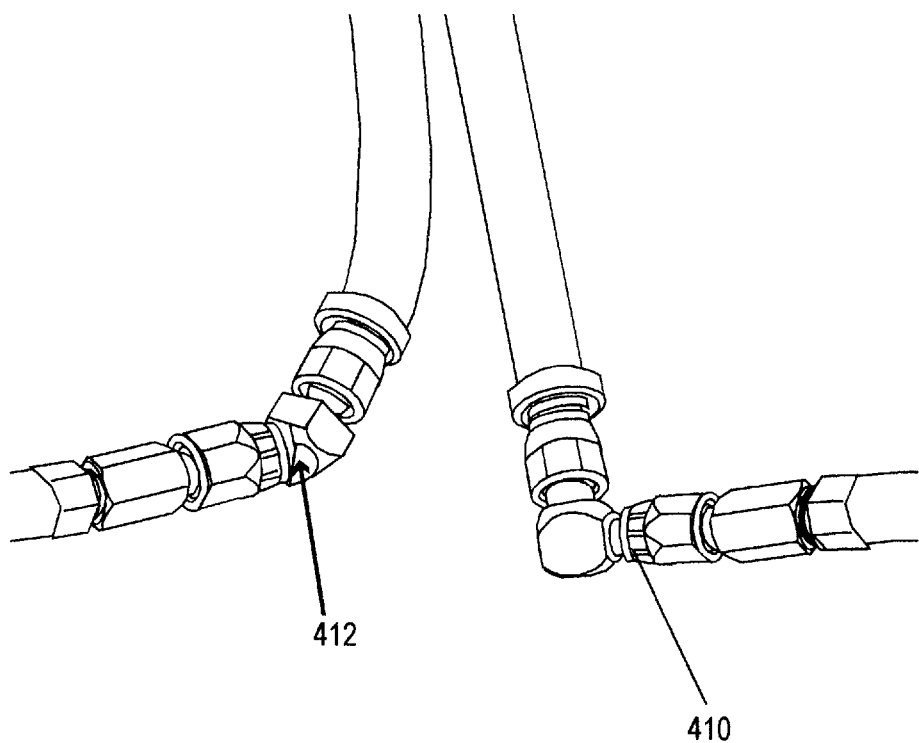
FIG. 24 illustrates a close-up view of the manifold connection of FIG. 23.
Figure 25:
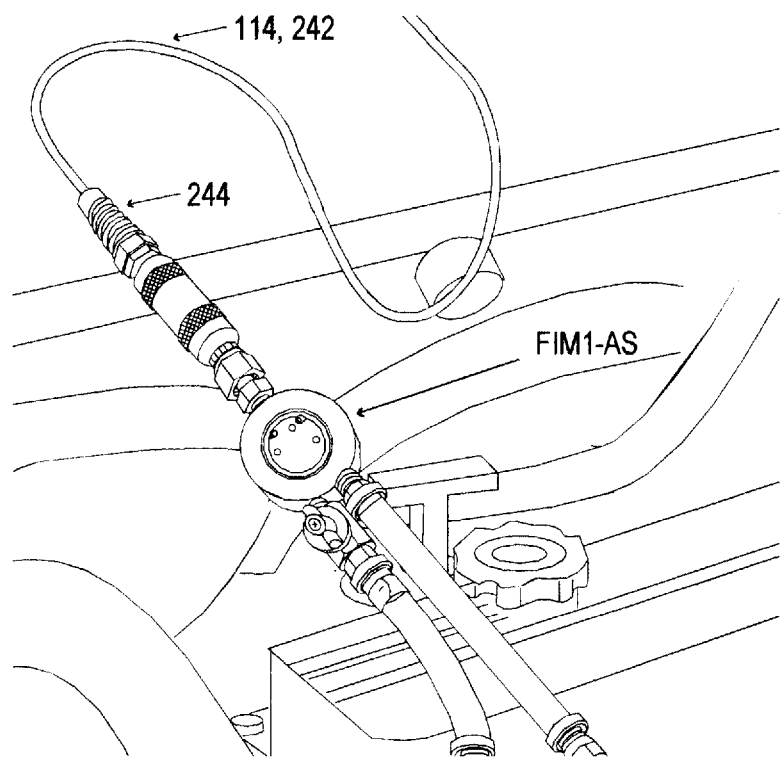
FIG. 25 illustrates attachment of the digital remote fuel pressure gauge to the manifold of FIGS. 22–24 of the present invention.

The user next installs the manifold (FIG. 22). When testing a fuel system, the user ties into the fuel flow. On some vehicles this can be done very easily by using a JIC hose or tire valve hose assembly and tapping into fuel rail 406. The user simply uses JIC hose or hose assembly and connects gauge 100 to fuel rail 406 directly. The cover attaches the leg of the manifold that does not have ball valve 406 on it to the JIC fitting on the end of the hose. The user closes the relief valve and then attaches the clear plastic relief hose to the ball valve hose. The user momentarily opens and closes ball valve 406. The user repeats this process until fuel appears in clear plastic relief hose. (This process bleeds air from the manifold.) This allows liquid fuel to reach the probe end of the probe 226. The probe 226 is now ready to measure fuel pressure. The user now bleeds off fuel into a clear container (not shown) and examines the condition of the fuel.

The user also conducts initial tests. When beginning a fuel pressure test on a vehicle which is a "no start" vehicle, the user must be certain there is sufficient fuel in the tank. One way this can be accomplished is by attaching the appropriate adapter to the vehicle and using the 1 liter volume sample bottle and the flex hose. If the vehicle can fill bottle half way in about 15 seconds, there should be sufficient fuel available to proceed with the diagnostic tests. This is also an excellent way to visually inspect the fuel for contamination.

The user next manually activates the fuel pump of the vehicle. On most fuel injected vehicles the fuel pump will be activated for a few seconds by turning the ignition key to the "ON" position.

The user next attaches adapters to the manifold assembly. If there is no Schrader valve 408 and the user needs one of the supplied adapters, the user references look-up tables 256 to determine the adapter needed for the application. Once the adapter is identified, the user relieves the fuel pressure. Once the fuel pressure is relieved, the user disconnects the fuel line adapter and attaches male and female adapter in place (see FIG. 23). Adapters and the kits which include them, can be identified by referencing the adapter kit column of the application guide look-up tables 256.

Doing this allows the use of the manifold hose assemblies to tie into the fuel flow. The manifold assembly comes with two extra hoses for length, as well as two 90° adapters 410 and two 45° adapters 412. With these combinations the user constructs the ideal manifold connection that will allow easy access to the fuel flow. (see FIG. 24). The manifold also incorporates sight glass 414 for easy identification of fuel flow and contaminants.

The user next positions the manifold. If the user plans to use the digital remote fuel pressure gauge 100 and test fuel pressure remotely while test driving, the user uses reusable ties (not shown) to attach the manifold to the fuel rail, being sure not to kink the manifold hoses. This practice will also position the manifold so the JIC probe end points to the rear of the hood to make it easy to bring wire cable 114, 242 out of the passenger window. When attaching the manifold to the adapters, the user tightens all line connections prior to pressurizing fuel rail 406.

The user next attaches the digital remote fuel pressure gauge 100 to the manifold. Once the user has completed the above, he is ready to attach probe end 232 of probe assembly 226 to the manifold. The user attaches the probe end 232 JIC swivel to the male JIC on the top of the manifold. (see FIG. 25)

The user snugs down all connections with the proper wrench size to avoid any leakage and checks to be sure nothing there is nothing in the way of the hot exhaust manifold or fan blade, pulleys, etc. At this point the user is ready to energize the fuel pump bypass or start the engine.

The adapter kits described herein come with a set of adapters designed to allow the fuel flow through the supplied manifold and to allow the attachment of gauge assembly 100. With this adapter set the user may universally use the digital remote fuel pressure gauge 100. The gauge 100 is uniquely designed to be installed on the manifold and then brought through the back of the hood of the car and through the passenger side window for remote fuel pressure monitoring.

The user next connects the digital remote fuel pressure gauge 100 for remote pressure testing. One probe end 232 of unit 100 is attached to the fuel rail adapter and manifold, you may want to bring gauge assembly 100 into the vehicle for remote pressure testing. Many fuel problems are drivability problems that may only occur under load and under driving conditions. The use of gauge 100 makes this remote testing possible.

After connecting the probe end 232 of the unit 100 to the manifold, bring gauge assembly 100 out through the back of the hood then bring gauge assembly 100 in through the window of the passenger or driver side, gently closing the window on sliding sleeve 246 on wire cable 114, 242 (The user may have to adjust the position of sleeve 246 to mate with the window closing). Once gauge assembly 100 is in place in the vehicle, check to be sure that cable 114, 242 is out of harms way. Carefully close the hood, avoiding damage to or pinching cable 114, 242. Check one more time for any leaks while the engine is running, and then drop the hood closed. The weather seal along the back of most hoods will provide a good cushion and seal for the routing of wire cable 114. The user is now ready to test drive and remotely test the fuel pressure.

The user monitors the display 112 to read fuel pressure. This way of viewing the information ("in real time") will enable the user to witness what the fuel pressure is doing visually as the user watches the display and as the vehicle is in actual operation. This means the user may notice a range of fuel pressure readouts on the display. This is a "real time" look at the condition of the fuel system. There are many factors occurring in the fuel system that the user needs to consider. The condition of the fuel pump, pressure regulator, injectors, fuel accumulator to name a few will have a direct impact on the readout. For instance by monitoring the readings in the HI Res Mode, the user is able to find leaky injectors following rest pressure test procedures.

Gauge screen 112 has a 4 digit display which has a resolution of ⅒ psi. This feature allows the user to see very slight changes within the fuel pressure system. In the HI Res Mode, the user can actually see the fuel pressure ranging from the effects of the spring diaphragm on the control pressure regulator and the pulses from the fuel pump. Once the user has monitored the readings of a few cars with proper working fuel systems, the user will then be able to notice a problem fuel system right away. If fuel pressure ranging makes it difficult to read the screen, the unit 100 is placed in LO Res Mode. In this mode unit 100 will take several pressure samples before updating the display. This gives the user a more stable readout. The LO Res Mode is recommended as the most useful when using the gauge during a test drive.

After testing, the user removes the digital remote fuel pressure gauge 100 from the manifold by unscrewing JIC fitting. The fuel pressure may be retained by the manifold via tire valve that is in the opening of JIC fitting. Tire valve allows removal of gauge assembly 100 without loss of fuel. Once gauge assembly 100 is removed from the manifold, the user attaches clear relief hose to JIC fitting and relieves any residual fuel pressure that may be present. The user holds a shop towel around fittings to absorb any spilled fuel during all disconnects. The user removes the adapter (if used) and replaces any O-rings, sealing washers or gaskets on the disturbed fittings if needed. As such, the invention described herein provides an environmentally friendly gauge that reduces or eliminates the risk of spillage of harmful fuels or other compounds.

The user next removes the manifold. When removing the manifold the user should be sure there is no residual pressure in the fuel line by using the clear relief hose. The user removes JIC fittings from the base of the hose assemblies and any adapters being used. Once the manifold and adapters are removed the user inspects the fitting connections and cleans and replaces any O-rings or washers that may be worn before reattaching the fuel line.

Cable wire 114, 242 attaching probe assembly 226 to digital remote fuel pressure gauge assembly 100 is made from a thermoplastic elastomeric compound that is rugged. Pressure transducer is located in probe housing 120 on the end of cable 114, 242. Pressure transducer is calibrated to the board in gauge assembly 100 and is a custom mate. Locating the pressure transducer in probe assembly 226 reduces the weight of probe assembly 226 making it lighter and more maneuverable.

On all cars and light trucks (massive engines, etc.) there are four main types of fuel systems. They are:TBI (Throttle Body Injection), MFI (Multi-port Fuel Injection; injectors are pulsed at the same time), or SFI (Sequential Port Fuel Injection; injectors pulsed individually), CPI (Central Port Injection; injectors are pulsed at the same time), or SCPI (Sequential Central Port Injection; injectors pulsed individually), and a CIS (Constant Injection System; injectors flow constantly).

On GM CPI or SCPI systems, the deadhead pressure should not be exceeded. The user should slowly block the return line and release when specification is attained. If pressure is allowed to exceed 100 psi, damage to the gauge 100 may be sustained.

The returnless systems used by Chrysler uses the following components: combination fuel pressure regulator/fuel filter and fuel pump inlet filter. The metallic components are made of stainless steel for flexible fuel compatibility. The regulator/filter is located at the top of the fuel pump module. The regulator consists of a diaphragm and spring loaded check valve to control the system pressure. The pressure regulator filter is a single pass design; only the fuel needed by the engine is filtered which results in longer filter life and allows a smaller, less expensive filter to do the job. The fuel pressure is maintained constant.

The user uses various troubleshooting methods with gauge 100. There are common fuel system problems associated with all systems. First, fuel pressure may be low. The user checks and replaces the fuel filter if needed. The user checks electrical supply and ground to fuel pump, and repairs if needed. The user blocks the return line and if fuel pressure rises, the problem is most likely in the fuel pressure regulator.

If fuel pressure is still low, the user checks for: leaking injectors, a leaking fuel pressure regulator diaphragm, faulty fuel pump, a restricted fuel pump sock, leaking fuel pump pressure hose connection in fuel tank, or no fuel in the fuel tank or restricted fuel pressure line.

If fuel pressure is high, the user removes the return line at throttle body or rail and attaches a hose to the engine return fitting. The user inserts the other end of the hose into an approved container and retests the pressure. If it is now normal, the user checks and repairs restriction in the fuel return line. If the pressure is still high, the user replaces or repairs the fuel pressure regulator as needed.

The user conducts fuel pressure leak down tests with gauge 100. TBI systems may, or may not, hold pressure after the fuel pump turns off. GM TBI models, 1981–83 Chrysler Imperial 318 EFI, Izuzu TBI, Renault Alliance and Encore TBI don't hold pressure. Most others will hold pressure after the pump shuts off (key on, engine off). If this type of system bleeds down after the pump shuts off, the user blocks off the return line and cycles the key again. If pressure now holds, the problem is the fuel pressure regulator. If the pressure still drops, the user blocks off the feed line the instant the fuel pressure reaches maximum. If it now holds, pressure after the pump shuts off, the problem is in the fuel pump or the coupling in the tank. If the pressure still drops, the problem is either a leaking injector or a fuel pressure regulator diaphragm leaking into the vacuum hose.

The user also diagnoses common fuel system problems in CIS systems with gauge 100. In Bosch K-JETRONIC Systems, when checking fuel pressure, abnormal pressure readings should be handled in the following manner:

If system pressure is low the user verifies voltage and ground available at fuel pump, verifies fuel filter condition, and verifies no fuel leakage. The user carefully restricts fuel return line while monitoring system pressure. If system pressure can be brought within specifications while restricting return line, the problem is in the fuel pressure regulator (either internal fuel distributor slide valve type regulator or external diaphragm type regulator).

If the system pressure is high, the user verifies there is no restriction in return side fuel circuit (ie. the user removes return side line and runs into a suitable container). If system pressure returns to specifications, restriction is in return circuit. If system pressure does not return to specifications, problem is with the fuel pressure regulator (either internal fuel distributor slide valve type regulator or external diaphragm type regulator).

The user can also test falling rest pressure with gauge 100. All K-JETRONIC fuel pumps are equipped with a non-return valve. In some cases this check valve is replaceable, separate from the pump. If rest pressure falls, the user energizes the fuel pump long enough to pressurize the system. The user restricts the fuel return line and monitor system pressure. If system pressure still falls, the problem is with the non-return valve on the fuel pump or with the fuel accumulator. If the pressure does not fall, the problem is with the pressure regulator (either internal fuel distributor slide valve type regulator or external diaphragm type regulator).

To test the non-return valve on the fuel pump, the user energizes the fuel pump long enough to pressurize the system. The user restricts the fuel line between pump and fuel tank and monitors system pressure. If pressure no longer falls, the problem is a faulty accumulator.

Gauge 100 is also used in Bosch K & K-E series injection system test procedures. Due to the high pressures involved, proper test procedures are essential when servicing Bosch K & K-E Series injection systems. These are the adapter fittings that are needed with these systems: F17–F25, F31 & F32. The user follows these steps: When checking fuel pressure on a K or K Lambda system, gauge 100 should be hooked up in the following manner:

a. Remove the fuel line from the center top port of the fuel distributor (this is the line that goes to the control pressure regulator).
b. Place gauge 100 and shut off valve assembly so that the shut-off valve is on the control pressure regulator side.
c. Connect the shut-off valve side of gauge 100 to the control pressure regulator fuel line, then connect gauge 100 side to the center top port of the fuel distributor. Start the engine or manually energize the fuel pump (consult service manual for fuel pump relay location and bypass procedure).
d. With gauge 100 in this position and the shut-off valve closed, system pressure is measured.

When checking fuel pressure on a K-E system, gauge 100 should be hooked up in the following manner: remove the fuel line to the cold start injector, place gauge 100 and shut-off valve assembly so that the shut-off valve is on the fuel distributor side, connect the shut-off valve side of gauge 100 and shut-off valve assembly to the fuel distributor test port, connect gauge 100 side to the cold start injector fuel line. Start the engine, or manually energize the fuel pump (consult the service manual for fuel pump relay location and bypass procedure). With gauge 100 in this position and the shut-off valve open, differential pressure is measured; with the shut-off valve closed, system pressure is measured. (An alternative method of measuring differential pressure is to dead head gauge 100 to the fuel distributor test port. Only differential pressure is measured in this case.)

To check system rest pressure, gauge 100 should be hooked up in the same manner as for testing system pressure. The system should hold a specific rest pressure for a specific amount of time (consult fuel pressure chart for values). After testing, be sure to replace any banjo washers with new ones and be sure to test system for leaks before releasing the vehicle to the customer.

Digital remote fuel pressure gauge assembly 100 has many other uses that include marine and airplane uses. With the air pressure attachment, gauge 100 can be used to test air pressure of the tire as well as the temperature. The user can monitor the oil pressure and temperature as well when gauge 100 is combined with oil pressure test kit.

Application guide/vehicle look-up tables 256 are attached hereto as Appendix A. Tables 256 includes application guide heading definitions as follows:

Make & Model: Vehicle Designation

Engine: is either a displacement and injection description; or an engine code that is listed on the engine decal.

From Year/To Year: the beginning and ending years for the particular information contained in this line.

VIN: Vehicle Identification Number, the engine code contained in the VIN number (10 digits) at the base of the windshield. Imports do not use this code in this chart.

KOEO: stands for "key on; engine off"

Normal Idle: engine at normal operation temperature, low idle speed

Idle w/o Vacuum: applies to port injected vehicles. This is the pressure of the system with the vacuum removed from the fuel pressure regulator.

Deadhead: the system pressure with the return line blocked off.

Adapter Fitting: the adapter fitting(s) needed to attach pressure gauge to vehicle.

Adapter Kit: indicates in which kit the listed adapter is available.

Fitting Location: where the adapter is installed on the vehicle.

Manual Pump Energize: how to activate the fuel pump without the engine running.

RPO: Regular Production Option; the production code contained in the vehicle option label.

European Fuel Pressure CIS Tables:

System Pressure: pressure reading while vehicle is being operated (driven).

Control/Differential Warm: pressure reading achieved once engine has warmed and is idling.

Control/Differential @ 68F: pressure reading at room temperature once vehicle has been shut down and allowed to surpass rest pressure (while stored indoors).

Rest Pressure: pressure reading reached once vehicle has been turned off and reached rest time.

Rest Time: amount of time required to reach rest pressure.

GM: Grand Master Kit (#EEFI300AM)
DM: Domestic Master Kit (#EEFI300ADM)
FM: Foreign Master Kit (#EEFI300AFM)
DB: Domestic Basic Kit (#EEFI300ADM)
FB: Foreign Basic Kit (#EEFI300AFB)
N/A: Not Applicable The following are general guidelines for using the enclosed Vehicle Look-up Tables 256. The user locates the vehicle in question in the look-up table headings by utilizing one or all of the following: Make & Model of vehicle, Engine, from Year/to Year, or VIN.

Once the vehicle has been identified, the proper adapter(s), as well as the fitting location will need to be determined. This information is found under the columns entitled Adapter Fitting and Fitting Location. Following the line for the specific vehicle over to these columns to find the information needed. The Adapter Fitting column lists the actual fitting needed. The number listed corresponds to the number stamped on the adapter in the kit. The Fitting Location column will tell the technician where in the vehicle to attach the designated adapter. The Fitting Location column uses a footnote method to provide all the required information. The technician needs to reference the numbered footnote given in this column. The number (found in parenthesis within the column) is referenced in the 'Key to Look-up Table Footnotes' found herein and provides an explanation as to where the fuel connection can be located for the specific vehicle.

This same method of identifying information is used with the KOEO, Normal Idle and Manual Pump Energize columns.

After choosing the adapter and referencing the Fitting Location, the additional columns of KOEO, Normal Idle, Idle w/o Vacuum and Deadhead Pressure will provide the technician with additional pertinent information. Listed in these columns are the actual pressure or pressure range which can be read from the Digital Remote Fuel Pressure Gauge for the vehicle being tested. KOEO indicates (for those vehicles listing a reading and/or a footnote) that a fuel pressure reading can be made with the key on without the engine running.

The European Fuel Pressure CIS tables list those vehicles with CIS fuel pressure systems. Use these tables the same way as described above. The difference in these tables is in the way the information is given; ie., there are 4 columns which list the fuel pressure readings in both bar & psi measurement which replace the columns VIN through Deadhead Pressure.

The parts for the grand master kit 258 are as follows:

| Product Description: | Part #: | Quantity: |
|---|---|---|
| Digital Remote Fuel Pressure Gauge 100 | BEFI300A | 1 |
| Lithium Batteries (CR2032) 236 | EEFI300AF50 | 2 |
| Gauge Boot 300 | EEFI300AF51 | 1 |
| Adapter Kit Manual & Look-up Tables 256 | ZEEFI300AF47 | 1 |
| Adapters: F1AS | EEFI300AF1 | 1 |
| F2AS | EEFI300AF2 | 1 |
| F3AS | EEFI300AF3 | 1 |
| F4AS | EEFI300AF4 | 1 |
| F5AS | EEFI300AF5 | 1 |
| F6 | EEFI300AF6 | 1 |
| F7AS | EEFI300AF7 | 1 |
| F8 | EEFI300AF8 | 1 |
| F9 | EEFI300AF9 | 1 |
| F10AS | EEFI300AF10 | 1 |

-continued

| Product Description: | Part #: | Quantity: |
|---|---|---|
| F11 | EEFI300AF11 | 1 |
| F12 | EEFI300AF12 | 1 |
| F13AS | EEFI300AF13 | 1 |
| F14 | EEFI300AF14 | 1 |
| F15 | EEFI300AF15 | 1 |
| F16AS | EEFI300AF16 | 1 |
| F17AS | EEFI300AF17 | 1 |
| F18AS | EEFI300AF18 | 1 |
| F19AS | EEFI300AF19 | 1 |
| F20AS | EEFI300AF20 | 1 |
| F21AS | EEFI300AF21 | 1 |
| F22AS | EEFI300AF22 | 2 |
| F23 | EEFI300AF23 | 1 |
| F24A5 | EEFI300AF24 | 1 |
| F25 | EEFI300AF25 | 1 |
| F26AS/2 screws (M6 × 1.0 × 50 mm) | EEFI300AF26 | 1 |
| F27 | EEFI300AF27 | 1 |
| F28 | EEFI300AF28 | 1 |
| F29 | EEFI300AF29 | 1 |
| F30AS | EEFI300AF30 | 1 |
| F31 | EEFI300AF31 | 1 |
| F32 | EEFI300AF32 | 1 |
| 45° Elbow | EEFI300AF33 | 2 |
| 90° Elbow | EEFI300AF34 | 2 |
| Hose clamps | EEFI300AF35 | 2 |
| ⅜" ID Hose/3" length | EEFI300AF36 | 2 |
| ¼" ID Hose/3" length | EEFI300AF37 | 2 |
| ¼" ID Fuel Flex tubing w/male ⁷⁄₁₆ JIC/4" length | EEFI300AF38 | 1 |
| Manifold Assembly | EEFI300AF38 | 1 |
| Manifold Extension Hose Assemblies | EEFI300AF39 | 1 |
| Grand Master Accessory Bag | EEFI300AF41 | 1 |
| 5" Zip Strips | EEFI300AF46 | 2 |
| 8" Zip Strips | EEFI300AF47 | 1 |
| Blow-molded Case | EEFI300AF48 | 1 |

The parts for the domestic master kit 260 are as follows:

| Product Description: | Part #: | Quantity: |
|---|---|---|
| Adapter Kit Manual & Look-up Tables 256 | ZEEFI300AF47 | 1 |
| Adapters: F1AS | EEFI300AF1 | 1 |
| F2AS | EEFI300AF2 | 1 |
| F3AS | EEFI300AF3 | 1 |
| F4AS | EEFI300AF4 | 1 |
| F5AS | EEFI300AF5 | 1 |
| F6 | EEFI300AF6 | 1 |
| F7AS | EEFI300AF7 | 1 |
| F8 | EEFI300AF8 | 1 |
| F9 | EEFI300AF9 | 1 |
| F10AS | EEFI300AF10 | 1 |
| F11 | EEFI300AF11 | 1 |
| F12 | EEFI300AF12 | 1 |
| F13AS | EEFI300AF13 | 1 |
| F14 | EEFI300AF14 | 1 |
| F15 | EEFI300AF15 | 1 |
| F16AS | EEFI300AF16 | 1 |
| F19AS | EEFI300AF19 | 1 |
| F26AS | EEFI300AF26 | 1 |
| F27 | EEFI300AF27 | 1 |
| F28 | EEFI300AF28 | 1 |
| F29 | EEFI300AF29 | 1 |

The parts for the foreign basic kit 272 are as follows:

| Product Description: | Part #: | Quantity: |
|---|---|---|
| Adapter Kit Manual & Look-up Tables | ZEEFI300AF47 | 1 |
| Adapters: F2AS | BEFI300AF2 | 1 |
| F3AS | EEFI300AF3 | 1 |
| F16AS | EEFI300AF16 | 1 |
| F18AS | EEFI300AF18 | 1 |
| F20AS | EEFI300AF20 | 1 |
| F21AS | EEFI300AF21 | 1 |
| F22AS | EEFI300AF22 | 2 |
| F23 | EEFI300AF23 | 1 |
| F24AS | BEFI300AF24 | 1 |
| F25 | ELFI300AF25 | 1 |
| F27 | EEFI300AF27 | 1 |
| 45 degree elbow | EEFI300AF33 | 2 |
| 90 degree elbow | EEFI300AF34 | 2 |
| Hose Clamps | EEFI300AF35 | 2 |
| ¼" ID Hose/3" length | EEFI300AF37 | 2 |
| ¼" ID Fuel Flex tubing w/male ⁷⁄₁₆ JIC/4" length | EEFI300AF38 | 1 |
| Manifold Assembly | EEFI300AF39 | 1 |
| Manifold Extension Hose Assemblies | EEFI300AF40 | 1 |
| Foreign Basic Accessory Bag | EEFI300AF45 | 1 |
| 5" Zip Strips | EEFI300AF46 | 2 |
| 8" Zip Strips | BEFI300AF47 | 1 |
| Blow-molded Case | EEFI300AF49 | 1 |

Optional accessories for the kits described herein include knee board attachment (not shown) to allow the user to hold and read guage 100 with hands free to make notes on attached pad, 1 liter sample bottle used for volume testing fuel and air chuck attachment.

The parts for the domestic master kit 260 include:

| Product Description: | Part #: | Quantity: |
|---|---|---|
| F30AS | EEFI300AF30 | 1 |
| 45° Elbow | EEFI300AF33 | 2 |
| 90° Elbow | EEFI300AF34 | 2 |
| Hose clamps | EEFI300AF35 | 2 |
| ⅜" ID Hose/3" length | EEFI300AF36 | 2 |
| ¼" ID Hose/3" length | EEFI300AF37 | 2 |
| ¼" ID Fuel Flex tubing w/male ⁷⁄₁₆ JIC/4" length | EEFI300AF38 | 1 |
| Manifold Assembly | EEFI300AF39 | 1 |
| Manifold Extension Hose Assemblies | EEFI300AF40 | 1 |
| Domestic Master Accessory Bag | EEFI300AF42 | 1 |
| 5" Zip Strips | EEFI300AF46 | 2 |
| 8" Zip Strips | EEFI300AF47 | 1 |
| Blow-molded Case | EEFI300AF48 | 1 |

The parts for the foreign master kit 268 include:

| Product Description: | Part #: | Quantity: |
|---|---|---|
| Adapter Kit Manual & Look-up Tables | ZEEFI300AF47 | 1 |
| Adapters: F1AS | EEFI300AF1 | 1 |
| F2AS | EEFI200AF2 | 1 |
| F3AS | EEFI300AF3 | 1 |
| F14 | EEFI300AF14 | 1 |
| F15 | EEFI300AF15 | 1 |
| F16AS | EEFI300AF16 | 1 |
| F19AS | EEFI300AF19 | 1 |
| F26AS | EEFI300AF26 | 1 |
| F27 | EEFI300AF27 | 1 |
| F31 | EEFI300AF31 | 1 |
| F32 | LEFI300AF32 | 1 |
| 45° Elbow | EEFI300AF33 | 2 |
| 90° Elbow | EEFI300AF34 | 2 |
| Hose clamps | EEFI300AF35 | 2 |
| ¼" ID Hose/3" length | EEFI300AF37 | 2 |
| ¼" ID Fuel Flex Tubing w/male ⁷⁄₁₆ JIC/4" length | EBFI300AF38 | 1 |
| Manifold Assembly | EEFI300AF39 | 1 |
| Manifold Extension Hose Assemblies | EEFI300AF40 | 1 |
| Foreign Master Accessory Bag | EEFI300AF44 | 1 |
| 5" Zip Strips | EEFI300AF46 | 2 |

-continued

| Product Description: | Part #: | Quantity: |
| --- | --- | --- |
| 8" Zip Strips | EEFI300AF47 | 1 |
| Blow-molded Case | EEFI300AF48 | 1 |

The parts for the domestic basic kit 270 include:

| Product Description: | Part #: | Quantity: |
| --- | --- | --- |
| Adapter Kit Manual & Look-up Tables | ZEEFI300AF47 | 1 |
| Adapters: F1AS | EEFI300AF1 | 1 |
| F2AS | EEFI300AF2 | 1 |
| F3AS | EEFI300AF3 | 1 |
| F4AS | EEFI300AF4 | 1 |
| F5AS | EEFI300AF5 | 1 |
| F19AS | EEFI300AF19 | 1 |
| F27 | EEFI300AF27 | 1 |
| F28 | EEFI300AF28 | 1 |
| 45 Elbow | EEFI300AF33 | 2 |
| 90 Elbow | EEFI300AF34 | 2 |
| Hose clamps | EEFI300AF35 | 2 |
| ⅜" ID Hose/3" length | EEFI300AF36 | 2 |
| ¼" ID Hose/3" length | EEFI300AF37 | 2 |
| ¼" ID Fuel Flex tubing w/male ⁷⁄₁₆ JIC/4" length | EEFI300AF38 | 1 |
| Manifold Assembly | EEFI300AF39 | 1 |
| Manifold Extension Hose Assemblies | EEFI300AF40 | 1 |
| Domestic Basic Accessory Bag | EEFI300AF43 | 1 |
| 5" Zip Strips | EEFI300AF46 | 2 |
| 8" Zip Strips | EEFI300AF47 | 1 |
| Blow-molded Case | EEFI30 | |

Appendix B includes a copy of a computer program for actuating and running gauge 100. Parts, components and adapters described herein are commercially available and can be purchased from Waekon Industries, Inc., P.O. Box 90, Kirkwood, Pa. 17536. Appendix C includes a parts list for the circuitry of FIG.. The parts listed in Appendix C are commercially available from various vendors including by way of example, NIC, NEMCO, PANASONIC, THOMPSON, PHILIPS, DALE, ABRACON, NATIONAL SEMICONDUCTOR, SGS THOMPSON, NJRC, TI, TELCOM, SEIKO, ITT, SIPEX, MICROCHIP, DB PRODUCTS, CLOVER, TCT COILS, JW MILLER, Q-TECH, AMERICAN ZETTLER, KOA, ROHM, CAL-CHIP, KEMET, NEMCO, AVX AND MKS. Items 54–67 are commercially available from Waekon Industries, Inc., Kirkland, Pa. The chip of item 59 is programmed by PIONEER TECHNINCAL GROUP, Horsham, Pa. who is a distributor for MICRO-CHIP who is the manufacturer of the chip. Appendix B contains the routines resident on the chip of item 59. Item 63 of Appendix C is a circuit board. Item 66 is an LCD that is supplied by AMERICAN ZETTLER of Pennsylvania which contains the combination of lettering appearing on the LCD as shown in the FIGS. herein.

Figure 30:
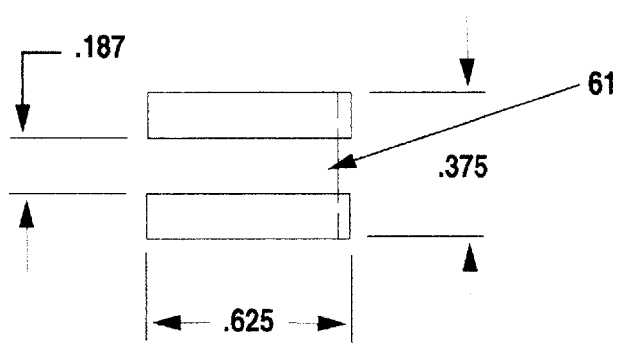
FIGS. 30–30b illustrate top, side, and frontal views of the battery clip of the present invention used in the gauge of the present invention.
Figure 30A:
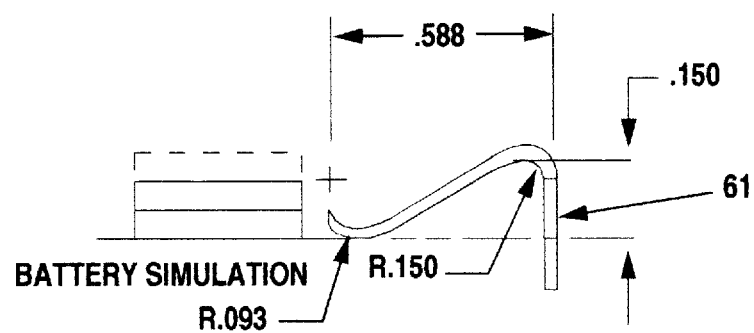
Figure 30B:
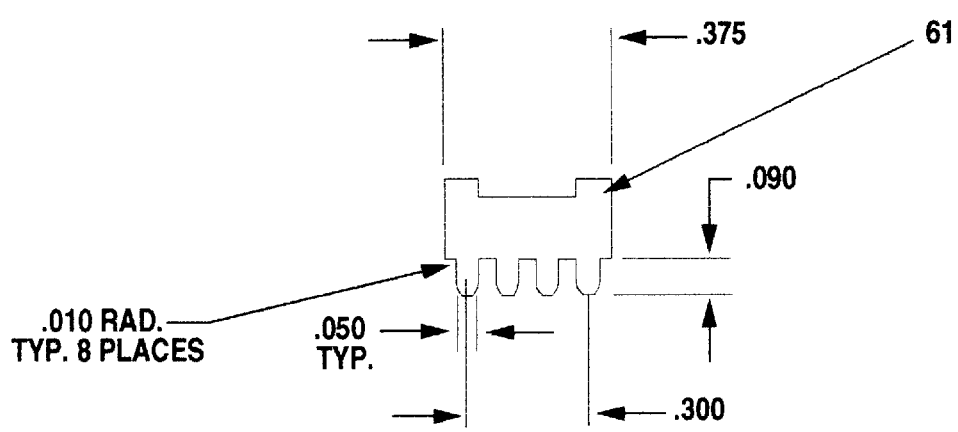

Item 61 are battery clips which are illustrated in FIGS. 30–30*b*. FIGS. 30–30*b* include a top, side and frontal view of battery hold down clip 61 used in gauge 100, 100'. Hold down clip 61 is generally made from spring steel that is nickel plated and a thinckness of 0.015 inches. The temper of the clip 61 is such that it exerts pressure on a variety of batteries ¹⁄₁₆ to ³⁄₁₆ of an in thick without deforming the clip 61.

Exemplary heat passive alloys include various metals, aluminum, steel, cooper and brass.

Gauge 100 can also have a variety of additions. These additions include voice chips and circuitry. Voice chips and circuitry similar to those found in telephones can be added to the visual display addition or substituted therefor. Hence, a user can be audibly prompted by gauge 100 with respect to function entries or measurements. Pressure measurements can be either positive or negative pressure measurements.

Figure 26:
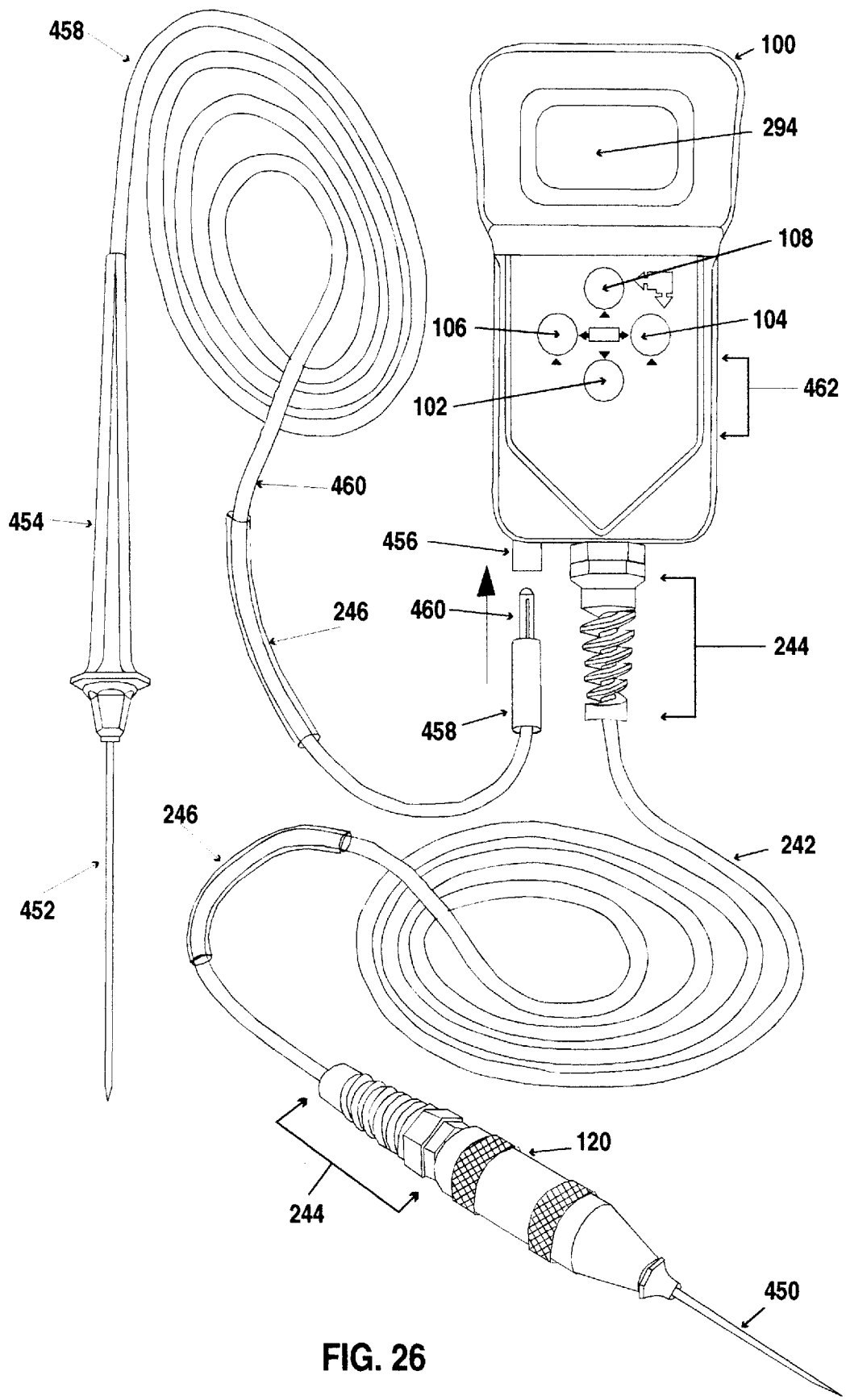
FIG. 26 illustrates a variant of the gauge of FIG. 5.

FIG. 26 illustrates a variant of gauge 100, gauge 100'. Gauge 100' includes an addition to the circuitry of gauge 100 that includes a switchable, detachable, second probe temperature sensing probe 458 for the measurement of temperature. Probe addition 458 includes electrical connector 460 which mates with electrical connector communication port 456 of gauge 100'. Electrical connector 460 is housed in insulating jacket 458, and communicates with needle probe 452 by way of cable 460. Needle 460 is fixedly secured in handle member 454. Cable 460 has optional sleeve member 246' which is similar to sleeve 246. Probe body 120 has a needle pressure probe attachment 450 connected thereto. Temperature probe 458 mates with gauge 100' at communication port 456. A routine on gauge 100' provides for a simultaneous measurement of temperature with temperature probe 458, and measurement of pressure with probe assembly 120. It is appreciated that the temperature compensation circuitry and routines (software, hardware or firmware, etc.) allow gauge 100 to auxiliary connections such as removable, detachable temperature probe connections which are simultaneously attached with pressure probe assembly 120. These attachments simultaneously and independently read measurements from the probe temperature assembly 120 (with the switching being done mechanically within the connector (which may include internal switching), or electronically. The programming within gauge 100' accommodates various applications. It is appreciated that having dual probes on gauge 100' permits simultaneously reading the following combinations of measurements: two independent temperature measurements, one pressure measurement and one temperature measurement, or two pressure measurements. These measurements can be taken at two different locations on a single source or at two different independent sources as needed. In this variant, two readings are displayed of display 112 in one variant of the invention. In another variant of the invention the measurements on display 112 alternate between the measurement taken by probe 458 and probe assembly 120 for a time out period.

Various pressure ranges are accommodates with different additions of pressure sensors, and related routine modifications for different conversion and display values. These values include: 1–100 PSI for air pressure, and fuel injection pressure, 1–300 PSI for transmission pressure, and 1–4000 PSI for air conditioning pressure, power steering (rack) pressure, and hydraulic system pressure. Gauge 100, 100' can measure either positive or negative pressure readings in one embodiment.

The pressure and temperature data is easily downloaded to a desk top computer 492 or a portable computer using a serial link via an optical interface addition in gauge 100, 100' (infra-red or visible light or other electromagnetic spectrum radiation)(not shown) to a suitable receiver or docking station (not shown) attached to RS 232 compatible interface or other appropriate electrical interface. This feature permits quick and accurate data collection and analysis from gauge 100, 100'. Gauge 100' has all supporting components necessary for such a feature including optional PC RS232 adapter 462. The system also includes supporting communications routines for communicating data from gauge 100, 100' to computer 492. Computer 492 also includes routines for analyzing that data collected at unit 100.

Figure 27:
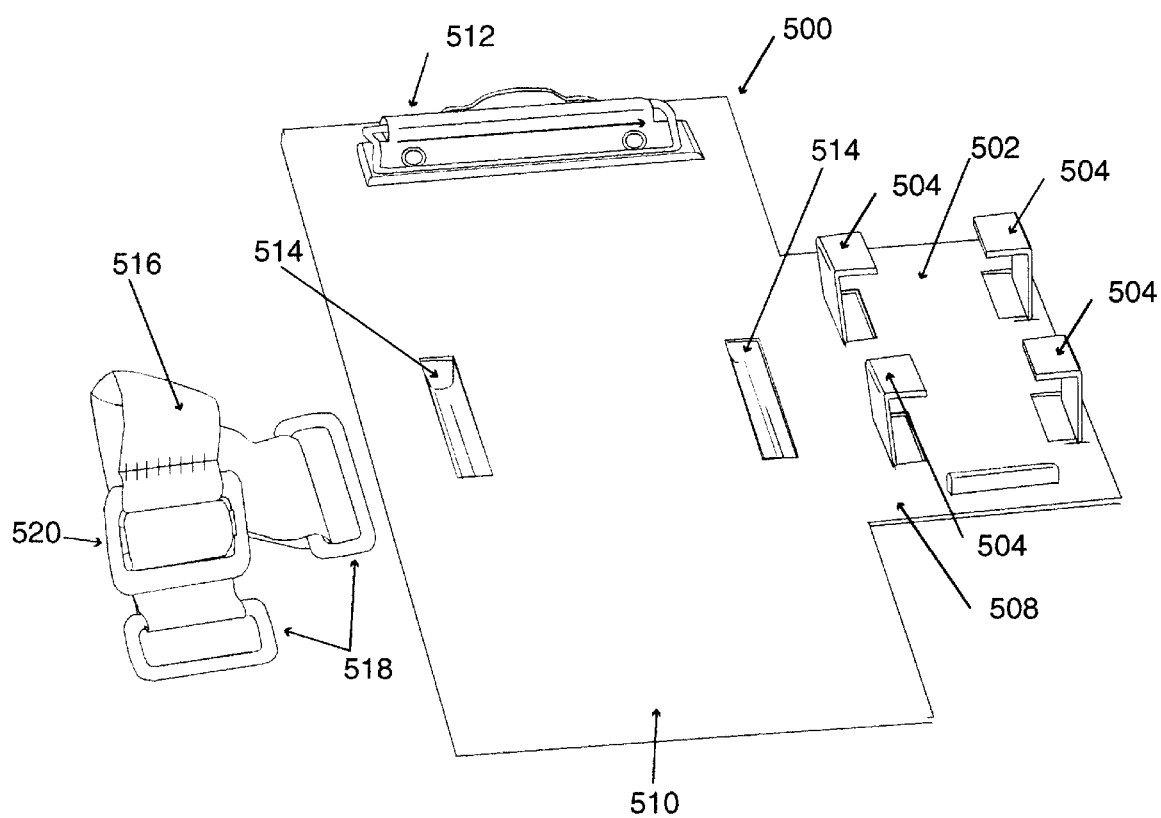
FIG. 27 illustrates a kneeboard of the present invention.

FIGS. 27–28 illustrate variants of kneeboard 500, 500'. Kneeboards 500, 500' include a docking station 502 for gauge 100. Docking station 502 includes a plurality of prongs 504 for removable or fixedly securing gauge 100, 100' to the docking station. Optionally a pair of side walls 506, and bottom member 506 are provided as shown in FIG. 28. It is appreciated that docking station 502 is made to removable secure gauge 100 and can have a variety of configurations. Docking station is connected either integrally or removable to note pad base member 510 by connecting member 508. Base member 510 can have optional note pad securing means 512 which may be a clip or other appropriate means. Base member 510 also optionally has hook projections 514 extending below base member 510 and spaced one from another about the width of an average adult males/females leg. Removable securing strap 516 has loop members 518 which connect to hook projections 514 to secure the kneeboard to an appropriate appendage of a user, e.g. the user's leg or arm. Strap 516 is adjustable with adjustment 520.

Figure 29A:
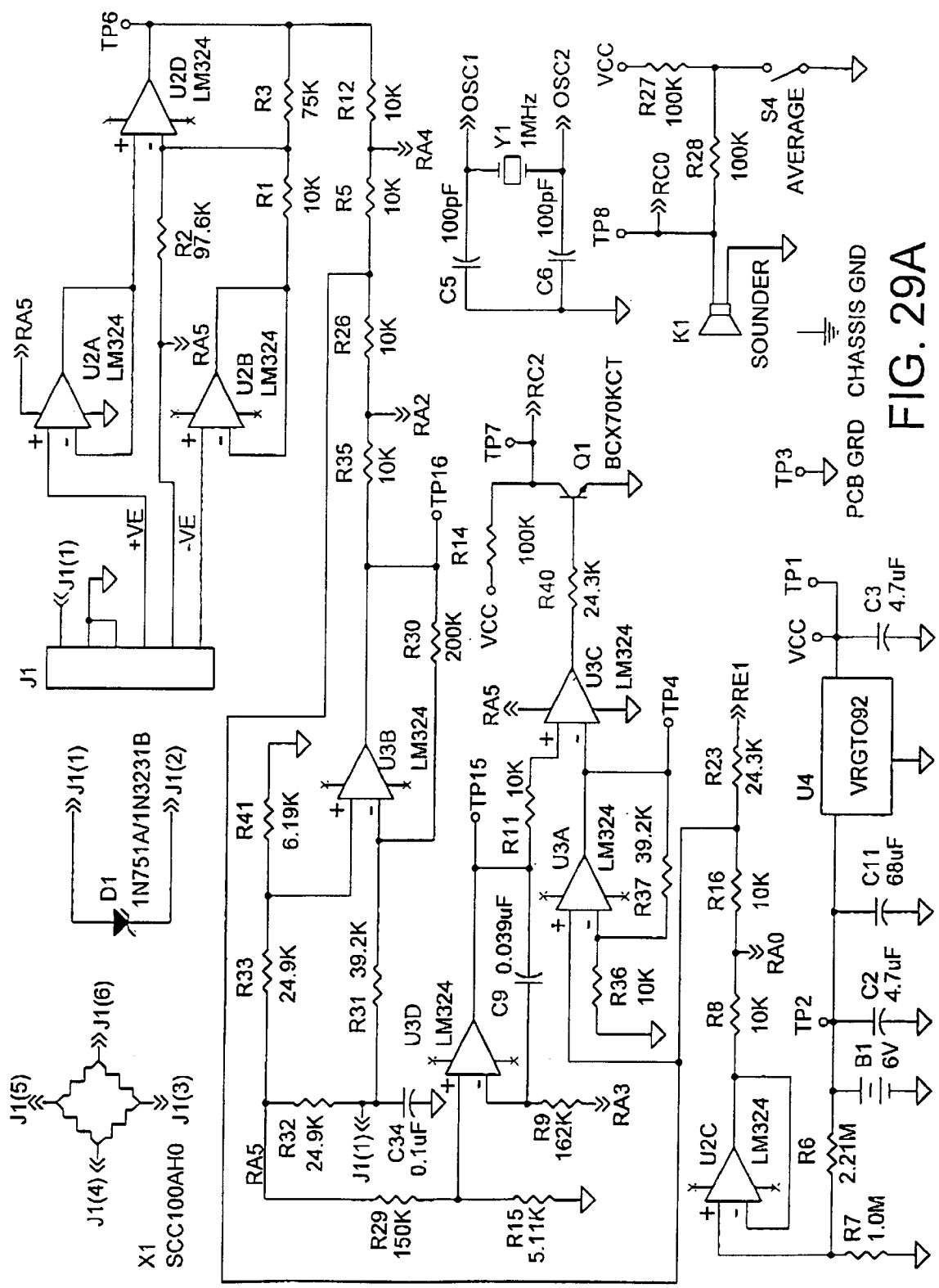
FIGS. 29A–29B illustrates a variant of the circuitry of FIGS. 4A–4B.
Figure 29B:
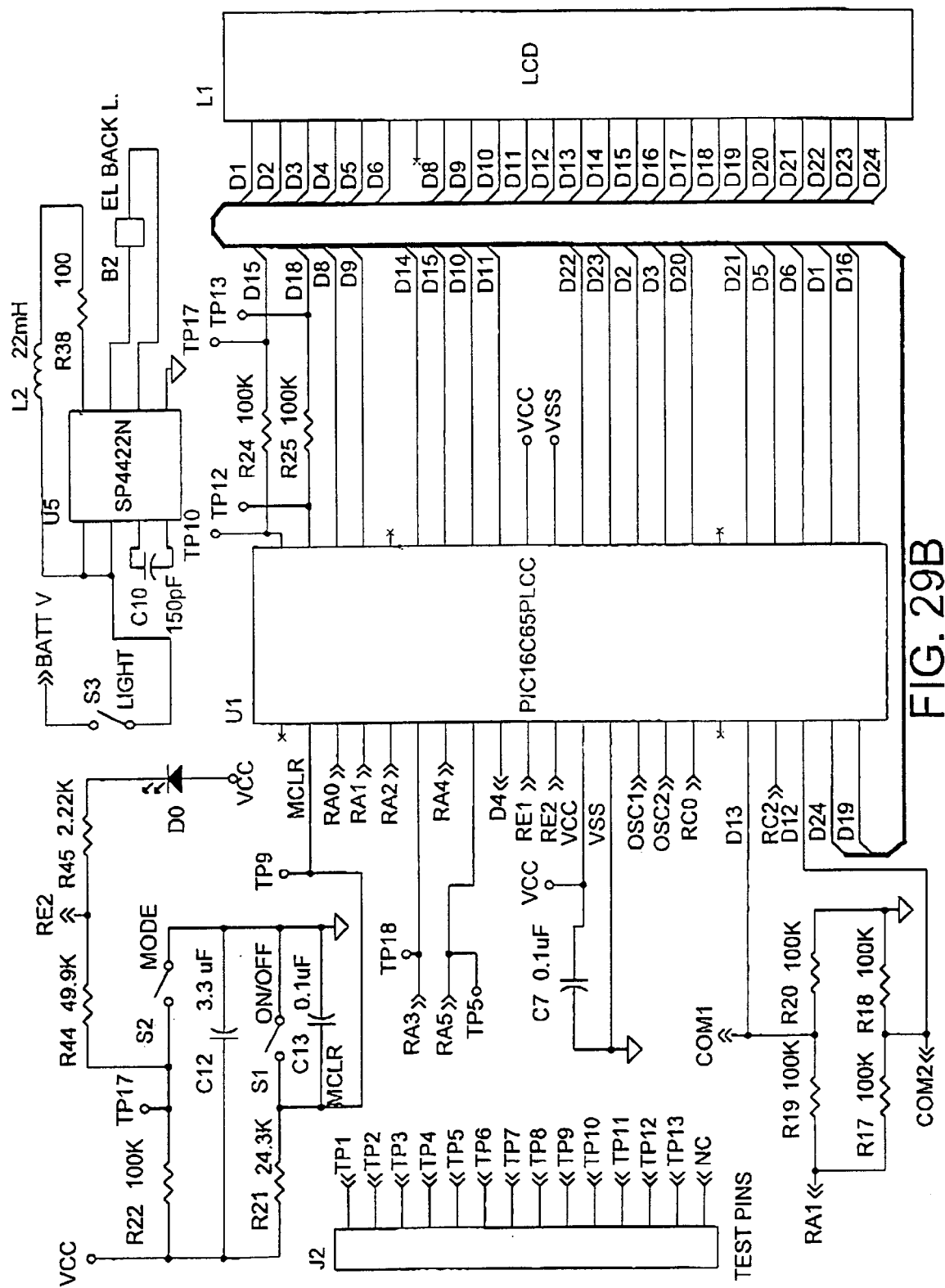

FIGS. 29A–29B is a variant of the circuitry of FIGS. 4A–4B. The part list attached as Appendix C describes that various parts in FIG. 29. The parts in Appendix C are commercially available as described above.

Gauge 100 also includes probe addition communication port 462 which is a RS 232 compatible interface or other appropriate electrical interface.

While only a few, preferred embodiments of the invention have been described hereinabove, those of ordinary skill in the art will recognize that the embodiment may be modified and altered without departing from the central spirit and scope of the invention. Thus, the preferred embodiment described hereinabove is to be considered in all respects as illustrative and not restrictive, the scope of the invention being indicated by the appended claims, rather than by the foregoing description, and all changes which come within the meaning and range of equivalency of the claims are intended to be embraced herein.

Application Guide/ Vehicle Look-up Tables:

Application Guide Heading Definitions:

Make & Model: Vehicle Designation

Engine: is either a displacement and injection description; or an engine code that is listed on the engine decal.

From Year /To Year: the beginning and ending years for the particular information contained in this line.

VIN: Vehicle Identification Number; the engine code contained in the VIN number (10 digits) at the base of the windshield. Imports do not use this code in this chart.

KOEO: stands for "key on; engine off".

Normal Idle: engine at normal operating temperature, low idle speed

Idle w/o Vacuum: applies to port injected vehicles. This is the pressure of the system with the vacuum removed from the fuel pressure regulator.

Deadhead: the system pressure with the return line blocked off.

⚠ CAUTION NOTE: <u>Do not</u> pinch plastic or braided steel lines.

Adapter Fitting: the adapter fitting(s) needed to attach pressure gauge to vehicle.

Adapter Kit: indicates in which kit the listed adapter is available.

Fitting Location: where the adapter is installed on the vehicle.

Manual Pump Energize: how to activate the fuel pump without the engine running.

RPO: Regular Production Option; the production code contained in the vehicle option label.

European Fuel Pressure CIS Tables:

System Pressure: pressure reading while vehicle is being operated (driven).

Control/Differential Warm: pressure reading achieved once engine has warmed and is idling.

Control/Differential @68° F: pressure reading at room temperature once vehicle has been shut down and allowed to surpass rest pressure (while stored indoors).

Rest Pressure: pressure reading reached once vehicle has been turned off and reached rest time.

Rest Time: amount of time required to reach rest pressure.

Definitions of Terms Used in Look-up Tables:

GM : Grand Master Kit (#EEFI300AM)

DM: Domestic Master Kit (#EEFI300ADM)

FM: Foreign Master Kit (#EEFI300AFM)

DB: Domestic Basic Kit (#EEFI300ADB)

FB: Foreign Basic Kit (#EEFI300AFB)

N/A: Not Applicable

See Intro: found in the European Fuel Pressure CIS tables; when indicated means to use the same fitting information as noted for that specific vehicle under the 'Standard Domestic & Foreign Fuel Pressure' Section of the Look-up Tables.

Using the Application Guide Look-up Tables:

The following are general guidelines for using the enclosed Vehicle Look-up Tables (pgs 1-39).

1.) Locate the vehicle in question in the look-up table headings by utilizing one or all of the following:
 - Make & Model of vehicle
 - Engine
 - From Year / to Year
 - VIN 2.) Once the vehicle has been identified, the proper adapter(s), as well as the fitting location will need to be determined. This information is found under the columns entitled Adapter Fitting and Fitting Location. Following the line for the specific vehicle over to the these columns to find the information needed. The Adapter Fitting column lists the actual fitting needed. The number listed corresponds to the number stamped on the adapter in the kit. The Fitting Location column will tell the technician where in the vehicle to attach the designated adapter. Because of space limitations and the desire to give as much information as possible to the user, the Fitting Location column uses a footnote method to provide all the required information. The technician needs to reference the numbered footnote given in this column. The number (found in parenthesis within the column) is referenced in the 'Key to Look-up Table Footnotes' found beginning on page 00, and provides an explanation as to where the fuel connection can be located for that specific vehicle.

⚐ NOTE: This same method of identifying information is used with the KOEO, Normal Idle and Manual Pump Energize columns.

Using the Application Guide Look-up Tables: (cont)

3.) After choosing the adapter and referencing the Fitting Location, the additional columns of KOEO, Normal Idle, Idle w/o Vacuum and Deadhead Pressure will provide the technician with additional pertinent information. Listed in these columns are the actual pressure or pressure range which can be read from the Digital Remote Fuel Pressure Gauge for the vehicle being tested.

 NOTE: KOEO indicates (for those vehicles listing a reading and/or a footnote) that a fuel pressure reading can be made with the key on without the engine running.

4.) The European Fuel Pressure CIS tables (found on pg 37-39) list those vehicles with CIS fuel pressure systems. Use these tables the same way described above. The difference in these tables is in the way the information is given; ie. there are 4 columns which list the fuel pressure readings in both bar & psi measurement which replace the columns VIN thru Deadhead Pressure.

 NOTE: for the Adapter Fitting the column says 'See Intro' which means use the same adapter listed for that vehicle in the 'Standard Domestic & Foreign Fuel Pressure Systems' Section of the Look-up Tables.

Application Guide/ Vehicle Look-up Tables:

Pressure Conversion Formulas:

Use the formulas given here to convert pressure units (or use the table that follows)

| To Convert: | | Multiply by: | | To Obtain: |
|---|---|---|---|---|
| psi | x | 0.0689 | = | bar |
| psi | x | 6.89 | = | kPa |
| psi | x | 0.0703 | = | kg/cm² |
| bar | x | 14.5 | = | psi |
| bar | x | 100 | = | kPa |
| bar | x | 1.02 | = | kg/cm² |
| kPa | x | 0.145 | = | psi |
| kPa | x | 0.01 | = | bar |
| kPa | x | 0.0102 | = | kg/cm² |
| kg/cm² | x | 14.2 | = | psi |
| kg/cm² | x | 0.981 | = | bar |
| kg/cm² | x | 98.1 | = | kPa |

Application Guide/Vehicle Look-up Tables:

Pressure Conversion Chart:

Use the table to convert from one unit of measurement to another.

| psi | bar | KPA | kg/cm² |
|---|---|---|---|
| 1 | 0.069 | 6.89 | 0.0703 |
| 2 | 0.138 | 13.79 | 0.141 |
| 3 | 0.207 | 20.68 | 0.211 |
| 4 | 0.276 | 27.58 | 0.281 |
| 5 | 0.345 | 34.47 | 0.352 |
| 6 | 0.414 | 41.37 | 0.422 |
| 7 | 0.483 | 48.26 | 0.492 |
| 8 | 0.552 | 55.16 | 0.562 |
| 9 | 0.621 | 62.05 | 0.633 |
| 10 | 0.689 | 68.95 | 0.703 |
| 11 | 0.758 | 75.84 | 0.773 |
| 12 | 0.827 | 82.74 | 0.844 |
| 13 | 0.896 | 89.63 | 0.914 |
| 14 | 0.965 | 96.53 | 0.984 |
| 15 | 1.03 | 103.42 | 1.05 |
| 20 | 1.38 | 137.90 | 1.41 |
| 25 | 1.72 | 172.37 | 1.76 |
| 30 | 2.07 | 206.84 | 2.11 |
| 35 | 2.41 | 241.32 | 2.46 |
| 40 | 2.76 | 275.79 | 2.81 |
| 45 | 3.1 | 310.26 | 3.16 |
| 50 | 3.45 | 344.74 | 3.52 |
| 55 | 3.79 | 379.21 | 3.87 |
| 60 | 4.14 | 413.69 | 4.22 |

Application Guide/Vehicle Look-up Tables:

Pressure Conversion Chart: (cont.)

Use the table to convert from one unit of measurement to another.

| psi | bar | KPA | kg/cm² |
|---|---|---|---|
| 65 | 4.48 | 448.16 | 4.57 |
| 70 | 4.83 | 482.63 | 4.92 |
| 75 | 5.17 | 517.11 | 5.27 |
| 80 | 5.52 | 551.58 | 5.62 |
| 85 | 5.86 | 586.05 | 5.98 |
| 90 | 6.21 | 620.53 | 6.33 |
| 95 | 6.55 | 655.00 | 6.68 |
| 100 | 6.89 | 689.48 | 7.03 |

Standard Domestic & Foreign Fuel Rail Systems

| MAKE | MODEL | ENGINE | FROM YEAR | TO YEAR | VIN | KOEO | NORMAL IDLE | IDLE W/O VACUUM | DEADHEAD PRESSURE | ADAPTER FITTING | ADAPTER KIT | FITTING LOCATION | MANUAL PUMP ENERGIZE | RPO |
|---|---|---|---|---|---|---|---|---|---|---|---|---|---|---|
| Acura | | | | | | | | | | | | | | |
| Acura | 2.5 TL | G25A4 | 1995 | 1995 | | N/A | 33-41 | 43-50 | N/A | F16 | GM,DM,FM,FB | [136] | [135] | |
| Acura | Integra | D16A1 | 1986 | 1986 | | N/A | [16] | 36-41 | N/A | F16 | GM,DM,FM,FB | [136] | [135] | |
| | | B17A1 VTEC | 1992 | 1993 | | N/A | 39-46 | 48-56 | N/A | F16 | GM,DM,FM,FB | [136] | [135] | |
| | | B18A1 | 1990 | 1990 | | N/A | [16] | 35-41 | N/A | F16 | GM,DM,FM,FB | [136] | [135] | |
| | | B18A1 | 1991 | 1991 | | N/A | [16] | 37-44 | N/A | F16 | GM,DM,FM,FB | [136] | [135] | |
| | | B18A1 | 1992 | 1993 | | N/A | 32-39 | 41-48 | N/A | F16 | GM,DM,FM,FB | [136] | [135] | |
| | | B18B1 | 1994 | 1995 | | N/A | 31-36 | 40-47 | N/A | F16 | GM,DM,FM,FB | [136] | [135] | |
| | | B18C1 VTEC | 1994 | 1995 | | N/A | 39-46 | 48-55 | N/A | F16 | GM,DM,FM,FB | [136] | [135] | |
| Acura | Legend Coupe | C27A1 | 1987 | 1990 | | N/A | [16] | 36-41 | N/A | F16 | GM,DM,FM,FB | [136] | [135] | |
| | | C32A1 | 1991 | 1992 | | N/A | 31-37 | 38-46 | N/A | F16 | GM,DM,FM,FB | [136] | [135] | |
| | | C32A1 | 1993 | 1995 | | N/A | 36-43 | 44-51 | N/A | F16 | GM,DM,FM,FB | [136] | [135] | |
| Acura | Legend Sedan | C25A1 | 1986 | 1987 | | N/A | [16] | 36-41 | N/A | F16 | GM,DM,FM,FB | [136] | [135] | |
| | | C27A1 | 1988 | 1990 | | N/A | [16] | 36-41 | N/A | F16 | GM,DM,FM,FB | [136] | [135] | |
| | | C32A1 | 1991 | 1992 | | N/A | 31-37 | 35-41 | N/A | F16 | GM,DM,FM,FB | [136] | [135] | |
| | | C32A1 GS | 1993 | 1993 | | N/A | 29-35 | 44-51 | N/A | F16 | GM,DM,FM,FB | [136] | [135] | |
| | | C32A1 L,LS | 1994 | 1995 | | N/A | 36-43 | 38-46 | N/A | F16 | GM,DM,FM,FB | [136] | [135] | |
| | | C32A1 | 1994 | 1995 | | N/A | 30-37 | | N/A | F16 | GM,DM,FM,FB | [136] | [135] | |
| Acura | NSX | C30A1 | 1991 | 1995 | | N/A | 36-44 | 46-53 | N/A | F16 | GM,DM,FM,FB | [136] | [135] | |
| Acura | Vigor | G25A1 | 1992 | 1995 | | N/A | 33-41 | 43-50 | N/A | F16 | GM,DM,FM,FB | [136] | [135] | |
| Alfa Romeo | | | | | | | | | | | | | | |
| Alfa | 164, 164 Quadrifoglio | 3.0L MPI | 1991 | 1994 | | 29 [114] | 35-40 | 42-47 | 58 | F3 | ALL | [137] | [133] | |
| Alfa | Graduate | 2.0L MPI | 1991 | 1995 | | 29 [114] | 34-39 | 41-46 | 58 | F3 | ALL | [137] | [133] | |
| Alfa | GTV 6 | 2.5L MPI | 1981 | 1987 | | N/A | 28-33 | 35-40 | 58 | F3 | ALL | [137] | [133] | |
| Alfa | Milano | 2.5L, 3.0L MPI | 1981 | 1985 | | N/A | 28-33 | 41-46 | 58 | F3 | ALL | [137] | [133] | |
| Alfa | Spider | 2.0L MPI | 1980 | 1990 | | 29 [114] | 34-39 | | N/A | F3 | ALL | [137] | [133] | |
| Audi (See also CIS section pgs. 37-39) | | | | | | | | | | | | | | |
| Audi | 80, 90 CS | 2.8L MPI | 1992 | 1995 | | 44 [114] | 49-54 | 55-70 | 100 | F32 | GM,FM | [137] | [133] | |
| Audi | 100, 100 CS | 2.8L MPI | 1992 | 1994 | | 44 [114] | 49-54 | 55-70 | 100 | F32 | GM,FM | [137] | [133] | |
| Audi | Cabriolet | 2.8L MPI | 1994 | 1995 | | 43 [114] | 49-54 | 58-62 | 100 | F32 | GM,FM | [137] | [133] | |
| Audi | S4 | 2.2L MPI | 1992 | 1994 | | 43 [114] | 49-54 | 58-62 | 100 | F32 | GM,FM | [137] | [133] | |
| Audi | V8 Quattro | 3.5L, 4.2L MPI | 1990 | 1994 | | 43 [114] | 49-54 | 58-62 | 100 | F32 | GM,FM | [137] | [132] | |
| BMW | | | | | | | | | | | | | | |
| BMW | 318i | M10 MPI | 1984 | 1985 | | 28 [114] | 36-41 | 43-48 | 100 | F3 | ALL | [137] | [122] | |
| BMW | 318i (E30) | M42 MPI | 1990 | 1992 | | 28 [114] | 36-41 | 43-48 | 100 | F3 | ALL | [137] | [122] | |
| BMW | 318i (E36) | | | | | | | | | | | | | |

* Note: Heading definitions for columns are found on page xii    Footnote references are found on pages 40-44 *

PAGE 1

Standard Domestic & Foreign Fuel Rail Systems

| MAKE | MODEL | ENGINE | FROM YEAR | TO YEAR | VIN | KOEO | NORMAL IDLE | IDLE W/O VACUUM | DEADHEAD PRESSURE | ADAPTER FITTING | ADAPTER KIT | FITTING LOCATION | MANUAL PUMP ENERGIZE | RPO |
|---|---|---|---|---|---|---|---|---|---|---|---|---|---|---|
| BMW (cont.) | | | | | | | | | | | | | | |
| BMW | 318i | M42, M43 MPI | 1993 | 1996 | | 28 [114] | 36-41 | 43-48 | 100 | F3 | ALL | [137] | [123] | |
| BMW | 318i | M43 MPI | 1995 | 1996 | | 28 [114] | 36-41 | 43-48 | 100 | F3 | ALL | [137] | [123] | |
| BMW | 325e, 325 | M20 MPI | 1984 | 1988 | | 28 [114] | 29-34 | 36-41 | 100 | F3 | ALL | [137] | [122] | |
| BMW | 325i (E30) | M20 MPI | 1987 | 1992 | | 28 [114] | 36-41 | 43-48 | 100 | F3 | ALL | [137] | [122] | |
| BMW | 325i (E36) | M50 MPI | 1992 | 1996 | | 33 [114] | 43-48 | 50-55 | 100 | F3 | ALL | [137] | [123] | |
| BMW | 328i | M50 MPI | 1997 | 1997 | | 33 [114] | 43-48 | 50-55 | 100 | F3 | ALL | [137] | [123] | |
| BMW | 525i | M50 MPI | 1992 | 1996 | | 33 [114] | 43-48 | 50-55 | 100 | F3 | ALL | [137] | [125] | |
| BMW | 528e | M20 MPI | 1982 | 1988 | | 28 [114] | 29-34 | 36-41 | 100 | F3 | ALL | [137] | [121] | |
| BMW | 528e | M20 MPI | 1987 | 1988 | | 28 [114] | 36-41 | 43-48 | 100 | F3 | ALL | [137] | [121] | |
| BMW | 528i (E12) | M30 MPI | 1979 | 1981 | | 28 [114] | 36-41 | 43-48 | 100 | F3 | ALL | [137] | [130] | |
| BMW | 528i (E39) | M50 MPI | 1995 | 1997 | | 33 [114] | 50-55 | 50-55 | 100 | F3 | ALL | [137] | N/A | |
| BMW | 530i (E12) | M30 MPI | 1975 | 1978 | | 28 [114] | 28-34 | 36-41 | 100 | F3 | ALL | [137] | [130] | |
| BMW | 530i (E34) | M60 MPI | 1994 | 1995 | | 33 [114] | 43-48 | 50-55 | 100 | F3 | ALL | [137] | [125] | |
| BMW | 533i | M30 MPI | 1983 | 1984 | | 28 [114] | 36-41 | 43-48 | 100 | F3 | ALL | [137] | [121] | |
| BMW | 535i (E28) | M30 MPI | 1985 | 1988 | | 28 [114] | 36-41 | 43-48 | 100 | F3 | ALL | [137] | [121] | |
| BMW | 535i (E34) | M30 MPI | 1989 | 1993 | | 28 [114] | 36-41 | 43-48 | 100 | F3 | ALL | [137] | [125] | |
| BMW | 540i | M60 MPI | 1994 | 1996 | | 33 [114] | 43-48 | 50-55 | 100 | F3 | ALL | [137] | [119] | |
| BMW | 630CSi | M30 MPI | 1977 | 1977 | | 28 [114] | 36-41 | 43-48 | 100 | F3 | ALL | [137] | [130] | |
| BMW | 633 CSi | M30 MPI | 1979 | 1982 | | 28 [114] | 36-41 | 43-48 | 100 | F3 | ALL | [137] | [130] | |
| BMW | 633, 635 CSi | M30 MPI | 1983 | 1988 | | 28 [114] | 36-41 | 43-48 | 100 | F3 | ALL | [137] | [122] | |
| BMW | 733i | M30 MPI | 1977 | 1981 | | 28 [114] | 36-41 | 43-48 | 100 | F3 | ALL | [137] | [130] | |
| BMW | 733i, 735i (E23) | M30 MPI | 1983 | 1987 | | 28 [114] | 36-41 | 43-48 | 100 | F3 | ALL | [137] | [122] | |
| BMW | 735i (E32) | M30 MPI | 1988 | 1993 | | 28 [114] | 36-41 | 43-48 | 100 | F3 | ALL | [137] | [125] | |
| BMW | 740i (E32) | M60 MPI | 1993 | 1995 | | 28 [114] | 43-48 | 43-48 | 100 | F3 | ALL | [137] | [125] | |
| BMW | 740i (E38) | M60 MPI | 1995 | 1997 | | 28 [114] | 36-41 | 43-48 | 100 | F3 | ALL | [137] | [125] | |
| BMW | 750iL | M70 MPI | 1988 | 1995 | | 28 [114] | 36-41 | 43-48 | 100 | F3 | ALL | [137] | [129] | |
| BMW | 750iL | M73 MPI | 1995 | 1997 | | 33 [114] | 43-48 | 50-55 | 100 | F3 | ALL | [137] | [119] | |
| BMW | 840Ci | M60 MPI | 1994 | 1996 | | 33 [114] | 43-48 | 50-55 | 100 | F3 | ALL | [137] | [125] | |

*** Note : Heading definitions for columns are found on page xii

Footnote references are found on pages 40-44 ***

PAGE 2

Standard Domestic & Foreign Fuel Rail Systems

| MAKE | MODEL | ENGINE | FROM YEAR | TO YEAR | VIN | KOEO | NORMAL IDLE | IDLE W/O VACUUM | DEADHEAD PRESSURE | ADAPTER FITTING | ADAPTER KIT | FITTING LOCATION | MANUAL PUMP ENERGIZE | RPO |
|---|---|---|---|---|---|---|---|---|---|---|---|---|---|
| BMW (CONT.) | | | | | | | | | | | | | |
| BMW | 850 | M70 MPI | 1990 | 1995 | | 28 [114] | 36-41 | 43-48 | 100 | F3 | ALL | [137] | [129] | |
| BMW | L6 | M30 MPI | 1987 | 1988 | | 28 [114] | 36-41 | 43-48 | 100 | F3 | ALL | [137] | [122] | |
| BMW | L7 | M30 MPI | 1986 | 1987 | | 28 [114] | 36-41 | 43-48 | 100 | F3 | ALL | [137] | [122] | |
| BMW | M3 (E30) | S14 MPI | 1987 | 1989 | | 28 [114] | 36-41 | 43-48 | 100 | F3 | ALL | [137] | [122] | |
| BMW | M3 (E36) | S50 MPI | 1993 | 1995 | | 28 [114] | 36-41 | 43-48 | 100 | F3 | ALL | [137] | [123] | |
| BMW | M5 (E28) | S38 MPI | 1987 | 1988 | | 28 [114] | 36-41 | 43-48 | 100 | F3 | ALL | [137] | [123] | |
| BMW | M5 (E34) | S38 MPI | 1991 | 1993 | | 28 [114] | 36-41 | 43-48 | 100 | F3 | ALL | [137] | [121] | |
| BMW | M6 | S38 MPI | 1987 | 1988 | | 28 [114] | 36-41 | 43-48 | 100 | F3 | ALL | [137] | [125] | |
| BMW | Z3 | M44 MPI | 1996 | 1997 | | 28 [114] | 36-41 | 43-48 | 100 | F3 | ALL | [137] | [123] | |
| Buick | | | | | | | | | | | | | | |
| Buick | Century Custom (FWD) | | | | | | | | | | | | | |
| | | 2.2L L4 MFI | 1993 | 1993 | 4 | 41-47 | [16] | 41-47 | 60+ | F12-F13 | GM,DM | [140] | [27] | LN2 |
| | | 2.2L L4 MFI | 1994 | 1995 | 4 | 41-47 | [16] | 41-47 | 60+ | F12-F13 | GM,DM | [140] | [29] | LN2 |
| | | 2.5L L4 TBI | 1986 | 1987 | R | 9-13 | 9-13 | N/A | 15+ | 8-F9 or F10-F11 | GM,DM | [140] | [30] | LR8 |
| | | 2.5L L4 TBI | 1988 | 1992 | U | 9-13 | 9-13 | N/A | 15+ | F10-F11 | GM,DM | [140] | [27] | LR8 |
| | | 2.8L V6 MFI | 1987 | 1989 | W | 40-47 | [16] | 40-47 | 60+ | F1 | GM,DM,FM,DB | [137] | [27] | LB6 |
| | | 3300 V6 MFI | 1989 | 1993 | N | 40-47 | [16] | 40-47 | 60+ | F1 | GM,DM,FM,DB | [137] | [20] | LG7 |
| | | 3.1L V6 MFI | 1990 | 1993 | M | 34-40 | [16] | 34-40 | 60+ | F1 | GM,DM,FM,DB | [137] | [27] | LH0 |
| | | 2.2L L4 SFI | 1996 | 1996 | 4 | 41-47 | [16] | 41-47 | 60+ | F1 | GM,DM,FM,DB | [140] | [42] | LN2 |
| Buick | Electra Park Avenue (FWD) | | | | | | | | | | | | | |
| | | 3.8L V6 SFI | 1984 | 1985 | 3,B | 34-40 | 25-35 | 34-40 | 60+ | F1 | GM,DM,FM,DB | [137] | [31] | LG3 |
| | | 3.8L V6 SFI | 1987 | 1990 | 3,B | 34-40 | 25-35 | 34-40 | 60+ | F1 | GM,DM,FM,DB | [137] | [32] | LG3 |
| | | 3800 V6 SFI | 1988 | 1991 | C | 40-47 | [16] | 40-47 | 60+ | F1 | GM,DM,FM,DB | [137] | [32] | LN3 |
| | | 3.8L V6 SFI | 1991 | 1995 | L | 40-47 | [16] | 40-47 | 60+ | F1 | GM,DM,FM,DB | [137] | [32] | L27 |
| | | 3.8L V6 SFI | 1992 | 1995 | 1 | 40-47 | [16] | 40-47 | 60+ | F1 | GM,DM,FM,DB | [137] | [27] | L67 |
| | | 3.8L V6 SFI | 1996 | 1996 | K | 48-55 | [16] | 48-55 | 60+ | F1 | GM,DM,FM,DB | [137] | [33] | L36 |
| | | 3.8L V6 SFI | 1996 | 1996 | K | 48-55 | [16] | 48-55 | 60+ | F1 | GM,DM,FM,DB | [137] | [31] | L36 |
| Buick | Lesabre Limited | | | | | | | | | | | | | |
| | | 3.0L V6 MFI | 1986 | 1986 | L | 40-47 | [16] | 40-47 | 60+ | F1 | GM,DM,FM,DB | [137] | [31] | LN7 |
| | | 3.8L V6 SFI | 1986 | 1986 | 3,B | 34-40 | [16] | 34-40 | 60+ | F1 | GM,DM,FM,DB | [137] | [32] | LG3 |
| | | 3800 V6 SFI | 1986 | 1991 | C | 40-47 | [16] | 40-47 | 60+ | F1 | GM,DM,FM,DB | [137] | [32] | LN3 |
| | | 3.8L V6 SFI | 1991 | 1995 | L | 40-47 | [16] | 40-47 | 60+ | F1 | GM,DM,FM,DB | [137] | [32] | LN3 |
| | | 3.8L V6 SFI | 1995 | 1995 | K | 48-55 | [16] | 48-55 | 60+ | F1 | GM,DM,FM,DB | [137] | [32] | L27 |
| | | 3.8L V6 SFI | 1996 | 1996 | K | 48-55 | [16] | 48-55 | 60+ | F1 | GM,DM,FM,DB | [137] | [34] | L36 |
| Buick | Regio | | | | | | | | | | | | | |
| Buick | Regal (FWD) | | | | | | | | | | | | | |
| | | 2.8L V6 MFI | 1988 | 1989 | W | 40-47 | [16] | 40-47 | 60+ | F1 | GM,DM,FM,DB | [137] | [37] | LB6 |
| | | 3.1L V6 SFI | 1989 | 1993 | T | 40-47 | [16] | 40-47 | 60+ | F1 | GM,DM,FM,DB | [137] | [32] | LH0 |
| | | 3.1L V6 SFI | 1994 | 1995 | M | 40-47 | [16] | 40-47 | 60+ | F1 | GM,DM,FM,DB | [137] | [32] | L82 |
| | | 3.1L V6 SFI | 1991 | 1991 | M | 40-47 | [16] | 40-47 | 60+ | F1 | GM,DM,FM,DB | [137] | [32] | L82 |
| | | 3.8L V6 SFI | 1995 | 1995 | L | 40-47 | [16] | 40-47 | 60+ | F1 | GM,DM,FM,DB | [137] | [32] | L27 |
| | | 3.8L V6 SFI Calif | 1993 | 1993 | T | 41-47 | [16] | 41-47 | 60+ | F1 | GM,DM,FM,DB | [137] | [37] | LH0 |

*** Note: Heading definitions for columns are found on page xii  
Footnote references are found on pages 40-44 ***

PAGE 3

Standard Domestic & Foreign Fuel Rail Systems

| MAKE | MODEL | ENGINE | FROM YEAR | TO YEAR | VIN | KOEO | NORMAL IDLE | IDLE W/O VACUUM | DEADHEAD PRESSURE | ADAPTER FITTING | ADAPTER KIT | FITTING LOCATION | MANUAL PUMP ENERGIZE | RPO |
|---|---|---|---|---|---|---|---|---|---|---|---|---|---|
| Buick (cont.) | | | | | | | | | | | | | |
| Buick | Regal (RWD) | 3.8L V6 SFI | 1996 | 1996 | K | 48-55 | [16] | 48-55 | 60+ | F1 | GM,DM,FM,DB | [137] | [34] | L36 |
| | | 3.8L V6 SFI Turbo | 1986 | 1987 | 7 | 40-47 | [16] | 40-47 | 60+ | F1 | GM,DM,FM,DB | [137] | [35] | LC2 |
| | | 3.8L V6 SFI Turbo | 1984 | 1985 | 9 | 40-47 | [16] | 40-47 | 60+ | F1 | GM,DM,FM,DB | [137] | [36] | LM9 |
| Buick | Riviera | 3.8L V6 SFI | 1986 | 1987 | 3 | 34-40 | 25-35 | 34-40 | 60+ | | GM,DM,FM,DB | | [31] | LG3 |
| | | 3800 V6 SFI | 1991 | 1990 | C | 40-47 | [16] | 40-47 | 60+ | | GM,DM,FM,DB | | [31] | LN3 |
| | | 3.8L V6 SFI | 1988 | 1993 | 3 | 40-47 | [16] | 40-47 | 60+ | | GM,DM,FM,DB | | [31] | L27 |
| | | 3.8L V6 SFI | 1985 | 1988 | L | 40-47 | [16] | 40-47 | 60+ | | GM,DM,FM,DB | | [38] | L67 |
| | | 3.8L V6 SFI | 1985 | 1996 | K | 48-55 | [16] | 48-55 | 60+ | | GM,DM,FM,DB | | [38] | L36 |
| Buick | Roadmaster (RWD) | 4.3L V8 SFI | 1994 | 1996 | W | 41-47 | [16] | 41-47 | 60+ | F1 | GM,DM,FM,DB | [137] | [39] | L99 |
| | | 5.0L V8 TBI | 1991 | 1992 | E | 9-13 | 9-13 | 41-47 | 15+ | F12-F13 | GM,DM | [140] | [39] | L03 |
| | | 5.7L V8 SFI | 1994 | 1996 | P | 41-47 | [16] | 41-47 | 15+ | | GM,DM,FM,DB | [137] | [39] | LT1 |
| | | 5.7L V8 TBI | 1992 | 1993 | 7 | 9-13[*] | 9-13 | N/A | 15+ | F12-F13 | GM,DM | [140] | [39] | L05 |
| Buick | Skyhawk | 1.8L L4 OHC TBI | 1982 | 1983 | O | 9-13[*] | [16] | N/A | | 8-F9 or F10-F11 | GM,DM | [140] | [40] | LH8 |
| | | 1.8L L4 OHC MFI | 1984 | 1986 | O | 9-13[*] | [16] | N/A | | 8-F9 or F10-F11 | GM,DM | [140] | [40] | LH8 |
| | | 1.8L L4 MFI Turbo | 1984 | 1986 | J | 30-40 | [16] | 30-40 | 60+ | F1 | GM,DM | [137] | [41] | LA5 |
| | | 2.0L L4 TBI | 1983 | 1984 | P | 9-13[*] | [16] | N/A | 15+ | F10-F11 | GM,DM | [140] | [41] | LQ5 |
| | | 2.0L L4 TBI | 1985 | 1986 | P | 9-13[*] | [16] | N/A | 15+ | F10-F11 | GM,DM | [140] | [41] | LQ5 |
| | | 2.0L L4 TBI | 1986 | 1988 | K | 9-13[*] | [16] | N/A | 16+ | F10-F11 | GM,DM | [140] | [41] | LT2 |
| | | 2.0L L4 TBI | 1987 | 1989 | 1 | 9-13[*] | [16] | N/A | 16+ | F10-F11 | GM,DM | [140] | [20] | LT2 |
| Buick | Skylark | 2.3L L4 DOHC MFI | 1988 | 1991 | D | 41-47 | [16] | 41-47 | 60+ | F1 | GM,DM,FM,DB | [137] | [42] | LL8 |
| | | 2.3L L4 DOHC MFI | 1992 | 1995 | 3 | 41-47 | [16] | 41-47 | 60+ | F1 | GM,DM,FM,DB | [137] | [42] | LD2 |
| | | 2.3L L4 OHC MFI | 1992 | 1994 | A | 41-47 | [16] | 41-47 | 60+ | F1 | GM,DM,FM,DB | [137] | [42] | LD2 |
| | | 2.4L L4 OHC SFI | 1996 | 1996 | T | 41-47 | [16] | 41-47 | 60+ | F1 | GM,DM,FM,DB | [137] | [40] | LD9 |
| | | 2.5L L4 TBI | 1982 | 1985 | R | 9-13[*] | [16] | N/A | 15+ | F12-F13 | GM,DM | [140] | [42] | LR8 |
| | | 2.5L L4 TBI | 1986 | 1988 | U | 9-13[*] | [16] | N/A | 15+ | F12-F13 | GM,DM | [140] | [30] | LR8 |
| | | 2.5L L4 TBI | 1988 | 1991 | U | 9-13[*] | [16] | N/A | 15+ | 8-F9 or F10-F11 | GM,DM | [140] | [43] | L68 |
| | | 2.8L V6 MFI | 1985 | 1988 | W | 41-47 | [16] | 41-47 | 60+ | F1 | GM,DM,FM,DB | [137] | [38] | LB6 |
| | | 3.0L V6 MFI | 1985 | 1988 | L | 40-47 | 31-42 | 40-47 | 60+ | F1 | GM,DM,FM,DB | [137] | [38] | LN7 |
| | | 3.1L V6 MFI | 1994 | 1995 | M | 41-47 | [16] | 41-47 | 60+ | F1 | GM,DM,FM,DB | [137] | [42] | LB2 |
| | | 3.1L V6 SFI | 1996 | 1996 | M | 41-47 | [16] | 41-47 | 60+ | F1 | GM,DM,FM,DB | [137] | [42] | LB2 |
| | | 3300 V6 MFI | 1989 | 1993 | N | 41-47 | [16] | 41-47 | 60+ | F1 | GM,DM,FM,DB | [137] | [42] | LG7 |
| Buick | Somerset Custom | 2.5L L4 TBI | 1986 | 1986 | U | 9-13[*] | 9-13 | N/A | 15+ | F10-F11 | GM,DM | [140] | [43] | L68 |
| | | 2.5L L4 TBI | 1986 | 1991 | U | 9-13[*] | 9-13 | N/A | 15+ | F10-F11 | GM,DM | [140] | [42] | L68 |
| | | 3.0L V6 MFI | 1986 | 1986 | L | 41-47 | 31-42 | 40-50 | 60+ | F1 | GM,DM,FM,DB | [137] | [43] | LN7 |
| Cadillac | | | | | | | | | | | | | | |
| Cadillac | Allante | 4.1L V8 SFI | 1987 | 1988 | 7 | 41-47 | [16] | 41-47 | 60+ | F1 | GM,DM,FM,DB | [137] | [44] | LC7 |
| | | 4.5L V8 SFI | 1989 | 1992 | 8 | 41-47 | [16] | 41-47 | 60+ | F1 | GM,DM,FM,DB | [137] | [44] | LC6 |
| | | 4.6L V8 SFI | 1993 | 1993 | 9 | 40-50 | [16] | 40-50 | 60+ | F1 | GM,DM,FM,DB | [137] | [34] | L37 |
| Cadillac | Cimarron | 2.0L L4 TBI | 1983 | 1984 | P | 9-13 | 9-13 | N/A | | | GM,DM | | [40] | LQ5 |
| | | 2.8L L4 TBI | 1985 | 1986 | P | 9-13[*] | [16] | N/A | | | GM,DM | | [27] | LO5 |
| | | 2.8L V6 MFI | 1985 | 1988 | W | 41-47 | 9-13 | 41-47 | 60+ | F1 | GM,DM,FM,DB | [137] | [27] | LB6 |
| Cadillac | Concours | 4.6L V8 MFI | 1994 | 1996 | 9 | 40-50 | [16] | 40-50 | 60+ | F1 | GM,DM,FM,DB | [137] | [34] | L37 |
| | | 4.6L V8 SFI | 1994 | 1996 | Y | 40-50 | [16] | 40-50 | 60+ | F1 | GM,DM,FM,DB | [137] | [34] | L37 |

* Note: Heading definitions for columns are found on page xii     Footnote references are found on pages 40-44 *

PAGE 4

Standard Domestic & Foreign Fuel Rail Systems

| MAKE | MODEL | ENGINE | FROM YEAR | TO YEAR | VIN | KOEO | NORMAL IDLE | IDLE W/O VACUUM | DEADHEAD PRESSURE | ADAPTER FITTING | ADAPTER KIT | FITTING LOCATION | MANUAL PUMP ENERGIZE | RPO |
|---|---|---|---|---|---|---|---|---|---|---|---|---|---|---|
| Cadillac | (cont.) | 4.9L V8 MFI | 1994 | 1995 | B | 41-47 | [16] | 41-47 | 60+ | F1 | GM,DM,FM,DB | [137] | [34] | L26 |
| Cadillac | Deville (FWD) | 4.1L V8 TBI | 1985 | 1985 | 8 | 9-13[7] | 9-13 | N/A | 15+ | F1 | GM,DM,FM,DB | [137] | [27] | LT8 |
|  |  | 4.1L V8 TBI | 1986 | 1987 | 8 | 9-13[7] | 9-13 | N/A | 15+ | F1 | GM,DM,FM,DB | [137] | [27] | LT8 |
|  |  | 4.1L V8 TBI | 1988 | 1988 | 8 | 9-13[7] | 9-13 | N/A | 15+ | F1 | GM,DM,FM,DB | [137] | [45] | LT8 |
|  |  | 4.5L V8 SFI | 1988 | 1990 | 5 | 9-13[7] | 9-13 | N/A | 15+ | F1 | GM,DM,FM,DB | [137] | [31] | LR6 |
|  |  | 4.5L V8 SFI | 1990 | 1990 | 3 | 41-47 | [16] | 41-47 | 60+ | F1 | GM,DM,FM,DB | [137] | [31] | LW2 |
|  |  | 4.6L V8 SFI | 1994 | 1994 | 9 | 40-50 | [16] | 40-50 | 60+ | F1 | GM,DM,FM,DB | [137] | [34] | L37 |
|  |  | 4.9L V8 SFI | 1994 | 1995 | Y | 40-50 | [16] | 40-50 | 60+ | F1 | GM,DM,FM,DB | [137] | [34] | LD8 |
|  |  | 4.9L V8 SFI | 1993 | 1993 | B | 40-50 | [16] | 40-50 | 60+ | F1 | GM,DM,FM,DB | [137] | [34] | LD8 |
|  |  | 4.9L V8 TBI | 1994 | 1995 | B | 40-50 | [16] | 40-50 | 60+ | F1 | GM,DM,FM,DB | [137] | [34] | L26 |
| Cadillac | Deville (RWD) | 4.1L V8 TBI | 1982 | 1984 | 8 | 9-13[7] | 9-13 | N/A | 15+ | F1 | GM,DM,FM,DB | [137] | [27] | LT8 |
|  |  | 6.0L V8 TBI | 1981 | 1984 | 9 | 9-13[7] | 9-13 | N/A | 15+ | F1 | GM,DM,FM,DB | [137] | [27] | L62 |
| Cadillac | Eldorado | 4.1L V8 TBI | 1982 | 1987 | 8 | 9-13[7] | 9-13 | N/A | 15+ | F1 | GM,DM,FM,DB | [137] | [27] | LT8 |
|  |  | 4.5L V8 TBI | 1988 | 1988 | 5 | 9-13[7] | 9-13 | N/A | 15+ | F1 | GM,DM,FM,DB | [137] | [31] | LR6 |
|  |  | 4.5L V8 SFI | 1990 | 1990 | 3 | 41-47 | [16] | 41-47 | 60+ | F1 | GM,DM,FM,DB | [137] | [31] | LR6 |
|  |  | 4.6L V8 SFI | 1994 | 1995 | 9 | 40-50 | [16] | 40-50 | 60+ | F1 | GM,DM,FM,DB | [137] | [34] | LW2 |
|  |  | 4.6L V8 SFI | 1994 | 1995 | Y | 40-50 | [16] | 40-50 | 60+ | F1 | GM,DM,FM,DB | [137] | [34] | L37 |
|  |  | 4.9L V8 SFI | 1991 | 1993 | B | 40-50 | [16] | 40-50 | 60+ | F1 | GM,DM,FM,DB | [137] | [34] | LD8 |
|  |  | 6.0L V8 TBI | 1981 | 1981 | 9 | 9-13[7] | 9-13 | N/A | 15+ | F1 | GM,DM,FM,DB | [137] | [46] | L26 |
|  |  | 6.0L V8 SFI |  |  |  |  |  |  |  |  |  |  | [29] | L62 |
| Cadillac | Fleetwood (FWD) | 4.1L V8 TBI | 1985 | 1985 | 8 | 9-13[7] | 9-13 | N/A | 15+ | F1 | GM,DM,FM,DB | [137] | [27] | LT8 |
|  |  | 4.1L V8 TBI | 1986 | 1987 | 8 | 9-13[7] | 9-13 | N/A | 15+ | F1 | GM,DM,FM,DB | [137] | [27] | LR8 |
|  |  | 4.5L V8 SFI | 1988 | 1988 | 5 | 9-13[7] | 9-13 | N/A | 15+ | F1 | GM,DM,FM,DB | [137] | [45] | LR6 |
|  |  | 4.5L V8 SFI | 1990 | 1990 | 3 | 41-47 | [16] | 41-47 | 60+ | F1 | GM,DM,FM,DB | [137] | [31] | LW2 |
|  |  | 6.0L V8 TBI | 1981 | 1981 | 9 | 40-50 | [16] | 40-50 | 60+ | F1 | GM,DM,FM,DB | [137] | [28] | L26 |
| Cadillac | Fleetwood Brougham (RWD) | 4.1L V8 TBI | 1982 | 1985 | 8 | 9-13[7] | 9-13 | N/A | 15+ | F1 | GM,DM,FM,DB | [137] | [27] | LT8 |
|  |  | 5.0L V8 TBI | 1991 | 1992 | E | 9-13[7] | 9-13 | N/A | 15+ | F1 | GM,DM,FM,DB | [137] | [28] | LR8 |
|  |  | 5.7L V8 SFI | 1990 | 1993 | 7 | 41-47 | [16] | 41-47 | 60+ | F1 | GM,DM,FM,DB | [137] | [03] | LW2 |
|  |  | 5.7L V8 SFI | 1994 | 1994 | P | 40-50 | [16] | 40-50 | 60+ | F1 | GM,DM,FM,DB | [137] | [28] | L05 |
|  |  | 6.0L V8 TBI | 1981 | 1981 | 9 | 9-13[7] | 9-13 | N/A | 15+ | F1 | GM,DM,FM,DB | [137] | [27] | L11 |
| Cadillac | Seville | 4.1L V8 TBI | 1982 | 1987 | 8 | 9-13[7] | 9-13 | N/A | 15+ | F1 | GM,DM,FM,DB | [137] | [27] | LT8 |
|  |  | 4.5L V8 SFI | 1988 | 1988 | 5 | 9-13[7] | 9-13 | N/A | 15+ | F1 | GM,DM,FM,DB | [137] | [31] | LR6 |
|  |  | 4.6L V8 SFI | 1990 | 1990 | 3 | 41-47 | [16] | 41-47 | 60+ | F1 | GM,DM,FM,DB | [137] | [31] | LW2 |
|  |  | 4.6L V8 SFI | 1994 | 1995 | 9 | 40-50 | [16] | 40-50 | 60+ | F1 | GM,DM,FM,DB | [137] | [34] | L37 |
|  |  | 4.6L V8 SFI | 1994 | 1995 | Y | 40-50 | [16] | 40-50 | 60+ | F1 | GM,DM,FM,DB | [137] | [34] | LD8 |
|  |  | 6.0L V8 SFI | 1981 | 1981 | M | N/A | [16] | N/A | 60+ | F1 | GM,DM,FM,DB | [137] | [29] | L62 |
| Chevrolet, Geo |  |  |  |  |  |  |  |  |  |  |  |  |  |  |
| Chev/GEO Beretta | | 2.0L L4 TBI | 1987 | 1988 | 1 | 9-13[7] | 9-13 | N/A | 15+ | F10-F11 | GM,DM | [140] | [42] | L8 |
|  |  | 2.2L L4 TBI | 1990 | 1992 | G | 9-13[7] | 9-13 | N/A | 15+ | F12-F13 | GM,DM | [140] | [42] | LM3 |
|  |  | 2.2L L4 MFI | 1992 | 1993 | 4 | 41-47 | [16] | 41-47 | 60+ | F12-F13 | GM,DM | [140] | [42] | LN2 |
|  |  | 2.3L L4 DOHC MFI HO | 1990 | 1991 | A | 41-47 | [16] | 41-47 | 60+ | F12-F13 | GM,DM | [140] | [42] | LN2 |
|  |  | 2.3L L4 DOHC MFI HO | 1992 | 1994 | A | 41-47 | [16] | 41-47 | 60+ | F1 | GM,DM,FM,DB | [137] | [42] | LG0 |
|  |  | 2.8L V6 MFI | 1987 | 1989 | W | 41-47 | [16] | 41-47 | 60+ | F12-F13 | GM,DM | [140] | [42] | LG0 |
|  |  | 3.1L V6 MFI | 1990 | 1993 | T | 41-47 | [16] | 41-47 | 60+ | F1 | GM,DM,FM,DB | [137] | [42] | LH0 |
|  |  | 3.1L V6 SFI | 1994 | 1996 | M | 41-47 | [16] | 41-47 | 60+ | F1 | GM,DM,FM,DB | [137] | [42] | LB6 |
|  |  |  |  |  |  |  |  |  |  |  |  |  | [42] | L82 |

*** Note: Heading definitions for columns are found on page xii  
Footnote references are found on pages 40-44 ***

Standard Domestic & Foreign Fuel Rail Systems

| MAKE | MODEL | ENGINE | FROM YEAR | TO YEAR | VIN | KOEO | NORMAL IDLE | IDLE W/O VACUUM | DEADHEAD PRESSURE | ADAPTER FITTING | ADAPTER KIT | FITTING LOCATION | MANUAL PUMP ENERGIZE | RPO |
|---|---|---|---|---|---|---|---|---|---|---|---|---|---|---|
| Chev/GEO | Camaro (cont.) | 2.5L L4 TBI | 1982 | 1985 | 2 | 9-13[*] | 9-13 | N/A | 15+ | F8-F9 or F10-F11 | | [40] | 40 | LQ9 |
| | | 2.8L V6 MFI | 1985 | 1989 | S | 41-47 | [16] | 41-47 | 60+ | F1 | GM,DM,FM,DB | [37] | 40 | LB8 |
| | | 3.1L V6 MFI | 1990 | 1992 | T | 41-47 | [16] | 41-47 | 60+ | F1 | GM,DM,FM,DB | [37] | 40 | LH0 |
| | | 3.4L V6 SFI | 1993 | 1995 | S | 41-47 | [16] | 41-47 | 60+ | F1 | GM,DM | [40] | 42 | L32 |
| | | 3.6L V6 SFI | 1995 | 1996 | K | 48-55 | [16] | 48-55 | 60+ | F1 | GM,DM,FM,DB | [37] | 39 | L36 |
| | | 5.0L V8 CFI | 1982 | 1983 | F | N/A | N/A | N/A | N/A | F8-F9 | GM,DM,FM,DB | [37] | 40 | LU5 |
| | | 5.0L V8 MFI | 1985 | 1989 | F | 41-47 | [16] | 41-47 | 60+ | F1 | GM,DM,FM,DB | [37] | 38 | LB9 |
| | | 5.0L V8 TBI | 1988 | 1992 | E | 41-47 | [16] | 41-47 | 15+ | F1 | GM,DM | [40] | 40 | L03 |
| | | 5.0L V8 TBI | 1988 | 1990 | E | 41-47 | [16] | N/A | 15+ | F10-F11 | GM,DM | [40] | 40 | L03 |
| | | 5.7L V8 MFI | 1987 | 1989 | 8 | 41-47 | [16] | 41-47 | 60+ | F1 | GM,DM,FM,DB | [37] | 39 | L98 |
| | | 5.7L V8 MFI | 1990 | 1992 | 8 | 41-47 | [16] | 41-47 | 60+ | F10-F11 | GM,DM | [40] | 40 | L98 |
| | | 5.7L V8 SFI | 1993 | 1996 | P | 41-47 | [16] | 41-47 | 60+ | F1 | GM,DM,FM,DB | [37] | 39 | LT1 |
| Chev/GEO | Caprice | 4.3L V6 TBI | 1985 | 1989 | N | 9-13[*] | 9-13 | N/A | 15+ | F10-F11 | GM,DM | [40] | 47 | LB4 |
| | | 4.3L V6 TBI | 1990 | 1993 | Z | 41-47 | [16] | N/A | 15+ | F12-F13 | GM,DM | [40] | 47 | LB4 |
| | | 5.0L V8 SFI | 1994 | 1996 | W | 41-47 | [16] | 41-47 | 60+ | F10-F11 | GM,DM,FM,DB | [37] | 44 | L99 |
| | | 5.0L V8 TBI | 1990 | 1993 | E | 41-47 | [16] | N/A | 15+ | F10-F11 | GM,DM | [40] | 47 | L03 |
| | | 5.7L V8 TBI | 1990 | 1993 | 7 | 41-47 | [16] | N/A | 15+ | F12-F13 | GM,DM | [40] | 47 | L05 |
| | | 5.7L V8 TBI | 1994 | 1996 | P | 41-47 | [16] | 41-47 | 60+ | F1 | GM,DM,FM,DB | [37] | 44 | LT1 |
| Chev/GEO | Cavalier | 2.0L L4 TBI | 1987 | 1989 | 1 | 9-13[*] | [16] | N/A | 15+ | F8-F9 or F10-F11 | | [40] | 42 | LL8 |
| | | 2.0L L4 TBI | 1983 | 1983 | P | 9-13[*] | 9-13 | N/A | 15+ | F10-F11 | GM,DM | [40] | 45 | LQ5 |
| | | 2.0L L4 TBI | 1984 | 1984 | P | 9-13[*] | 9-13 | N/A | 15+ | F10-F11 | GM,DM | [40] | 45 | LQ5 |
| | | 2.0L L4 TBI | 1985 | 1985 | P | 9-13[*] | 9-13 | N/A | 15+ | F10-F11 | GM,DM | [40] | 45 | LQ5 |
| | | 2.2L L4 MFI | 1990 | 1991 | G | 41-47 | [16] | 41-47 | 60+ | F10-F11 | GM,DM | [40] | 42 | LM3 |
| | | 2.2L L4 SFI | 1992 | 1995 | 4 | 41-47 | [16] | 41-47 | 60+ | F12-F13 | GM,DM | [40] | 42 | LN2 |
| | | 2.3L L4 DOHC MFI | 1988 | 1995 | D | 41-47 | [16] | 41-47 | 60+ | F1 | GM,DM,FM,DB | [37] | 34 | LM3 |
| | | 2.4L SFI | 1996 | 1996 | T | 41-47 | [16] | 41-47 | 60+ | F1 | GM,DM,FM,DB | [37] | 34 | LD9 |
| | | 2.8L V8 MFI | 1985 | 1989 | W | 41-47 | [16] | 41-47 | 60+ | F1 | GM,DM,FM,DB | [37] | 42 | LB6 |
| | | 3.1L V6 MFI | 1990 | 1994 | T | 41-47 | [16] | 41-47 | 60+ | F12-F13 | GM,DM | [40] | 42 | LH0 |
| Chev/GEO | Celebrity | 2.5L L4 TBI | 1982 | 1986 | R | 9-13[*] | 9-13 | N/A | 15+ | F8-F9 or F10-F11 | GM,DM | [40] | 30 | LR8 |
| | | 2.5L L4 TBI | 1987 | 1989 | R | 41-47 | [16] | N/A | 15+ | F1 | GM,DM | [40] | 30 | LR8 |
| | | 2.8L V6 MFI | 1990 | 1990 | R | 41-47 | [16] | N/A | 60+ | F10-F11 | GM,DM | [40] | 30 | LR8 |
| | | 2.8L V6 MFI | 1985 | 1986 | W | 41-47 | [16] | 41-47 | 60+ | F12-F13 | GM,DM | [40] | 30 | LB6 |
| | | 2.8L V6 MFI | 1987 | 1989 | W | 41-47 | [16] | 41-47 | 60+ | F1 | GM,DM | [40] | 30 | LB6 |
| | | 2.8L V6 MFI | 1990 | 1990 | W | 41-47 | [16] | 41-47 | 60+ | F1 | GM,DM,FM,DB | [37] | 42 | LB6 |
| Chev/GEO | Citation | 2.5L L4 TBI | 1982 | 1985 | R | 9-13[*] | 9-13 | N/A | 15+ | F1 | GM,DM | [40] | 30 | LR8 |
| | | 2.8L V6 MFI | 1985 | 1985 | W | 41-47 | [16] | 41-47 | 60+ | F1 | GM,DM,FM,DB | [37] | 30 | LB6 |
| Chev/GEO | Corsica | 2.0L L4 TBI | 1987 | 1989 | 1 | 9-13[*] | [16] | N/A | 15+ | F10-F11 | GM,DM | [40] | 42 | LL8 |
| | | 2.2L L4 MFI | 1990 | 1991 | G | 41-47 | [16] | 41-47 | 60+ | F12-F13 | GM,DM | [40] | 42 | LM3 |
| | | 2.2L L4 SFI | 1992 | 1996 | 4 | 41-47 | [16] | 41-47 | 60+ | F1 | GM,DM | [40] | 42 | LN2 |
| | | 2.8L V6 MFI | 1988 | 1989 | A | 41-47 | [16] | 41-47 | 60+ | F1 | GM,DM,FM,DB | [37] | 42 | LB6 |
| | | 2.3L L4 DOHC MFI HO | 1992 | 1994 | A | 41-47 | [16] | 41-47 | 60+ | F12-F13 | GM,DM | [40] | 42 | LG0 |
| | | 2.3L L4 DOHC MFI HO | 1990 | 1991 | A | 41-47 | [16] | 41-47 | 60+ | F1 | GM,DM | [40] | 42 | LG0 |
| | | 2.8L V6 MFI HO | 1987 | 1989 | W | 41-47 | [16] | 41-47 | 60+ | F1 | GM,DM,FM,DB | [37] | 42 | LB6 |

* Note: Heading definitions for columns are found on page xii    Footnote references are found on pages 40-44 *

PAGE 6

Standard Domestic & Foreign Fuel Rail Systems

| MAKE | MODEL | ENGINE | FROM YEAR | TO YEAR | VIN | KOEO | NORMAL IDLE | IDLE W/O VACUUM | DEADHEAD PRESSURE | ADAPTER FITTING | ADAPTER KIT | FITTING LOCATION | MANUAL PUMP ENERGIZE | RPO |
|---|---|---|---|---|---|---|---|---|---|---|---|---|---|
| Chev/GEO | Corvette (cont.) | 3.1L V6 MFI | 1990 | 1993 | T | 41-47 | [16] | 41-47 | 60+ | F1 | GM,DM,FM,DB | [137] | [42] | LH0 |
| | | 3.1L V6 SFI | 1994 | 1996 | M | 41-47 | [16] | 41-47 | 60+ | F1 | GM,DM,FM,DB | [137] | [42] | L82 |
| | | 5.7L V8 TBI | 1982 | 1984 | 8 | 9-13[] | 9-13 | N/A | 15+ | F8-F9 | GM,DM | [140] | [40] | L83 |
| | | 5.7L V8 MFI | 1985 | 1989 | 8 | 41-47 | [16] | 41-47 | 60+ | F1 | GM,DM,FM,DB | [137] | [40] | L98 |
| | | 5.7L V8 MFI | 1990 | 1991 | J | 41-47 | [16] | 41-47 | 60+ | F1 | GM,DM,FM,DB | [137] | [32] | L98 |
| | | 5.7L V8 SFI | 1990 | 1995 | P | 48-55 | [16] | 48-55 | 60+ | F1 | GM,DM,FM,DB | [137] | [34] | LT5 |
| | | 5.7L V8 MFI | 1992 | 1993 | P | 41-47 | [16] | 41-47 | 60+ | F1 | GM,DM,FM,DB | [137] | [34] | LT1 |
| | | 5.7L V8 SFI | 1994 | 1996 | P | 41-47 | [16] | 41-47 | 60+ | F1 | GM,DM,FM,DB | [137] | [34] | LT1 |
| | | 5.7L V8 SFI | 1996 | 1996 | 5 | 41-47 | 3-10 | 41-47 | 60+ | F1 | GM,DM,FM,DB | [137] | [34] | LT4 |
| Chev/GEO | Impala | | | | | | | | | | | | | |
| | | 4.3L V6 TBI | 1985 | 1985 | Z | 9-13[] | 9-13 | N/A | 15+ | F10-F11 | GM,DM | [140] | [47] | LB4 |
| | | 4.3L V8 SFI | 1986 | 1986 | W | 41-47 | [16] | 41-47 | 60+ | F1 | GM,DM | [137] | [44] | L99 |
| | | 5.7L V8 SFI | 1986 | 1986 | P | 41-47 | [16] | 41-47 | 60+ | F1 | GM,DM,FM,DB | [137] | [44] | LT1 |
| Chev/GEO | Lumina | | | | | | | | | | | | | |
| | | 2.2L L4 MFI | 1993 | 1993 | 4 | 41-47 | [16] | 41-47 | 60+ | F12-F13 | GM,DM | [140] | [37] | LN2 |
| | | 2.5L L4 TBI | 1990 | 1992 | R | 26-32[] | 26-32 | N/A | 32+ | F10-F11 | GM,DM | [140] | [37] | LR6 |
| | | 3.1L V6 SFI | 1994 | 1995 | M | 41-47 | [16] | 41-47 | 60+ | F1 | GM,DM,FM,DB | [137] | [37] | L82 |
| | | 3.1L V6 SFI | 1996 | 1996 | M | 41-47 | [16] | 41-47 | 60+ | F1 | GM,DM,FM,DB | [137] | [37] | L82 |
| | | 3.4L V6 OHC MFI | 1991 | 1993 | X | 41-47 | [16] | 41-47 | 60+ | F1 | GM,DM,FM,DB | [137] | [37] | LQ1 |
| | | 3.1L V6 MFI | 1994 | 1994 | X | 41-47 | [16] | 41-47 | 60+ | F1 | GM,DM,FM,DB | [137] | [37] | LQ1 |
| | | 3.1L V6 SFI Calif. | 1993 | 1993 | T | 41-47 | [16] | 41-47 | 60+ | F1 | GM,DM,FM,DB | [137] | [37] | LH0 |
| | | 3.4L V6 OHC SFI | 1996 | 1996 | X | 41-47 | [16] | 41-47 | 60+ | F1 | GM,DM,FM,DB | [137] | [34] | LQ1 |
| Chev/GEO | Metro LSi | | | | | | | | | | | | | |
| | | 1.0L L3 TBI | 1989 | 1989 | 6 | 23-31 | 15-20 | 23-31 | 52+ | F3 | ALL | [140] | [34] | LP2 |
| | | 1.0L L3 MFI | 1989 | 1990 | B | 35-43 | 25-33 | 35-43 | N/A | F3 | ALL | [140] | [34] | LS3 |
| | | 1.3L L4 TBI | 1992 | 1996 | 8 | 23-31 | 13-20 | 23-31 | N/A | F3 | ALL | [140] | [34] | L72 |
| Chev/GEO | Monte Carlo | | | | | | | | | | | | | |
| | | 4.3L V6 TBI | 1985 | 1985 | Z | 9-13[] | 9-13 | N/A | 15+ | F10-F11 | GM,DM | [140] | [47] | LB4 |
| | | 3.1L V6 SFI | 1995 | 1995 | M | 41-47 | [16] | 41-47 | 60+ | F1 | GM,DM,FM,DB | [137] | [37] | L82 |
| | | 1.8L L4 MFI | 1986 | 1992 | M | 41-47 | [16] | 41-47 | 60+ | F1 | GM,DM,FM,DB | [137] | [37] | L82 |
| | | 3.4L V6 OHC SFI | 1996 | 1996 | X | 41-47 | [16] | 41-47 | 60+ | F1 | GM,DM,FM,DB | [137] | [37] | LQ1 |
| | | 3.4L V6 OHC SFI | 1996 | 1996 | X | 41-47 | [16] | 41-47 | 60+ | F1 | GM,DM,FM,DB | [137] | [34] | LQ1 |
| Chev/GEO | Nova | | | | | | | | | | | | | |
| | | 1.6L L4 MFI | 1988 | 1988 | 5 | 38-44 | 30-33 | 38-44 | N/A | F17 | GM,FM | [137] | [157] | LC0 |
| Chev/GEO | Prizm | | | | | | | | | | | | | |
| | | 1.5L L4 MFI Turbo | 1989 | 1995 | 6 | 38-44 | 30-35 | 38-44 | 55+ | F17 | GM,FM | [140] | [48] | LB4 |
| | | 1.6L L4 MFI | 1989 | 1992 | 5 | 38-44 | 30-35 | 38-44 | N/A | F17 | GM,FM | [137] | [48] | L82 |
| | | 1.8L L4 MFI | 1993 | 1994 | 8 | 41-44 | 41-44 | 41-44 | N/A | F17 | GM,FM | [137] | [48] | LW0 |
| | | 1.8L L4 SFI | 1995 | 1995 | 8 | 38-44 | 30-35 | 38-44 | N/A | F17 | GM,FM | [137] | [48] | LV6 |
| | | 1.8L L4 SFI | 1995 | 1995 | 8 | 38-44 | 30-35 | 38-44 | N/A | F17 | GM,FM | [137] | [48] | L01 |
| | | 1.8L L4 SFI | 1995 | 1995 | 8 | 38-45 | 28.4 | 38-45 | N/A | F17 | GM,FM | [137] | [48] | LV6 |
| Chev/GEO | Spectrum Coupe | | | | | | | | | | | | | |
| | | 1.5L L4 MFI Turbo | 1988 | 1988 | 9 | 35.5 | 28.4 | 35.5 | N/A | F17 | GM,FM | [140] | [34] | LC0 |
| Chev/GEO | Sprint | | | | | | | | | | | | | |
| | | 1.0L L3 TBI | 1986 | 1992 | 6 | 23-31 | 15-20 | 23-31 | 55+ | F3 | ALL | [140] | [34] | LP2 |
| | | 1.0L L3 MFI Turbo Suzuki | 1987 | 1992 | 9 | 35-43 | 25-33 | 35-43 | N/A | F3 | ALL | [140] | [34] | L72 |
| | | 1.0 L3 MFI | 1987 | 1990 | 2 | 28.4 | 28.4 | N/A | N/A | F3 | ALL | [140] | [34] | LS3 |
| Chev/GEO | Storm | | | | | | | | | | | | | |
| | | 1.6L L4 MFI | 1990 | 1991 | 5 | 38-44 | 30-35 | 38-44 | N/A | F14-F15 | GM,DM,FM | [140] | [34] | LW0 |
| | | 1.8L L4 MFI | 1990 | 1993 | 6 | 38-44 | 30-35 | 38-44 | 55+ | F14-F15 | GM,DM,FM | [140] | [34] | L01 |
| | | 1.8L L4 MFI | 1992 | 1993 | 8 | 41-47 | 41-44 | 41-47 | N/A | F14-F15 | GM,DM,FM | [140] | [34] | LV6 |

* Note : Heading definitions for columns are found on page xii     Footnote references are found on pages 40-44 *

PAGE 7

Standard Domestic & Foreign Fuel Rail Systems

| MAKE | MODEL | ENGINE | FROM YEAR | TO YEAR | VIN | KOEO | NORMAL IDLE | IDLE W/O VACUUM | DEADHEAD PRESSURE | ADAPTER FITTING | ADAPTER KIT | FITTING LOCATION | MANUAL PUMP ENERGIZE | RPO |
|---|---|---|---|---|---|---|---|---|---|---|---|---|---|---|
| Chevrolet Truck | | | | | | | | | | | | | | |
| Chev Trk. | Astro, M.L. Mini Van | 2.5L L4 TBI | 1986 | 1991 | E | 9-13[*] | 9-13 | N/A | 15+ | F10-F11 | GM,DM | [140] | [27] | LN8 |
| | | 4.3L V6 TBI | 1987 | 1994 | N | 9-13[*] | 9-13 | N/A | 15+ | F10-F11 | GM,DM | [140] | [28] | LB4 |
| | | 4.3L V6 TBI | 1990 | 1991 | B | 9-13[*] | 9-13 | N/A | 15+ | F10-F11 | GM,DM | [140] | [28] | LU2 |
| | | 4.3L V6 CPI | 1992 | 1995 | W | 60-66 | [16] | N/A | 75 [159] | F1 | GM,DM,FM,DB | [137] | [28] | L35 |
| | | 4.3L V6 SCPI | 1996 | 1996 | W | 60-66 | [16] | N/A | 75 [159] | F1 | GM,DM,FM,DB | [137] | [28] | L35 |
| Chev Trk. | C/K Pickup Truck (88-96), Suburban and Tahoe (92-96) | | | | | | | | | | | | | |
| | | 4.3L V6 TBI | 1988 | 1995 | Z | 9-13[*] | 9-13 | N/A | 15+ | F10-F11 | GM,DM | [140] | [40] | LB4 |
| | | 5.0L V8 TBI | 1988 | 1995 | H | 9-13[*] | 9-13 | N/A | 15+ | F10-F11 | GM,DM | [140] | [40] | L03 |
| | | 5.7L V8 TBI | 1988 | 1995 | K | 9-13[*] | 9-13 | N/A | 15+ | F10-F11 | GM,DM | [140] | [40] | L05 |
| | | 7.4L V8 TBI | 1987 | 1993 | N | 9-13[*] | 9-13 | N/A | 15+ | F10-F11 | GM,DM | [140] | [40] | L19 |
| | | 7.4L V8 SFI | 1994 | 1995 | N | 26-32[*] | 26-32 | N/A | 32+ | F1 | GM,DM | [140] | [40] | L19 |
| | | 7.4L V8 SFI | 1996 | 1996 | J | 60-66 | [16] | 60-66 | 75 [159] | F1 | GM,DM,FM,DB | [137] | [27] | L29 |
| Chev Trk. | El Camino | 4.3L TBI | 1987 | 1987 | Z | 9-13[*] | 9-13 | N/A | 15+ | F10-F11 | GM,DM | [140] | [47] | LB4 |
| Chev Trk. | Geo Tracker | | | | | | | | | | | | | |
| | | 1.6L L4 TBI | 1988 | 1995 | U | 35-41 | 34-41 | 35-41 | 58+ | F16 | GM,DM,FM,FB | [140] | [34] | LS5 |
| | | 1.6L L4 TBI | 1988 | 1995 | U | 36-43 | 30-37 | 36-43 | 58+ | F31 | GM,FM | [137] | [34] | L01 |
| | | 1.6L L4 SFI | 1995 | 1996 | 6 | 30-43 | 30-37 | 36-43 | 57+ | F31 | GM,DM,FM,DB | [137] | [34] | L01 |
| | | 4.3L V6 SCPI | 1996 | 1996 | W | 60-66 | [16] | 60-66 | 75 [159] | F1 | GM,DM,FM,DB | [137] | [35] | L35 |
| | | 5.0L V8 SCPI | 1996 | 1996 | M | 60-66 | [16] | 60-66 | 75 [159] | F1 | GM,DM,FM,DB | [137] | [30] | L30 |
| | | 5.7L V8 SCPI | 1996 | 1996 | R | 60-66 | [16] | 60-66 | 75 [159] | F1 | GM,DM,FM,DB | [137] | [27] | L31 |
| Chev Trk. | G Van, Sportvan | | | | | | | | | | | | | |
| | | 4.3L V6 TBI | 1987 | 1995 | Z | 9-13[*] | 9-13 | N/A | 15+ | F10-F11 | GM,DM | [140] | [44] | LB4 |
| | | 4.3L V6 SCPI | 1996 | 1996 | W | 60-66 | [16] | 60-66 | 75 [159] | F1 | GM,DM,FM,DB | [137] | [36] | L35 |
| | | 5.0L V8 TBI | 1987 | 1995 | H | 9-13[*] | 9-13 | N/A | 15+ | F10-F11 | GM,DM | [140] | [44] | L03 |
| | | 5.0L V8 SCPI | 1996 | 1996 | M | 60-66 | [16] | 60-66 | 75 [159] | F1 | GM,DM,FM,DB | [137] | [44] | L30 |
| | | 5.7L V8 TBI | 1987 | 1995 | K | 9-13[*] | 9-13 | N/A | 15+ | F10-F11 | GM,DM | [140] | [44] | L05 |
| | | 5.7L V8 SCPI | 1996 | 1996 | R | 60-66 | [16] | 60-66 | 75 [159] | F1 | GM,DM,FM,DB | [137] | [44] | L31 |
| | | 7.4L V8 TBI | 1987 | 1993 | N | 9-13[*] | 9-13 | N/A | 15+ | F10-F11 | GM,DM | [140] | [44] | L19 |
| | | 7.4L V8 SFI | 1994 | 1995 | N | 26-32[*] | 26-32 | N/A | 32+ | F1 | GM,DM | [140] | [44] | L19 |
| | | 7.4L V8 SFI | 1996 | 1996 | J | 60-66 | [16] | 60-66 | 75 [159] | F1 | GM,DM,FM,DB | [137] | [35] | L29 |
| Chev Trk. | Lumina Van | 3.1L V6 TBI | 1990 | 1993 | D | 9-13[*] | 9-13 | N/A | 15+ | F12-F13 | GM,DM | [140] | [43] | LG6 |
| | | 3.1L V6 TBI | 1994 | 1995 | D | 9-13[*] | 9-13 | N/A | 15+ | F12-F13 | GM,DM | [140] | [45] | LG8 |
| | | 3.4L V6 SFI | 1996 | 1996 | E | [16] | [16] | 41-47 | 80+ | F1 | GM,DM,FM,DB | [137] | [44] | LA1 |
| Chev Trk. | P Truck | 3.8L V6 SFI | 1992 | 1995 | L | 41-47 | [16] | 41-47 | 60+ | F1 | GM,DM,FM,DB | [137] | [50] | L27 |
| | | 4.3L V6 TBI | 1991 | 1996 | Z | 9-13[*] | 9-13 | N/A | 15+ | F10-F11 | GM,DM | [140] | [27] | LB4 |
| | | 5.7L V6 TBI | 1987 | 1995 | K | 9-13[*] | 9-13 | N/A | 15+ | F10-F11 | GM,DM | [140] | [27] | L05 |
| | | 5.7L V8 SCPI | 1996 | 1996 | R | 60-66 | [16] | 60-66 | 75 [159] | F1 | GM,DM,FM,DB | [137] | [N/A] | L31 |
| | | 7.4L V6 TBI | 1987 | 1993 | N | 9-13[*] | 9-13 | N/A | 15+ | F10-F11 | GM,DM | [140] | [27] | L19 |
| | | 7.4L V8 SFI | 1994 | 1995 | N | 26-32[*] | 26-32 | N/A | 32+ | F1 | GM,DM | [140] | [27] | L19 |
| | | 7.4L V8 SFI | 1996 | 1996 | J | 60-66 | [16] | 60-66 | 75 [159] | F1 | GM,DM,FM,DB | [137] | [N/A] | L29 |
| Chev Trk. | R/V Pickup Truck (87-88), Suburban and Blazer (87-91) | | | | | | | | | | | | | |
| | | 4.3L V6 TBI | 1987 | 1987 | Z | 9-13[*] | 9-13 | N/A | 15+ | F10-F11 | GM,DM | [140] | [44] | LB4 |
| | | 5.0L V8 TBI | 1987 | 1987 | H | 9-13[*] | 9-13 | N/A | 15+ | F10-F11 | GM,DM | [140] | [36] | L03 |
| | | 5.7L V8 TBI | 1987 | 1987 | K | 9-13[*] | 9-13 | N/A | 15+ | F10-F11 | GM,DM | [140] | [44] | L05 |
| | | 7.4L V8 TBI | 1987 | 1991 | N | 9-13[*] | 9-13 | N/A | 15+ | F10-F11 | GM,DM | [140] | [44] | L19 |
| Chev Trk. | S-10 Pickup, Blazer | 2.2L L4 MFI | 1994 | 1995 | 4 | 41-47 | [16] | 41-47 | 60+ | F1 | GM,DM,FM,DB | [137] | [38] | LN2 |
| | | 2.2L L4 SFI | 1996 | 1996 | 4 | 41-47 | [16] | 41-47 | 60+ | F12-F13 | GM,DM,FM,DB | [140] | [28] | LN2 |

*** Note: Heading definitions for columns are found on page xii

Footnote references are found on pages 40-44 ***

PAGE 8

Standard Domestic & Foreign Fuel Rail Systems

| MAKE | MODEL | ENGINE | FROM YEAR | TO YEAR | VIN | KOEO | NORMAL IDLE | IDLE W/O VACUUM | DEADHEAD PRESSURE | ADAPTER FITTING | ADAPTER KIT | FITTING LOCATION | MANUAL PUMP ENERGIZE | RPO |
|---|---|---|---|---|---|---|---|---|---|---|---|---|---|
| Chevrolet Truck (cont.) | | 2.5L L4 TBI | 1985 | 1985 | E | 9-13[*] | 9-13 | N/A | 15+ | F10-F11 | GM,DM | [140] | [40] | LN8 |
| | | 2.5L L4 TBI | 1986 | 1991 | E | 9-13[*] | 9-13 | N/A | 15+ | F10-F11 | GM,DM | [140] | [44] | LN8 |
| | | 2.5L L4 TBI | 1991 | 1993 | A | 9-13[*] | 9-13 | N/A | 15+ | F10-F11 | GM,DM | [140] | [44] | [38] |
| | | 2.8L V6 TBI | 1986 | 1989 | R | 9-13[*] | 9-13 | N/A | 15+ | F10-F11 | GM,DM | [140] | [27] | L2 |
| | | 4.3L V6 TBI | 1988 | 1993 | N | 9-13[*] | 9-13 | N/A | 15+ | F10-F11 | GM,DM | [140] | [44] | LB4 |
| | | 4.3L V6 TBI | 1990 | 1993 | Z | 9-13[*] | 9-13 | N/A | 15+ | F10-F11 | GM,DM | [140] | [44] | LB4 |
| | | 4.3L V6 TBI | 1994 | 1995 | Z | 9-13[*] | 9-13 | N/A | 15+ | F10-F11 | GM,DM | [140] | [39] | LB4 |
| | | 4.3L V6 CPI | 1992 | 1995 | W | 60-68 | [16] | 60-66 | 75 [159] | F1 | GM,DM,FM,DB | [137] | [27] | L35 |
| | | 2.5L V6 MPI | 1995 | 1996 | H | 49 | 49 | N/A | [1] | F29-F30 | GM,DM | [137] | [3] | |
| Chrysler | | | | | | | | | | | | | | |
| Chrysler | Cirrus | 2.0L/2.4L MPI | 1995 | 1996 | C,X | 48 | 48 | N/A | [1] | F3 | GM,DM,FM,DB | [137] | [3] | |
| | | 3.0L MPI | 1988 | 1993 | 3 | 48 | 48 | N/A | 95 | F3 | GM,DM | [138] | [2] | |
| | | 3.3L/3.8L MPI | 1990 | 1993 | R,L | 48 | 48 | N/A | 95 | F1 | GM,DM,FM,DB | [137] | [2] | |
| Chrysler | Concord | 3.3L MPI | 1993 | 1996 | T | 48 | 48 | 48 | 95 | F1 | GM,DM,FM,DB | [137] | [3] | |
| | | 3.5L MPI | 1993 | 1996 | F | 48 | 48 | 48 | 95 | F1 | GM,DM,FM,DB | [137] | [3] | |
| Chrysler | Conquest | 2.6L TBI Turbo | 1984 | 1989 | H,N | N/A | 36 | N/A | 70 | F16 | GM,FM,FB | [138] | [4] | |
| Chrysler | Fifth Ave / Imperial | 4.3L V6 SCPI | 1988 | 1993 | W | 60-68 | [16] | 60-66 | 75 [159] | F1 | GM,DM,FM,DB | [137] | [29] | |
| Chrysler | Imperial RWD | 5.2L TBI | 1981 | 1983 | N | N/A | 11-13 | N/A | N/A | F3 | ALL | [138] | [10] | |
| Chrysler | Laser | 2.2L TBI | 1984 | 1985 | D | N/A | 36 | N/A | 75 | F3 | ALL | [138] | [2] | |
| | | 2.2L/2.5L TBI | 1986 | 1986 | D,K | N/A | 14.5 | N/A | 45 | F3 | ALL | [138] | [2] | |
| | | 2.2L MPI Turbo I, II | 1984 | 1986 | A,E,I | 55 | 50 | 55 | 95 | F1 | GM,DM,FM,DB | [137] | [2] | |
| Chrysler | Lebaron GTS | 2.2L TBI | 1984 | 1985 | D | N/A | 36 | N/A | 75 | F3 | ALL | [138] | [2] | |
| | | 2.2L/2.5L TBI | 1986 | 1988 | D,K | N/A | 14.5 | N/A | 45 | F3 | GM,DM | [138] | [2] | |
| | | 2.2/2.5L MPI Turbo I, II | 1984 | 1988 | A,E,J | 55 | 50 | 55 | 95 | F1 | GM,DM,FM,DB | [137] | [2] | |
| Chrysler | Lebaron & Convertible | 2.2/2.5L TBI | 1987 | 1990 | D | N/A | 14.5 | N/A | 45 | F3 | ALL | [138] | [2] | |
| | | 2.2/2.5L TBI | 1991 | 1991 | D,K | N/A | 38 | N/A | 75 | F3 | GM,DM | [138] | [2] | |
| | | 2.2/2.5L TBI | 1992 | 1995 | D,K | N/A | 38 | N/A | 75 | F26-F30 | GM,DM | [138] | [3] | |
| | | 2.2/2.5L MPI Turbo I, II, III | 1987 | 1991 | A,E,J,R | 55 | 50 | 55 | 95 | F29-F30 | ALL | [137] | [2] | |
| | | 3.0L MPI | 1990 | 1995 | 3 | 48 | 40 | 48 | 95 | F3 | GM,DM,FM,DB | [136] | [2] | |
| Chrysler | Lebaron Landau 4dr | 3.0L MPI | 1990 | 1995 | 3 | 48 | 40 | 48 | 95 | F3 | ALL | [138] | [2] | |
| Chrysler | Lebaron / T&C | 2.2L TBI | 1984 | 1985 | D | N/A | 36 | N/A | 75 | F3 | ALL | [138] | [2] | |
| | | 2.2/2.5L TBI | 1986 | 1988 | D,K | N/A | 14.5 | N/A | 45 | F3 | GM,DM | [138] | [2] | |
| | | 2.2/2.5L MPI Turbo I | 1984 | 1988 | E,J | 55 | 50 | 55 | 95 | F1 | GM,DM,FM,DB | [137] | [2] | |
| Chrysler | LHS / New Yorker | 3.5L MPI | 1994 | 1996 | F | 48 | 48 | 48 | 95 | F1 | ALL | [137] | [3] | |
| Chrysler | New Yorker C Body | 3.0L MPI | 1988 | 1993 | 3 | 48 | 40 | 48 | 95 | F3 | GM,DM | [138] | [2] | |
| | | 3.3L MPI | 1990 | 1993 | R | 48 | 40 | 48 | 95 | F1 | GM,DM | [137] | [2] | |
| Chrysler | New Yorker / E Class | 2.2/2.5L TBI | 1985 | 1988 | D,K | N/A | 14.5 | N/A | 45 | F3 | ALL | [138] | [2] | |
| | | 2.2/2.5L MPI Turbo I | 1984 | 1989 | E,J | 55 | 50 | 55 | 95 | F1 | GM,DM,FM,DB | [137] | [2] | |
| Chrysler | Sebring | 2.0L/2.4L MPI | 1995 | 1996 | C,X | 49 | 49 | N/A | [1] | F1 | GM,DM,FM,DB | [137] | [3] | |

** Note : Heading definitions for columns are found on page xii    Footnote references are found on pages 40-44 **

Standard Domestic & Foreign Fuel Rail Systems

| MAKE | MODEL | ENGINE | FROM YEAR | TO YEAR | VIN | KOEO | NORMAL IDLE | IDLE W/O VACUUM | DEADHEAD PRESSURE | ADAPTER FITTING | ADAPTER KIT | FITTING LOCATION | MANUAL PUMP ENERGIZE | INFO |
|---|---|---|---|---|---|---|---|---|---|---|---|---|---|---|
| Chrysler | TC Maserati (cont.) | 2.5L V6 MPI | 1995 | 1996 | H | 49 | 49 | N/A | [1] | F26 | GM,DM,FM | [137] | [3] | |
| | | 2.2L MPI Turbo II | 1989 | 1991 | R | 55 | 50 | 55 | 95 | F1 | GM,DM,FM,DB | [138] | [2] | |
| | | 3.0L MPI | 1990 | 1996 | 3 | 48 | 40 | 48 | 95 | F3 | ALL | [137] | [2] | |
| | | 3.3/3.8L MPI | 1990 | 1990 | R,L | 48 | 40 | 48 | 95 | F1 | GM,DM,FM,DB | [137] | [2] | |
| | | 3.3/3.8L MPI | 1991 | 1991 | R,L | 48 | 40 | 48 | 95 | F1 | GM,DM,FM,DB | [137] | [5] | |
| | | 3.3/3.8L MPI | 1992 | 1996 | R,L | 48 | 40 | 48 | 95 | F1 | GM,DM,FM,DB | [137] | [3] | |
| Daihatsu | Charade | | | | | | | | | | | | | |
| Daihatsu | Charade | 2.2L MPI Turbo III | 1989 | 1991 | R | 55 | 50 | 55 | 95 | F1 | GM,DM,FM,DB | [137] | [2] | |
| | | 3.0L MPI | 1989 | 1991 | S | 48 | 40 | 48 | 95 | F3 | ALL | [138] | [2] | |
| Daihatsu | T&C / Mini Van | | | | | | | | | | | | | |
| | | 1.0L CB-90 EFI | 1988 | 1989 | — | N/A | 21.3-28.4 | 33-40 | N/A | F1 | ALL | [138] | [17] | |
| | | 1.0L CB-90 EFI | 1990 | 1992 | — | N/A | [18] | 33-40 | N/A | F3 | ALL | [138] | [17] | |
| | | 1.3L HC-E EFI | 1989 | 1992 | — | N/A | [18] | 37-45.5 | N/A | F10 | GM,DM,FM,DB | [138] | [17] | |
| Daihatsu | Rocky | 1.6L HD-E EFI | 1990 | 1992 | — | N/A | [16] | 33-40 | N/A | F10 | GM,DM,FM,DB | [137] | [17] | |
| Dodge | 400 | | | | | | | | | | | | | |
| Dodge | 600 | 2.2L TBI | 1984 | 1985 | D | N/A | 36 | N/A | 75 | F3 | | [138] | [2] | |
| Dodge | Aries | 2.2L TBI | 1984 | 1985 | D | N/A | 36 | N/A | 75 | F3 | | [138] | [2] | |
| | | 2.2/2.5L TBI | 1986 | 1989 | D,K | N/A | 14.5 | N/A | 45 | F3 | | [138] | [2] | |
| | | 2.2/2.5L MPI Turbo T | 1984 | 1989 | E,J | N/A | 50 | 55 | 95 | F1 | | [137] | [2] | |
| Dodge | Avenger | 2.2L TBI | 1984 | 1985 | D | N/A | 36 | N/A | 75 | F3 | | [138] | [2] | |
| | | 2.2/2.5L TBI | 1986 | 1989 | D,K | N/A | 14.5 | N/A | 45 | F3 | | [138] | [2] | |
| Dodge | Colt | 2.0/2.4L MPI | 1995 | 1996 | C,X | 49 | 49 | 49 | [1] | F1 | GM,FM,FB | [137] | [3] | |
| | | 2.5L V6 MPI | 1995 | 1996 | H | 49 | 49 | 49 | [1] | F26 | GM,DM,FM | [137] | [3] | |
| Dodge | Colt Wagon | 1.5L MPI | 1989 | 1989 | A,X | 48 | 48 | 48 | 95 | F16 | GM,FM,FB | [137] | [8] | |
| | | 1.6L TBI Turbo | 1984 | 1988 | F | N/A | 40 | 48 | 75 | F3 | GM,FM,FB | [138] | [8] | |
| | | 1.8L MPI DOHC | 1988 | 1990 | Y | N/A | 33 | 36 | 45 | F3 | GM,FM,FB | [138] | [8] | |
| | | 1.8L MPI DOHC Turbo | 1988 | 1989 | N | N/A | 40 | 48 | 75 | F18 | GM,FM,FB | [138] | [8] | |
| | | 1.8L MPI | 1989 | 1990 | C | 48 | 40 | 48 | 95 | F18 | GM,FM,FB | [138] | [8] | |
| Dodge | Daytona | 1.5L MPI | 1989 | 1989 | A,X | 48 | 40 | 48 | 95 | F18 | GM,FM,FB | [137] | [8] | |
| Dodge | Dynasty | 2.2L TBI | 1984 | 1985 | D | N/A | 36 | N/A | 75 | F3 | | [138] | [2] | |
| | | 2.2/2.5L TBI | 1986 | 1990 | D,K | N/A | 14.5 | N/A | 75 | F3 | ALL | [138] | [2] | |
| | | 2.2/2.5L TBI | 1991 | 1991 | D,K | N/A | 39 | N/A | 45 | F26-F30 | GM,DM | [138] | [2] | |
| | | 2.2/2.5L Turbo I,II,III | 1984 | 1993 | A,C,E,R,J | 48 | 40 | 48 | 75 | F26-F30 | ALL | [137] | [2] | |
| | | 3.0L MPI | 1989 | 1996 | 3 | 48 | 40 | 48 | 95 | F1 | GM,DM | [138] | [3] | |
| Dodge | Dynasty | 2.2/2.5L TBI | 1988 | 1990 | D,K | N/A | 14.5 | N/A | 45 | F3 | ALL | [138] | [2] | |
| | | 3.0L MPI | 1991 | 1993 | 3 | N/A | 39 | N/A | 75 | F20-F30 | GM,DM | [138] | [2] | |
| | | 3.3L MPI | 1990 | 1993 | R | 48 | 40 | 48 | 95 | F1 | ALL | [137] | [2] | |
| Dodge | Intrepid | 2.2/2.5L TBI | 1995 | 1996 | D,K | N/A | 14.5 | N/A | 45 | F3 | | [138] | [2] | |

*** Note: Heading definitions for columns are found on page xii  
Footnote references are found on pages 40-44 ***

PAGE 19

Standard Domestic & Foreign Fuel Rail Systems

| MAKE | MODEL | ENGINE | FROM YEAR | TO YEAR | VIN | KOEO | NORMAL IDLE | IDLE W/O VACUUM | DEADHEAD PRESSURE | ADAPTER FITTING | ADAPTER KIT | FITTING LOCATION | MANUAL PUMP ENERGIZE | RPO |
|---|---|---|---|---|---|---|---|---|---|---|---|---|---|---|
| Dodge | (cont.) | 2.2L/2.5L MPI Turbo I,II | 1984 | 1989 | A,E,J | 55 | 50 | 55 | 95 | F1 | GM,DM,FM,DB | [137] | [2] | |
| Dodge | Monaco | 3.0L MPI | 1990 | 1990 | U | 39 | 39 | 39 | 95 | F12-F13 | GM,DM | [137] | [3] | |
| | | 3.0L MPI | 1991 | 1992 | U | 48 | 43 | 48 | 95 | F12-F13 | GM,DM | [137] | [3] | |
| Dodge | Neon | 3.3L MPI | 1993 | 1996 | T | 48 | 40 | 48 | 95 | F1 | GM,DM,FM,DB | [137] | [3] | |
| | | 3.5L MPI | 1993 | 1995 | F | 48 | 40 | 48 | 95 | F1 | GM,DM,FM,DB | [137] | [3] | |
| Dodge | Lancer | 2.2L TBI | 1984 | 1985 | D | NA | 36 | NA | 75 | F3 | ALL | [138] | [2] | |
| | | 2.0L MPI | 1985 | 1988 | C,Y | 49 | 49 | NA | [1] | F1 | GM,DM,FM,DB | [137] | [3] | |
| Dodge | Omni / Charger | | | | | | | | | | | | | |
| Dodge | Shadow | 2.2L/2.5L TBI | 1988 | 1990 | D,K | NA | 14.5 | NA | 45 | F3 | ALL | [138] | [2] | |
| | | 2.2L/2.5L MPI Turbo I | 1985 | 1988 | E,J | 55 | 50 | 55 | 95 | F1 | GM,DM,FM,DB | [137] | [2] | |
| Dodge | | 2.2L/2.5L TBI | 1987 | 1990 | D,K | NA | 14.5 | NA | 45 | F3 | ALL | [138] | [2] | |
| | | 2.2L/2.5L TBI | 1991 | 1991 | D,K | NA | 39 | NA | 75 | F3 | GM,DM | [138] | [2] | |
| | | 2.2L/2.5L TBI | 1992 | 1994 | D,K | NA | 39 | NA | 75 | F29-F30 | GM,DM | [138] | [3] | |
| | | 2.2L/2.5L MPI Turbo I,II,III | 1987 | 1990 | A,C,E,J | 55 | 50 | 55 | 95 | F1 | GM,DM,FM,DB | [137] | [2] | |
| | | 2.2L/2.5L MPI Turbo I,II,III | 1991 | 1991 | A,C,E,J | 55 | 50 | 55 | 95 | F1 | GM,DM,FM,DB | [137] | [5] | |
| | | 2.2L/2.5L MPI Turbo I,II,III | 1992 | 1992 | A,C,E,J | 55 | 50 | 55 | 95 | F1 | GM,DM,FM,DB | [137] | [3] | |
| Dodge | Spirit | 2.2L/2.5L TBI | 1988 | 1988 | D,K | NA | 14.5 | NA | 45 | F3 | ALL | [138] | [2] | |
| | | 2.2L/2.5L TBI | 1990 | 1990 | D,K | NA | 14.5 | NA | 45 | F3 | ALL | [138] | [5] | |
| | | 2.2L/2.5L TBI | 1991 | 1991 | D,K | NA | 39 | NA | 75 | F29-F30 | GM,DM | [138] | [5] | |
| | | 2.2L/2.5L TBI | 1992 | 1994 | D,K | NA | 39 | NA | 75 | F29-F30 | GM,DM | [138] | [5] | |
| | | 2.2L/2.5L MPI Turbo I,II | 1988 | 1988 | A,J | 55 | 50 | 55 | 95 | F1 | GM,DM,FM,DB | [137] | [3] | |
| | | 2.2L/2.5L MPI Turbo I,II | 1990 | 1993 | A,J | 55 | 50 | 55 | 95 | F1 | GM,DM,FM,DB | [137] | [5] | |
| | | 2.2L/2.5L MPI Turbo I,II | 1992 | 1992 | 3 | 48 | 40 | 48 | 85 | F1 | GM,DM,FM,DB | [137] | [3] | |
| | | 3.0L MPI | 1988 | 1990 | 3 | 48 | 40 | 48 | 85 | F3 | ALL | [137] | [5] | |
| | | 3.0L MPI | 1990 | 1990 | 3 | 48 | 40 | 48 | 85 | F3 | ALL | [138] | [3] | |
| | | 3.0L MPI | 1991 | 1994 | 3 | 48 | 40 | 48 | 85 | F3 | ALL | [138] | [3] | |
| Dodge | Stealth | 3.0L MPI SOHC | 1991 | 1996 | S | 48 | 40 | 48 | 95 | F18 | GM,FM,FB | [136] | [9] | |
| | | 3.0L MPI DOHC | 1992 | 1996 | B,J | 48 | 40 | 48 | 95 | F18 | GM,FM,FB | [136] | [9] | |
| | | 3.0L MPI DOHC Turbo | 1992 | 1996 | C | 48 | 40 | 48 | 95 | F18 | GM,FM,FB | [136] | [9] | |
| Dodge | Stratus | 2.0L/2.4L MPI | 1995 | 1996 | C,X | 49 | 49 | NA | [1] | F1 | GM,DM,FM,DB | [137] | [3] | |
| | | 2.5L V6 MPI | 1995 | 1996 | H | 55 | 55 | NA | [1] | F29-F30 | GM,DM | [137] | [3] | |
| Dodge | Viper | 8.0L MPI | 1994 | 1996 | E | 55 | 55 | NA | [1] | F1 | | [156] | [3] | |
| Dodge Truck | | | | | | | | | | | | | | |
| Dodge Trk Caravan | | 2.5L TBI | 1987 | 1990 | K | NA | 14.5 | NA | 45 | F3 | ALL | [138] | [2] | |
| | | 2.5L TBI | 1991 | 1991 | K | NA | 39 | NA | 75 | F29-F30 | GM,DM | [138] | [5] | |
| | | 2.5L TBI | 1992 | 1995 | K | NA | 39 | NA | 75 | F29-F30 | GM,DM | [138] | [5] | |
| | | 2.4L MPI | 1996 | 1996 | X | 48 | 48 | 48 | [1] | F1 | GM,DM | [137] | [3] | |
| | | 2.2L/2.5L MPI Turbo | 1988 | 1990 | C,X | 55 | 50 | 55 | 95 | F1 | GM,DM,FM,DB | [137] | [5] | |
| | | 3.3L/3.8L MPI | 1991 | 1991 | E,J | 48 | 40 | 48 | 95 | F1 | GM,DM,FM,DB | [137] | [3] | |
| | | 3.3L/3.8L MPI | 1992 | 1996 | R,L | 48 | 40 | 48 | 95 | F1 | GM,DM,FM,DB | [137] | [5] | |
| Dodge Trk Colt Vista | | 1.8L MPI | 1992 | 1996 | T | 48 | 40 | 48 | 85 | F18 | GM,FM,FB | [136] | [7] | |

* Note : Heading definitions for columns are found on page xii    Footnote references are found on pages 40-44 *

PAGE 11

Standard Domestic & Foreign Fuel Rail Systems

| MAKE | MODEL | ENGINE | FROM YEAR | TO YEAR | VIN | KOEO | NORMAL IDLE | IDLE W/O VACUUM | DEADHEAD PRESSURE | ADAPTER FITTING | | FITTING LOCATION | MANUAL PUMP ENERGIZE | APO |
|---|---|---|---|---|---|---|---|---|---|---|---|---|---|---|
| Dodge Truck (cont.) | | 2.0L MPI,SOHC | #### | 1991 | V,D | 48 | 40 | 48 | 95 | F18 | GM,FM,FB | [138] | [7] | |
| | | 2.4L MPI | 1992 | 1996 | G,L,W | 48 | 40 | 48 | 95 | F18 | GM,FM,FB | [138] | [7] | |
| | | 3.0L MPI | #### | 1988 | 3 | 36 | 30 | 36 | 85 | F3 | ALL | [138] | [2] | |
| | | 3.0L MPI | 1988 | 1990 | 3 | 48 | 40 | 48 | 85 | F3 | ALL | [138] | [2] | |
| | | 3.0L MPI | 1991 | 1991 | 3 | 48 | 40 | 48 | 85 | F3 | ALL | [138] | [5] | |
| | | 3.0L MPI | 1992 | 1996 | 3 | 48 | 40 | 48 | 95 | F3 | ALL | [138] | [3] | |
| | | 3.3L/3.8L MPI | 1990 | 1990 | R,L | 48 | 40 | 48 | 95 | F1 | GM,DM,FM,DB | [137] | [2] | |
| Dodge Trk.Dakota | | 2.5L TBI | 1989 | 1989 | K | N/A | 14.5 | N/A | 45 | F3 | ALL | [138] | [5] | |
| | | 2.5L TBI | 1990 | 1990 | K | N/A | 14.5 | N/A | 45 | F3 | ALL | [138] | [5] | |
| | | 2.5L TBI | 1991 | 1996 | K | N/A | 39 | N/A | 75 | F29-F30 | GM,DM | [138] | [5] | |
| | | 3.9L TBI | 1988 | 1989 | X | N/A | 14.5 | N/A | 45 | F3 | ALL | [138] | [2] | |
| | | 3.9L TBI | 1990 | 1991 | X | N/A | 14.5 | N/A | 45 | F3 | ALL | [138] | [5] | |
| | | 3.9L/5.2L MPI | 1992 | 1996 | X,Y | 40 | 32 | 40 | 95 | F1 | GM,DM,FM,DB | [137] | [3] | |
| Dodge Trk.D-50 | | 2.4L MPI | 1990 | 1993 | G,W | 48 | 40 | 48 | 95 | F18 | GM,FM,FB | [138] | [12] | |
| | | 3.0L MPI SOHC | 1990 | 1990 | N | 48 | 40 | 48 | 85 | F3 | ALL | [138] | [3] | |
| | | 3.0L MPI SOHC | 1991 | 1993 | N | 48 | 40 | 48 | 85 | F3 | ALL | [138] | [12] | |
| Dodge Trk.Ram / Ramcharger 2X4 | | 3.9L/5.2L/5.9L TBI | 1988 | 1989 | X,Y,Z,5 | N/A | 14.5 | N/A | 45 | F3 | ALL | [138] | [2] | |
| | | 3.9L/5.2L/5.9L TBI | 1990 | 1991 | X,Y,Z,5 | N/A | 14.5 | N/A | 45 | F3 | ALL | [138] | [5] | |
| | | 3.9L/5.2L/5.9L MPI | 1992 | 1996 | X,Y,Z,5 | 40 | 32 | 40 | 95 | F1 | GM,DM,FM,DB | [137] | [3] | |
| Dodge Trk.Ram / Ramcharger 4X4 | | 3.9L/5.2L/5.9L TBI | 1988 | 1989 | X,Y,Z,5 | N/A | 14.5 | N/A | 45 | F3 | ALL | [138] | [2] | |
| | | 3.9L/5.2L/5.9L TBI | 1990 | 1991 | X,Y,Z,5 | N/A | 14.5 | N/A | 45 | F3 | ALL | [138] | [5] | |
| | | 3.9L/5.2L/5.9L MPI | 1992 | 1996 | X,Y,Z,5 | 40 | 32 | 40 | 95 | F1 | GM,DM,FM,DB | [137] | [3] | |
| Dodge Trk.Raider | | 3.0L MPI SOHC | 1989 | 1989 | S | 48 | 40 | 48 | 95 | F18 | GM,FM,FB | [138] | [3] | |
| Dodge Trk.Ram Truck T-300 | | | 1992 | 1996 | X,Y,Z,5 | 40 | 32 | 40 | 95 | F1 | GM,DM,FM,DB | [136] | [11] | |
| Dodge Trk.Ram Van | | 3.9L/5.2L/5.9L/8.0L MPI | 1988 | 1988 | X,Y,Z | N/A | 14.5 | N/A | 45 | | | [137] | [3] | |
| | | 3.9L/5.2L/5.9L TBI | 1990 | 1991 | X,Y,Z | N/A | 14.5 | N/A | 45 | F3 | ALL | [138] | [2] | |
| | | 3.9L/5.2L/5.9L TBI | 1992 | 1992 | X,Y,Z | N/A | 14.5 | N/A | 45 | F3 | ALL | [138] | [5] | |
| | | 5.9L TBI | 1992 | 1992 | Z,5 | N/A | 14.5 | N/A | 45 | F3 | ALL | [138] | [3] | |
| | | 5.9L MPI | 1992 | 1992 | Z,5 | 48 | 40 | 48 | 85 | F1 | ALL | [138] | [3] | |
| | | 3.9L/5.2L/5.9L MPI | 1992 | 1996 | X,Y,Z,5 | 40 | 32 | 40 | 95 | F1 | GM,DM,FM,DB | [137] | [3] | |
| Eagle | Medallion | | | | | | | | | | | | | |
| Eagle | Premier | 2.2L MPI | 1988 | 1989 | | 36 | 29 | 36 | 75 | | | [137] | | |
| Eagle | | 3.0L MPI | 1987 | 1990 | U | 39 | 30 | 39 | 85 | F3 | GM,DM | [137] | [3] | |
| | | 3.0L MPI | 1991 | 1992 | U | 43 | 43 | 48 | 85 | F3 | GM,DM | [137] | [3] | |
| Eagle | Summit | 2.0L MPI SOHC | 1989 | 1991 | V,D | 48 | 40 | 48 | 95 | F18 | GM,FM,FB | [138] | [2] | |
| | | 2.4L MPI | 1992 | 1996 | G,L,W | 48 | 40 | 48 | 95 | F18 | GM,FM,FB | [136] | [5] | |
| Eagle | Talon | 1.8L MPI | 1990 | 1994 | T,B | 48 | 40 | 48 | 85 | F18 | GM,FM,FB | [138] | [3] | |
| | | 2.0L MPI DOHC | 1990 | 1994 | E,Y,R | 48 | 40 | 48 | 85 | F18 | GM,FM,FB | [136] | [7] | |
| | | 2.0L MPI DOHC Turbo | 1990 | 1994 | F,U | 48 | 40 | 48 | 85 | F18 | GM,FM,FB | [136] | [7] | |

* Note : Heading definitions for columns are found on page xii    Footnote references are found on pages 40-44 *

PAGE 12

Standard Domestic & Foreign Fuel Rail Systems

| MAKE | MODEL | ENGINE | FROM YEAR | TO YEAR | VIN | KOEO | NORMAL IDLE | IDLE W/O VACUUM | DEADHEAD PRESSURE | ADAPTER FITTING | ADAPTER KIT | FITTING LOCATION | MANUAL PUMP ENERGIZE | RPO |
|---|---|---|---|---|---|---|---|---|---|---|---|---|---|---|
| Eagle (cont.) | Vision | | | | | | | | | | | | | |
| Eagle | Summit Vista Wagon | 1.5L MPI | 1996 | 1996 | A,X | 48 | 40 | 48 | 95 | | | | | |
| | | 1.8L MPI | 1992 | 1994 | T | 48 | 40 | 48 | 95 | F18 | GM,FM,FB | [136] | [6] | |
| | | 3.3L MPI | 1993 | 1996 | T | 48 | 40 | 48 | 95 | F18 | GM,FM,FB | [136] | [7] | |
| Fiat | | 3.5L MPI | 1993 | 1996 | F | 48 | 40 | 48 | 95 | F1 | GM,DM,FM,DB | [137] | [3] | |
| Fiat | Brava | 1.8L, 2.0L MPI | 1990 | 1991 | | 28 [114] | | | N/A | | | | [3] | |
| Fiat | Spider 124 | 1.8L, 2.0L MPI | 1980 | 1982 | | 28 [114] | | | N/A | F3 | ALL | [137] | [131] | |
| Fiat | Strada | 1.5L MPI | 1980 | 1982 | | 28 [114] | | | N/A | F3 | ALL | [137] | [131] | |
| Fiat | X1/9 | 1.5L MPI | 1980 | 1982 | | 28 [114] | | | N/A | F3 | ALL | [137] | [131] | |
| Ford | Aspire | 1.3L L4 SFI | 1994 | 1996 | H | 39-42 | [16] | 39-42 | 60+ | F3 | ALL | [137] | [131] | |
| Ford | Contour | 2.0L L4 DOHC SFI | 1995 | 1996 | 3 | 39-42 | [16] | 39-42 | 70+ | F3 | ALL | [145] | [26] | |
| | | 2.5L V6 DOHC SFI | 1995 | 1996 | L | 39-42 | [16] | 39-42 | 75+ | F3 | ALL | [145] | [20] | |
| Ford | Escort | 1.6L L4 MFI | 1984 | 1985 | 5 | 39-42 | [16] | 39-42 | 75+ | F2 | ALL | [137] | [20] | |
| | | 1.6L L4 MFI Turbo | 1984 | 1985 | 8 | 42 | [16] | 42 [16] | 75+ | F2 | ALL | [137] | [19] | |
| | | 1.8L L4 DOHC MFI | 1991 | 1995 | 8 | 40-45 | [16] | 40-45 | 75+ | F3 | ALL | [145] | [19] | |
| | | 1.9L L4 MFI | 1986 | 1996 | V | 39-42 | [16] | 39-42 | 75+ | F2 | ALL | [137] | [26] | |
| | | 1.8L MPI DOHC | 1989 | 1990 | Y | 48 | 40 | 48 | 95 | F18 | GM,FM,FB | [136] | [23] | |
| | | 1.8L MPI DOHC Turbo | 1989 | 1990 | Z | 48 | 40 | 48 | 95 | F18 | GM,FM,FB | [136] | [6] | |
| | | 1.8L MPI | 1993 | 1996 | C | 48 | 40 | 48 | 95 | F18 | GM,DM,FM,DB | [139] | [9] | |
| | | 1.9L L4 TBI | 1987 | 1990 | 9 | N/A | 14-16 | N/A | 30+ | F4-F5 or F6-F7 | | | [19] | |
| Ford | EXP | 1.6L L4 MFI Turbo | 1985 | 1986 | 8 | 42 | [16] | 42 [16] | 75+ | F2 | ALL | [137] | [19] | |
| | | 1.9L L4 MFI | 1987 | 1987 | J | 39-42 | [16] | 39-42 | 75+ | F2 | ALL | [137] | [19] | |
| Ford | Festiva | 1.3L L4 MFI | 1990 | 1993 | H | 39-42 | [16] | 39-42 | 75+ | F3 | ALL | [145] | [24] | |
| Ford | LTD (midsized) | 3.8L V6 TBI | 1984 | 1986 | 3 | N/A | [16] | N/A | | F2 | ALL | [139] | [19] | |
| | | 5.0L V8 TBI | 1985 | 1985 | M | N/A | 38-42 | N/A | | F2 | ALL | [139] | [19] | |
| | | 5.0L V8 EFI | 1986 | 1986 | M | 39-42 | 38-42 | 39-42 | | F2 | ALL | [137] | [19] | |
| Ford | LTD Crown Victoria | 4.6L V8 OHC SFI | 1993 | 1996 | W | 39-42 | [16] | 39-42 | 75+ | F2 | ALL | [137] | [23] | |
| | | 5.0L V8 TBI EEC III | 1983 | 1983 | F | N/A | 38-42 | N/A | 75+ | F2 | ALL | [139] | [19] | |
| | | 4.6L V8 DOHC SFI | 1996 | 1996 | W | 39-42 | [16] | 39-42 | 75+ | F2 | ALL | [137] | [20] | |
| | | 4.6L V8 OHC SFI | 1996 | 1996 | W | 39-42 | 38-42 | 39-42 | 75+ | F2 | ALL | [137] | [19] | |
| | | 5.0L V8 (TBI) H.O. | 1985 | 1985 | M | N/A | [16] | N/A | 75+ | F2 | ALL | [139] | [20] | |
| | | 5.0L V8 SFI | 1986 | 1992 | E | 39-42 | [16] | 39-42 | 75+ | F2 | ALL | [137] | [9] | |
| | | 5.0L V8 SFI H.O. | 1993 | 1996 | D | 39-42 | [16] | 39-42 | 75+ | F2 | ALL | [137] | [9] | |
| Ford | Probe | | | | | | | | | | | | [19] | |
| Ford | Mustang | 5.0L V8 SEFI AND H.O. | 1986 | 1991 | E,F | 39-42 | [16] | 39-42 | 75+ | F2 | ALL | [137] | [19] | |

* Note : Heading definitions for columns are found on pages 40-44 *

Footnote references are found on page xii

PAGE 13

Standard Domestic & Foreign Fuel Rail Systems

| MAKE | MODEL | ENGINE | FROM YEAR | TO YEAR | VIN | KOEO | NORMAL IDLE | IDLE W/O VACUUM | DEADHEAD PRESSURE | ADAPTER FITTING | ADAPTER KIT | FITTING LOCATION | MANUAL PUMP ENERGIZE | RPO |
|---|---|---|---|---|---|---|---|---|---|---|---|---|---|
| Ford (cont.) | | 2.3L L4 OHC MFI Turbo | 1984 | 1987 | T,W | 42 | [16] | 42 [18] | 75+ | F2 | ALL | [137] | [19] | |
| | | 2.3L L4 OHC MFI | 1987 | 1993 | A | 39-42 | [16] | 39-42 | 75+ | F2 | ALL | [137] | [19] | |
| | | 3.8L V6 TBI | 1988 | 1987 | 3 | N/A | 38-42 | N/A | 75+ | F2 | ALL | [139] | [19] | |
| | | 5.0L V8 TBI | 1984 | 1990 | F | N/A | 38-42 | N/A | 75+ | F2 | ALL | [139] | [19] | |
| | | 3.8L V6 SFI | 1994 | 1996 | 4 | 39-42 | [16] | 39-42 | 75+ | F3 | ALL | [137] | [20] | |
| | | 2.0L L4 SFI | 1993 | 1996 | A | 39-42 | [16] | 39-42 | 70+ | F3 | ALL | [145] | [26] | |
| Ford | Probe GL | 2.2L L4 MFI | 1989 | 1992 | C | 39-42 | [16] | 39-42 | 70+ | F3 | ALL | [145] | [24] | |
| Ford | Probe GT | 2.2L L4 MFI Turbo | 1989 | 1992 | L | 40 | [16] | 40 [18] | 70+ | F3 | ALL | [145] | [24] | |
| | | 2.5L V6 SFI | 1993 | 1996 | B | 39-42 | [16] | 39-42 | 70+ | F3 | ALL | [145] | [26] | |
| Ford | Probe LX | 2.2L L4 MFI | 1989 | 1992 | C | 39-42 | [16] | 39-42 | 70+ | F3 | ALL | [145] | [26] | |
| | | 3.0L V6 MFI | 1990 | 1992 | U | 39-42 | [16] | 39-42 | 75+ | F2 | ALL | [137] | [19] | |
| Ford | Taurus | 2.5L L4 HSC TBI | 1986 | 1988 | D | N/A | 14-16 | N/A | 30+ | F4-F5 or F6-F7 | GM,DM,DB | [139] | [19] | |
| | | 2.5L L4 HSC TBI | 1989 | 1990 | D | N/A | 30-35 | N/A | 70+ | F4-F5 or F6-F7 | GM,DM,DB | [139] | [19] | |
| | | 3.0L V6 MF/SFI | 1986 | 1996 | U | 39-42 | [16] | 39-42 | 75+ | F2 | ALL | [137] | [19] | |
| | | 3.0L V6 SFI (Flex Fuel) | 1993 | 1996 | 1 | 39-42 | [16] | 39-42 | 75+ | F2 | ALL | [137] | [23] | |
| | | 3.0L V6 DOHC SFI | 1996 | 1996 | S | 39-42 | [16] | 39-42 | 75+ | F2 | ALL | [137] | [23] | |
| | | 3.8L V6 MF/SFI | 1988 | 1996 | 4 | 39-42 | [16] | 39-42 | 75+ | F2 | ALL | [137] | [20] | |
| Ford | Taurus SHO | 3.0L V6 DOHC SFI | 1989 | 1995 | Y | 39-42 | [16] | 39-42 | 75+ | F2 | ALL | [137] | [23] | |
| | | 3.2L V6 DOHC SFI | 1993 | 1995 | P | 39-42 | [16] | 39-42 | 75+ | F2 | ALL | [137] | [19] | |
| Ford | Tempo | 2.3L L4 HSC TB/H.O | 1985 | 1987 | X | N/A | 14-16 | N/A | 30+ | F4-F5 or F6-F7 | GM,DM,DB | [139] | [19] | |
| | | 2.3L L4 HSC MF/SFI | 1988 | 1994 | X | 50-80 | 45 | 50-80 | 75+ | F2 | ALL | [137] | [19] | |
| | | 3.0L V6 SFI | 1992 | 1994 | U | 39-42 | [16] | 39-42 | 75+ | F2 | ALL | [137] | [19] | |
| Ford | Thunderbird | 2.3L L4 OHC MFI Turbo | 1983 | 1988 | W | 42 | [16] | 42 [18] | 75+ | F2 | ALL | [137] | [19] | |
| | | 3.8L V6 TBI | 1984 | 1987 | 3 | N/A | 38-42 | N/A | 75+ | F2 | ALL | [137] | [19] | |
| | | 3.8L V6 MF/SFI | 1988 | 1995 | 4 | 39-42 | [16] | 39-42 | 75+ | F2 | ALL | [139] | [19] | |
| | | 3.8L V6 SFI SC | 1989 | 1995 | R | 39-42 | [16] | 39-42 | 75+ | F2 | ALL | [137] | [19] | |
| | | 5.0L V8 TBI | 1984 | 1985 | F | 42 | [16] | 42 [18] | 75+ | F2 | ALL | [137] | [19] | |
| | | 5.0L V8 SFI | 1986 | 1988 | F | N/A | 38-42 | N/A | 75+ | F2 | ALL | [137] | [19] | |
| | | 5.0L V8 SFI HO | 1991 | 1993 | T | 39-42 | [16] | 39-42 | 75+ | F2 | ALL | [137] | [19] | |
| | | 4.6L V8 OHC SFI | 1994 | 1996 | W | 39-42 | [16] | 39-42 | 75+ | F2 | ALL | [137] | [20] | |
| Ford Truck | | | | | | | | | | | | | | |
| Ford Trk. | Aerostar | 2.3L L4 OHC MFI | 1986 | 1987 | A | 39-42 | [16] | 39-42 | 85+ | F2 | ALL | [137] | [19] | |
| | | 3.0L V6 MFI | 1986 | 1991 | U | 39-42 | [16] | 39-42 | 85+ | F2 | ALL | [137] | [19] | |
| | | 3.0L V6 MFI | 1992 | 1995 | U | 39-42 | [16] | 39-42 | 85+ | F2 | ALL | [137] | [23] | |
| | | 4.0L V6 MFI | 1991 | 1995 | X | 39-42 | [16] | 39-42 | 85+ | F2 | ALL | [137] | [19] | |
| | | 4.0L V6 SFI | 1993 | 1996 | X | 39-42 | [16] | 39-42 | 85+ | F2 | ALL | [137] | [19] | |
| Ford Trk. | Bronco | 4.9L L6 MFI | 1987 | 1996 | Y | 50-80 | 45 | 50-80 | 85+ | F2 | ALL | [137] | [19] | |
| | | 5.0L V8 MFI | 1985 | 1985 | N | N/A | [16] | N/A | 85+ | F4,F5 | ALL | [137] | [23] | |
| | | 5.0L V8 MFI | 1988 | 1993 | N | 39-42 | [16] | 39-42 | 85+ | F2 | GM,DM,DB | [137] | [19] | |
| | | 5.8L V8 MFI | 1988 | 1993 | H | 39-42 | [16] | 39-42 | 85+ | F2 | ALL | [137] | [19] | |

* Note : Heading definitions for columns are found on page xii     Footnote references are found on pages 40-44 *

PAGE 14

Standard Domestic & Foreign Fuel Rail Systems

| MAKE | MODEL | ENGINE | FROM YEAR | TO YEAR | VIN | KOEO | NORMAL IDLE | IDLE W/O VACUUM | DEADHEAD PRESSURE | ADAPTER FITTING | ADAPTER KIT | FITTING LOCATION | MANUAL PUMP ENERGIZE | RPO |
|---|---|---|---|---|---|---|---|---|---|---|---|---|---|
| Ford Truck (cont.) | | | | | | | | | | | | | |
| Ford Trk. | Bronco II | 5.8L V8 SFI | 1994 | 1996 | H | 39-42 | [16] | 39-42 | 85+ | F2 | ALL | [137] | [23] | |
| | | 5.8L V8 HP | 1994 | 1996 | R | 39-42 | [16] | 39-42 | 85+ | F2 | ALL | [137] | [23] | |
| Ford Trk. | E150 | 5.0L V8 SFI | 1994 | 1996 | N | 39-42 | [16] | 39-42 | 85+ | F2 | ALL | [137] | [23] | |
| | | 2.0L V8 MFI | 1996 | 1996 | T | 39-42 | [16] | 39-42 | 85+ | F2 | ALL | [137] | [19] | |
| Ford Trk. | E250 | 4.9L L6 MFI | 1987 | 1996 | Y | 50-60 | 45 | 50-60 | 85+ | F2 | ALL | [137] | [23] | |
| | | 4.9L L6 SFI | 1995 | 1996 | Y | 50-60 | 45 | 50-60 | 85+ | F2 | ALL | [137] | [23] | |
| | | 5.0L V8 MFI | 1985 | 1985 | N | 39-42 | [16] | 39-42 | 85+ | F2 | ALL | [137] | [19] | |
| | | 5.0L V8 MFI | 1986 | 1993 | N | 39-42 | [16] | 39-42 | 85+ | F2 | ALL | [137] | [19] | |
| | | 5.0L V8 SFI | 1994 | 1996 | N | 39-42 | [16] | 39-42 | 85+ | F4-F5 | GM,DM,DB | [137] | [19] | |
| | | 5.8L V8 MFI (Cal SFI) | 1988 | 1996 | H | 39-42 | [16] | 39-42 | 85+ | F2 | ALL | [137] | [23] | |
| | | 5.8L V8 SFI | 1995 | 1996 | H | 39-42 | [16] | 39-42 | 85+ | F2 | ALL | [137] | [23] | |
| | | 5.8L V8 SFI | 1988 | 1996 | G | 39-42 | [16] | 39-42 | 85+ | F2 | ALL | [137] | [23] | |
| Ford Trk. | E350 | 4.9L L6 MFI | 1987 | 1996 | Y | 50-60 | 45 | 50-60 | 85+ | F2 | ALL | [137] | [19] | |
| | | 4.9L L6 SFI | 1995 | 1996 | Y | 50-60 | 45 | 50-60 | 85+ | F2 | ALL | [137] | [19] | |
| | | 5.0L V8 MFI | 1985 | 1985 | N | 39-42 | [16] | 39-42 | 85+ | F2 | ALL | [137] | [19] | |
| | | 5.0L V8 MFI | 1986 | 1993 | N | 39-42 | [16] | 39-42 | 85+ | F2 | ALL | [137] | [19] | |
| | | 5.0L V8 SFI | 1994 | 1996 | N | 39-42 | [16] | 39-42 | 85+ | F4-F5 | GM,DM,DB | [137] | [19] | |
| | | 5.8L V8 MFI (Cal SFI) | 1988 | 1996 | H | 39-42 | [16] | 39-42 | 85+ | F2 | ALL | [137] | [23] | |
| | | 5.8L V8 SFI | 1995 | 1996 | H | 39-42 | [16] | 39-42 | 85+ | F2 | ALL | [137] | [23] | |
| | | 7.5L V8 MFI | 1988 | 1996 | G | 39-42 | [16] | 39-42 | 85+ | F2 | ALL | [137] | [23] | |
| Ford Trk. | E-Super Duty | 4.9L L6 SFI | 1987 | 1996 | Y | 50-60 | 45 | 50-60 | 85+ | F2 | ALL | [137] | [19] | |
| | | 5.8L V8 MFI (Cal SFI) | 1988 | 1996 | H | 39-42 | [16] | 39-42 | 85+ | F2 | ALL | [137] | [23] | |
| | | 7.5L V8 MFI (Cal SFI) | 1988 | 1996 | G | 39-42 | [16] | 39-42 | 85+ | F2 | ALL | [137] | [23] | |
| Ford Trk. | Explorer | 4.0L V6 MFI | 1991 | 1993 | X | 39-42 | [16] | 39-42 | 85+ | F2 | ALL | [137] | [19] | |
| | | 4.0L V6 SFI | 1993 | 1996 | X | 39-42 | [16] | 39-42 | 85+ | F2 | ALL | [137] | [23] | |
| | | 5.0L V8 SFI | 1996 | 1996 | N | 39-42 | [16] | 39-42 | 85+ | F2 | ALL | [137] | [20] | |
| Ford Trk. | F250 | 4.9L L6 MFI | 1987 | 1996 | Y | 50-60 | 45 | 50-60 | 85+ | F2 | ALL | [137] | [23] | |
| | | 4.9L L6 SFI | 1985 | 1985 | Y | 50-60 | 45 | 50-60 | 85+ | F2 | ALL | [137] | [19] | |
| | | 5.0L V8 SFI | 1986 | 1993 | N | 39-42 | [16] | 39-42 | 85+ | F4-F5 | GM,DM,DB | [137] | [23] | |
| | | 5.0L V8 SFI | 1994 | 1996 | N | 39-42 | [16] | 39-42 | 85+ | F2 | ALL | [137] | [19] | |
| | | 5.0L V8 SFI | 1985 | 1985 | N | 39-42 | [16] | 39-42 | 85+ | F2 | ALL | [137] | [23] | |
| | | 5.0L V8 SFI | 1986 | 1993 | N | 39-42 | [16] | 39-42 | 85+ | F4-F5 | GM,DM,DB | [137] | [19] | |
| | | 5.0L V8 SFI | 1986 | 1996 | N | 39-42 | [16] | 39-42 | 85+ | F2 | ALL | [137] | [23] | |
| | | 5.0L V8 SFI | 1994 | 1996 | N | 39-42 | [16] | 39-42 | 85+ | F2 | ALL | [137] | [23] | |

* Note : Heading definitions for columns are found on page xii       Footnote references are found on pages 40-44 *

Standard Domestic & Foreign Fuel Rail Systems

| MAKE | MODEL | ENGINE | FROM YEAR | TO YEAR | VIN | KOEO | NORMAL IDLE | IDLE W/O VACUUM | DEADHEAD PRESSURE | ADAPTER FITTING | ADAPTER KIT | FITTING LOCATION | MANUAL PUMP ENERGIZE | RPO |
|---|---|---|---|---|---|---|---|---|---|---|---|---|---|---|
| Ford Truck (cont.) | | | | | | | | | | | | | | |
| Ford Trk. | F150 | 5.8L V8 MFI | 1988 | 1996 | H | 39-42 | [16] | 39-42 | 85+ | | ALL | [137] | | |
| | | 5.8L V8 SEFI | 1995 | 1996 | H | 39-42 | [16] | 39-42 | 85+ | | ALL | [137] | [23] | |
| | | 4.9L L6 MFI | 1987 | 1996 | Y | 50-60 | 45 | 50-60 | 85+ | F2 | ALL | [137] | [23] | |
| | | 4.9L L6 SFI | 1995 | 1996 | Y | 50-60 | 45 | 50-60 | 85+ | F2 | ALL | [137] | [23] | |
| | | 4.9L L6 SFI | 1995 | 1996 | Y | 50-60 | 45 | 50-60 | 85+ | F2 | ALL | [137] | [23] | |
| | | 5.8L V8 MFI | 1988 | 1996 | H | 39-42 | [16] | 39-42 | 85+ | F2 | ALL | [137] | [23] | |
| | | 5.8L V8 MFI (Cal SFI) | 1995 | 1996 | H | 39-42 | [16] | 39-42 | 85+ | F2 | ALL | [137] | [23] | |
| | | 7.5L V8 MFI | 1988 | 1996 | G | 39-42 | [16] | 39-42 | 85+ | F2 | ALL | [137] | [23] | |
| | | 7.5L V8 MFI (Cal SFI) | 1995 | 1996 | G | 39-42 | [16] | 39-42 | 85+ | F2 | ALL | [137] | [23] | |
| | | 5.8L V8 HP | 1994 | 1996 | R | 39-42 | [16] | 39-42 | 85+ | F2 | ALL | [137] | [20] | |
| | | 5.8L V8 MFI | 1988 | 1996 | H | 39-42 | [16] | 39-42 | 85+ | F2 | ALL | [137] | [23] | |
| | | 5.8L V8 MFI (SFI w/MAF) | 1995 | 1996 | H | 39-42 | [16] | 39-42 | 85+ | F2 | ALL | [137] | [23] | |
| | | 7.5L V8 MFI | 1988 | 1996 | G | 39-42 | [16] | 39-42 | 85+ | F2 | ALL | [137] | [23] | |
| | | 7.5L V8 MFI (Cal SFI) | 1995 | 1996 | G | 39-42 | [16] | 39-42 | 85+ | F2 | ALL | [137] | [20] | |
| Ford Trk. | F350 | 4.9L L6 MFI | 1987 | 1996 | Y | 50-60 | 45 | 50-60 | 85+ | F2 | ALL | [137] | [23] | |
| Ford Trk. | F-Super Duty | 7.5L V8 MFI | 1988 | 1996 | G | 39-42 | [16] | 39-42 | 85+ | F2 | ALL | [137] | [23] | |
| Ford Trk. | Ranger | 2.3L L4 OHC MFI | 1995 | 1993 | A | 39-42 | [16] | 39-42 | 85+ | F2 | ALL | [137] | [19] | |
| | | 2.3L L4 OHC MFI (Cal SF) | 1994 | 1996 | A | 39-42 | [16] | 39-42 | 85+ | F2 | ALL | [137] | [23] | |
| | | 2.3L L4 OHC SFI | 1995 | 1996 | A | 39-42 | [16] | 39-42 | 85+ | F2 | ALL | [137] | [19] | |
| | | 2.9L V6 MFI | 1986 | 1992 | T | 39-42 | [16] | 39-42 | 85+ | F2 | ALL | [137] | [23] | |
| | | 3.0L V6 MFI | 1991 | 1991 | U | 39-42 | [16] | 39-42 | 85+ | F2 | ALL | [137] | [19] | |
| | | 3.0L V6 SFI | 1992 | 1996 | U | 39-42 | [16] | 39-42 | 85+ | F2 | ALL | [137] | [19] | |
| | | 4.0L V6 MFI | 1991 | 1994 | X | 39-42 | [16] | 39-42 | 85+ | F2 | ALL | [137] | [23] | |
| | | 4.0L V6 SFI | 1993 | 1996 | X | 39-42 | [16] | 39-42 | 85+ | F2 | ALL | [137] | [19] | |
| Ford Trk. | Windstar | 3.0L V6 SFI | 1995 | 1996 | U | 39-42 | [16] | 39-42 | 85+ | F2 | ALL | [137] | [20] | |
| | | 3.8L V6 SFI | 1995 | 1995 | 4 | 39-42 | [16] | 39-42 | 85+ | F2 | ALL | [137] | [20] | |
| Geo - See Chevrolet, Chevrolet Truck | | | | | | | | | | | | | | |
| GMC Truck | | | | | | | | | | | | | | |
| GMC Trk. | Caballero | 4.3L TBI | 1987 | 1987 | Z | 9-13[*] | 9-13 | N/A | 15+ | F10-F11 | GM,DM | [140] | [47] | LB4 |
| GMC Trk. | C/K Pickup Truck and Sierra (88-96), Suburban and Yukon (92-96) | | | | | | | | | | | | | |
| | | 4.3L V6 TBI | 1988 | 1995 | Z | 9-13[*] | 9-13 | N/A | 15+ | F10-F11 | GM,DM | [140] | [40] | LB4 |
| | | 4.3L V6 SCPI | 1996 | 1996 | W | 60-66 | [16] | 60-66 | 75 [159] | F1 | GM,DM,FM,DB | [137] | [27] | L35 |
| | | 5.0L V8 TBI | 1988 | 1995 | H | 9-13[*] | 9-13 | N/A | 15+ | F10-F11 | GM,DM | [140] | [40] | L03 |
| | | 5.0L V8 SCPI | 1996 | 1996 | M | 60-66 | [16] | 60-66 | 75 [159] | F1 | GM,DM,FM,DB | [137] | [39] | L30 |
| | | 5.7L V8 TBI | 1987 | 1995 | K | 9-13[*] | 9-13 | N/A | 15+ | F10-F11 | GM,DM | [140] | [44] | L05 |
| | | 5.7L V8 SCPI | 1996 | 1996 | R | 60-66 | [16] | 60-66 | 75 [159] | F1 | GM,DM,FM,DB | [137] | [36] | L31 |
| | | 7.4L V8 TBI | 1987 | 1993 | N | 9-13[*] | 9-13 | N/A | 15+ | F10-F11 | GM,DM | [140] | [44] | L19 |
| | | 7.4L V8 TBI | 1994 | 1995 | N | 26-32[*] | 26-32 | N/A | 32+ | F1 | GM,DM | [140] | [44] | L19 |
| | | 7.4L V8 SFI | 1994 | 1995 | J | 60-66 | [16] | 60-66 | 75 [159] | F1 | GM,DM,FM,DB | [137] | [36] | L29 |
| | | 7.4L V8 SFI | 1996 | 1996 | J | 60-66 | [16] | 60-66 | 32 [159] | F1 | GM,DM,FM,DB | [137] | [40] | L19 |
| GMC Trk. | G Van, Rally, Vendura | 4.3L V6 TBI | 1987 | 1995 | Z | 9-13[*] | 9-13 | N/A | 15+ | F10-F11 | GM,DM | [140] | [44] | LB4 |

* Note: Heading definitions for columns are found on page xii.  Footnote references are found on pages 40-44 *

PAGE 16

Standard Domestic & Foreign Fuel Rail Systems

| MAKE | MODEL | ENGINE | FROM YEAR | TO YEAR | VIN | ROEO | NORMAL IDLE | IDLE W/O VACUUM | DEADHEAD PRESSURE | ADAPTER FITTING | ADAPTER KIT | FITTING LOCATION | MANUAL PUMP ENERGIZE | MFG |
|---|---|---|---|---|---|---|---|---|---|---|---|---|---|---|
| GMC Truck (cont.) | | 4.3L V6 SCPI | 1996 | 1996 | W | 60-66 | [16] | 60-66 | 75 [159] | F1 | GM,DM,FM,DB | [137] | [36] | L35 |
| | | 5.0L V8 TBI | 1987 | 1995 | H | 9-13[*] | 9-13 | N/A | 15+ | F10-F11 | GM,DM | [140] | | L03 |
| | | 5.0L V8 SCPI | 1996 | 1996 | M | 60-66 | [16] | 60-66 | 75 [159] | F1 | GM,DM,FM,DB | [137] | [44] | L30 |
| | | 5.7L V8 TBI | 1988 | 1995 | K | 9-13[*] | 9-13 | N/A | 15+ | F10-F11 | GM,DM | [140] | [27] | L05 |
| | | 5.7L V8 SCPI | 1996 | 1996 | R | 60-66 | [16] | 60-66 | 75 [159] | F1 | GM,DM,FM,DB | [137] | [40] | L31 |
| | | 7.4L V8 TBI | 1987 | 1993 | N | 9-13[*] | 9-13 | N/A | 15+ | F10-F11 | GM,DM | [140] | [27] | L19 |
| GMC Trk. | P Truck | | | | | | | | | | | | | |
| | | 4.3L V6 TBI | 1991 | 1996 | Z | 9-13[*] | 9-13 | N/A | 15+ | F10-F11 | GM,DM | [140] | [27] | LB4 |
| | | 5.7L V8 TBI | 1987 | 1988 | K | 9-13[*] | 9-13 | N/A | 15+ | F10-F11 | GM,DM | [140] | [27] | L05 |
| | | 5.7L V8 SCPI | 1996 | 1996 | R | 9-13[*] | [16] | N/A | 75 [159] | F10-F11 | GM,DM,FM,DB | [137] | N/A | L31 |
| | | 7.4L V8 TBI | 1987 | 1993 | N | 9-13[*] | 9-13 | N/A | 15+ | F10-F11 | GM,DM | [140] | [27] | L19 |
| | | 7.4L V8 TBI | 1994 | 1995 | N | 26-32 | 26-32 | N/A | 32+ | F10-F11 | GM,DM | [140] | [27] | L19 |
| | | 7.4L V8 SFI | 1996 | 1996 | J | 60-66 | [16] | 60-66 | 75 [159] | F1 | GM,DM,FM,DB | [137] | N/A | L29 |
| GMC Trk. | R/V Pickup Truck (87-88), Suburban and Jimmy (87-91) | | | | | | | | | | | | | |
| | | 4.3L V6 TBI | 1987 | 1987 | Z | 9-13[*] | 9-13 | N/A | 15+ | F10-F11 | GM,DM | [140] | [44] | LB4 |
| | | 5.0L V8 TBI | 1987 | 1987 | H | 9-13[*] | 9-13 | N/A | 15+ | F10-F11 | GM,DM | [140] | [44] | L03 |
| | | 5.7L V8 TBI | 1987 | 1991 | K | 9-13[*] | 9-13 | N/A | 15+ | F10-F11 | GM,DM | [140] | [44] | L05 |
| | | 7.4L V8 TBI | 1987 | 1991 | N | 9-13[*] | 9-13 | N/A | 15+ | F10-F11 | GM,DM | [140] | [44] | L19 |
| GMC Trk. | Safari, Mini Van | | | | | | | | | | | | | |
| | | 2.5L L4 TBI | 1986 | 1991 | E | 9-13[*] | [16] | N/A | 15+ | F1 | GM,DM | [140] | [27] | LN8 |
| | | 4.3L V6 TBI | 1987 | 1994 | Z | 9-13[*] | [16] | N/A | 15+ | F1 | GM,DM | [140] | [28] | LB4 |
| | | 4.3L V6 TBI | 1990 | 1991 | B | 9-13[*] | 9-13 | N/A | 15+ | F1 | GM,DM | [140] | [28] | LU2 |
| | | 4.3L V6 CPI | 1992 | 1995 | W | 60-66 | [16] | 60-66 | 75 [159] | F1 | GM,DM | [140] | [28] | L35 |
| | | 4.3L V6 SCPI | 1996 | 1996 | W | 60-66 | [16] | 60-66 | 75 [159] | F1 | GM,DM,FM,DB | [137] | [28] | L35 |
| GMC Trk. | S/T Pickup, Sonoma, Mini Jimmy, Syclone, Typhoon | | | | | | | | | | | | | |
| | | 2.2L L4 MFI | 1994 | 1995 | 4 | 41-47 | [16] | 41-47 | 60+ | F1 | GM,DM,FM,DB | [137] | [36] | LN2 |
| | | 2.2L L4 SFI | 1996 | 1996 | 4 | 41-48 | [16] | 41-48 | 60+ | F1 | GM,DM,FM,DB | [140] | [29] | LN2 |
| | | 2.5L L4 TBI | 1985 | 1985 | E | 9-13[*] | 9-13 | N/A | 15+ | F10-F11 | GM,DM | [140] | [40] | LN8 |
| | | 2.5L L4 TBI | 1986 | 1993 | E | 9-13[*] | 9-13 | N/A | 15+ | F10-F11 | GM,DM | [140] | [27] | LN8 |
| | | 2.5L L4 TBI | 1991 | 1993 | A | 9-13[*] | 9-13 | N/A | 15+ | F10-F11 | GM,DM | [140] | [27] | LN8 |
| | | 2.8L V6 TBI | 1986 | 1989 | R | 9-13[*] | 9-13 | N/A | 15+ | F10-F11 | GM,DM | [140] | [27] | L36 |
| | | 4.3L V6 TBI | 1988 | 1993 | Z | 9-13[*] | 9-13 | N/A | 15+ | F10-F11 | GM,DM | [140] | [27] | L2 |
| | | 4.3L V6 TBI | 1990 | 1990 | N | 9-13[*] | 9-13 | N/A | 15+ | F10-F11 | GM,DM | [140] | [36] | LB4 |
| | | 4.3L V6 TBI | 1994 | 1994 | Z | 9-13[*] | 9-13 | N/A | 15+ | F10-F11 | GM,DM | [140] | [44] | LB4 |
| | | 4.3L V6 CPI | 1992 | 1993 | W | 60-66 | [16] | 60-66 | 75 [159] | F1 | GM,DM,FM,DB | [140] | [44] | LB4 |
| | | 4.3L V6 CPI | 1994 | 1995 | W | 60-66 | [16] | 60-66 | 75 [159] | F1 | GM,DM,FM,DB | [137] | [27] | L35 |
| | | 4.3L V6 MFI Turbo | 1991 | 1992 | Z | 38-43 | 30-38 | 38-43 | 75 [159] | F1 | GM,DM,FM,FB | [137] | [35] | L35 |
| | | 4.3L V6 SCPI | 1996 | 1996 | W | 60-66 | [16] | 60-66 | 75 [159] | F1 | GM,DM,FM,FB | [137] | [28] | L35 |
| | | F22A6 2.2L FI | 1991 | 1992 | | N/A | 30-38 | 40-47 | N/A | F16 | GM,DM,FM,FB | [136] | [29] | |
| | | F22A6 2.2L FI | 1992 | 1993 | | N/A | 28-36 | 40-48 | N/A | F16 | GM,DM,FM,FB | [137] | [35] | |
| | | F2B1 | 1982 | 1983 | | N/A | 30-37 | 40-47 | N/A | F16 | GM,DM,FM,FB | [136] | [135] | |
| | | F2B2 | 1994 | 1995 | | N/A | 30-37 | 38-46 | N/A | F16 | GM,DM,FM,FB | [136] | [135] | |
| Honda | Civic | | | | | | | | | | | | | |
| Honda | | D15B1 | 1988 | 1990 | | N/A | [16] | 35-41 | N/A | F16 | GM,DM,FM,FB | [136] | [135] | |
| | | D15B1 | 1991 | 1991 | | N/A | [16] | 40-50 | N/A | F16 | GM,DM,FM,FB | [136] | [135] | |
| | | D15B2 | 1988 | 1990 | | N/A | [16] | 35-41 | N/A | F16 | GM,DM,FM,FB | [136] | [135] | |
| | | D15B2 | 1991 | 1991 | | N/A | [16] | 40-50 | N/A | F16 | GM,DM,FM,FB | [136] | [135] | |
| Honda | Accord | | | | | | | | | | | | | |
| | | A20A3 | 1987 | 1989 | | N/A | [16] | 36-41 | N/A | F16 | GM,DM,FM,FB | [136] | [135] | |
| | | BT | 1986 | 1988 | | N/A | [16] | 33-39 | N/A | F16 | GM,DM,FM,FB | [136] | [135] | |
| | | C27A4 | 1995 | 1995 | | N/A | [16] | 44-51 | N/A | F16 | GM,DM,FM,FB | [136] | [135] | |
| | | ES3 | 1985 | 1985 | | N/A | [16] | 33-39 | N/A | F16 | GM,DM,FM,FB | [136] | [135] | |

*** Note : Heading definitions for columns are found on page xii

Footnote references are found on pages 40-44 ***

Standard Domestic & Foreign Fuel Rail Systems

| MAKE | MODEL | ENGINE | FROM YEAR | TO YEAR | VIN | KOEO | NORMAL IDLE | IDLE W/O VACUUM | DEADHEAD PRESSURE | ADAPTER FITTING | ADAPTER KIT | FITTING LOCATION | MANUAL PUMP ENERGIZE | RPO |
|---|---|---|---|---|---|---|---|---|---|---|---|---|---|---|
| Honda | (CONT.) | F22A1 2.2L FI | 1990 | 1990 | | N/A | 28-35 | 35-41 | N/A | F16 | GM,DM,FM,FB | [136] | [135] | |
| | | F22A1 2.2L FI | 1991 | 1991 | | N/A | 28-33 | 34-41 | N/A | F16 | GM,DM,FM,FB | [136] | [135] | |
| | | F22A4 2.2L FI | 1990 | 1990 | | N/A | 29-35 | 35-41 | N/A | F16 | GM,DM,FM,FB | [136] | [135] | |
| | | F22A1 2.2L FI | 1992 | 1993 | | N/A | 30-38 | 40-47 | N/A | F16 | GM,DM,FM,FB | [136] | [135] | |
| | | F22A4 2.2L FI | 1991 | 1991 | | N/A | 28-33 | 34-41 | N/A | F16 | GM,DM,FM,FB | [136] | [135] | |
| | | D16B7 | 1992 | 1995 | | N/A | 31-38 | 40-47 | N/A | F16 | GM,DM,FM,FB | [136] | [135] | |
| | | D16B6 | 1992 | 1995 | | N/A | 31-38 | 40-47 | N/A | F16 | GM,DM,FM,FB | [136] | [135] | |
| | | D15Z1 | 1992 | 1995 | | N/A | 31-38 | 35-41 | N/A | F16 | GM,DM,FM,FB | [136] | [135] | |
| | | D16A6 | 1989 | 1990 | | N/A | [16] | 40-50 | N/A | F16 | GM,DM,FM,FB | [136] | [135] | |
| | | D16Y5 | 1991 | 1991 | | N/A | [16] | 38-46 | N/A | F16 | GM,DM,FM,FB | [136] | [135] | |
| | | D16Y7 | 1988 | 1988 | | N/A | 28-36 | 38-46 | N/A | F16 | GM,DM,FM,FB | [136] | [135] | |
| | | D16Y8 | 1988 | 1988 | | N/A | 28-36 | 38-46 | N/A | F16 | GM,DM,FM,FB | [136] | [135] | |
| | | D16Z6 | 1992 | 1995 | | N/A | 31-38 | 40-47 | N/A | F16 | GM,DM,FM,FB | [136] | [135] | |
| Honda | Civic del Sol | B16A3 | 1994 | 1995 | | N/A | 31-38 | 40-47 | N/A | F16 | GM,DM,FM,FB | [136] | [135] | |
| | | D15B7 | 1993 | 1995 | | N/A | 31-38 | 40-47 | N/A | F16 | GM,DM,FM,FB | [136] | [135] | |
| | | D16Z6 | 1993 | 1995 | | N/A | 31-38 | 40-47 | N/A | F16 | GM,DM,FM,FB | [136] | [135] | |
| Honda | Civic Si/CRX Si | D15A3 | 1987 | 1987 | | N/A | [16] | 36-39 | N/A | F16 | GM,DM,FM,FB | [136] | [135] | |
| | | EW3 | 1985 | 1986 | | N/A | [16] | 33-39 | N/A | F16 | GM,DM,FM,FB | [136] | [135] | |
| Honda | Civic Wagon | D15B2 | 1988 | 1990 | | N/A | [16] | 35-41 | N/A | F16 | GM,DM,FM,FB | [136] | [135] | |
| | | D15B2 | 1991 | 1991 | | N/A | [16] | 40-50 | N/A | F16 | GM,DM,FM,FB | [136] | [135] | |
| | | D16B6 | 1988 | 1990 | | N/A | [16] | 40-50 | N/A | F16 | GM,DM,FM,FB | [136] | [135] | |
| | | D16A6 | 1988 | 1988 | | N/A | [16] | 35-41 | N/A | F16 | GM,DM,FM,FB | [136] | [135] | |
| | | D16A6 | 1991 | 1991 | | N/A | [16] | 40-47 | N/A | F16 | GM,DM,FM,FB | [136] | [135] | |
| Honda | CRX | D15B2 | 1988 | 1988 | | N/A | [16] | 35-41 | N/A | F16 | GM,DM,FM,FB | [136] | [135] | |
| | | D15B2 | 1991 | 1991 | | N/A | [16] | 40-50 | N/A | F16 | GM,DM,FM,FB | [136] | [135] | |
| | | D15B6 | 1988 | 1988 | | N/A | [16] | 35-41 | N/A | F16 | GM,DM,FM,FB | [136] | [135] | |
| | | D16A6 | 1988 | 1988 | | N/A | [16] | 37-44 | N/A | F16 | GM,DM,FM,FB | [136] | [135] | |
| | | B21A1 | 1990 | 1991 | | N/A | 29-35 | 33-39 | N/A | F16 | GM,DM,FM,FB | [136] | [135] | |
| | | B21A1 | 1991 | 1991 | | N/A | [16] | 33-39 | N/A | F16 | GM,DM,FM,FB | [136] | [135] | |
| | | BT | 1985 | 1988 | | N/A | 28-35 | 33-40 | N/A | F16 | GM,DM,FM,FB | [136] | [135] | |
| | | F22A1 | 1992 | 1995 | | N/A | 28-35 | 36-43 | N/A | F16 | GM,DM,FM,FB | [137] | [135] | |
| | | H22A1 | 1993 | 1995 | | N/A | 24-31 | 33-40 | N/A | F16 | GM,DM,FM,FB | [137] | [135] | |
| | | H23A1 | 1992 | 1995 | | N/A | 28-35 | 36-43 | N/A | F16 | GM,DM,FM,FB | [137] | [135] | |
| Hyundai | | | | | | | | | | | | | | |
| Hyundai | Accent | 1.5L MPI | 1995 | 1996 | K | 48 | 40 | 48 | 85 | F16 | GM,FM,FB | [136] | [14] | |
| Hyundai | Elantra | D16A8 | 1991 | 1991 | | N/A | [16] | 40-50 | N/A | F16 | GM,DM,FM,FB | [136] | [135] | |
| Hyundai | Odyssey | | | | | | | | | | | | | |
| Hyundai | Passport | F22B6 | 1995 | 1995 | | N/A | 30-37 | 38-46 | N/A | F16 | GM,DM,FM,FB | [137] | [135] | |
| | | 4ZE1 2.6L | 1994 | 1995 | | N/A | 35 | 42 | N/A | F3 | ALL | [137] | [143] | |
| | | 6VD1 3.2L V6 FI | 1994 | 1995 | | 41-46 | 25-30 | 41-46 | N/A | F1 | GM,DM,FM,DB | [137] | [144] | |
| Hyundai | Prelude | A20A3 | 1987 | 1987 | | N/A | [16] | 36-41 | N/A | F16 | GM,DM,FM,FB | [136] | [135] | |
| | | B20A5 | 1988 | 1989 | | N/A | 29-35 | 35-41 | N/A | F16 | GM,DM,FM,FB | [136] | [135] | |

*** Note : Heading definitions for columns are found on page xii*

*Footnote references are found on pages 40-44 ***

Standard Domestic & Foreign Fuel Rail Systems

| MAKE | MODEL | ENGINE | FROM YEAR | TO YEAR | VIN | KOEO | NORMAL IDLE | IDLE W/O VACUUM | DEADHEAD PRESSURE | ADAPTER FITTING | ADAPTER KIT | FITTING LOCATION | MANUAL PUMP ENERGIZE | RPO |
|---|---|---|---|---|---|---|---|---|---|---|---|---|---|---|
| Hyundai (cont.) | | B20A5 | 1991 | 1991 | J,M | N/A | 28-36 | 37-44 | N/A | F18 | GM,DM,FM,FB | [138] | [135] | |
| Hyundai | Excel | 1.5L/1.8L MPI | 1994 | 1996 | R | 48 | 40 | 48 | 95 | F18 | GM,FM,FB | [138] | [8] | |
| | | 1.8L MPI DOHC | 1992 | 1996 | | 48 | 40 | 48 | 95 | F18 | GM,FM,FB | [138] | [8] | |
| Hyundai | Scoupe | 1.5L MPI | 1990 | 1991 | J | 48 | 40 | 48 | 95 | F18 | GM,FM,FB | [138] | [8] | |
| | | 1.5L MPI | 1992 | 1996 | J | 48 | 40 | 48 | 95 | F18 | GM,FM,FB | [138] | [15] | |
| Hyundai | Sonata | 1.5L MPI | 1991 | 1992 | J,N | 48 | 40 | 48 | 95 | F18 | GM,FM,FB | [138] | [8] | |
| | | 1.5L MPI | 1993 | 1996 | J,N | 48 | 40 | 48 | 95 | F18 | GM,FM,FB | [138] | [14] | |
| | | 1.8L/2.0L/2.4L MPI | 1989 | 1994 | M,P,S | 48 | 40 | 48 | 95 | F18 | GM,FM,FB | [138] | [4] | |
| | | 1.8L/2.0L/2.4L MPI | 1995 | 1995 | M,P,S | 48 | 40 | 48 | 95 | F18 | GM,FM,FB | [138] | [8] | |
| | | 3.0L MPI SOHC | 1995 | 1995 | T | 48 | 40 | 48 | 95 | F18 | GM,FM,FB | [138] | [4] | |
| | | 3.0L MPI SOHC | 1995 | 1996 | T | 48 | 40 | 48 | 95 | F18 | GM,FM,FB | [138] | [8] | |
| Infiniti | G20 | SR20DE | 1991 | 1995 | | 43 | 36 | 43 | N/A | F3 | ALL | [145] | [51] | |
| Infiniti | I30 | VQ30DE | 1996 | 1996 | | 43 | 34 | 43 | N/A | F3 | ALL | [145] | N/A | |
| Infiniti | J30 | VG30DE | 1993 | 1995 | | 43 | 36 | 43 | N/A | F3 | ALL | [145] | N/A | |
| Infiniti | M30 | VG30E | 1990 | 1992 | | 43 | 34 | 43 | N/A | F3 | ALL | [145] | [51] | |
| Infiniti | Q45 | VH45DE | 1990 | 1995 | | 43 | 34 | 43 | N/A | F3 | ALL | [145] | N/A | |
| Isuzu | I-Mark | 4XC1-T 1.5L | 1987 | 1988 | | 35.6 | 28.4 | 35.6 | 65 | F3 | ALL | [146] | [53] | |
| Isuzu | | 4ZE1 2.6L | 1991 | 1995 | | N/A | 36 | 43 | 65 | F3 | ALL | [146] | [55] | |
| Isuzu | | 6VD1 3.2L | 1993 | 1995 | | 41-46 | 25-30 | 41-46 | 65 | F3 | ALL | [137] | [52] | |
| Isuzu | | CPC V6 3.1L | 1991 | 1992 | | 9-13 | 9-13 | N/A | -5 | F3 | ALL | [136] | [57] | |
| Isuzu | Stylus | 4XE1-V SOHC | 1991 | 1993 | | 35-38 | 25-30 | 35-38 | 65 | F3 | ALL | [139] | [52] | |
| | | 4XE1-W DOHC | 1991 | 1993 | | 35-38 | 25-30 | 35-38 | 65 | F3 | ALL | [139] | [52] | |
| Isuzu | Trooper | 4ZE1 2.6L | 1988 | 1981 | | N/A | 35 | 42 | 65 | F3 | ALL | [146] | [55] | |
| | | 4XE1 1.6L | 1989 | | | 35.6 | 28.4 | 35.6 | 65 | F3 | ALL | [146] | [54] | |
| Isuzu | Impulse | 4XE1-W 1.8L | 1990 | 1992 | | 35-38 | 25-30 | 35-38 | 65 | F3 | ALL | [139] | [52] | |
| | | 4XE1-WT 1.6L | 1991 | 1992 | | 39.7-47.1 | [16] | 39.7-47.1 | 65 | F3 | ALL | [146] | [52] | |
| | | 4ZC1-T 2.0L | 1985 | 1986 | | 35.6 | 35.6 | 42.6 | 65 | F3 | ALL | [146] | [52] | |
| | | 4ZD1 2.3L | 1986 | 1986 | | N/A | 28.4 | 35.6 | 65 | F3 | ALL | [146] | [52] | |
| | | G200Z 1.9L | 1983 | 1983 | | N/A | 35.6 | 35.6 | 65 | F3 | ALL | [146] | [52] | |
| | | G200Z 1.9L | 1987 | 1987 | | N/A | 35.6 | 42.6 | 65 | F3 | ALL | [146] | [52] | |
| Isuzu | Pickup/Amigo | 4ZE1 2.6L | 1988 | 1995 | | N/A | 35 | 42 | 65 | F3 | ALL | [146] | [55] | |
| | | CPC V6 3.1L | 1991 | 1995 | | 9-13 | 9-13 | N/A | -5 | F3 | ALL | [139] | [54] | |
| Isuzu | Rodeo | 6VD1 3.2L | 1992 | 1995 | | 41-46 | 25-30 | 41-46 | 65 | F3 | ALL | [146] | [52] | |
| | | V6 2.6L TBI | 1989 | 1991 | | 9-13 | 9-13 | N/A | -5 | F3 | ALL | [137] | [56] | |
| Jaguar | Sovereign | | | | | | | | | | | | | |

* Note: Heading definitions for columns are found on page xii    Footnote references are found on pages 40-44 *

PAGE 19

Standard Domestic & Foreign Fuel Rail Systems

| MAKE | MODEL | ENGINE | FROM YEAR | TO YEAR | VIN | KOEO | NORMAL IDLE | IDLE W/O VACUUM | DEADHEAD PRESSURE | ADAPTER FITTING | ADAPTER KIT | FITTING LOCATION | MANUAL PUMP ENERGIZE | INFO |
|---|---|---|---|---|---|---|---|---|---|---|---|---|---|---|
| Jaguar | (CONT.) | | | | | | | | | | | | | |
| Jaguar | Vanderplas | 4.0L MPI | 1990 | 1992 | | N/A | 35-37 | 42-44 | N/A | F3 | ALL | [137] | [116] | |
| | | 4.2L MPI | 1980 | 1987 | | N/A | 28-30 | 35-37 | N/A | | ALL | [137] | [118] | |
| | | 3.6L MPI | 1988 | 1989 | | N/A | 35-37 | 42-44 | N/A | F3 | ALL | [137] | [119] | |
| | | 4.0L MPI | 1990 | 1995 | | N/A | 35-37 | 42-44 | N/A | F3 | ALL | [137] | [116] | |
| Jaguar | XJ6 | 3.6L MPI | 1988 | 1989 | | N/A | 35-37 | 42-44 | N/A | | ALL | [137] | [116] | |
| | | 4.2L MPI | 1980 | 1987 | | N/A | 28-30 | 35-37 | N/A | | ALL | [137] | [118] | |
| | | 4.0L MPI | 1990 | 1995 | | N/A | 35-37 | 42-44 | N/A | F3 | ALL | [137] | [116] | |
| Jaguar | XJ12 | 6.0L MPI | 1994 | 1995 | | N/A | 43-45 | 43-45 | N/A | | ALL | [137] | [116] | |
| Jaguar | XJS | 5.3L, 6.0L MPI | 1982 | 1993 | | N/A | 37-39 | 44-46 | N/A | | ALL | [137] | [116] | |
| Jaguar | XJ-SC | 5.2L MPI | 1982 | 1993 | | N/A | 35-37 | 44-46 | N/A | F3 | ALL | [137] | [116] | |
| Jeep | Cherokee | 2.5L TBI | 1986 | 1990 | | N/A | 14.5 | N/A | 45 | F3 | ALL | [136] | [3] | |
| | | 2.6L MPI | 1991 | 1988 | | 40 | 35 | 40 | 75 | F1 | GM,DM,FM,DB | [137] | [3] | |
| | | 4.0L MPI | 1987 | 1990 | P | 39 | 35 | 39 | 85 | F1 | GM,DM,FM,DB | [137] | [3] | |
| | | 4.0L MPI | 1991 | 1996 | S | 39 | 35 | 39 | 95 | F1 | GM,DM,FM,DB | [137] | [3] | |
| Jeep | CJ / Wrangler | 2.5L TBI | 1986 | 1990 | | N/A | 14.5 | N/A | 45 | F3 | ALL | [136] | [3] | |
| | | 2.5L MPI | 1991 | 1996 | P | 40 | 35 | 40 | 75 | F1 | GM,DM,FM,DB | [137] | [3] | |
| Jeep | Sophia | 1.6L EFI | 1993 | 1994 | | N/A | 30-37 | 38-46 | 21 | F3 | ALL | [136] | [58] | |
| Land Rover | | | | | | | | | | | | | | |
| Lnd. Rov. | Defender | 3.9L MPI | 1993 | 1994 | Y | 28 [114] | 35-37 | 42-45 | 80 | F3 | ALL | [149] | [124] | |
| | | 5.2L MPI | 1992 | 1996 | | 48 | 40 | 48 | 85 | F1 | GM,DM,FM,DB | [137] | [3] | |
| Lnd. Rov. | Grand Cherokee | 4.0L MPI | 1991 | 1996 | S | 39 | 35 | 39 | 95 | F1 | GM,DM,FM,DB | [137] | [3] | |
| | | 5.2L MPI | 1992 | 1996 | Y | 40 | 32 | 40 | 95 | F1 | GM,DM,FM,DB | [137] | [3] | |
| Kia | | 2.5L MPI | 1991 | 1992 | P | 40 | 35 | 40 | 75 | F1 | GM,DM,FM,DB | [137] | [3] | |
| | | 4.0L TBI | 1987 | 1990 | | 39 | 35 | 39 | 95 | F1 | GM,DM,FM,DB | [137] | [3] | |
| | | 4.0L MPI | 1991 | 1996 | S | 39 | 35 | 39 | 95 | F1 | GM,DM,FM,DB | [137] | [3] | |
| Kia | Comanche | 2.5L TBI | 1986 | 1990 | | N/A | 14.5 | N/A | 45 | F3 | ALL | [136] | [3] | |
| | | 4.0L MPI | 1991 | 1992 | S | 39 | 35 | 39 | 85 | F1 | GM,DM,FM,DB | [137] | [3] | |
| Kia | Grand Wagoneer | | | | | | | | | | | | | |
| Kia | Discovery | 3.9L MPI | 1993 | 1994 | | 28 [114] | 35-37 | 42-45 | 80 | F3 | ALL | [149] | [124] | |
| Kia | Range Rover | 3.5L MPI | 1987 | 1988 | | 28 [114] | 35-37 | 42-45 | 80 | | ALL | [149] | [123] | |
| | | 3.6L, 3.9L MPI | 1990 | 1992 | | 28 [114] | 35-37 | 42-45 | 80 | F3 | ALL | [149] | [128] | |
| | | 3.9L MPI | 1993 | 1994 | | 28 [114] | 35-37 | 42-45 | 80 | F3 | ALL | [149] | [134] | |
| Lexus | ES 250 | 3.0L 1MZ-FE EFI | 1994 | 1994 | | N/A | 33-38 | 38-44 | 57 | F17 or F19 | GM,DM,FM,DB | [149] | [108] | |

* Note : Heading definitions for columns are found on page xii    Footnote references are found on pages 40-44 *

Standard Domestic & Foreign Fuel Rail Systems

| MAKE | MODEL (cont.) | ENGINE | FROM YEAR | TO YEAR | VIN | KOEO | NORMAL IDLE | IDLE W/O VACUUM | DEADHEAD PRESSURE | ADAPTER FITTING | ADAPTER KIT | FITTING LOCATION | MANUAL PUMP ENERGIZE | RPO |
|---|---|---|---|---|---|---|---|---|---|---|---|---|---|---|
| Lexus | ES 300 | 2.5L 2VZ-FE EFI | 1990 | 1991 | | N/A | 33-37 | 38-44 | 57 | F17 or F19 | GM,DM,FM,DB | [137] | [106] | |
| Lexus | GS 300 | 3.0L 3VZ-FE EFI | 1992 | 1993 | | N/A | 33-37 | 38-44 | 57 | F17 or F19 | GM,DM,FM,DB | [146] | [106] | |
| Lexus | LS 400 | 3.0L 2JZ-GE EFI | 1993 | 1994 | | N/A | 28-34 | 38-44 | 57 | F17 or F19 | GM,DM,FM,DB | [152] | [106] | |
| Lexus | SC 300 | 4.0L 1UZ-FE EFI | 1990 | 1994 | | N/A | 28-34 | 38-44 | 57 | F17 or F19 | GM,DM,FM,DB | [137] | [106] | |
| Lexus | SC 400 | 3.0L 2JZ-GE EFI | 1992 | 1994 | | N/A | 28-34 | 38-44 | 57 | F17 or F19 | GM,DM,FM,DB | [137] | [106] | |
| Lexus | | 4.0L 1UZ-FE EFI | 1992 | 1994 | | N/A | 28-34 | 38-44 | 57 | F17 or F19 | GM,DM,FM,DB | [137] | [106] | |
| Lincoln | Continental | | | | | | | | | | | | | |
| Lincoln | | 3.8L V6 MFI/SFI | 1988 | 1994 | 4 | 39-42 | [18] | 39-42 | 75+ | F2 | ALL | [137] | [19] | |
| Lincoln | | 4.6L V8 DOHC SFI | 1995 | 1996 | V | 39-42 | [18] | 39-42 | 75+ | F2 | ALL | [137] | [20] | |
| Lincoln | | 5.0L V8 TBI | 1984 | 1985 | F | N/A | 39-42 | N/A | 75+ | F2 | ALL | [137] | [19] | |
| Lincoln | | 5.0L V8 SFI | 1986 | 1987 | F | 39-42 | [18] | 39-42 | 75+ | F2 | ALL | [137] | [19] | |
| Lincoln | Mark VI | 5.0L V8 TBI | 1980 | 1983 | F | N/A | 38-42 | N/A | 75+ | F2 | ALL | [139] | [21] | |
| Lincoln | Mark VII | 5.0L V8 TBI | 1984 | 1985 | F | N/A | 38-42 | N/A | 75+ | F2 | ALL | [139] | [19] | |
| Lincoln | | 5.0L V8 SFI/H.O. | 1986 | 1992 | M,E | 39-42 | [18] | 39-42 | 75+ | F2 | ALL | [137] | [19] | |
| Lincoln | Mark VIII | 4.6L V8 DOHC SFI | 1993 | 1996 | V | 39-42 | [18] | 39-42 | 75+ | F2 | ALL | [137] | [20] | |
| Lincoln | Town Car | 4.6L V8 OHC SFI | 1991 | 1996 | W | 39-42 | [18] | 39-42 | -21 | F3 | ALL | [137] | [20] | |
| Lincoln | | 5.0L V8 TBI EEC II | 1980 | 1983 | F | N/A | 38-42 | N/A | -21.3 | F3 | ALL | [137] | [21] | |
| Lincoln | | 5.0L V8 TBI | 1984 | 1985 | F | N/A | 38-42 | N/A | -21.3 | F3 | ALL | [137] | [19] | |
| Lincoln | | 5.0L V8 SFI | 1986 | 1990 | F | 39-42 | [18] | 39-42 | -21.3 | F3 | ALL | [137] | [19] | |
| Mazda | 323/PROTEGE | | | | | | | | | | | | | |
| Mazda | | 1.5L Z5, 1.8L BP EFI | 1995 | 1995 | | N/A | 29-34 | 40-45 | -21 | F3 | ALL | [136] | [60] | |
| Mazda | | 1.6L B6 EFI | 1995 | 1996 | | N/A | 28.4-31.3 | 36.6-40.5 | -21.3 | F3 | ALL | [136] | [59] | |
| Mazda | | 1.6L B6 EFI | 1987 | 1987 | | N/A | 28.4-31.3 | 34.8-40.5 | -21.3 | F3 | ALL | [136] | [59] | |
| Mazda | | 1.6L B6 EFI | 1987 | 1988 | | N/A | 24.6-31.3 | 34.8-40.5 | -21.3 | F3 | ALL | [136] | [59] | |
| Mazda | | 1.6L B6 EFI | 1989 | 1988 | | N/A | 26-31 | 34-40 | -21 | F3 | ALL | [136] | [59] | |
| Mazda | | 1.6L B6 EFI | 1990 | 1994 | | N/A | 30-37 | 38-40 | -21 | F3 | ALL | [136] | [59] | |
| Mazda | | 1.6L B6 EFI Turbo | 1988 | 1988 | | N/A | 24.1-31.3 | 34.6-40.5 | -21.3 | F3 | ALL | [136] | [59] | |
| Mazda | | 1.6L B6 EFI Turbo | 1989 | 1989 | | N/A | 26-31 | 34-40 | -21 | F3 | ALL | [136] | [59] | |
| Mazda | | 1.8L BP EFI | 1990 | 1994 | | N/A | 30-37 | 38-46 | -20 | F3 | ALL | [136] | [60] | |
| Mazda | 626/MX-6 | | | | | | | | | | | | | |
| Mazda | | 2.0L FE EFI | 1986 | 1986 | | N/A | 35-41 | 44-46 | -21 | F3 | ALL | [136] | [61] | |
| Mazda | | 2.0L FE EFI | 1987 | 1987 | | N/A | 27-33 | 35-41 | -21 | F3 | ALL | [136] | [61] | |
| Mazda | | 2.0L FE EFI Turbo | 1986 | 1986 | | N/A | 35-41 | 44-46 | -21 | F3 | ALL | [136] | [61] | |
| Mazda | | 2.0L FE EFI Turbo | 1987 | 1987 | | N/A | 27-33 | 35-41 | -21 | F3 | ALL | [136] | [61] | |
| Mazda | | 2.0L F8 EFI | 1993 | 1995 | | N/A | 30-36 | 37-46 | -28 | F3 | ALL | [136] | [60] | |
| Mazda | | 2.2L F2 EFI | 1988 | 1992 | | N/A | 30-37 | 38-46 | -21 | F3 | ALL | [136] | [62] | |
| Mazda | | 2.2L F2 EFI Turbo | 1988 | 1989 | | N/A | 27-33 | 34-40 | -21 | F3 | ALL | [136] | [62] | |
| Mazda | | 2.5L KL EFI | 1993 | 1995 | | N/A | 30-36 | 39-45 | -20 | F3 | ALL | [136] | [60] | |
| Mazda | 929/929S | 3.0L JE SOHC EFI | 1988 | 1991 | | N/A | 31.3-36.3 | 38.3-45.5 | -21.3 | F3 | ALL | [136] | [65] | |

*** Note : Heading definitions for columns are found on page xii

Footnote references are found on pages 40-44 ***

PAGE 21

Standard Domestic & Foreign Fuel Rail Systems

| MAKE | MODEL | ENGINE | FROM YEAR | TO YEAR | VIN | KOEO | NORMAL IDLE | IDLE W/O VACUUM | DEADHEAD PRESSURE | ADAPTER FITTING | ADAPTER KIT | FITTING LOCATION | MANUAL PUMP ENERGIZE | MPO |
|---|---|---|---|---|---|---|---|---|---|---|---|---|---|---|
| Mazda | (cont.) | | | | | | | | | | | | | |
| Mazda | MX-3 | 3.0L JE DOHC EFI | 1990 | 1991 | | N/A | 31-38 | 38-46 | -21 | | ALL | | [65] | |
| | | 3.0L JE DOHC EFI | 1992 | 1995 | | N/A | 30-38 | 37-46 | -21 | | ALL | | [60] | |
| Mazda | MX-5/Miata | 1.6L B6 EFI | 1992 | 1993 | | N/A | 30-38 | 37-46 | -28 | F3 | ALL | [136] | [60] | |
| | | 1.8L B6 EFI | 1994 | 1995 | | N/A | 28-37 | 37-47 [67] | -25 | F3 | ALL | [136] | [60] | |
| | | 1.8L K8 DOHC EFI | 1992 | 1995 | | N/A | 30-38 | 37-46 | -28 | F3 | ALL | [136] | [60] | |
| Mazda | RX-7 | 1.6L B6 DOHC EFI | 1990 | 1993 | | N/A | 31-38 | 38-46 | -21 | | ALL | [154] | [60] | |
| | | 1.8L BP DOHC EFI | 1994 | 1995 | | N/A | 32-38 | 38-46 | -28 | | ALL | [154] | [60] | |
| Mazda | | 1.3L 13B EFI | 1984 | 1985 | | N/A | 28.4 | 36.97 | 21.3 | F3 | ALL | [154] | [84] | |
| | | 1.3L 13B EFI | 1986 | 1987 | | N/A | 28.4 | 35.6-37 | -21 | F3 | ALL | [154] | [85] | |
| | | 1.3L 13B EFI | 1988 | 1988 | | N/A | 28.4 | 34-39.8 | -21 | F3 | ALL | [154] | [85] | |
| | | 1.3L 13B EFI | 1989 | 1991 | | N/A | 27-33 | 34-39.8 | -21 | F3 | ALL | [154] | [85] | |
| | | 1.3L 13B EFI Turbo | 1987 | 1987 | | N/A | 28.4 | 35.6-37 | -21 | F3 | ALL | [154] | [85] | |
| | | 1.3L 13B EFI Turbo | 1988 | 1988 | | N/A | 28.4 | 34-39.8 | -21 | F3 | ALL | [154] | [85] | |
| | | 1.3L 13B EFI Turbo | 1989 | 1991 | | N/A | 27-33 | 34-39.8 | -21 | F3 | ALL | [154] | [85] | |
| | | 1.3L 13B EFI &Turbo | 1993 | 1995 | | N/A | 28-32 | 36-38 | -36 | F3 | ALL | [154] | [60] | |
| Mazda Truck | | | | | | | | | | | | | | |
| Mazda Trk. | B2200 | 2.2L F2 EFI | 1990 | 1993 | | N/A | 28-37 | 38-46 | -21 | F3 | ALL | [136] | [60] | |
| Mazda Trk. | B2300 | 2.3L EFI | 1994 | 1995 | | N/A | 30-33 | 39-42 | 82+ | F2 | ALL | [137] | [60] | |
| Mazda Trk. | B2600i | 2.6L G6 EFI | 1989 | 1989 | | N/A | 31-38 | 38-46 | -21 | F3 | ALL | [136] | [60] | |
| | | 2.6L G6 EFI | 1990 | 1993 | | N/A | 28-37 | 38-46 | -21 | F3 | ALL | [136] | [60] | |
| Mazda Trk. | B3000 | 3.0L V6 EFI | 1994 | 1995 | | N/A | 30-33 | 39-42 | 82+ | F2 | ALL | [137] | [60] | |
| Mazda Trk. | B4000 | 4.0L V6 EFI | 1994 | 1995 | | N/A | 30-33 | 39-42 | 82+ | F2 | ALL | [137] | [60] | |
| Mazda Trk. | MPV | 2.6L G6 EFI | 1989 | 1989 | | N/A | 31-38 | 38-46 | -21 | F3 | ALL | [136] | [62] | |
| | | 2.6L G6 EFI | 1990 | 1993 | | N/A | 30-37 | 38-46 | -21 | F3 | ALL | [136] | [62] | |
| | | 2.6L G6 EFI | 1994 | 1994 | | N/A | 30-36 | 39-45 | -28 | F3 | ALL | [136] | [60] | |
| | | 3.0L JE EFI | 1989 | 1989 | | N/A | 31-38 | 38-46 | -21 | F3 | ALL | [136] | [63] | |
| | | 3.0L JE EFI | 1990 | 1993 | | N/A | 30-37 | 38-46 | -21 | F3 | ALL | [136] | [60] | |
| | | 3.0L JE EFI | 1994 | 1994 | | N/A | 30-36 | 39-45 | -28 | F3 | ALL | [136] | [60] | |
| Mazda Trk. | Navajo | 4.0L V6 EFI | 1991 | 1994 | | N/A | 30-33 | 36-42 | 82+ | F2 | ALL | [137] | [60] | |
| Mercedes Benz | (See also CIS section pgs. 37-39) | | | | | | | | | | | | | |
| Mercedes | 300CE, E, SE, SL | 3.2L MPI | 1992 | 1993 | | 36 [114] | 48-52 | 54-61 | N/A | F3 | ALL | [137] | N/A | |
| Mercedes | 400SE | 4.2L MPI | 1992 | 1992 | | 36 [114] | 46-52 | 54-61 | N/A | F3 | ALL | [137] | N/A | |
| Mercedes | 500E, SEC, SEL, SL | 5.0L MPI | 1992 | 1993 | | 36 [114] | 46-52 | 54-61 | N/A | F3 | ALL | [137] | N/A | |
| Mercedes | 600SEL, SEC, SL | 6.0L MPI | 1992 | 1993 | | 36 [114] | 46-52 | 54-61 | N/A | F3 | ALL | [137] | N/A | |
| | | 4.2L MPI | 1994 | 1995 | | 36 [114] | 46-52 | 54-61 | N/A | F3 | ALL | [137] | N/A | |
| Mercedes | E500, S500, SL500 | 5.0L MPI | 1994 | 1995 | | 36 [114] | 48-52 | 54-61 | N/A | F3 | ALL | [137] | N/A | |

* Note : Heading definitions for columns are found on page xii       Footnote references are found on pages 40-44 *

PAGE 22

Standard Domestic & Foreign Fuel Rail Systems

| MAKE | MODEL | ENGINE | FROM YEAR | TO YEAR | VIN | KOEO | NORMAL IDLE | IDLE W/O VACUUM | DEADHEAD PRESSURE | ADAPTER FITTING | ADAPTER KIT | FITTING LOCATION | MANUAL PUMP ENERGIZE | RPO |
|---|---|---|---|---|---|---|---|---|---|---|---|---|---|---|
| Mercedes (CONT.) | | | | | | | | | | | | | | |
| Mercedes | C280 | 2.8L MPI | 1994 | 1996 | | 36 [114] | 46-52 | 54-61 | N/A | F3 | ALL | [137] | N/A | |
| Mercedes | E320, S320 | 3.2L MPI | 1994 | 1995 | | 36 [114] | 46-52 | 54-61 | N/A | F3 | ALL | [137] | N/A | |
| Mercedes | E420, S420 | | | | | | | | | | | | | |
| Mercedes | S600, SL600 | 6.0L MPI | 1994 | 1995 | | 36 [114] | 46-52 | 54-61 | N/A | F3 | ALL | [137] | N/A | |
| Mercury | | | | | | | | | | | | | | |
| Mercury | Capri | 1.6L L4 MFI | 1991 | 1994 | 6 | 40-45 | [16] | 40-45 [18] | 70+ | F3 | ALL | [145] | [22] | |
| | | 1.6L L4 MFI Turbo | 1991 | 1994 | 2 | 40-45 | [16] | 40-45 [18] | 70+ | F3 | ALL | [145] | [22] | |
| | | 2.3L L4 OHC MFI Turbo | 1984 | 1986 | T | 39-42 | [16] | 39-42 | 75+ | F2 | ALL | [137] | [19] | |
| | | 3.8L V6 TBI | 1984 | 1986 | 3 | N/A | 38-42 | N/A | 75+ | F2 | ALL | [139] | [19] | |
| | | 5.0L V6 TBI | 1984 | 1985 | M | 39-42 | 38-42 | 39-42 | 75+ | F2 | ALL | [139] | [19] | |
| | | 5.0L V8 HO SFI | 1986 | 1986 | M | 39-42 | [16] | 39-42 | 75+ | F2 | ALL | [137] | [19] | |
| Mercury | Cougar | 2.3L L4 OHC MFI Turbo | 1983 | 1986 | W | 39-42 | [16] | 42 [18] | 75+ | F2 | ALL | [137] | [19] | |
| | | 3.8L V6 TBI | 1984 | 1987 | 3 | N/A | 38-42 | N/A | 75+ | F2 | ALL | [139] | [19] | |
| | | 3.8L V6 MFI/SFI | 1988 | 1994 | 4 | 39-42 | [16] | 39-42 | 75+ | F2 | ALL | [137] | [19] | |
| | | 3.8L V6 SFI Super Charge | 1989 | 1995 | R | 42 | [16] | 42 [18] | 75+ | F2 | ALL | [137] | [19] | |
| | | 4.6L V8 OHC SFI | 1994 | 1996 | W | 39-42 | [16] | 39-42 | 75+ | F2 | ALL | [137] | [20] | |
| | | 5.0L V8 TBI | 1984 | 1985 | F | N/A | 38-42 | N/A | 75+ | F2 | ALL | [139] | [19] | |
| | | 5.0L V8 SFI | 1986 | 1993 | T | 39-42 | [16] | 39-42 | 75+ | F2 | ALL | [137] | [19] | |
| Mercury | Grand Marquis | 4.6L V8 OHC SFI | 1993 | 1996 | W | 39-42 | [16] | 39-42 | 75+ | F2 | ALL | [137] | [23] | |
| | | 5.0L V8 OHC SFI | 1983 | 1983 | F | N/A | 38-42 | N/A | 75+ | F2 | ALL | [139] | [21] | |
| | | 5.0L V8 TBI | 1984 | 1984 | F | N/A | 38-42 | N/A | 75+ | F2 | ALL | [137] | [19] | |
| | | 5.0L V8 SFI AND H.O. | 1986 | 1991 | E,F | 39-42 | 38-42 | 39-42 | 30+ | F4-F5 or F6-F7 | GM,DM,DB | [137] | [19] | |
| Mercury | Lynx | 1.6L L4 MFI | 1984 | 1985 | 5 | 39-42 | [16] | 39-42 | 75+ | F2 | ALL | [137] | [19] | |
| | | 1.6L L4 MFI TURBO | 1984 | 1985 | 8 | 42 | [16] | 42 [18] | 75+ | F2 | ALL | [137] | [19] | |
| | | 1.9L L4 MFI | 1986 | 1987 | J | 39-42 | [16] | 39-42 | 75+ | F2 | ALL | [137] | [19] | |
| | | 1.9L L4 TBI | 1987 | 1987 | 9 | N/A | 14-16 | N/A | 30+ | F4-F5 or F6-F7 | GM,DM,DB | [137] | [19] | |
| Mercury | Marquis | 3.8L V6 TBI | 1984 | 1986 | 3 | N/A | 39-42 | N/A | 75+ | F2 | ALL | [139] | [19] | |
| Mercury | Mystique | 2.0L L4 DOHC SFI | 1995 | 1996 | 3 | 39-42 | [16] | 39-42 | 70+ | F3 | ALL | [139] | [19] | |
| | | 2.5L V6 SFI | 1995 | 1996 | L | 39-42 | [16] | 39-42 | 75+ | F3 | ALL | [145] | [20] | |
| Mercury | Sable | 2.5L L4 HSC TBI | 1986 | 1988 | D | N/A | 14-16 | N/A | 30+ | F4-F5 or F6-F7 | GM,DM,DB | [139] | [20] | |
| | | 3.0L V6 MFI/SFI | 1986 | 1996 | U | N/A | [16] | N/A | 75+ | F2 | ALL | [145] | [19] | |
| | | 3.0L V6 SFI (Flex Fuel) | 1993 | 1996 | 1 | 39-42 | [16] | 39-42 | 75+ | F2 | ALL | [137] | [23] | |
| | | 3.8L V6 MFI/SFI | 1988 | 1996 | 4 | 39-42 | [16] | 39-42 | 75+ | F2 | ALL | [137] | [23] | |
| Mercury | Topaz | 2.3L L4 HSC TBI/H.O. | 1985 | 1987 | X | N/A | 14-16 | N/A | 30+ | F4-F5 or F6-F7 | GM,DM,DB | [139] | [19] | |
| | | 2.3L L4 HSC MFI/SFI | 1988 | 1994 | S | 50-60 | 45 | 50-60 | 75+ | F2 | ALL | [137] | [19] | |
| | | 3.0L V6 SFI | 1992 | 1994 | U | 39-42 | [16] | 39-42 | 75+ | F2 | ALL | [137] | [19] | |
| Mercury | Tracer | 1.6L L4 MFI | 1988 | 1989 | 5 | 38-40 | [16] | 38-40 | 65+ | F3 | ALL | [139] | [24] | |
| | | 1.8L L4 DOHC MFI/SFI | 1991 | 1996 | 8 | 40-45 | [16] | 40-45 | 75+ | F3 | ALL | [145] | [20] | |
| | | 1.9L L4 SFI | 1991 | 1996 | J | 39-42 | [16] | 39-42 | 75+ | F2 | ALL | [137] | [23] | |

* Note: Heading definitions for columns are found on page xii  Footnote references are found on pages 40-44 *

PAGE 23

Standard Domestic & Foreign Fuel Rail Systems

| MAKE | MODEL | ENGINE | FROM YEAR | TO YEAR | VIN | KOEO | NORMAL IDLE | IDLE W/O VACUUM | DEADHEAD PRESSURE | ADAPTER FITTING | ADAPTER KIT | FITTING LOCATION | MANUAL PUMP ENERGIZE | RPO |
|---|---|---|---|---|---|---|---|---|---|---|---|---|---|---|
| Mercury | Villager | 3.0L SFI | 1993 | 1996 | W | 40-43 | 32 | 40-43 | 65+ | F3 | ALL | [145] | [25] | |
| Merkur | Scorpio | | | | | | | | | | | | | |
| Merkur | XR4Ti | 2.9L V6 MFI | 1988 | 1989 | V | 39-42 | [16] | 39-42 | 70+ | F2 | ALL | [137] | [19] | |
| Mitsubishi | | 2.3L L4 OHC MFI Turbo | 1985 | 1989 | W | 40 | [16] | 40 [18] | 70+ | F2 | ALL | [137] | [19] | |
| Mitsubishi | 3000/GT | 3.0L MPI DOHC | 1991 | 1996 | B,J | 48 | 40 | 48 | 95 | F18 | GM,FM,FB | [136] | [9] | |
| | | 3.0L MPI DOHC Turbo | 1991 | 1996 | C,K | 48 | 40 | 48 | 95 | F18 | GM,FM,FB | [136] | [9] | |
| Mitsubishi | Cordia | 1.8L TBI Turbo | 1984 | 1988 | K,C | 36 | 33 | 36 | 75 | F18 | GM,FM,FB | [136] | [8] | |
| Mitsubishi | Diamante | 3.0L MPI SOHC | 1992 | 1996 | S | 48 | 40 | 48 | 95 | F18 | GM,FM,FB | [136] | [8] | |
| | | 3.0L MPI DOHC | 1992 | 1996 | B,J | 48 | 40 | 48 | 95 | F18 | GM,FM,FB | [136] | [8] | |
| Mitsubishi | Eclipse | 1.8L MPI | 1990 | 1994 | T | 48 | 40 | 48 | 95 | F18 | GM,FM,FB | [136] | [7] | |
| | | 2.0L MPI DOHC | 1990 | 1996 | E,Y,R | 48 | 40 | 48 | 95 | F18 | GM,FM,FB | [136] | [7] | |
| | | 2.0L MPI DOHC Turbo | 1990 | 1996 | F,U | 48 | 40 | 48 | 95 | F18 | GM,FM,FB | [136] | [7] | |
| Mitsubishi | Expo / LRV | 1.8L MPI | 1992 | 1996 | C | 48 | 40 | 48 | 95 | F18 | GM,FM,FB | [136] | [7] | |
| | | 2.4L MPI | 1992 | 1996 | G,L,W | 48 | 40 | 48 | 95 | F18 | GM,FM,FB | [136] | [7] | |
| Mitsubishi | Galant | 2.0L MPI SOHC | 1989 | 1993 | C | 48 | 40 | 48 | 95 | F18 | GM,FM,FB | [136] | [8] | |
| | | 2.0L MPI DOHC | 1989 | 1996 | V,D | 48 | 40 | 48 | 95 | F18 | GM,FM,FB | [136] | [8] | |
| | | 2.0L MPI DOHC Turbo | 1989 | 1990 | E,Y,R | 48 | 40 | 48 | 50 | F18 | GM,FM,FB | [136] | [8] | |
| | | 2.4L TBI | 1985 | 1985 | L | N/A | 35.8 | N/A | 50 | F18 | GM,FM,FB | [136] | [8] | |
| | | 2.4L MPI | 1986 | 1994 | | 48 | 40 | 48 | 95 | F18 | GM,FM,FB | [136] | [8] | |
| | | 3.0L MPI SOHC | 1986 | 1988 | G,L,W,S | 48 | 40 | 48 | 95 | F18 | GM,FM,FB | [136] | [8] | |
| Mitsubishi | Mirage | 1.5L MPI | 1988 | 1996 | A,X | 48 | 40 | 48 | 95 | F18 | GM,FM,FB | [136] | [8] | |
| | | 1.6L TBI Turbo | 1984 | 1988 | F | 36 | 33 | 36 | 75 | F18 | GM,FM,FB | [136] | [8] | |
| | | 1.6L MPI DOHC | 1989 | 1990 | Y | 48 | 40 | 48 | 85 | F18 | GM,FM,FB | [136] | [7] | |
| | | 1.6L MPI DOHC Turbo | 1989 | 1989 | Z | 48 | 40 | 48 | 85 | F18 | GM,FM,FB | [136] | [7] | |
| | | 1.8L MPI | 1990 | 1996 | T | 48 | 40 | 48 | 95 | F18 | GM,FM,FB | [136] | [7] | |
| Mitsubishi | Montero | 3.0L MPI SOHC | 1989 | 1996 | S | 48 | 40 | 48 | 95 | F18 | GM,FM,FB | [136] | [8] | |
| Mitsubishi | Precis | 1.5L MPI | 1990 | 1996 | | 48 | 40 | 48 | 95 | F18 | GM,FM,FB | [136] | [11] | |
| Mitsubishi | Sigma | | 1989 | 1990 | A,X | 48 | 40 | 48 | 95 | F18 | GM,FM,FB | [136] | [4] | |
| Mitsubishi | Station | 3.0L MPI SOHC | 1989 | 1990 | S | 48 | 40 | 48 | 95 | F18 | GM,FM,FB | [136] | [8] | |
| Mitsubishi | Tredia | 2.6L TBI Turbo | 1983 | 1983 | 7,H,N | N/A | 36 | N/A | 50 | F18 | GM,FM,FB | [136] | [2] | |
| | | 2.6L TBI Turbo | 1984 | 1989 | 7,H,N | N/A | 36 | N/A | 50 | F18 | GM,FM,FB | [136] | [4] | |
| Mitsubishi | Truck | 1.8L TBI Turbo | 1984 | 1988 | F | 36 | 33 | 36 | 75 | F18 | GM,FM,FB | [136] | [6] | |
| | | 2.4L MPI | 1991 | 1994 | G,L,W | 48 | 40 | 48 | 95 | F18 | GM,FM,FB | [136] | [12] | |
| | | 3.0L MPI SOHC | 1990 | 1990 | S | 48 | 40 | 48 | 95 | F18 | GM,FM,FB | [136] | [3] | |
| | | 3.0L MPI SOHC | 1991 | 1996 | S | 48 | 40 | 48 | 95 | F18 | GM,FM,FB | [136] | [12] | |

* Note: Heading definitions for columns are found on page xii    Footnote references are found on pages 40-44 *

PAGE 24

Standard Domestic & Foreign Fuel Rail Systems

| MAKE | MODEL | ENGINE | FROM YEAR | TO YEAR | VIN | KOEO | NORMAL IDLE | IDLE W/O VACUUM | DEADHEAD PRESSURE | ADAPTER FITTING | ADAPTER KIT | FITTING LOCATION | MANUAL PUMP ENERGIZE | RPO |
|---|---|---|---|---|---|---|---|---|---|---|---|---|---|
| Mitsubishi (cont.) | Van/Wagon | 2.4L MPI | 1986 | 1991 | G,L,W | 48 | 40 | 48 | 95 | F18 | GM,FM,FB | [136] | [13] | |
| Nissan | 200SX | | | | | | | | | | | | | |
| | | CA18ET-Turbo | 1984 | 1988 | | 37 | 30 [100] | 37 | -21 | F3 | ALL | [98] | [88] (Early-GW0 VIN) [88] | |
| | | CA20E | 1984 | 1987 | | 37 | 30 [100] | 37 | -21 | F3 | ALL | [98] | [98] | |
| | | CA20E | 1987 | 1987 | | 37 | 30 [100] | 37 | -21 | F3 | ALL | [98] | [98] | |
| | | CA20E | 1988 | 1988 | | 44 | 37 [100] | 44 | N/A | F3 | ALL | [98] | (Midyear--GW1 VIN) [70] | |
| | | VG30E | 1987 | 1988 | | 37 | 30 [100] | 37 | -10 | F3 | ALL | [98] | [70] | |
| | | Z20E | 1981 | 1981 | | N/A | 30 [100] | N/A | -21 | F3 | ALL | [98] | [71] | |
| | | Z22E | 1982 | 1983 | | 37 | 30 [100] | 37 | -21 | F3 | ALL | [98] | [71] | |
| Nissan | 240SX | | | | | | | | | | | | | |
| | | KA24DE | 1991 | 1993 | | 43 | 34 [100] | 43 | N/A | F3 | ALL | [98] | [72] | |
| | | KA24DE | 1995 | 1995 | | 43 | 34 [100] | 43 | N/A | F3 | ALL | [98] | [73] | |
| | | KA24E | 1989 | 1990 | | 43 | 33+[100] | 43 | N/A | F3 | ALL | [98] | [72] | |
| Nissan | 280ZX | | | | | | | | | | | | | |
| | | L28E | 1981 | 1981 | | N/A | 30 [100] | 37 | -21 | F3 | ALL | [98] | [74] | |
| | | L28E | 1982 | 1983 | | 37 | 30 [100] | 37 | -21 | F3 | ALL | [98] | [74] | |
| | | L28ET-Turbo | 1981 | 1981 | | 37 | 30 [100] | 37 | -21 | F3 | ALL | [98] | [74] | |
| | | L28ET-Turbo | 1982 | 1983 | | 37 | 30 [100] | 37 | -10 | F3 | ALL | [98] | [75] | |
| Nissan | 300ZX | | | | | | | | | | | | | |
| | | VG30DE | 1990 | 1995 | | 43.4 | 36.3 [100] | 43.4 | N/A | F3 | ALL | [98] | [76] | |
| | | VG30DETT | 1990 | 1995 | | 43.4 | 36.3 [100] | 43.4 | N/A | F3 | ALL | [98] | [76] | |
| | | VG30E | 1984 | 1989 | | 37 | 30 [100] | 37 | -10 | F3 | ALL | [98] | [77] | |
| | | VG30ET-Turbo | 1984 | 1989 | | 37 | 30 [100] | 37 | -10 | F3 | ALL | [98] | [77] | |
| Nissan | Altima | | | | | | | | | | | | | |
| | | KA24DE | 1993 | 1994 | | 43 | 34 [100] | 43 | N/A | F3 | ALL | [98] | [78] | |
| | | KA24DE | 1995 | 1995 | | 43 | 34 [100] | 43 | N/A | F3 | ALL | [98] | [79] | |
| Nissan | Axxess | | | | | | | | | | | | | |
| | | KA24E | 1990 | 1990 | | 43 | 33 [100] | 43 | N/A | F3 | ALL | [98] | [80] | |
| Nissan | Maxima | | | | | | | | | | | | | |
| | | L24E | 1981 | 1981 | | N/A | 30 [100] | 37 | -21 | F3 | ALL | [98] | [71] | |
| | | L24E | 1982 | 1984 | | 37 | 30 [100] | 37 | -21 | F3 | ALL | [98] | [71] | |
| | | VE30DE | 1992 | 1994 | | 43 | 36 [100] | 43 | -10 | F3 | ALL | [98] | [83] | |
| | | VG30E | 1985 | 1988 | | 37 | 30 [100] | 37 | N/A | F3 | ALL | [98] | [84] | |
| | | VG30E | 1989 | 1990 | | 34 | 14 [100] | 14 | N/A | F3 | ALL | [98] | [85] | |
| | | VG30DE Federal | 1995 | 1995 | | 43.4 | 36.3 [100] | 43.4 | N/A | F3 | ALL | [98] | [86] | |
| | | VG30DE California | 1995 | 1995 | | 43 | 34 [100] | 43 | N/A | F3 | ALL | [98] | [87] | |
| Nissan | Pulsar | | | | | | | | | | | | | |
| | | CA16DE | 1987 | 1987 | | 36 | 28 [100] | 36 | N/A | F3 | ALL | [98] | [88] | |
| | | CA16DE | 1988 | 1989 | | 43 | 36 [100] | 43 | N/A | F3 | ALL | [98] | [89] | |
| | | E15ET-Turbo | 1983 | 1983 | | 37 | 36 [100] | 37 | -10 | F3 | ALL | [98] | [90] | |
| | | E16 | 1987 | 1988 | | 14 | 14 [100] | 14 | N/A | F3 | ALL | [98] | [89] | |
| | | GA16 | 1989 | 1990 | | 34 | 36 [100] | 34 | N/A | F3 | ALL | [98] | [89] | |
| | | GA16DE | 1991 | 1994 | | 43 | 36 [100] | 43 | N/A | F3 | ALL | [98] | [92] | |
| | | SR20DE | 1991 | 1994 | | 43 | 36 [100] | 43 | N/A | F3 | ALL | [98] | [87] | |
| Nissan | Sentra/200SX | | | | | | | | | | | | | |
| | | GA16DE | 1995 | 1995 | | 43 | 34 [100] | 43 | N/A | F3 | ALL | [98] | [73] | |
| | | SR20DE | 1995 | 1995 | | 43 | 34 [100] | 43 | N/A | F3 | ALL | [98] | [73] | |
| Nissan | Quest | | | | | | | | | | | | | |

* Note : Heading definitions for columns are found on page xii          Footnote references are found on pages 40-44 *

Standard Domestic & Foreign Fuel Rail Systems

| MAKE | MODEL | ENGINE | FROM YEAR | TO YEAR | VIN | KOEO | NORMAL IDLE | IDLE W/O VACUUM | DEADHEAD PRESSURE | ADAPTER FITTING | ADAPTER KIT | FITTING LOCATION | MANUAL JMP ENERGIZE | RPO |
|---|---|---|---|---|---|---|---|---|---|---|---|---|---|---|
| Nissan | (cont.) | | | | | | | | | | | | | |
| Nissan | Sentra | VG30E | 1993 | 1995 | | 43 | 34 [100] | 43 | N/A | F3 | ALL | [98] | [91] | |
| | | E16i 2WD | 1987 | 1988 | | 14 | 14 [100] | 14 | N/A | | ALL | [99] | [88] | |
| | | E16i 4WD | 1987 | 1988 | | 36.3 | 36.3 [100] | 36.3 | N/A | | ALL | [99] | [88] | |
| | | GA16i | 1989 | 1990 | | 34 | 34 [100] | 34 | N/A | | ALL | [99] | [89] | |
| Nissan | Sentra/NX | | | | | | | | | | | | | |
| Nissan | Stanza | CA20E | 1984 | 1986 | | 36.3 | 30 [100] | 37 | -21 | F3 | ALL | [98] | [93] | |
| | | CA20E | 1987 | 1987 | | 37 | 30 [100] | 37 | N/A | F3 | ALL | [98] | [94] | |
| | | CA20E | 1988 | 1989 | | 44 | 37 [100] | 44 | N/A | F3 | ALL | [98] | [94] | |
| | | KA24E | 1990 | 1992 | | 43 | 33 [100] | 43 | N/A | F3 | ALL | [98] | [95] | |
| Nissan | Stanza Wagon | CA20E | 1986 | 1986 | | 37 | 30 [100] | 37 | -21 | F3 | ALL | [98] | [96] | |
| | | CA20E | 1987 | 1987 | | 37 | 30 [100] | 37 | N/A | F3 | ALL | [98] | [94] | |
| | | CA20E | 1988 | 1988 | | 44 | 37 [100] | 44 | N/A | F3 | ALL | [98] | [94] | |
| Nissan Truck | | | | | | | | | | | | | | |
| Nissan Trk | 720 Truck | Z24i | 1986 | 1986 | | 14 | 14 [100] | 14 | N/A | F3 | ALL | [99] | [69] | |
| Nissan Trk | D21 Truck/Pathfinder | VG30i | 1986.5 | 1989 | | 36.3 | 36.3 [100] | 36.3 | N/A | F3 | ALL | [99] | [81] | |
| | | Z24i | 1986.5 | 1989 | | 36.3 | 36.3 [100] | 36.3 | N/A | F3 | ALL | [99] | [81] | |
| | | VG30E | 1990 | 1995 | | 43 | 34 [100] | 43 | N/A | F3 | ALL | [98] | [82] | |
| | | KA24E | 1990 | 1995 | | 43 | 33 [100] | 43 | N/A | F3 | ALL | [98] | [82] | |
| Nissan Trk | Van | Z24i | 1987 | 1988 | | 36.3 | 36.3 [100] | 36.3 | N/A | F3 | ALL | [99] | [97] | |
| | | Z24i | 1990 | 1990 | | 36.3 | 36.3 [100] | 36.3 | N/A | F3 | ALL | [99] | [97] | |
| Oldsmobile | | | | | | | | | | | | | | |
| Olds | 98 Regency (FWD) | | | | | | | | | | | | | |
| | | 3.8L V6 MFI | 1984 | 1985 | 3 | 34-40 | 25-35 | 34-40 | 80+ | F1 | GM,DM,FM,DB | [140] | [31] | LN3 |
| | | 3.8L V6 DOHC MFI | 1988 | 1984 | 3 | 34-40 | 25-35 | 34-40 | 80+ | F1 | GM,DM,FM,DB | [140] | [31] | LG3 |
| | | 3.8L V6 OHC MFI | 1987 | 1988 | B | 34-40 | 25-35 | 34-40 | 80+ | F1 | GM,DM,FM,DB | [140] | [31] | LG3 |
| | | 3.8L V6 SFI | 1985 | 1986 | C | 34-40 | 25-35 | 34-40 | 80+ | F1 | GM,DM,FM,DB | [140] | [31] | LN3 |
| | | 3800 V6 SFI | 1988 | 1991 | L | 40-47 | [16] | 34-40 | 80+ | F1 | GM,DM,FM,DB | [137] | [32] | LG2 |
| | | 3.8L V6 SFI | 1990 | 1995 | 1 | 40-47 | [16] | 40-47 | 80+ | F1 | GM,DM,FM,DB | [137] | [32] | L27 |
| | | 3.8L V6 SFI | 1992 | 1995 | L | 40-47 | [16] | 40-47 | 80+ | F1 | GM,DM,FM,DB | [137] | [32] | L67 |
| | | 3.8L V6 SFI | 1988 | 1996 | 1 | 40-47 | [16] | 40-47 | 80+ | F1 | GM,DM,FM,DB | [137] | [33] | L67 |
| Olds | Achieve | 2.3L L4 DOHC MFI | 1992 | 1995 | D | 40-47 | [16] | 40-47 | 80+ | F1 | GM,DM,FM,DB | [140] | [42] | LD2 |
| | | 2.3L L4 DOHC MFI HO | 1992 | 1994 | A | 40-47 | [16] | 40-47 | 80+ | F1 | GM,DM,FM,DB | [140] | [42] | LG0 |
| | | 2.3L L4 OHC MFI | 1992 | 1994 | 3 | 41-47 | [16] | 41-47 | 80+ | F1 | GM,DM,FM,DB | [140] | [42] | L40 |
| | | 2.4L L4 OHC SFI | 1996 | 1996 | T | 40-47 | [16] | 40-47 | 80+ | F1 | GM,DM,FM,DB | [140] | [34] | LD9 |
| | | 3.1L V6 SFI | 1994 | 1996 | M | 40-47 | [16] | 40-47 | 80+ | F1 | GM,DM,FM,DB | [137] | [29] | L82 |
| | | 3300 V6 MFI | 1992 | 1993 | N | 40-47 | [16] | 40-47 | 80+ | F1 | GM,DM,FM,DB | [137] | [42] | LG7 |
| Olds | Aurora | 4.0L V8 SFI | 1995 | 1996 | C | 40-47 | [16] | 40-47 | 80+ | F1 | GM,DM,FM,DB | [137] | [36] | L47 |
| Olds | Bravada | 4.3L V6 TBI | 1988 | 1989 | Z | 9-13† | 9-13 | N/A | 15+ | F10-F11 | GM,DM | [140] | [35] | LB4 |
| | | 4.3L V6 TBI | 1990 | 1993 | Z | 9-13† | 9-13 | N/A | 15+ | F10-F11 | GM,DM | [140] | [44] | LB4 |
| | | 4.3L V6 TBI | 1994 | 1995 | Z | 9-13† | 9-13 | N/A | 15+ | F10-F11 | GM,DM | [140] | [30] | LB4 |
| | | 4.3L V6 CPI | 1992 | 1995 | W | 60-66 | [16] | 60-66 | 75 [159] | F1 | GM,DM,FM,DB | [137] | [27] | L35 |

* Note: Heading definitions for columns are found on page xii    Footnote references are found on pages 40-44 **

Standard Domestic & Foreign Fuel Rail Systems

| MAKE | MODEL | ENGINE | FROM YEAR | TO YEAR | VIN | KOEO | NORMAL IDLE | IDLE W/O VACUUM | DEADHEAD PRESSURE | ADAPTER FITTING | ADAPTER KIT | FITTING LOCATION | MANUAL PUMP ENERGIZE | RPO |
|---|---|---|---|---|---|---|---|---|---|---|---|---|---|
| Olds | Calais | 4.3L V6 SCPI | 1985 | 1986 | W | 80-86 | [16] | 80-86 | 75[159] | | GM,DM,FM,DB | [137] | [29] | L35 |
| | | 2.3L L4 DOHC MFI | 1987 | 1991 | D | 40-47 | [16] | 40-47 | 60+ | F1 | GM,DM,FM,DB | [137] | [42] | LD2 |
| | | 2.3L L4 DOHC MFI HO | 1989 | 1991 | A | 40-47 | [16] | 40-47 | 60+ | F1 | GM,DM,FM,DB | [140] | [42] | LG0 |
| | | 2.5L L4 TBI | 1985 | 1988 | U | 9-13[*] | [16] | N/A | 15+ | F10-F11 | GM,DM | [140] | [43] | LR8 |
| | | 2.5L L4 TBI | 1989 | 1991 | E | 9-13[*] | [16] | N/A | 15+ | F10-F11 | GM,DM | [140] | [43] | LR8 |
| | | 3.0L V6 MFI | 1985 | 1988 | L | 40-47 | [16] | 40-47 | 60+ | F1 | GM,DM,FM,DB | [137] | [42] | LN7 |
| | | 3300 V6 MFI | 1989 | 1993 | N | 40-47 | [16] | 40-47 | 60+ | F1 | GM,DM,FM,DB | [137] | [42] | LG7 |
| Olds | Cutlass Ciera / Wagon | 2.5L L4 TBI | 1982 | 1991 | R | 9-13[*] | 9-13 | N/A | 15+ | F8-F9 or F10-F11 | GM,DM | [140] | [30] | LR8 |
| | | 2.8L V6 MFI | 1985 | 1989 | W | 40-47 | [16] | 40-47 | 60+ | F1 | GM,DM,FM,DB | [137] | [27] | LB6 |
| | | 3.0L V6 MFI | 1989 | 1993 | N | 40-47 | [16] | 40-47 | 60+ | F1 | GM,DM,FM,DB | [137] | [27] | LN7 |
| | | 3.1L V6 SFI | 1994 | 1996 | M | 40-47 | [16] | 40-47 | 60+ | F1 | GM,DM,FM,DB | [137] | [29] | L82 |
| | | 3300 V6 MFI | 1989 | 1993 | N | 34-40 | [16] | 34-40 | 60+ | F1 | GM,DM,FM,DB | [137] | [29] | LG7 |
| | | 3.8L V6 MFI | 1985 | 1988 | 3 | 40-47 | [16] | 40-47 | 60+ | F1 | GM,DM,FM,DB | [137] | [27] | LG7 |
| | | 2.2L L4 MFI | 1993 | 1995 | 4 | 41-47 | [16] | 41-47 | 60+ | F1 | GM,DM,FM,DB | [137] | [31] | LN3 |
| | | 2.2L L4 SFI | 1996 | 1996 | 4 | 41-47 | [16] | 41-47 | 60+ | F1 | GM,DM,FM,DB | [140] | [29] | LN2 |
| Olds | Cutlass Supreme (FWD) | 2.3L L4 DOHC MFI | 1990 | 1991 | D | 40-47 | [16] | 40-47 | 60+ | F1 | GM,DM,FM,DB | [137] | [37] | LD2 |
| | | 2.3L L4 DOHC MFI | 1992 | 1995 | D | 40-47 | [16] | 40-47 | 60+ | F1 | GM,DM,FM,DB | [140] | [37] | LD2 |
| | | 2.3L L4 DOHC MFI HO | 1990 | 1991 | A | 40-47 | [16] | 40-47 | 60+ | F1 | GM,DM,FM,DB | [137] | [37] | LG0 |
| | | 2.3L L4 DOHC MFI HO | 1992 | 1994 | A | 40-47 | [16] | 40-47 | 60+ | F1 | GM,DM,FM,DB | [140] | [37] | LG0 |
| | | 2.8L V6 MFI | 1988 | 1988 | W | 40-47 | [16] | 40-47 | 60+ | F1 | GM,DM,FM,DB | [137] | [37] | LB6 |
| | | 3.1L V6 MFI | 1989 | 1994 | T | 41-47 | [16] | 41-47 | 60+ | F1 | GM,DM,FM,DB | [137] | [37] | LH0 |
| | | 3.1L V6 SFI Calif | 1993 | 1993 | T | 41-47 | [16] | 41-47 | 60+ | F1 | GM,DM,FM,DB | [137] | [37] | LH0 |
| | | 3.1L V6 SFI | 1994 | 1995 | M | 41-47 | [16] | 41-47 | 60+ | F1 | GM,DM,FM,DB | [137] | [37] | L82 |
| | | 3.1L V6 SFI | 1996 | 1996 | M | 40-47 | [16] | 40-47 | 60+ | F1 | GM,DM,FM,DB | [137] | [37] | L82 |
| | | 3.4L V6 OHC MFI | 1991 | 1993 | X | 41-47 | [16] | 41-47 | 60+ | F1 | GM,DM,FM,DB | [137] | [34] | LQ1 |
| | | 3.4L V6 OHC SFI | 1994 | 1995 | X | 41-47 | [16] | 41-47 | 60+ | F1 | GM,DM,FM,DB | [137] | [37] | LQ1 |
| | | 3.4L V6 OHC SFI | 1996 | 1996 | X | 41-47 | [16] | 41-47 | 60+ | F1 | GM,DM,FM,DB | [137] | [34] | LQ1 |
| Olds | Delta 88 (FWD) | 3.0L V6 MFI | 1985 | 1988 | L | 40-47 | 31-42 | 40-47 | 60+ | F1 | GM,DM,FM,DB | [137] | [31] | LN7 |
| | | 3.8L V6 SFI | 1985 | 1988 | B | 34-40 | 25-35 | 34-40 | 60+ | F1 | GM,DM,FM,DB | [140] | [32] | LG2 |
| | | 3.8L V6 SFI | 1986 | 1988 | 3 | 40-47 | [16] | 40-47 | 60+ | F1 | GM,DM,FM,DB | [140] | [32] | LG3 |
| | | 3800 V6 SFI | 1988 | 1991 | C | 9-13 | 9-13 | N/A | 15+ | F10-F11 | GM,DM | [140] | [32] | LN3 |
| | | 3.8L V6 SFI | 1990 | 1995 | L | 9-13 | 9-13 | N/A | 15+ | F10-F11 | GM,DM | [140] | [32] | L27 |
| | | 3.8L V6 SFI | 1992 | 1995 | 1 | 9-13 | 9-13 | N/A | 15+ | F10-F11 | GM,DM | [140] | [32] | L67 |
| | | 3.8L V6 SFI | 1996 | 1996 | 1 | 9-13 | 9-13 | N/A | 15+ | F10-F11 | GM,DM | [140] | [33] | L67 |
| | | 3.8L V6 SFI | 1995 | 1995 | K | 40-47 | 9-13 | 48-55 | 60+ | F1 | GM,DM,FM,DB | [137] | [32] | L36 |
| | | 3.8L V6 SFI | 1996 | 1996 | K | 40-47 | [16] | 48-55 | 60+ | F1 | GM,DM,FM,DB | [137] | [34] | L36 |
| Olds | Firenza | 1.8L L4 OHC TBI | 1982 | 1983 | O | 9-13[*] | 9-13 | N/A | 15+ | F8-F9 or F10-F11 | GM,DM | [140] | [40] | LH8 |
| | | 1.8L L4 OHC TBI | 1984 | 1984 | O | 9-13[*] | 9-13 | N/A | 15+ | F8-F9 or F10-F11 | GM,DM | [140] | [41] | LH8 |
| | | 2.0L L4 TBI | 1983 | 1985 | P | 9-13[*] | 9-13 | N/A | 15+ | F10-F11 | GM,DM | [140] | [40] | LQ5 |
| | | 2.0L L4 TBI | 1985 | 1986 | P | 9-13[*] | 9-13 | N/A | 15+ | F10-F11 | GM,DM | [140] | [41] | LQ5 |
| | | 2.0L L4 TBI | 1987 | 1988 | 1 | 9-13[*] | 9-13 | N/A | 15+ | F10-F11 | GM,DM | [140] | [42] | L8 |
| | | 2.0L L4 MFI | 1985 | 1988 | K | 40-47 | [16] | 40-47 | 60+ | F1 | GM,DM,FM,DB | [140] | [42] | LT2 |
| | | 2.8L V6 MFI | 1986 | 1988 | W | 40-47 | [16] | 40-47 | 60+ | F1 | GM,DM,FM,DB | [137] | [42] | LB6 |

* Note : Heading definitions for columns are found on page xii     Footnote references are found on pages 40-44 *

PAGE 27

Standard Domestic & Foreign Fuel Rail Systems

| MAKE | MODEL | ENGINE | FROM YEAR | TO YEAR | VIN | KOEO | NORMAL IDLE | IDLE W/O VACUUM | DEADHEAD PRESSURE | ADAPTER FITTING | ADAPTER KIT | FITTING LOCATION | MANUAL PUMP ENERGIZE | RPO |
|---|---|---|---|---|---|---|---|---|---|---|---|---|---|---|
| Olds | Omega | | | | | | | | | | | | | |
| Olds | Silhouette | 2.5L L4 TBI | 1982 | 1986 | R | 9-13[*] | 9-13 | N/A | 15+ | F8-F9 or F10-F11 | GM,DM | [140] | [30] | LR8 |
| | | 3.1L V6 TBI | 1990 | 1993 | D | 9-13[*] | 9-13 | N/A | 15+ | F12-F13 | GM,DM | [140] | [43] | LG6 |
| | | 3.1L V6 TBI | 1994 | 1995 | D | 9-13[*] | 9-13 | N/A | 15+ | F12-F13 | GM,DM | [140] | [45] | LG8 |
| | | 3.4L V6 SFI | 1996 | 1996 | E | 41-47 | [16] | 41-47 | 60+ | F1 | GM,DM,FM,DB | [137] | [34] | LA1 |
| | | 3.8L V6 SFI | 1992 | 1995 | L | 41-47 | [16] | 41-47 | 60+ | F1 | GM,DM,FM,DB | [137] | [50] | L27 |
| Olds | Toronado | | | | | | | | | | | | | |
| | | 3.8L V6 SFI | 1988 | 1988 | B | 34-40 | 25-35 | 34-40 | 60+ | F1 | GM,DM,FM,DB | [137] | [38] | LG2 |
| | | 3.8L V6 SFI | 1986 | 1987 | 3 | 34-40 | 25-35 | 34-40 | 60+ | F1 | GM,DM,FM,DB | [137] | [38] | LG3 |
| | | 3800 V6 SFI | 1988 | 1991 | C | 40-47 | [16] | 40-47 | 60+ | F1 | GM,DM,FM,DB | [137] | [38] | LN3 |
| | | 3.8L V6 SFI | 1991 | 1992 | L | 40-47 | [16] | 40-47 | 60+ | F1 | GM,DM,FM,DB | [137] | [38] | L27 |
| Peugeot | (See also CIS section pgs. 34-38) | | | | | | | | | | | | | |
| Peugeot | 405 DL, 405 S | | | | | | | | | | | | | |
| | 505 | 1.9L MPI | 1989 | 1993 | | N/A | 39-45 | 46-52 | N/A | | ALL | | N/A | |
| | | 2.2L MPI | 1986 | 1993 | | N/A | 33-39 | 40-46 | N/A | F3 | ALL | [137] | N/A | |
| | | 2.8L MPI | 1987 | 1990 | | N/A | 33-39 | 40-46 | N/A | F3 | ALL | [137] | N/A | |
| Peugeot | 505 S | 2.2L MPI Turbo | 1987 | 1993 | | N/A | 34-37 | 41-45 | N/A | F3 | ALL | [137] | N/A | |
| Plymouth | | | | | | | | | | | | | | |
| Plymouth | Acclaim | 2.2L/2.5L TBI | 1989 | 1989 | D,K | N/A | 14.5 | N/A | 45 | F3 | ALL | [138] | [2] | |
| | | 2.2L/2.5L TBI | 1990 | 1990 | D,K | N/A | 14.5 | N/A | 45 | F3 | ALL | [138] | [5] | |
| | | 2.2L/2.5L TBI | 1991 | 1991 | D,K | N/A | 39 | N/A | 75 | F29-F30 | GM,DM | [138] | [5] | |
| | | 2.2L/2.5L TBI | 1992 | 1994 | D,K | N/A | 39 | N/A | 75 | F29-F30 | GM,DM | [138] | [5] | |
| | | 2.2L/2.5L MPI Turbo I | 1989 | 1989 | E,J | 55 | 50 | 55 | 95 | F1 | GM,DM,FM,DB | [137] | [2] | |
| | | 2.2L/2.5L MPI Turbo I | 1990 | 1991 | E,J | 55 | 50 | 55 | 95 | F1 | GM,DM,FM,DB | [137] | [5] | |
| | | 2.2L/2.5L MPI Turbo I | 1991 | 1992 | E,J | 55 | 50 | 55 | 95 | F1 | GM,DM,FM,DB | [137] | [2] | |
| | | 3.0L MPI | 1989 | 1989 | 3 | 48 | 40 | 48 | 85 | F3 | ALL | [138] | [2] | |
| | | 3.0L MPI | 1990 | 1991 | 3 | 48 | 40 | 48 | 85 | F3 | ALL | [138] | [5] | |
| | | 3.0L MPI | 1992 | 1994 | 3 | 48 | 40 | 48 | 85 | F3 | ALL | [138] | [3] | |
| Plymouth | Breeze | 2.0L/2.4L MPI | 1995 | 1996 | C,X | 49 | 49 | N/A | [1] | F1 | GM,DM,FM,DB | [137] | [3] | |
| | | 2.5L V6 MPI | 1995 | 1996 | H | 49 | 49 | N/A | [1] | F1 | GM,DM,FM,DB | [137] | [3] | |
| Plymouth | Caravelle | 2.2L TBI | 1984 | 1985 | D | N/A | 36 | N/A | 75 | F3 | ALL | [138] | [2] | |
| | | 2.2L/2.5L TBI | 1986 | 1988 | D,K | N/A | 14.5 | N/A | 45 | F3 | ALL | [138] | [2] | |
| | | 2.2L/2.5L MPI Turbo I | 1986 | 1988 | E,J | 55 | 50 | 55 | 95 | F1 | GM,DM,FM,DB | [137] | [2] | |
| Plymouth | Laser | 1.8L MPI | 1990 | 1994 | T,B | 48 | 40 | 48 | 85 | F18 | GM,FM,FB | [138] | [7] | |
| | | 2.0L MPI DOHC | 1990 | 1994 | E,Y,R | 48 | 40 | 48 | 85 | F18 | GM,FM,FB | [138] | [7] | |
| | | 2.0L MPI DOHC Turbo | 1990 | 1994 | F,U | 48 | 40 | 48 | 85 | F18 | GM,FM,FB | [138] | [7] | |
| Plymouth | Neon | 2.0L MPI | 1995 | 1996 | C | 49 | 49 | N/A | [1] | F1 | GM,DM,FM,DB | [137] | [3] | |
| Plymouth | Reliant | 2.2L TBI | 1984 | 1985 | D | N/A | 36 | N/A | 75 | F3 | ALL | [138] | [2] | |
| | | 2.2L/2.5L TBI | 1986 | 1989 | D,K | N/A | 14.5 | N/A | 45 | F3 | ALL | [138] | [2] | |

*** Note: Heading definitions for columns are found on page xii

Footnote references are found on pages 40-44 ***

Domestic & Foreign Fuel Rail Systems

| MAKE | MODEL | ENGINE | FROM YEAR | TO YEAR | VIN | KOEO | NORMAL IDLE | IDLE W/O VACUUM | DEADHEAD PRESSURE | ADAPTER FITTING | ADAPTER KIT | FITTING LOCATION | MANUAL PUMP ENERGIZE | RPO |
|---|---|---|---|---|---|---|---|---|---|---|---|---|---|---|
| Plymouth | Sundance / Duster (CONT.) | 2.2L/2.5L TBI | 1987 | 1990 | D,K | N/A | 14.5 | N/A | 45 | F3 | ALL | [138] | [2] | |
| | | 2.2L/2.5L TBI | 1991 | 1991 | D,K | N/A | 39 | N/A | 75 | F29-F30 | GM,DM | [138] | [5] | |
| | | 2.2L/2.5L TBI | 1992 | 1994 | D,K | N/A | 39 | N/A | 75 | F29-F30 | GM,DM | [138] | [3] | |
| | | 2.2L/2.5L MPI Turbo I | 1987 | 1990 | E,J | 55 | 50 | 55 | 85 | F1 | GM,DM,FM,DB | [137] | [2] | |
| | | 2.2L/2.5L MPI Turbo I | 1991 | 1991 | E,J | 55 | 50 | 55 | 85 | F1 | GM,DM,FM,DB | [137] | [5] | |
| | | 2.2L/2.5L MPI Turbo I | 1992 | 1994 | E,J | 55 | 50 | 55 | 85 | F1 | GM,DM,FM,DB | [137] | [3] | |
| | | 3.0L MPI | 1992 | 1994 | 3 | 48 | 40 | 48 | 85 | F3 | ALL | [138] | [3] | |
| Plymouth | Voyager | 2.5L TBI | 1987 | 1990 | K | N/A | 14.5 | N/A | 45 | F3 | ALL | [138] | [2] | |
| | | 2.5L TBI | 1991 | 1991 | K | N/A | 39 | N/A | 75 | F29-F30 | GM,DM | [138] | [5] | |
| | | 2.5L TBI | 1992 | 1995 | K | N/A | 39 | N/A | 75 | F29-F30 | GM,DM | [138] | [3] | |
| | | 2.4L MPI | 1996 | 1996 | X | N/A | 49 | N/A | [1] | F1 | GM,DM | [137] | [3] | |
| | | 2.2L/2.5L MPI Turbo I | 1988 | 1990 | | 55 | 50 | 55 | 85 | F1 | GM,DM,FM,DB | [137] | [2] | |
| | | 3.0L MPI | ***** | 1988 | 3 | 36 | 30 | 38 | 85 | F3 | ALL | [138] | [2] | |
| | | 3.0L MPI | 1988 | 1990 | 3 | 48 | 40 | 48 | 85 | F3 | ALL | [138] | [2] | |
| | | 3.0L MPI | 1991 | 1991 | 3 | 48 | 40 | 48 | 85 | F3 | ALL | [138] | [5] | |
| | | 3.0L MPI | 1992 | 1996 | 3 | 48 | 40 | 48 | 85 | F3 | ALL | [138] | [3] | |
| | | 3.3L/3.8L MPI | 1990 | 1990 | R,L | 48 | 40 | 48 | 85 | F1 | GM,DM,FM,DB | [137] | [2] | |
| | | 3.3L/3.8L MPI | 1991 | 1991 | R,L | 48 | 40 | 48 | 85 | F1 | GM,DM,FM,DB | [137] | [5] | |
| | | 3.3L/3.8L MPI | 1992 | 1996 | R,L | 48 | 40 | 48 | 85 | F1 | GM,DM,FM,DB | [137] | [3] | |
| Pontiac | 6000 | 2.5L L4 TBI | 1982 | 1986 | R | 9-13[1] | 9-13 | N/A | 15+ | F8-F9 or F10-F11 | GM,DM | [140] | [30] | LR8 |
| | | 2.5L L4 TBI | 1987 | 1988 | R | 9-13[1] | 9-13 | N/A | 15+ | F10-F11 | GM,DM | [140] | [30] | LR8 |
| | | 2.5L L4 TBI | 1989 | 1991 | R | 9-13[1] | 9-13 | N/A | 15+ | F10-F11 | GM,DM | [140] | [42] | LR8 |
| | | 2.8L V6 MFI | 1985 | 1986 | W | 41-47 | [16] | 41-47 | 60+ | F1 | GM,DM,FM,DB | [137] | [30] | LB6 |
| | | 2.8L V6 MFI | 1987 | 1989 | W | 41-47 | [16] | 41-47 | 60+ | F1 | GM,DM,FM,DB | [137] | [30] | LB6 |
| | | 3.1L V6 MFI | 1988 | 1991 | T | 41-47 | [16] | 41-47 | 60+ | F1 | GM,DM,FM,DB | [137] | [42] | LH0 |
| Pontiac | Bonneville (FWD) | 3.8L V6 SFI | 1987 | 1988 | 3 | 34-40 | 25-35 | 34-40 | 60+ | F1 | GM,DM,FM,DB | [137] | [32] | LG3 |
| | | 3800 V6 SFI | 1988 | 1991 | C | 41-47 | [16] | 41-47 | 60+ | F1 | GM,DM,FM,DB | [137] | [33] | LN3 |
| | | 3.8L V6 SFI | 1992 | 1995 | L | 41-47 | [16] | 41-47 | 60+ | F1 | GM,DM,FM,DB | [137] | [32] | L27 |
| | | 3.8L V6 SFI | 1992 | 1995 | 1 | 41-47 | [16] | 41-47 | 60+ | F1 | GM,DM,FM,DB | [137] | [32] | L67 |
| | | 3.8L V6 SFI | 1996 | 1996 | 1 | 41-47 | [16] | 41-47 | 60+ | F1 | GM,DM,FM,DB | [137] | [33] | L67 |
| | | 3.8L V6 SFI | 1995 | 1996 | K | 48-55 | [16] | 48-55 | 60+ | F1 | GM,DM,FM,DB | [137] | [32] | L36 |
| | | 3.8L V6 SFI | 1996 | 1996 | K | 48-55 | [16] | 48-55 | 60+ | F1 | GM,DM,FM,DB | [137] | [34] | L36 |
| Pontiac | Fiero Coupe | 2.5L L4 TBI | 1984 | 1988 | R | 9-13[1] | 9-13 | N/A | 15+ | F10-F11 | GM,DM,FM,DB | [140] | [40] | LR8 |
| | | 2.8L V6 MFI | 1985 | 1988 | 9 | 41-47 | [16] | 41-47 | 60+ | F1 | GM,DM,FM,DB | [137] | [40] | L44 |
| Pontiac | Firebird | 2.5L L4 TBI | 1982 | 1986 | 2 | 9-13[1] | 9-13 | N/A | 15+ | F8-F9 or F10-F11 | GM,DM | [140] | [40] | LQ9 |
| | | 2.8L V6 MFI | 1985 | 1988 | S | 41-47 | [16] | 41-47 | 60+ | F1 | GM,DM,FM,DB | [137] | [40] | LB8 |
| | | 3.1L V6 MFI | 1990 | 1992 | T | 41-47 | [16] | 41-47 | 60+ | F1 | GM,DM,FM,DB | [137] | [42] | LH0 |
| | | 3.4L V6 MFI | 1993 | 1995 | S | 41-47 | [16] | 41-47 | 60+ | F1 | GM,DM,FM,DB | [137] | [42] | L32 |
| | | 3.8L V6 SFI | 1995 | 1996 | K | 48-55 | [16] | 48-55 | 60+ | F1 | GM,DM,FM,DB | [137] | [39] | L36 |
| | | 5.0L V8 CFI | 1982 | 1983 | 7 | 9-13[1] | 8-13 | N/A | 15+ | F8-F9 | GM,DM | [140] | [40] | LU5 |

* Note : Heading definitions for columns are found on page xii  Footnote references are found on pages 40-44 *

PAGE 29

Standard Domestic & Foreign Fuel Rail Systems

| MAKE | MODEL | ENGINE | FROM YEAR | TO YEAR | VIN | KOEO | NORMAL IDLE | IDLE W/O VACUUM | DEADHEAD PRESSURE | ADAPTER FITTING | ADAPTER KIT | FITTING LOCATION | MANUAL PUMP ENERGIZE | RPO |
|---|---|---|---|---|---|---|---|---|---|---|---|---|---|
| Pontiac | (cont.) | 5.0L V8 MFI | 1985 | 1989 | F | 41-47 | [16] | 41-47 | 60+ | F1 | GM,DM,FM,DB | [137] | [40] | L69 |
| | | 5.0L V8 MFI | 1990 | 1992 | F | 41-47 | [16] | 41-47 | 60+ | F1 | GM,DM,FM,DB | [137] | [39] | L69 |
| | | 5.0L V8 TBI | 1988 | 1989 | E | 9-13[*] | 9-13 | N/A | 15+ | F10-F11 | GM,DM | [140] | [40] | L03 |
| | | 5.0L V8 TBI | 1990 | 1992 | E | 9-13[*] | 9-13 | N/A | 15+ | F10-F11 | GM,DM | [140] | [39] | L03 |
| | | 5.7L V8 MFI | 1987 | 1989 | 8 | 41-47 | [16] | 41-47 | 60+ | F1 | GM,DM,FM,DB | [137] | [40] | L98 |
| | | 5.7L V8 MFI | 1990 | 1992 | 8 | 41-47 | [16] | 41-47 | 60+ | F1 | GM,DM,FM,DB | [137] | [39] | L98 |
| | | 5.7L V8 SFI | 1992 | 1996 | P | 41-47 | [16] | 41-47 | 60+ | F1 | GM,DM,FM,DB | [137] | [39] | LT1 |
| Pontiac | Grand Am | | | | | | | | | | | | | |
| | | 2.0L L4 MFI Turbo | 1987 | 1989 | M | 35-38 | [18] | 35-38 | 60+ | F1 | GM,DM,FM,DB | [137] | [30] | LT3 |
| | | 2.3L L4 DOHC MFI | 1988 | 1991 | D | 41-47 | [18] | 41-47 | 60+ | F1 | GM,DM,FM,DB | [137] | [42] | LD2 |
| | | 2.3L L4 DOHC MFI | 1992 | 1995 | D | 41-47 | [18] | 41-47 | 60+ | F12-F13 | GM,DM | [140] | [42] | LD2 |
| | | 2.3L L4 DOHC MFI HO | 1989 | 1991 | A | 41-47 | [18] | 41-47 | 60+ | F1 | GM,DM,FM,DB | [137] | [42] | LG0 |
| | | 2.3L L4 DOHC MFI HO | 1992 | 1994 | A | 41-47 | [18] | 41-47 | 60+ | F12-F13 | GM,DM | [140] | [42] | LG0 |
| | | 2.3L L4 OHC MFI | 1992 | 1994 | 3 | 41-47 | [18] | 41-47 | 60+ | F12-F13 | GM,DM | [140] | [42] | L40 |
| | | 2.4L L4 SFI | 1996 | 1996 | T | 41-47 | [18] | 41-47 | 60+ | F10-F11 | GM,DM | [140] | [43] | LD9 |
| | | 2.5L L4 TBI | 1985 | 1988 | U | 9-13[*] | 9-13 | N/A | 15+ | F1 | GM,DM,FM,DB | [137] | [43] | L68 |
| | | 2.5L L4 TBI | 1989 | 1991 | U | 41-47 | 31-42 | 41-47 | 60+ | F1 | GM,DM,FM,DB | [137] | [42] | L68 |
| | | 3.0L V6 MFI | 1985 | 1987 | L | 41-47 | [18] | 41-47 | 60+ | F1 | GM,DM,FM,DB | [137] | [43] | LN7 |
| | | 3.1L V6 SFI | 1994 | 1995 | M | 41-47 | [18] | 41-47 | 60+ | F1 | GM,DM,FM,DB | [137] | [42] | L82 |
| | | 3.1L V6 SFI | 1996 | 1996 | M | 41-47 | [18] | 41-47 | 60+ | F1 | GM,DM,FM,DB | [137] | [34] | L82 |
| | | 3300 V6 MFI | 1992 | 1993 | N | 41-47 | [18] | 41-47 | 60+ | F1 | GM,DM,FM,DB | [137] | [42] | LG7 |
| Pontiac | Grand Prix (FWD) | | | | | | | | | | | | | |
| | | 2.3L L4 DOHC MFI | 1990 | 1991 | D | 41-47 | [18] | 41-47 | 60+ | F1 | GM,DM,FM,DB | [137] | [37] | LD2 |
| | | 2.8L V6 MFI | 1988 | 1989 | W | 41-47 | [18] | 41-47 | 60+ | F1 | GM,DM,FM,DB | [137] | [37] | LB6 |
| | | 3.1L V6 MFI Turbo | 1989 | 1990 | V | 41-47 | [18] | 41-47 | 60+ | F1 | GM,DM,FM,DB | [137] | [37] | LG5 |
| | | 3.1L V6 MFI | 1989 | 1993 | T | 41-47 | [18] | 41-47 | 60+ | F1 | GM,DM,FM,DB | [137] | [37] | LH0 |
| | | 3.4L V6 OHC MFI | 1991 | 1993 | X | 41-47 | [18] | 41-47 | 60+ | F1 | GM,DM,FM,DB | [137] | [37] | LQ1 |
| | | 3.4L V6 OHC SFI | 1994 | 1995 | X | 41-47 | [18] | 41-47 | 60+ | F1 | GM,DM,FM,DB | [137] | [37] | LQ1 |
| | | 3.4L V6 OHC SFI | 1996 | 1996 | X | 41-47 | [18] | 41-47 | 60+ | F1 | GM,DM,FM,DB | [137] | [34] | LQ1 |
| Pontiac | Grand Prix (RWD) | | | | | | | | | | | | | |
| | | 4.3L V6 TBI | 1987 | 1987 | Z | 9-13[*] | 9-13 | N/A | 15+ | F10-F11 | GM,DM | [140] | [47] | LB4 |
| | | 3.1L V6 SFI Calif | 1993 | 1993 | T | 41-47 | [18] | 41-47 | 60+ | F1 | GM,DM | [137] | [37] | LH0 |
| | | 3.1L V6 SFI | 1994 | 1995 | M | 41-47 | [18] | 41-47 | 60+ | F1 | GM,DM | [137] | [31] | L82 |
| | | 3.1L V6 SFI | 1996 | 1996 | M | 41-47 | [18] | 41-47 | 60+ | F1 | GM,DM | [137] | [34] | L82 |
| Pontiac | Lemans | | | | | | | | | | | | | |
| | | 1.6L L4 TBI | 1988 | 1993 | 6 | 9-13[*] | 9-13 | N/A | 15+ | F10-F11 | GM,DM | [140] | [40] | L73 |
| | | 2.0L L4 TBI | 1988 | 1991 | K | 9-13[*] | 9-13 | N/A | 15+ | F10-F11 | GM,DM | [140] | [40] | LT2 |
| Pontiac | Parisienne (RWD) Safari | 4.3L V6 TBI | 1985 | 1986 | Z | 9-13[*] | 9-13 | N/A | 15+ | F10-F11 | GM,DM | [137] | [44] | LB4 |
| Pontiac | Phoenix | 2.5L L4 TBI | 1982 | 1984 | R | 9-13[*] | 9-13 | N/A | 15+ | F8-F9 or F10-F11 | GM,DM | [140] | [30] | LR8 |
| Pontiac | Sunbird/J2000/Sunfire | | | | | | | | | | | | | |
| | | 1.8L L4 OHC TBI | 1982 | 1983 | O | 9-13[*] | 9-13 | N/A | 15+ | F8-F9 or F10-F11 | GM,DM | [137] | [40] | LH8 |
| | | 1.8L L4 OHC TBI | 1984 | 1986 | O | 9-13[*] | 9-13 | N/A | 15+ | F8-F9 or F10-F11 | GM,DM | [140] | [41] | LH8 |
| | | 1.8L L4 MFI Turbo | 1984 | 1986 | J | 30-40 | [16] | 30-40 | 60+ | F1 | GM,DM,FM,DB | [137] | [41] | LA5 |
| | | 2.0L L4 TBI | 1983 | 1983 | P | 9-13[*] | 9-13 | N/A | 15+ | F10-F11 | GM,DM | [140] | [40] | LQ5 |
| | | 2.0L L4 TBI | 1984 | 1986 | P | 9-13[*] | 9-13 | N/A | 15+ | F10-F11 | GM,DM | [140] | [41] | LQ5 |

* Note : Heading definitions for columns are found on page xii    Footnote references are found on pages 40-44 *

PAGE 30

Standard Domestic & Foreign Fuel Rail Systems

| MAKE | MODEL | ENGINE | FROM YEAR | TO YEAR | VIN | KOEO | NORMAL IDLE | IDLE W/O VACUUM | DEADHEAD PRESSURE | ADAPTER FITTING | ADAPTER KIT | FITTING LOCATION | MANUAL PUMP ENERGIZE | RPO |
|---|---|---|---|---|---|---|---|---|---|---|---|---|---|
| PONTIAC (cont.) | | | | | | | | | | | | | | |
| | | 2.0L L4 MFI Turbo | 1987 | 1990 | M | 35-38 | [18] | 35-38 | 60+ | F1 | GM,DM,FM,DB | [137] | [31] | LT3 |
| | | 2.0L L4 TBI | 1987 | 1991 | K | 9-13[7] | 9-13 | N/A | 15+ | F10-F11 | GM,DM | [140] | [42] | LT2 |
| | | 2.0L L4 OHC SFI | 1992 | 1994 | H | 41-47 | [18] | 41-47 | 60+ | F12-F13 | GM,DM | [140] | [42] | LE4 |
| | | 2.2L L4 MFI | 1995 | 1995 | 4 | 41-47 | [18] | 41-47 | 60+ | F12-F13 | GM,DM | [140] | [42] | LN2 |
| | | 2.2L L4 SFI | 1996 | 1996 | 4 | 41-47 | [18] | 41-47 | 60+ | F12-F13 | GM,DM | [140] | [42] | LN2 |
| | | 2.3L L4 SFI | 1995 | 1995 | D | 41-47 | [18] | 41-47 | 60+ | F12-F13 | GM,DM | [140] | [34] | LD2 |
| | | 2.4L L4 SFI | 1996 | 1996 | T | 41-47 | [16] | 41-47 | 60+ | F12-F13 | GM,DM | [140] | [34] | LD9 |
| | | 3.1L V6 MFI | 1991 | 1994 | T | 41-47 | [16] | 41-47 | 60+ | F1 | GM,DM,FM,DB | [137] | [42] | LH0 |
| | Transport | | | | | | | | | | | | | |
| | | 3.1L V6 TBI | 1990 | 1993 | D | 9-13[7] | 9-13 | N/A | 15+ | F12-F13 | GM,DM | [140] | [43] | LG6 |
| | | 3.1L V6 MFI | 1994 | 1995 | D | 9-13[7] | 9-13 | N/A | 15+ | F12-F13 | GM,DM | [140] | [45] | LG6 |
| | | 3.4L V6 SFI | 1996 | 1996 | E | 41-47 | [18] | 41-47 | 60+ | F1 | GM,DM,FM,DB | [137] | [34] | LA1 |
| | | 3.8L V6 SFI | 1992 | 1995 | L | 41-47 | [18] | 41-47 | 60+ | F1 | GM,DM,FM,DB | [137] | [50] | L27 |
| Porsche (See also CIS section pgs. 37-39) | | | | | | | | | | | | | | |
| Porsche | 911, 911 C2, 911 C4 | | | | | | | | | | | | | |
| Porsche | 924 S | 3.2L MPI | 1984 | 1989 | | 29 [114] | 27-31 | 33-39 | N/A | F32 | GM,FM | [137] | [133] | |
| | | 3.6L MPI | 1989 | 1990 | | 15 [114] | 39-44 | 46-51 | N/A | F32 | GM,FM | [137] | [133] | |
| | | 3.6L MPI | 1991 | 1995 | | 29 [114] | 41-48 | 48-55 | N/A | F32 | GM,FM | [137] | [133] | |
| Porsche | 928 GTS | 2.5L MPI | 1986 | 1988 | | 14 [114] | 27-31 | 34-37 | 80 | F32 | GM,FM | [137] | [128] | |
| Porsche | 928 S | 5.4L MPI | 1994 | 1995 | | 44 [114] | 47-51 | 54-58 | 100 | F32 | GM,FM | [137] | [133] | |
| Porsche | 928 S4 | 4.5L MPI | 1984 | 1987 | | 28 [114] | 27-31 | 34-38 | 80 | F32 | GM,FM | [137] | [133] | |
| | | 5.0L MPI | 1987 | 1991 | | 44 [114] | 47-51 | 54-58 | 100 | F32 | GM,FM | [137] | [133] | |
| | 944 | | | | | | | | | | | | | |
| | | 2.5L MPI | 1982 | 1984 | | 14 [114] | 27-31 | 34-37 | 80 | F32 | GM,FM | [137] | [127] | |
| | | 2.5L MPI | 1985 | 1987 | | 14 [114] | 27-31 | 34-37 | 80 | F32 | GM,FM | [137] | [128] | |
| | | 3.0L MPI | 1987 | 1991 | | 29 [114] | 47-51 | 54-58 | 100 | F32 | GM,FM | [137] | [128] | |
| | 968 | | | | | | | | | | | | | |
| | | 3.0L MPI | 1992 | 1994 | | 29 [114] | 47-51 | 54-58 | 100 | F32 | GM,FM | [137] | [128] | |
| Renault | Alliance/Encore | | | | | | | | | | | | | |
| | | 1.4L TBI | 1983 | 1987 | D | N/A | 14.5 | N/A | 45 | F1 | GM,DM,FM,DB | [139] | [3] | |
| | | 1.4/1.7L/2.0L TBI | 1986 | 1987 | D,A,V | N/A | 14.5 | N/A | 45 | F1 | GM,DM,FM,DB | [139] | [3] | |
| | | 1.4L MPI | 1983 | 1987 | E | 36 | 29 | 36 | 70 | F3 | ALL | [137] | [3] | |
| Saab (See also CIS section pgs. 37-39) | FuegoSportwagon/18 | | | | | | | | | | | | | |
| | | 1.0L MPI | 1982 | 1987 | E | 36 | 29 | 36 | 70 | F3 | ALL | [137] | [3] | |
| | | 1.7L MPI w/wo Turbo | 1982 | 1987 | E | 36 | 29 | 36 | 70 | F3 | ALL | [137] | [3] | |
| | 900 | | | | | | | | | | | | | |
| | | 2.0L, 2.1L, 2.3L MPI DOHC | 1985 | 1995 | | 29 [114] | 34-38 | 41-45 | 100 | F3 | ALL | [137] | [133] | |
| | | 2.5L MPI | 1994 | 1996 | | 29 [114] | 34-38 | 41-45 | 100 | F3 | ALL | [137] | [133] | |
| | 9000 | | | | | | | | | | | | | |
| | | 2.0L, 2.3L MPI | 1985 | 1996 | | 29 [114] | 34-38 | 41-45 | 100 | F3 | ALL | [137] | [133] | |
| | | 3.0L MPI | 1995 | 1996 | | 28 [114] | 35-39 | 42-46 | 100 | F3 | ALL | [137] | [133] | |

Note: Heading definitions for columns are found on page xii. Footnote references are found on pages 40-44.

PAGE 31

Standard Domestic & Foreign Fuel Rail Systems

| MAKE | MODEL | ENGINE | FROM YEAR | TO YEAR | VIN | KOEO | NORMAL IDLE | IDLE W/O VACUUM | DEADHEAD PRESSURE | ADAPTER FITTING | ADAPTER KIT | FITTING LOCATION | MANUAL PUMP ENERGIZE | RPO |
|---|---|---|---|---|---|---|---|---|---|---|---|---|---|---|
| Saturn | | | | | | | | | | | | | | |
| Saturn | All Models | 1.9L L4 TBI | 1991 | 1994 | 9 | 26-31 | 26-31 | 26-31 | -58 | F1 | GM,DM,FM,DB | [141] | [34] | LKO |
| | | 1.9L L4 MFI | 1991 | 1996 | 7 | 38-44 | [16] | 38-44 | -48 | F1 | GM,DM,FM,DB | [142] | [34] | LLO |
| | | 1.9L L4 MFI | 1995 | 1996 | 8 | 38-44 | [16] | 38-44 | -48 | F1 | GM,DM,FM,DB | [142] | [34] | L24 |
| Sterling | | | | | | | | | | | | | | |
| Sterling | 825S, 827S | | | | | | | | | | | | | |
| Subaru | DL, GL, XT, Turbo | 2.5L MPI | 1997 | 1998 | | N/A | 29-34 | 36-41 | N/A | F3 | ALL | [139] | [139] | |
| | | 2.7L MPI | 1988 | 1990 | | N/A | 29-34 | 36-41 | N/A | F3 | ALL | [139] | [139] | |
| Subaru | | 1.8L TBI | 1986 | 1986 | | N/A | 13-17 | N/A | N/A | F3 | ALL | [147] | N/A | |
| | | 1.8L MPFI | 1988 | 1988 | | N/A | 26-30 | 33-37 | -10 | F3 | ALL | [146] | [101] | |
| | | 1.8L TBI | 1987 | 1989 | | N/A | 20-24 | N/A | N/A | F3 | ALL | [147] | [102] | |
| | | 1.8L MPFI | 1987 | 1989 | | N/A | 26-30 | 33-37 | -10 | F3 | ALL | [146] | [102] | |
| Subaru | GL Turbo | 1.8L EGI Turbo | 1984 | 1984 | | N/A | 26-30 | 33-37 | 43.4 | F3 | ALL | [146] | [101] | |
| Subaru | GL-10, Turbo | 1.8L MPFI | 1985 | 1985 | | N/A | 26-30 | 33-37 | -10 | F3 | ALL | [146] | [101] | |
| Subaru | Impreza | 1.8L MPFI | 1993 | 1995 | | 34-38 | 26-30 | 34-38 | N/A | F3 | ALL | [139] | N/A | |
| Subaru | Justy | 1.2L MPFI | 1990 | 1994 | | 41 | 31-34 | 41 | 43 | F3 | ALL | [139] | N/A | |
| Subaru | Loyale | 1.8L TBI | 1990 | 1994 | | N/A | 20-24 | N/A | N/A | F3 | ALL | [147] | [102] | |
| | | 1.8L MPFI | 1990 | 1994 | | N/A | 26-30 | 33-37 | N/A | F3 | ALL | [146] | [102] | |
| Subaru | Legacy | 2.2L MPFI | 1990 | 1994 | | N/A | 26-30 | 33-37 | N/A | F3 | ALL | [139] | [102] | |
| | | 2.2L MPFI | 1995 | 1995 | | 33-40 | 23-30 | 33-40 | N/A | F3 | ALL | [139] | [102] | |
| Subaru | SVX | 2.7L MPFI | 1992 | 1994 | | 34-38 | 26-30 | 34-38 | N/A | F3 | ALL | [139] | [102] | |
| Subaru | XT, Turbo, XT-6 | 1.8L MPFI | 1987 | 1991 | | N/A | 26-30 | 33-37 | N/A | F3 | ALL | [146] | [102] | |
| | | 2.7L MPFI | 1988 | 1991 | | N/A | 26-30 | 33-37 | -10 | F3 | ALL | [146] | [102] | |
| Suzuki | | | | | | | | | | | | | | |
| Suzuki | Samurai | 1.3L TBI | 1990 | 1994 | | 34-40 | 24-30 | 34-40 | 57 | F17 | GM,FM | [139] | [103] | |
| Suzuki | Sidekick | 1.6L MFI | 1992 | 1995 | | 35.6-43 | 30-37 | 35.6-43 | 64 | F31 | GM,FM | [155] | [103] | |
| | | 1.6L TBI | 1989 | 1995 | | N/A | 34-40 | N/A | 57 | F17 | GM,FM | [139] | [104] | |
| Suzuki | Swift | 1.0L TBI | 1995 | 1995 | | 22.7-30 | 13-20 | 22.7-30 | 64 | F3 | ALL | [147] | [105] | |
| | | 1.3L MFI | 1989 | 1994 | | 35.5-38.4 | 25.6-30 | 35.5-38.4 | 64 | F3 | ALL | [150] | [105] | |
| Toyota | | | | | | | | | | | | | | |
| Toyota | Camry | 1.3L TBI | 1989 | 1996 | | 22.7-30 | 13-20 | 22.7-30 | 64 | F3 | ALL | [147] | [105] | |
| Toyota | | 1MZ-FE | 1994 | 1996 | | N/A | 33-38 | 38-44 | 57 | F17 or F19 | GM,DM,FM,DB | [146] | N/A | |
| | | 2.0L 2S-E EFI | 1983 | 1984 | | N/A | 28 | 33-38 | 57 | F17 or F19 | GM,DM,FM,DB | [148] | [107] | |
| | | 2.0L 2S-E EFI | 1985 | 1988 | | N/A | 27-31 | 33-38 | 57 | F17 or F19 | GM,DM,FM,DB | [148] | [108] | |

* Note: Heading definitions for columns are found on page xii  Footnote references are found on pages 40-44 *

PAGE 32

Domestic & Foreign Fuel Rail Systems

| MAKE | ENGINE | FROM YEAR | TO YEAR | VIN | KOEO | NORMAL IDLE | IDLE W/O VACUUM | DEADHEAD PRESSURE | ADAPTER FITTING | ADAPTER KIT | FITTING LOCATION | MANUAL PUMP ENERGIZE | RPO |
|---|---|---|---|---|---|---|---|---|---|---|---|---|---|
| | 2.0L 3S-FE EFI | 1987 | 1991 | | N/A | 33-37 | 38-44 | 57 | F17 or F19 | GM,DM,FM,DB | [148] | [105] | |
| | 2.2L 5S-FE | 1992 | 1995 | | N/A | 31-37 | 38-44 | 57 | F17 or F19 | GM,DM,FM,DB | [148] | [105] | |
| | 2.2L 5S-FE | 1996 | 1996 | | N/A | 31-37 | 38-44 | 57 | F17 or F19 | GM,DM,FM,DB | [148] | N/A | |
| | 2.8L 2VZ-FE EFI | 1988 | 1991 | | N/A | 33-37 | 38-44 | 57 | F17 or F19 | GM,DM,FM,DB | [148] | [105] | |
| | 3VZ-FE | 1992 | 1993 | | N/A | 33-37 | 38-44 | 57 | F17 or F19 | GM,DM,FM,DB | [148] | [105] | |
| | Celica | | | | | | | | | | | | |
| | 2.0L 2S-FE EFI | 1986 | 1988 | | N/A | 27-31 | 33-38 | 57 | F17 or F19 | GM,DM,FM,DB | [148] | [105] | |
| | 2.0L 3S-FE EFI | 1989 | 1989 | | N/A | 27-31 | 33-38 | 57 | F17 or F19 | GM,DM,FM,DB | [148] | [105] | |
| | 2.2L 3S-FE EFI | 1987 | 1989 | | N/A | 33-37 | 38-44 | 57 | F17 or F19 | GM,DM,FM,DB | [148] | [105] | |
| | 2.2L 5S-FE EFI | 1990 | 1991 | | N/A | 33-37 | 38-44 | 57 | F17 or F19 | GM,DM,FM,DB | [148] | [105] | |
| | 2.2L 5S-FE EFI | 1992 | 1995 | | N/A | 31-37 | 38-44 | 57 | F17 or F19 | GM,DM,FM,DB | [148] | [105] | |
| | 2.2L 5S-FE EFI | 1996 | 1996 | | N/A | 33-38 | 38-44 | 57 | F17 or F19 | GM,DM,FM,DB | [148] | [105] | |
| | 2.4L 22R-EC EFI | 1983 | 1984 | | N/A | 28 | 36-38 | 57 | F17 or F19 | GM,DM,FM,DB | [148] | N/A | |
| | 2.4L 22R-E EFI | 1985 | 1985 | | N/A | 27-31 | 33-38 | 57 | F17 or F19 | GM,DM,FM,DB | [148] | [105] | |
| Toyota | Celica GT Convertible | | | | | | | | | | | | |
| | 2.0L 3S-FE EFI | 1987 | 1989 | | N/A | 27-31 | 33-38 | 57 | F17 or F19 | GM,DM,FM,DB | [148] | [105] | |
| | 2.0L 3S-GE EFI | 1988 | 1988 | | N/A | 27-31 | 33-38 | 57 | F17 or F19 | GM,DM,FM,DB | [148] | [105] | |
| Toyota | Celica GT-S | | | | | | | | | | | | |
| | 2.0L 3S-GE EFI | 1986 | 1989 | | N/A | 27-31 | 33-38 | 57 | F17 or F19 | GM,DM,FM,DB | [148] | [105] | |
| | 2.2L 5S-FE EFI | 1990 | 1991 | | N/A | 33-37 | 38-44 | 57 | F17 or F19 | GM,DM,FM,DB | [148] | [105] | |
| | 2.2L 5S-FE EFI | 1992 | 1995 | | N/A | 31-37 | 38-44 | 57 | F17 or F19 | GM,DM,FM,DB | [148] | [105] | |
| | 2.2L 5S-FE FEFI | 1996 | 1996 | | N/A | 33-38 | 38-44 | 57 | F17 or F19 | GM,DM,FM,DB | [148] | [105] | |
| | 2.4L 22R-EC EFI | 1983 | 1984 | | N/A | 28 | 36-38 | 57 | F17 or F19 | GM,DM,FM,DB | [148] | N/A | |
| | 2.4L 22R-E EFI | 1985 | 1985 | | N/A | 27-31 | 33-38 | 57 | F17 or F19 | GM,DM,FM,DB | [148] | [105] | |
| Toyota | Celica ST | | | | | | | | | | | | |
| | 1.6L 4A-FE EFI | 1990 | 1990 | | N/A | 33-37 | 38-44 | 57 | F17 or F19 | GM,DM,FM,DB | [150] | [105] | |
| | 1.6L 4A-FE EFI | 1991 | 1993 | | N/A | 31-37 | 38-44 | 57 | F17 or F19 | GM,DM,FM,DB | [150] | [105] | |
| | 1.8L 7A-FE EFI | 1994 | 1995 | | N/A | 31-37 | 38-44 | 57 | F17 or F19 | GM,DM,FM,DB | [150] | [105] | |
| | 1.8L 7A-FE EFI | 1996 | 1996 | | N/A | 31-37 | 38-44 | 57 | F17 or F19 | GM,DM,FM,DB | [150] | N/A | |
| | 2.0L 2S-FE EFI | 1986 | 1988 | | N/A | 27-31 | 33-38 | 57 | F17 or F19 | GM,DM,FM,DB | [148] | [105] | |
| | 2.0L 3S-FE EFI | 1987 | 1989 | | N/A | 31-37 | 38-44 | 57 | F17 or F19 | GM,DM,FM,DB | [148] | [105] | |
| | 2.4L 22R-EC EFI | 1983 | 1984 | | N/A | 28 | 36-38 | 57 | F17 or F19 | GM,DM,FM,DB | [148] | [105] | |
| | 2.4L 22R-E EFI | 1985 | 1985 | | N/A | 27-31 | 33-38 | 57 | F17 or F19 | GM,DM,FM,DB | [148] | [105] | |
| Toyota | Celica Supra | | | | | | | | | | | | |
| | 2.8L 5M-GE EFI | 1983 | 1984 | | N/A | 28 | 36-38 | 57 | F17 or F19 | GM,DM,FM,DB | [137] | [107] | |
| | 2.8L 5M-GE EFI | 1985 | 1986 | | N/A | 27-31 | 33-38 | 57 | F17 or F19 | GM,DM,FM,DB | [137] | [110] | |
| | Celica Turbo AllTrac | | | | | | | | | | | | |
| | 2.0L 3S-GTE EFI | 1988 | 1993 | | N/A | 27-31 | 33-38 | 57 | F17 or F19 | GM,DM,FM,DB | [148] | | |
| | Carolla AIItrac DLX/SR5 | | | | | | | | | | | | |
| | 1.6L 4A-FE EFI | 1988 | 1988 | | N/A | 23-30 | 33-40 | 57 | F17 or F19 | GM,DM,FM,DB | [137] | [105] | |
| | Corolla/DLX/LE/SR5 | | | | | | | | | | | | |
| | 1.6L 4A-FE EFI | 1989 | 1989 | | N/A | 30-33 | 38-44 | | F17 or F19 | GM,DM,FM,DB | [137] | [105] | |
| | 1.6L 4A-FE EFI | 1990 | 1992 | | N/A | 30-37 | 38-44 | 57 | F17 or F19 | GM,DM,FM,DB | [137] | [105] | |
| | 1.6L 4A-FE EFI | 1993 | 1995 | | N/A | 31-37 | 38-44 | 57 | F17 or F19 | GM,DM,FM,DB | [137] | [105] | |
| | 1.6L 4A-GE EFI | 1988 | 1990 | | N/A | 30-33 | 38-44 | 57 | F17 or F19 | GM,DM,FM,DB | [137] | [105] | |
| | 1.8L 7A-FE EFI | 1993 | 1996 | | N/A | 31-37 | 38-44 | 57 | F17 or F19 | GM,DM,FM,DB | [137] | [105] | |
| | Coyote FX16 FF | | | | | | | | | | | | |

* Note : Heading definitions for columns are found on page xii    Footnote references are found on pages 40-44 *

PAGE 33

Standard Domestic & Foreign Fuel Rail Systems

| MAKE | MODEL | ENGINE | FROM YEAR | TO YEAR | VIN | KOEO | NORMAL IDLE | IDLE W/O VACUUM | DEADHEAD PRESSURE | ADAPTER FITTING | ADAPTER KIT | FITTING LOCATION | MANUAL PUMP ENERGIZE | RPO |
|---|---|---|---|---|---|---|---|---|---|---|---|---|---|---|
| Toyota (cont.) | | | | | | | | | | | | | | |
| Toyota | Corolla FX16 | 1.6L 4A-GELC EFI | 1988 | 1988 | | N/A | 30-33 | 38-44 | 57 | F17 or F19 | GM,DM,FM,DB | [137] | [109] | |
| | | 1.6L GT-S/FF | | | | | | | | | | | | |
| | | 1.6L 4A-GE EFI | 1986 | 1987 | | N/A | 24-31 | 33-40 | 57 | F17 or F19 | GM,DM,FM,DB | [137] | [111] | |
| | | 1.6L 4A-GE EFI | 1988 | 1988 | | N/A | 30-33 | 38-44 | 57 | F17 or F19 | GM,DM,FM,DB | [137] | [111] | |
| Toyota | Corolla FX16 GT-S/FR | | | | | | | | | | | | | |
| | | 1.6L 4A-GE EFI | 1985 | 1985 | | N/A | 24-31 | 33-40 | 57 | F17 or F19 | GM,DM,FM,DB | [137] | [110] | |
| | | 1.6L 4A-GE EFI | 1986 | 1987 | | N/A | 24-31 | 33-40 | 57 | F17 or F19 | GM,DM,FM,DB | [137] | [109] | |
| Toyota | Cressida | | | | | | | | | | | | | |
| | | 2.8L 5M-GE EFI | 1983 | 1984 | | N/A | 28 | 36-38 | 57 | F17 or F19 | GM,DM,FM,DB | [137] | [110] | |
| | | 2.8L 5M-GE EFI | 1985 | 1988 | | N/A | 27-31 | 33-38 | 57 | F17 or F19 | GM,DM,FM,DB | [137] | [109] | |
| | | 3.0L 7M-GE EFI | 1989 | 1992 | | N/A | 33-37 | 38-44 | 57 | F17 or F19 | GM,DM,FM,DB | [137] | [109] | |
| Toyota | MR2 | | | | | | | | | | | | | |
| | | 1.6L 4A-GE EFI | 1985 | 1987 | | N/A | 24-31 | 33-40 | 57 | F17 or F19 | GM,DM,FM,DB | [137] | [109] | |
| | | 1.6L 4A-GE EFI | 1988 | 1989 | | N/A | 30-33 | 38-44 | 57 | F17 or F19 | GM,DM,FM,DB | [137] | [109] | |
| | | 1.6L 4A-GZE EFI S/C | 1988 | 1989 | | N/A | 20-27 | 38-44 | 57 | F17 or F19 | GM,DM,FM,DB | [137] | [109] | |
| | | 2.2L 5S-FE EFI | 1991 | 1992 | | N/A | 33-37 | 38-44 | 57 | F17 or F19 | GM,DM,FM,DB | [137] | [109] | |
| | | 2.2L 5S-FE EFI | 1993 | 1995 | | N/A | 31-37 | 38-44 | 57 | F17 or F19 | GM,DM,FM,DB | [137] | [109] | |
| Toyota | MR2 Turbo | | | | | | | | | | | | | |
| | | 2.0L 3S-GTE EFI | 1991 | 1995 | | N/A | 27-31 | 33-38 | 57 | F17 or F19 | GM,DM,FM,DB | [137] | [109] | |
| Toyota | Paseo | | | | | | | | | | | | | |
| | | 1.5L 3E-FE EFI | 1992 | 1995 | | N/A | 33-37 | 40.8-41.7 | 57 | F17 or F19 | GM,DM,FM,DB | [149] | [109] | |
| | | 1.5L 5E-FE EFI | 1996 | 1996 | | N/A | 33-37 | 40.8-41.7 | 57 | F17 or F19 | GM,DM,FM,DB | [149] | N/A | |
| Toyota | Supra | | | | | | | | | | | | | |
| | | 3.0L 7M-GE EFI | 1986.5 | 1988 | | N/A | 23-30 | 33-40 | 57 | F17 or F19 | GM,DM,FM,DB | [137] | [109] | |
| | | 3.0L 7M-GE EFI | 1989 | 1989 | | N/A | 33-37 | 38-44 | 57 | F17 or F19 | GM,DM,FM,DB | [137] | [109] | |
| | | 3.0L 7M-GE EFI | 1990 | 1992 | | N/A | 30-37 | 38-44 | 57 | F17 or F19 | GM,DM,FM,DB | [137] | [109] | |
| | | 3.0L 2JZ-GE EFI | 1994 | 1995 | | N/A | 28-34 | 38-44 | 57 | F17 or F19 | GM,DM,FM,DB | [137] | [109] | |
| | | 3.0L 2JZ-GE EFI | 1996 | 1996 | | N/A | 28-34 | 38-44 | 57 | F17 or F19 | GM,DM,FM,DB | [137] | N/A | |
| Toyota | Supra Turbo | | | | | | | | | | | | | |
| | | 3.0L 7M-GTE EFI Turbo | 1989 | 1993 | | N/A | 23-30 | 38-44 | 57 | F17 or F19 | GM,DM,FM,DB | [137] | [109] | |
| | | 3.0L 2JZ-GTE | 1994 | 1995 | | N/A | 24-31 | 38-44 | 57 | F17 or F19 | GM,DM,FM,DB | [149] | [109] | |
| | | 3.0L 2JZ-GTE | 1996 | 1996 | | N/A | 24-31 | 33-40 | 57 | F17 or F19 | GM,DM,FM,DB | [149] | N/A | |
| Toyota | T100 | | | | | | | | | | | | | |
| | | 3.0L 3VZ-E EFI | 1993 | 1994 | | N/A | 33-38 | 38-44 | 57 | F17 or F19 | GM,DM,FM,DB | [137] | [109] | |
| | | 3.0L 3VZ-E EFI | 1995 | 1995 | | N/A | 33-38 | 38-44 | 57 | F17 or F19 | GM,DM,FM,DB | [137] | N/A | |
| | | 3RZ-FE | 1994 | 1994 | | N/A | 33-37 | 38-44 | 57 | F17 or F19 | GM,DM,FM,DB | [137] | [109] | |
| | | 3RZ-FE | 1995 | 1996 | | N/A | 31-37 | 38-44 | 57 | F17 or F19 | GM,DM,FM,DB | [149] | N/A | |
| | | 5VZ-FE | 1996 | 1996 | | N/A | 33-38 | 38-44 | 57 | F17 or F19 | GM,DM,FM,DB | [149] | N/A | |
| Toyota | Tercel LE | | | | | | | | | | | | | |
| | | 1.5L 3E-E EFI | 1990 | 1990 | | N/A | 33-37 | 38-44 | 57 | F17 or F19 | GM,DM,FM,DB | [137] | [109] | |
| | | 1.5L 3E-E EFI | 1991 | 1994 | | N/A | 33-37 | 40.8-41.7 | 57 | F17 or F19 | GM,DM,FM,DB | [136] | [109] | |
| | | 1.5L 5E-E EFI | 1995 | 1996 | | N/A | 33-37 | 40.8-41.7 | 57 | F17 or F19 | GM,DM,FM,DB | [136] | N/A | |
| Toyota Truck | | | | | | | | | | | | | | |
| Toyota Trk/4 Runner/Truck | | | | | | | | | | | | | | |
| | | 2.4L 22R-E EFI | 1985 | 1986 | | N/A | 27-31 | 33-38 | 57 | F17 or F19 | GM,DM,FM,DB | [149] | [110] | |
| | | 2.4L 22R-E EFI | 1987 | 1987 | | N/A | 27-31 | 33-38 | 57 | F17 or F19 | GM,DM,FM,DB | [149] | [109] | |
| | | 2.4L 22R-E EFI | 1988 | 1995 | | N/A | 33-37 | 38-44 | 57 | F17 or F19 | GM,DM,FM,DB | [149] | [109] | |
| | | 2.4L 22R-TE EFI Turbo | 1986 | 1988 | | N/A | 27-31 | 33-38 | 57 | F17 or F19 | GM,DM,FM,DB | [149] | [109] | |
| | | 3.0L 3VZ-E EFI | 1988 | 1995 | | N/A | 33-37 | 38-44 | 57 | F17 or F19 | GM,DM,FM,DB | [149] | [109] | |

*** Note: Heading definitions for columns are found on page xii

Footnote references are found on pages 40-44 ****

PAGE 34

Standard Domestic & Foreign Fuel Rail Systems

| MAKE | MODEL | ENGINE | FROM YEAR | TO YEAR | VIN | KOEO | NORMAL IDLE | IDLE W/O VACUUM | DEADHEAD PRESSURE | ADAPTER FITTING | ADAPTER KIT | FITTING LOCATION | MANUAL PUMP ENERGIZE | RPO |
|---|---|---|---|---|---|---|---|---|---|---|---|---|---|---|
| Toyota Truck (cont.) | | | | | | | | | | | | | | |
| Toyota Trk | 4 Runner | 5VZ-FE | 1996 | 1996 | | N/A | 33-38 | 38-44 | 57 | F17 or F19 | GM,DM,FM,DB | [151] | N/A | |
| | | 3RZ-FE | 1996 | 1996 | | N/A | 31-37 | 38-44 | 57 | F17 or F19 | GM,DM,FM,DB | [151] | N/A | |
| Toyota Trk | Cab/Chassis Truck | | | | | | | | | | | | | |
| | | 2.4L 22R-E | 1984 | 1984 | | N/A | 28 | 36-38 | 57 | F17 or F19 | GM,DM,FM,DB | [148] | [110] | |
| | | 2.4L 22R-E | 1985 | 1986 | | N/A | 27-31 | 33-39 | 57 | F17 or F19 | GM,DM,FM,DB | [148] | [110] | |
| | | 2.4L 22R-E | 1987 | 1995 | | N/A | 27-31 | 33-38 | 57 | F17 or F19 | GM,DM,FM,DB | [148] | [109] | |
| | | 3.0L 3VZ-E EFI | 1988 | 1995 | | N/A | 33-37 | 38-44 | 57 | F17 or F19 | GM,DM,FM,DB | [148] | [109] | |
| Toyota Trk | Land Cruiser | 4.0L 3F-E EFI | 1988 | 1992 | | N/A | 33-37 | 37-46 | 57 | F17 or F19 | GM,DM,FM,DB | [137] | [109] | |
| | | 4.5L 1FZ-FE EFI | 1993 | 1996 | | N/A | 31-37 | 37-46 | 57 | F17 or F19 | GM,DM,FM,DB | [137] | [109] | |
| Toyota Trk | Land Cruiser GX | 4.0L 3F-E EFI | 1988 | 1992 | | N/A | 31-37 | 37-46 | 57 | F17 or F19 | GM,DM,FM,DB | [137] | [109] | |
| Toyota Trk | Previa | 2.4L 2TZ-FE EFI | 1991 | 1995 | | N/A | 30-36 | 38-44 | 57 | F17 or F19 | GM,DM,FM,DB | [148] | [109] | |
| | | 2.4L 2TZ-FZE | 1994 | 1994 | | N/A | 24-31 | 33-40 | 57 | F17 or F19 | GM,DM,FM,DB | [137] | [109] | |
| | | 2.4L 2TZ-FZE | 1995 | 1996 | | N/A | 24-31 | | 57 | F17 or F19 | GM,DM,FM,DB | [148] | N/A | |
| Toyota Trk | Van | 2.2L 4Y-EC EFI | 1984 | 1984 | | N/A | 28 | 33-38 | -2 | | GM,DM,FM,DB | [148] | [110] | |
| | | 2.2L 4Y-EC EFI | 1985 | 1987 | | N/A | 27-31 | 33-38 | -2 | | GM,DM,FM,DB | [148] | [110] | |
| | | 2.2L 4YE EFI | 1988 | 1988 | | N/A | 30-33 | 38-44 | -2 | | GM,DM,FM,DB | [148] | [110] | |
| Triumph | | | | | | | | | | | | | | |
| Triumph | TR7, TR8 | | | | | | | | | | | | | |
| | | 2.0L MPI | 1980 | 1981 | | | 34-38 | 42-46 | N/A | F3 | ALL | [137] | [131] | |
| | | 3.5L MPI | 1980 | 1981 | | | 34-38 | 42-46 | N/A | F3 | ALL | [137] | [131] | |
| Volkswagen (See also CIS section pgs. 37-39) | | | | | | | | | | | | | | |
| VW | Cabrio | 2.0L MPI | 1993 | 1996 | | 29 [114] | 34-38 | 41-45 | 100 | F32 | GM,FM | [137] | [133] | |
| VW | Cabriolet (Digifant) | 1.8L MPI | 1990 | 1993 | | 29 [114] | 35-39 | 42-46 | 100 | F27 | ALL | [137] | [133] | |
| VW | Corrado G60 | 1.8L MPI | 1991 | 1994 | | 29 [114] | 35-39 | 42-46 | 100 | F27 | ALL | [137] | [133] | |
| VW | Corrado VR-6 | 2.8L MPI | 1991 | 1994 | | 36 [114] | 49-53 | 56-60 | 100 | F32 | GM,FM | [137] | [133] | |
| VW | Eurovan | 2.5L MPI | 1992 | 1994 | | 29 [114] | 35-39 | 42-46 | 100 | F32 | GM,FM | [137] | [123] | |
| | | 1.8L MPI | 1991 | 1993 | | 29 [114] | 35-39 | 42-46 | 100 | F27 | ALL | [137] | [133] | |
| VW | Fox (Digifant) | | | | | | | | | | | | | |
| VW | Golf (Digifant) | 1.8L MPI | 1988 | 1993 | | 29 [114] | 35-39 | 42-46 | 100 | F27 | ALL | [137] | [133] | |
| VW | Golf III | 2.0L MPI | 1993 | 1996 | | 29 [114] | 34-38 | 41-45 | 100 | F32 | GM,FM | [137] | [133] | |
| VW | Golf III GTI | 2.8L MPI | 1993 | 1996 | | 36 [114] | 49-53 | 56-60 | 100 | F32 | GM,FM | [137] | [133] | |
| VW | Jetta (Digifant) | 1.8L MPI | 1987 | 1993 | | 29 [114] | 35-39 | 42-46 | 100 | F27 | ALL | [137] | [133] | |
| VW | Jetta III | | | | | | | | | | | | | |

* Note: Heading definitions for columns are found on page xii        Footnote references are found on pages 40-44 *

Standard Domestic & Foreign Fuel Rail Systems

| MAKE | MODEL | ENGINE | FROM YEAR | TO YEAR | VIN | KOEO | NORMAL IDLE | IDLE W/O VACUUM | DEADHEAD PRESSURE | ADAPTER FITTING | ADAPTER KIT | FITTING LOCATION | MANUAL PUMP ENERGIZE | RPO |
|---|---|---|---|---|---|---|---|---|---|---|---|---|---|---|
| Volkswagen (cont.) | | | | | | | | | | | | | | |
| VW | Jetta III GLX | 2.0L MPI | 1993 | 1996 | | 29 [114] | 34-38 | 41-45 | 100 | F32 | GM,FM | [137] | [133] | |
| VW | Type 1 Sedan | 2.8L MPI | 1993 | 1996 | | 36 [114] | 49-53 | 58-60 | 100 | F32 | GM,FM | [137] | [133] | |
| VW | Vanagon Bus | 1.6L MPI | 1975 | 1979 | | 20 [114] | 27-30 | 33-37 | 80 | F32 | GM,FM | [146] | [118] | |
| | | 2.1L MPI | 1980 | 1982 | | 20 [114] | 27-30 | 33-37 | 80 | F32 | GM,FM | [158] | [115] | |
| | | 2.1L MPI | 1983 | 1989 | | 20 [114] | 27-30 | 33-37 | 80 | F32 | GM,FM | [158] | [133] | |
| Volvo (See also CIS section pgs. 37-39) | | | | | | | | | | | | | | |
| Volvo | 240 | B23F MPI | 1982 | 1984 | | 28 [114] | 27-31 | 34-38 | 100 | F14-F15 | GM,DM,FM | [137] | [133] | |
| | | B230F MPI | 1966 | 1993 | | 28 [114] | 33-36 | 40-45 | 100 | F14-F15 | GM,DM,FM | [137] | [120] | |
| Volvo | 740 | B23F, B230F_FT MPI | 1984 | 1992 | | 28 [114] | 33-36 | 40-45 | 100 | F14-F15 | GM,DM,FM | [137] | [120] | |
| | | B234F MPI | 1988 | 1995 | | 28 [114] | 33-36 | 40-45 | 100 | F14-F15 | GM,DM,FM | [137] | [120] | |
| Volvo | 760 | B230FT MPI | 1985 | 1990 | | 28 [114] | 33-38 | 40-45 | 100 | F14-F15 | GM,DM,FM | [137] | [120] | |
| | | B280F MPI | 1987 | 1988 | | 28 [114] | 27-31 | 34-38 | 100 | F14-F15 | GM,DM,FM | [137] | [120] | |
| Volvo | 780 | B230FT MPI | 1987 | 1991 | | 28 [114] | 33-38 | 40-45 | 100 | F14-F15 | GM,DM,FM | [137] | [120] | |
| | | B280F MPI | 1987 | 1990 | | 28 [114] | 27-31 | 34-38 | 100 | F14-F15 | GM,DM,FM | [137] | [120] | |
| Volvo | 850 | B5254F_FT MPI | 1993 | 1996 | | 28 [114] | 33-38 | 41-45 | 100 | F2 | ALL | [137] | [133] | |
| Volvo | 940 | B230F_FT MPI | 1991 | 1995 | | 28 [114] | 33-38 | 40-45 | 100 | F14-F15 | GM,DM,FM | [137] | [120] | |
| | | B234F MPI | 1991 | 1995 | | 28 [114] | 33-38 | 40-45 | 100 | F14-F15 | GM,DM,FM | [137] | [120] | |
| Volvo | 960 | B6304F MPI | 1992 | 1996 | | 28 [114] | 33-38 | 41-45 | 100 | F14-F15 or F2 | ALL | [137] | [120] | |
| Yugo | | | | | | | | | | | | | | |
| Yugo | All with Fuel Injection | 1.3L MPI | 1989 | 1992 | | N/A | 27-31 | 33-38 | 72 | F3 | ALL | [137] | [133] | |

* Note: Heading definitions for columns are found on page xii        Footnote references are found on pages 40-44 *

BOSCH CIS FUEL PRESSURE SYSTEMS

| MAKE | MODEL | ENGINE | FROM YEAR | TO YEAR | SYSTEM PRESSURE BAR | SYSTEM PRESSURE PSI | CONTROL WARM BAR | CONTROL WARM PSI | CONTROL @ 68 DEGREE F BAR | CONTROL DIFFERENTIAL @ 68 DEGREE F PSI | REST PRESSURE BAR | REST PRESSURE PSI | REST TIME | ADAPTER FITTING | FITTING LOCATION | MANUAL PUMP BYPASS |
|---|---|---|---|---|---|---|---|---|---|---|---|---|---|---|---|---|
| Audi | | | | | | | | | | | | | | | | |
| Audi | 80, 80 Quattro | All-CIS-E or E III | 1988 | 1992 | 6.105 | 88.5694 3 | 5.6162 | 81.2699 | 5.3146 | 76.9667 | 3.5 | 50.8 | 10 MIN | see Intro (pg xi) | [112] | [113] |
| Audi | 90, 90 Quattro | All-CIS-E or E III | 1988 | 1991 | 6.1185 | 88.5643 | 5.6162 | 81.2699 | 5.3146 | 76.9667 | 3.5 | 50.8 | 10 MIN | see Intro (pg xi) | [112] | [113] |
| Audi | 100, 100 Quattro | All-CIS-E or E III | 1989 | 1991 | 6.1185 | 88.5643 | 5.6162 | 81.2699 | 5.3146 | 76.9667 | 3.5 | 50.8 | 10 MIN | see Intro (pg xi) | [112] | [113] |
| Audi | 200, 200 Quattro | All-CIS | 1989 | 1991 | 5.8065 | 84.1957 | 3.4375 | 49.3551 | 1.5146 | 21.8281 | 3.0 | 43.5 | 10 MIN | see Intro (pg xi) | [112] | [113] |
| Audi | | All-CIS Turbo | 1988 | 1991 | 5.8065 | 84.1957 | 3.4375 | 49.3551 | 1.5146 | 21.8281 | 3.0 | 43.5 | 10 MIN | see Intro (pg xi) | [112] | [113] |
| Audi | 4000 | All-CIS | 1980 | 1983 | 4.7564 | 68.2783 | 3.4375 | 49.3551 | 1.3725 | 18.9290 | 2.6 | 37.7 | 10 MIN | see Intro (pg xi) | [112] | [113] |
| Audi | | All-CIS-E 4 Cyl | 1984 | 1987 | 5.2566 | 75.4812 | 4.7153 | 68.2783 | 4.0485 | 58.0711 | 2.6 | 37.7 | 10 MIN | see Intro (pg xi) | [112] | [113] |
| Audi | | All-CIS 5 Cyl | 1984 | 1984 | 4.7564 | 68.2783 | 3.4375 | 49.3551 | 1.3725 | 18.9290 | 2.6 | 37.7 | 10 MIN | see Intro (pg xi) | [112] | [113] |
| Audi | | All-CIS-E | 1984 | 1987 | 5.2566 | 75.4812 | 4.7564 | 68.2783 | 4.0485 | 58.0711 | 2.6 | 37.7 | 10 MIN | see Intro (pg xi) | [112] | [113] |
| Audi | 4000 Quattro | All-CIS-E 4 Cyl | 1984 | 1987 | 5.2566 | 75.4812 | 4.7153 | 68.2783 | 4.0485 | 58.0711 | 2.6 | 37.7 | 10 MIN | see Intro (pg xi) | [112] | [113] |
| Audi | | All-CIS-E 5 Cyl | 1984 | 1987 | 5.2566 | 75.4812 | 4.7154 | 68.2783 | 4.0485 | 58.0711 | 2.6 | 37.7 | 10 MIN | see Intro (pg xi) | [112] | [113] |
| Audi | 5000 | All-CIS | 1980 | 1984 | 4.7564 | 68.2783 | 3.4375 | 49.3551 | 1.3725 | 18.9290 | 2.6 | 37.7 | 10 MIN | see Intro (pg xi) | [112] | [113] |
| Audi | | All-CIS-E | 1985 | 1988 | 5.2566 | 75.4812 | 4.7154 | 68.2783 | 4.0485 | 58.0711 | 2.6 | 37.7 | 10 MIN | see Intro (pg xi) | [112] | [113] |
| Audi | | All-CIS-E-III NF | 1985 | 1988 | 6.1185 | 88.5643 | 5.6162 | 81.2699 | 5.3146 | 76.9667 | 3.5 | 50.8 | 10 MIN | see Intro (pg xi) | [112] | [113] |
| Audi | | All-CIS Turbo | 1990 | 1984 | 5.1568 | 74.8411 | 3.4375 | 49.3551 | 1.2515 | 18.1218 | 2.6 | 37.7 | 10 MIN | see Intro (pg xi) | [112] | [113] |
| Audi | | All-CIS Turbo | 1985 | 1985 | 5.8065 | 84.1957 | 3.4375 | 49.3551 | 1.2515 | 18.1218 | 2.6 | 37.7 | 10 MIN | see Intro (pg xi) | [112] | [113] |
| Audi | | All-CIS Turbo | 1986 | 1988 | 5.8065 | 84.1957 | 3.4375 | 49.3551 | 1.2515 | 18.1218 | 3.0 | 43.5 | 10 MIN | see Intro (pg xi) | [112] | [113] |
| Audi | 5000 Quattro | All-CIS | 1986 | 1986 | 4.7154 | 68.2783 | 3.4375 | 49.3551 | 1.3725 | 18.9290 | 2.6 | 37.7 | 10 MIN | see Intro (pg xi) | [112] | [113] |
| Audi | | All-CIS Turbo | 1986 | 1988 | 5.8065 | 84.1957 | 3.4375 | 49.3551 | 1.2515 | 18.1218 | 3.0 | 43.5 | 10 MIN | see Intro (pg xi) | [112] | [113] |
| Audi | | All-CIS-E-III NF | 1987 | 1987 | 6.1185 | 88.5643 | 5.8065 | 81.2699 | 5.3146 | 76.9667 | 3.5 | 50.8 | 10 MIN | see Intro (pg xi) | [112] | [113] |
| Audi | Coupe GT | All-CIS | 1981 | 1984 | 4.7564 | 68.2783 | 3.4375 | 49.3551 | 1.3725 | 18.9290 | 2.6 | 37.7 | 10 MIN | see Intro (pg xi) | [112] | [113] |
| Audi | | All-CIS-E | 1985 | 1987 | 5.2566 | 75.4812 | 4.7154 | 68.2783 | 4.0485 | 58.0711 | 2.6 | 37.7 | 10 MIN | see Intro (pg xi) | [112] | [113] |
| Audi | Quattro Coupe | All-CIS | 1983 | 1985 | 4.7564 | 68.2783 | 3.4375 | 49.3551 | 1.3725 | 18.9290 | 2.6 | 37.7 | 10 MIN | see Intro (pg xi) | [112] | [113] |
| Audi | | All-CIS Turbo | 1983 | 1984 | 5.1585 | 74.0841 | 3.4375 | 49.3551 | 1.2515 | 18.1218 | 2.6 | 37.7 | 10 MIN | see Intro (pg xi) | [112] | [113] |
| Mercedes | | | | | | | | | | | | | | | | |
| Mercedes | 190 | | | | | | | | | | | | | | | |
| Mercedes | 190E/2.6 | 102.961/985 | 1984 | 1993 | 5.3565 | 78.9798 | 4.951 | 71.1740 | 4.650 | 69.8725 | 3.0 | 43.5 | 30 MIN | see Intro (pg xi) | [112] | [113] |
| Mercedes | 260 | 103 All | All | All | 5.3655 | 78.9798 | 4.951 | 71.1740 | 4.650 | 69.8725 | 2.5 | 36.3 | 20 MIN | see Intro (pg xi) | | [113] |
| Mercedes | 300 Series | 103 All | All | All | 5.3655 | 78.9798 | 4.951 | 71.1740 | 4.650 | 69.8725 | 2.5 | 36.3 | 20 MIN | see Intro (pg xi) | [112] | [113] |
| Mercedes | | 103 All | All | All | 5.3655 | 78.9798 | 4.951 | 71.1740 | 4.650 | 69.8725 | 2.5 | 36.3 | 20 MIN | see Intro (pg xi) | [112] | [113] |
| Mercedes | 380 Series | 104.98/961 | 1990 | 1992 | 6.2064 | 89.9928 | 5.8060 | 84.1870 | 5.7539 | 82.7856 | 2.8 | 40.6 | 30 MIN | see Intro (pg xi) | [112] | [113] |

* Note: Heading definitions for columns are found on page xii     Footnote references are found on pages 40-44 *

BOSCH CIS FUEL PRESSURE SYSTEMS

| MAKE | MODEL | ENGINE | FROM YEAR | TO YEAR | SYSTEM PRESSURE BAR | SYSTEM PRESSURE PSI | CONTROL / DIFFERENTIAL WARM BAR | CONTROL / DIFFERENTIAL WARM PSI | CONTROL / DIFFERENTIAL @ 68 DEGREE F BAR | CONTROL / DIFFERENTIAL @ 68 DEGREE F PSI | REST PRESSURE BAR | REST PRESSURE PSI | REST TIME | ADAPTER FITTING | FITTING LOCATION | MANUAL PUMP ENERGIZE |
|---|---|---|---|---|---|---|---|---|---|---|---|---|---|---|---|---|
| Mercedes (cont.) | DIESEL | | | | | | | | | | | | | | | |
| Mercedes | 500 Series | 116, 117 | 1986 | 1991 | 6.206.4 | 89.9/92.8 | 5.8/6.0 | 84.1/87.0 | 5.7/5.9 | 82.7/85.6 | 3.0 | 43.5 | 30 MIN | see Intro (pg xi) | [112] | [113] |
| Mercedes | 500 Series | 116 All | 1984 | 1985 | 5.0/5.6 | 72.5/81.2 | 3.4/3.8 | 49.3/55.1 | 1.8/2.2 | 26.1/31.9 | 2.5 | 36.3 | 30 MIN | see Intro (pg xi) | [112] | [113] |
| Mercedes | 560 Series | 116, 117 | 1986 | 1991 | 6.2/6.4 | 89.9/92.8 | 5.8/6.0 | 84.1/87.0 | 5.7/5.9 | 82.7/85.6 | 3.0 | 43.5 | 30 MIN | see Intro (pg xi) | [112] | [113] |
| Peugeot | 505 | | | | | | | | | | | | | | | |
| Peugeot | | 2.2 L | 1980 | 1990 | 4.5/5.2 L | 65.3/75.4 | 3.5/3.7 | 50.8/53.7 | 1.7/1.9 | 24.7/27.6 | 2.6 | 37.7 | 20 MIN | see Intro (pg xi) | [112] | [113] |
| Peugeot | | 2.2 L | 1981 | 1986 | 4.5/5.2 L | 65.3/75.4 | 3.5/3.7 | 50.8/53.7 | 2.3/2.5 | 33.4/36.3 | 2.6 | 37.7 | 20 MIN | see Intro (pg xi) | [112] | [113] |
| Porsche | 911 TURBO | | | | | | | | | | | | | | | |
| Porsche | 911 SC | K-Jet | 1986 | 1984 | 6.7/7.4 | 97.2/107.3 | 3.6/3.9 | 52.2/56.6 | 1.5/1.9 | 21.8/27.6 | 1.6 | 23.2 | 10 MIN | see Intro (pg xi) | [112] | [113] |
| Porsche | 924 | K-Jet | 1980 | 1983 | 4.5/5.2 | 65.3/75.4 | 3.4/3.8 | 49.3/55.1 | 2.3/2.6 | 33.4/37.7 | 2.0 | 29.0 | 10 MIN | see Intro (pg xi) | [112] | [113] |
| Porsche | 924 TURBO | K-Jet | 1980 | 1982 | 4.5/5.2 | 65.3/75.4 | 3.4/3.8 | 49.3/55.1 | 1.8/2.2 | 26.1/31.9 | 2.0 | 29.0 | 10 MIN | see Intro (pg xi) | [112] | [113] |
| Porsche | 928 | K-Jet | 1980 | 1982 | 5.8/6.5 | 84.1/94.3 | 3.4/3.8 | 49.3/55.1 | 2.0/2.4 | 29.0/34.8 | 2.0 | 29.0 | 10 MIN | see Intro (pg xi) | [112] | [113] |
| Porsche | | | 1980 | 1984 | 4.5/5.2 | 65.3/75.4 | 3.4/3.8 | 49.3/55.1 | 2.0/2.2 | 29.0/37.7 | 2.0 | 29.0 | 10 MIN | see Intro (pg xi) | [112] | [113] |
| Saab | 90 | | | | | | | | | | | | | | | |
| Saab | 900 | 2.0 L | 1977 | 1980 | 4.5/5.1 | 65.3/74.0 | 3.4/3.8 | 46.3/55.1 | 1.5/1.9 | 21.8/27.6 | 1.5 | 21.8 | 20 MIN | see Intro (pg xi) | [112] | [113] |
| | | 2.0 L | 1981 | 1982 | 4.5/5.2 | 65.3/75.4 | 3.4/3.8 | 49.3/55.1 | 1.3/1.7 | 18.9/24.7 | 1.5 | 21.8 | 20 MIN | see Intro (pg xi) | [112] | [113] |
| | | 2.0 L | 1983 | 1985 | 4.5/5.2 | 65.3/75.4 | 3.4/3.8 | 49.3/55.1 | 2.0/2.3 | 29.0/33.4 | 1.5 | 21.8 | 20 MIN | see Intro (pg xi) | [112] | [113] |
| | | 2.0 L | 1984 | 1984 | 4.5/5.2 | 65.3/75.4 | 3.4/3.8 | 49.3/55.1 | 1.8/2.2 | 26.1/31.9 | 1.5 | 21.8 | 20 MIN | see Intro (pg xi) | [112] | [113] |
| | | 2.0 L | 1985 | 1985 | 4.5/5.1 | 65.3/74.0 | 3.4/3.8 | 49.3/55.1 | 1.5/1.9 | 21.8/27.6 | 1.5 | 21.8 | 20 MIN | see Intro (pg xi) | [112] | [113] |
| | | 2.0 L Turbo | 1981 | 1982 | 5.1/5.6 | 74.0/81.2 | 3.4/3.8 | 49.3/55.1 | 1.3/1.7 | 18.9/24.7 | 1.5 | 21.8 | 20 MIN | see Intro (pg xi) | [112] | [113] |
| Volkswagen | Cabriolet | | | | | | | | | | | | | | | |
| Volkswagen | Dasher | All CIS | 1985 | 1989 | 4.7/5.4 | 68.2/78.3 | 3.4/3.8 | 49.3/55.1 | 1.3/1.7 | 18.9/24.7 | 2.5 | 36.3 | 10 MIN | see Intro (pg xi) | [112] | [113] |
| Volkswagen | Fox | All CIS | 1978 | 1990 | 4.7/5.4 | 68.2/78.3 | 3.4/3.8 | 49.3/55.1 | 1.3/1.7 | 18.9/24.7 | 2.4 | 34.8 | 10 MIN | see Intro (pg xi) | [112] | [113] |
| Volkswagen | Golf | All CIS-E | 1987 | 1990 | 5.2/5.6 | 75.4/81.2 | 4.7/5.4 | 68.2/78.3 | 4.0/4.9 | | 2.6 | 37.7 | 10 MIN | see Intro (pg xi) | [112] | [113] |
| | | All CIS | 1985 | 1987 | 4.7/5.4 | 68.2/78.3 | 3.4/3.8 | 49.3/55.1 | 1.3/1.7 | 18.9/24.7 | 2.4 | 34.8 | 10 MIN | see Intro (pg xi) | [112] | [113] |
| | | All CIS-E | 1985 | 1989 | 5.2/5.6 | 75.4/81.2 | 4.7/5.4 | 68.2/78.3 | 4.0/4.9 | 58.0/71.1 | 2.6 | 37.7 | 10 MIN | see Intro (pg xi) | [112] | [113] |
| | | All CIS-E Motronic | 1990 | 1992 | 6.1/6.6 | 88.5/95.7 | 5.6/6.3 | 81.2/91.4 | 4.2/5.3 | 60.9/76.9 | 3.3 | 47.9 | 10 MIN | see Intro (pg xi) | [112] | [113] |
| Volkswagen | Jetta | | | | | | | | | | | | | | | |
| | | All CIS | 1980 | 1984 | 4.7/5.4 | 68.2/78.3 | 3.4/3.8 | 49.3/55.1 | 1.3/1.7 | 18.9/24.7 | 2.4 | 34.8 | 10 MIN | see Intro (pg xi) | [112] | [113] |
| | | All CIS-E | 1985 | 1989 | 5.2/5.6 | 75.4/81.2 | 4.7/5.4 | 68.2/78.3 | 4.0/4.9 | 58.0/71.1 | 2.6 | 37.7 | 10 MIN | see Intro (pg xi) | [112] | [113] |
| | | All CIS-E Motronic | 1990 | 1992 | 6.1/6.6 | 88.5/95.7 | 5.6/6.3 | 81.2/91.4 | 4.2/5.3 | 60.9/76.9 | 3.3 | 47.9 | 10 MIN | see Intro (pg xi) | [112] | [113] |

* Note : Heading definitions for columns are found on page xii       Footnote references are found on pages 40-44 *

BOSCH CIS FUEL PRESSURE SYSTEMS

| MAKE | MODEL | ENGINE | FROM YEAR | TO YEAR | SYSTEM PRESSURE BAR | PSI | CONTROL/DIFFERENTIAL WARM BAR | PSI | CONTROL/DIFFERENTIAL @ 68 DEGREE F BAR | PSI | REST PRESSURE BAR | PSI | REST TIME | ADAPTER FITTING | FITTING LOCATION | MANUAL PUMP ENERGIZE |
|---|---|---|---|---|---|---|---|---|---|---|---|---|---|---|---|---|
| Volkswagen (cont.) | Passat | | | | | | | | | | | | | | | |
| Volkswagen | Pickup | All CIS-E | 1990 | 1993 | 6.10.6 | 88.5/95.7 | 5.06.3 | 81.2/91.4 | 4.25.3 | 60.9/76.9 | 3.3 | 47.9 | 10 MIN | see intro (pg xi) | [112] | [113] |
| Volkswagen | Quantum | All CIS | 1980 | 1984 | 4.75.4 | 68.2/78.3 | 3.43.6 | 49.3/55.1 | 1.31.7 | 18.9/24.7 | 2.4 | 34.8 | 10 MIN | see intro (pg xi) | [112] | [113] |
| | | All CIS | 1982 | 1984 | 4.75.4 | 68.2/78.3 | 3.43.8 | 49.3/55.1 | 1.31.7 | 18.9/24.7 | 2.4 | 34.8 | 10 MIN | see intro (pg xi) | [112] | [113] |
| Volkswagen | Rabbit | All CIS-E | 1985 | 1988 | 5.25.6 | 75.4/81.2 | 4.75.4 | 66.2/78.3 | 4.04.9 | 58.0/71.1 | 2.6 | 37.7 | 10 MIN | see intro (pg xi) | [112] | [113] |
| Volkswagen | Scirocco | All CIS | 1977 | 1984 | 4.75.4 | 68.2/78.3 | 3.43.8 | 49.3/55.1 | 1.31.7 | 18.9/24.7 | 2.4 | 34.8 | 10 MIN | see intro (pg xi) | [112] | [113] |
| | | All CIS | 1978 | 1988 | 4.75.4 | 68.2/78.3 | 3.43.8 | 49.3/55.1 | 1.31.7 | 18.9/24.7 | 2.4 | 34.8 | 10 MIN | see intro (pg xi) | [112] | [113] |
| Volvo | 240 | All CIS-E | 1988 | 1988 | 5.25.6 | 75.4/81.2 | 4.75.4 | 66.2/78.3 | 4.04.9 | 58.0/71.1 | 2.6 | 37.7 | 10 MIN | see intro (pg xi) | [112] | [113] |
| Volvo | | B21F | 1976 | 1981 | 4.55.3 | 65.3/76.9 | 3.5/3.75 | 50.8/54.4 | 1.4/1.7 | 20.3/24.7 | 1.5 | 21.8 | 20 MIN | see intro (pg xi) | [112] | [113] |
| | | B21FT Turbo | 1981 | 1981 | 5.25.8 | 75.4/84.1 | 3.5/3.75 | 50.8/54.4 | 1.8/2.1 | 26.1/30.5 | 1.5 | 21.8 | 20 MIN | see intro (pg xi) | [112] | [113] |
| | | B21FT Turbo | 1982 | 1984 | 5.25.8 | 75.4/84.1 | 3.5/3.75 | 50.8/54.4 | 1.8/2.1 | 26.1/30.5 | 2.0 | 29.0 | 20 MIN | see intro (pg xi) | [112] | [113] |
| Volvo | 260 | B27F | 1976 | 1979 | 4.55.3 | 65.3/76.9 | 3.5/3.75 | 50.8/54.4 | 1.01.3 | 14.5/18.9 | 1.5 | 21.8 | 20 MIN | see intro (pg xi) | [112] | [113] |
| | | B27F | 1978 | 1979 | 4.55.3 | 65.3/76.9 | 3.03.3 | 43.5/47.9 | 1.4/1.7 | 20.3/24.7 | 1.5 | 21.8 | 20 MIN | see intro (pg xi) | [112] | [113] |
| | | B28F | 1980 | 1982 | 4.55.3 | 65.3/76.9 | 3.43.75 | 49.3/54.4 | 2.02.4 | 29.0/34.8 | 1.5 | 21.8 | 20 MIN | see intro (pg xi) | [112] | [113] |
| Volvo | 760 | | | | | | | | | | | | | | | |
| | | B28F | 1982 | 1985 | 4.75.5 | 68.2/79.8 | 3.43.75 | 49.3/54.4 | 1.8/2.2 | 27.0/31.9 | 2.4 | 34.8 | 20 MIN | see intro (pg xi) | [112] | [113] |

Note: Heading definitions for columns are found on page xii    Footnote references are found on pages 40-44

Application Guide/ Vehicle Look-up Tables:

Look-up Table Numerical Footnotes:

These footnotes correspond to the numbers used in the table columns. They are used to elaborate the needed information for the specific column under which each number was found.

(*) Pump running.

(1) Unable to test deadhead pressure; there is no fuel return hose.

(2) Using a 15 amp fused jumper wire; ground dark blue/yellow trace wire in the diagnostic connector.

(3) Unplug fuel pump relay; jumper across wires corresponding to pins 30, 87 on relay with a fused jumper wire.

(4) Using a fused jumper wire; apply 12 volts to the fuel pump test connector located on the passenger side, near airflow meter.

(5) Unplug the auto shutdown relay and jumper across wires corresponding to pins 30, 87 on relay with a fused jumper wire.

(6) Using a fused jumper wire, apply 12 volts to the fuel pump test connector, located on the firewall near master cylinder.

(7) Using a fused jumper wire, apply 12 volts to the fuel pump test connector, located on the firewall, halfway between center and passenger side.

(8) Using a fused jumper wire, apply 12 volts to the fuel pump test connector, located on firewall halfway between the center and the drivers side.

(9) Using a fused jumper wire, apply 12 volts to the fuel pump test connector, located on firewall near battery.

(10) Locate the Auto Shutdown Module on the passenger side fender area; unplug connector; jumper 12 volts to the dark green wire with a fused jumper wire. NOTE: Be aware in the ASD connector there is also a light green wire. Do not jumper this wire.

(11) Using a fused jumper wire, apply 12 volts to the fuel pump test connector, located inside vehicle, on the passenger side kick panel area.

(12) Using a fused jumper wire, apply 12 volts to the fuel pump test connector located on passenger fender, near firewall.

(13) Using a fused jumper wire, apply 12 volts to the fuel pump test connector, located near battery.

Application Guide/ Vehicle Look-up Tables:

Look-up Table Numerical Footnotes: (cont.)

(14) Using a fused jumper wire, apply 12 volts to the fuel pump test connector located on the firewall near the intake manifold.

(15) Using a fused jumper wire, apply 12 volts to the fuel pump test connector, located in engine compartment, between the air cleaner assembly and the upper radiator hose.

(16) Pressure should drop in relation to the volume applied to the pressure regulator. Two inches of vacuum will result from "Key On, Engine Off" pressure and engine running vacuum level.

(17) At the six pin check connector, jump the F terminal (white/black wire) to the ground (black wire).

(18) Approximately 50 PSI during boost.

(19) EEC IV. "Key On, Engine Off", ground pin 6 self test connector. (see Diagram 1, Footnote Diagrams)

(20) OBD II. If it has standard relays, remove fuel pump relay and jump between two closest terminals, pins 1 & 2. (see Diagram 2, Footnote Diagrams). If it has an integrated controller, apply 12 volts to pump at inertia switch connector.

(21) EEC III. Locate fuel pump relay, (green connector) and ground (tan/light green wire) with "Key On, Engine Off".

(22) MECS VAF. "Key On, Engine Off", prop open vane air flow meter door.

(23) If 60 pin ECA, same as (1); if 104 pin ECA, same as (2).

(24) MECS. "Key On, Engine Off", jump 2 wire fuel pump test connector located in rear of engine compartment.

(25) Villager. Remove fuel pump relay from relay box; jump pins 1 & 2. (see Diagram 2, Footnote Diagrams)

(26) Ground pin 22 at underhood DLC connector "Key On, Engine Off". (see Diagram 3, Footnote Diagrams)

(27) Install fused jumper from B+ to fuel pump prime connector located under hood near firewall on left hand side.

(28) Install fused jumper from B+ to fuel pump prime connector located under hood near firewall on right hand side.

Application Guide/ Vehicle Look-up Tables:

Look-up Table Numerical Footnotes: (cont.)

(29) Install fused jumper from B+ to fuel pump prime connector located on the left hand side of the engine compartment, near the bulkhead connector.

(30) Install fused jumper from B+ to fuel pump prime connector taped to harness near transmission.

(31) Install fused jumper from B+ to fuel pump prime connector taped to harness of left shock tower.

(32) Install fused jumper from B+ to fuel pump prime connector taped to harness near battery.

(33) Install fused jumper from B+ to fuel pump feed wire (grey, terminal 6) at fuel control module. Install second jumper wire from ground to fuel pump ground terminal (black, terminal 4) at fuel control module. Module located under rear seat on left side.

(34) Install fused jumper from B+ to fuel pump relay connector.

(35) Install fused jumper from B+ to fuel pump prime connector taped to harness below generator.

(36) Install fused jumper from B+ to fuel pump prime connector in harness on left side of engine compartment.

(37) Install fused jumper from B+ to fuel pump prime connector taped to harness below left side electrical center.

(38) Install fused jumper from B+ to fuel pump prime connector, right hand side of engine compartment under washer tank.

(39) Install fused jumper from B+ to fuel pump prime connector behind right hand wheel well in engine compartment.

(40) Install fused jumper from B+ to fuel pump prime connector terminal G in ALDL connector.

(41) Install fused jumper from B+ to fuel pump prime connector taped to harness behind transmission.

(42) Install fused jumper from B+ to fuel pump prime connector which is taped to wiring harness in the left rear of engine compartment near the bulkhead connector.

Application Guide/ Vehicle Look-up Tables:

Look-up Table Numerical Footnotes: (cont.)

(43) Install fused jumper from B+ to fuel pump prime connector, left hand front of engine compartment behind battery.

(44) Install fused jumper from B+ to fuel pump prime connector located underhood near firewall on right hand side.

(45) Install fused jumper from B+ to fuel pump prime connector located in engine harness near distributor.

(46) Install fused jumper from B+ to fuel pump prime connector located left hand front engine compartment under washer bottle.

(47) Install fused jumper from B+ to fuel pump prime connector near right hand wheel well in engine compartment.

(48) Install fused jumper from B+ to the data link connector, terminal fp.

(49) Install fused jumper from B+ to fuel pump prime connector near thermostat housing.

(50) Install fused jumper from B+ to fuel pump prime connector located in front right hand corner of engine compartment.

(51) Ground ECU terminal 104 with key on.

(52) With a fused jumper, apply power to the black/red wire at the fuel pump relay in the underhood relay box.

(53) Jump power to the R/L at the fuel pump relay under the hood.

(54) Jump power to the R/G at the fuel pump relay under the hood.

(55) Jump pins 1(B/Y) and 3 (B/L) at the fuel pump relay.

(56) Jump power to the fuel pump check connector (B/R) on the left inner vender.

(57) Jump power to the fuel pump check connector (G/R) on right inner fender.

(58) At data link connector F/P to ground, turn the key on.

(59) Jump 2 wire T-shaped connector by wiper motor. Wires are G/W & B.

(60) At diagnosis connector, jump F/P to ground

Application Guide/ Vehicle Look-up Tables:

Look-up Table Numerical Footnotes: (cont.)

(61) Jump 2 wire check connector on center of firewall. Wires are yellow/red or light green & black.

(62) Jump 2 wire yellow check connector on left side of firewall. Wires are light green & black.

(63) Jump 2 wire yellow check connector by the air flow sensor. Wires are black/red &black.

(64) Jump 2 wire yellow check connector behind the air flow sensor. Wires are brown/yellow & black.

(65) Jump 2 wire yellow check connector behind the air flow sensor. Wires are brown & black.

(66) Jump 2 wire yellow connector by the fuel filter. Wires are blue/green & black.

(67) With both hoses off; 45-55 with the lower hose on.

(68) Ground fuel pump at terminal 106 of the ECU.

(69) Ground ECU terminal108 (to energize fuel pump relay) or bypass fuel pump relay-jump black/white to white/black.

(70) Ground fuel pump at terminal 108 of the ECU or bypass fuel pump relay.

(71) Bypass fuel pump relay #1-jump black/white to light green/red.

(72) Ground ECU terminal 104 (to energize fuel pump relay) or bypass fuel pump relay-jump black/white to black/yellow.

(73) Ground ECU terminal 8 (to energize fuel pump relay) or bypass fuel pump relay-jump black/white to black/yellow.

(74) Bypass fuel pump relay-jump white/black to green.

(75) Jump power and ground to external fuel pump.

(76) Bypass fuel pump relay (jump white/black to orange) and ground fuel pump at fuel pump control unit (white wire).

(77) Ground fuel pump at ECU terminal 108 or at the fuel pump relay.

Application Guide/ Vehicle Look-up Tables:

Look-up Table Numerical Footnotes: (cont.)

(78) Ground fuel pump at ECU terminal 014 (to energize fuel pump relay) or bypass fuel pump relay-jump blue/black to black/red.

(79) Ground ECU terminal 8 (to energize fuel pump relay) or bypass fuel pump relay-jump blue/black to black/red.

(80) Ground ECU terminal 104 (to energize fuel pump relay) or bypass fuel pump relay-jump P/black to black/white.

(81) Ground ECU terminal 108 (to energize fuel pump relay) or bypass fuel pump relay-jump black/white to white/blue.

(82) Ground ECU terminal 104 (to energize fuel pump relay) or bypass fuel pump relay-jump black/white to white/blue.

(83) Bypass the fuel pump relay-jump blue to red/blue or ground fuel pump relay at terminal 18 of the ECU.

(84) Ground fuel pump at ECU terminal 108 or bypass fuel pump relay-jump orange to black.

(85) Ground fuel pump at ECU terminal 104 or bypass fuel pump relay-jump orange to black.

(86) Ground ECU terminal 11 (to energize fuel pump relay) or bypass fuel pump relay-jump black/white to black/yellow.

(87) Bypass fuel pump relay-jump black/white to black/yellow and ground fuel pump at fuel pump control module.

(88) Ground ECU terminal 108 (to energize fuel pump relay) or bypass fuel pump relay-jump purple to purple/white.

(89) Ground ECU terminal 104 (to energize fuel pump relay) or bypass fuel pump relay-jump purple to purple/white.

(90) Bypass fuel pump relay-jump white/black to white/purple.

(91) Ground ECU terminal 104 (to energize fuel pump relay) or bypass fuel pump relay-jump black/red to light green/red.

(92) Ground ECU terminal 104 (to energize fuel pump relay) or bypass fuel pump relay-jump brown to black/red.

(93) Ground fuel pump at ECU.

Application Guide/ Vehicle Look-up Tables:

Look-up Table Numerical Footnotes: (cont.)

(94) Ground fuel pump at ECU terminal 108.

(95) Ground ECU terminal 104 (to energize fuel pump relay) or bypass fuel pump relay-jump black/white to black/yellow.

(96) Ground fuel pump at ECU terminal O.

(97) Ground ECU terminal 108 (to energize fuel pump relay) or bypass fuel pump relay-jump white/green to white/blue.

(98) Between fuel filter & fuel pipe.

(99) Between fuel filter & injection body.

(100) On particular vehicles, do not perform fuel pressure check while fuel pressure regulator control system is operating (on hot restart); otherwise the pressure gauge might indicate incorrect readings. Wait at least 5 minutes after hot restart to check this value.

(101) Connect diagnosis connectors and turn key on; the fuel pump should cycle on & off.

(102) Connect green test mode connectors and turn the key on; the pump should cycle on & off.

(103) At fuel pump relay, jump the black/white to the purple/black. Turn on ignition switch.

(104) At control relay, jump the black/white to the purple/black. Turn on the ignition switch.

(105) At fuel pump relay, jump the white/blue to the purple. Turn on ignition switch.

(106) With the key on, jumper terminal marked +B and FP in the diagnosis box with a fused jumper wire.

(107) With the key on, jumper the 2 terminals together in the round 2 cavity connector near the air flow meter with a fused jumper wire.

(108) With the key on, jumper the 2 terminals together in the round 2 cavity connector near the power steering reservoir with a fused jumper wire.

(109) With the key on, jumper the 2 terminals together in the T-shaped 2 cavity connector near the right front strut tower with a fused jumper wire

Application Guide/ Vehicle Look-up Tables:

Look-up Table Numerical Footnotes: (cont.)

(110) With the key on, jumper the 2 terminals together in the T-shaped 2 cavity connector near the air flow meter with a fused jumper wire.

(111) With the key on, jumper the 2 terminals together in the T-shaped 2 cavity connector on the passenger side firewall with a fused jumper wire.

(112) When checking fuel pressure on a CIS system, the gauge should be hooked up in the following manner: Remove the fuel line from the center top port of the fuel distributor (this is the line that goes to the control pressure regulator). Place the gauge and valve assembly so that the valve is on the control pressure regulator side. Connect the valve side of the gauge to the control pressure regulator fuel line, then connect the gauge side to the center top port of the fuel distributor. In this position, with the gauge valve open, control pressure is measured and with the valve closed system pressure is measured.

When checking fuel pressure on a CIS-E system, the gauge should be hooked up in the following manner: Remove the fuel line to the cold start injector. Place the gauge and valve assembly so that the valve is on the cold start fuel distributor side. Connect the valve side of the gauge and valve assembly to the fuel distributor test port (8mm Banjo fitting) Connect the gauge side to the cold start injector fuel line. In this position, with the gauge valve open, differential pressure is measured and with the valve closed, system pressure is measured.

All pressures are listed in BAR. 1 BAR = 14.7 psi.

(113) To manually energize the fuel pump on the CIS or CIS-E equipped cars, you must bridge the safety circuit on the fuel pump relay. In most cases, applying 12 volts to pin 87 on the harness side of the relay will energize the fuel pump. In most cases the fuel pump relay is located in, or near, the main vehicle fuse panel, or near the vehicle ECU. Consult appropriate service manual for additional information.

(114) Crank engine, then turn key off. System should hold this pressure for at least 20 minutes.

(115) Bridge terminal 36 & 39 of air flow meter plug.

(116) Crank or run engine.

(117) Jump pins 5 & 6 in diagnostic connector D1.

(118) Key on.

Application Guide/Vehicle Look-up Tables:

Look-up Table Numerical Footnotes: (cont.)

(119) Using a fused jumper, apply power to black/purple wire at fuel pump relay.

(120) Using a fused jumper, apply power to wire at terminal 87/2 of fuel injection relay.

(121) Using a fused jumper, apply power to fuse #1.

(122) Using a fused jumper, apply power to fuse #11.

(123) Using a fused jumper, apply power to fuse #18.

(124) Using a fused jumper, apply power to fuse #20.

(125) Using a fused jumper, apply power to fuse #23.

(126) Using a fused jumper, apply power to fuse #C4.

(127) Using a fused jumper, apply power to fuse #2 in the auxiliary fuse panel.

(128) Using a fused jumper, apply power to fuse #34.

(129) Using a fused jumper, apply power to fuse #23 & #24.

(130) Using a fused jumper, apply power to the green/purple wire at the combined relay.

(131) Using a fused jumper, apply power to the output terminal of the fuel pump relay.

(132) Using a fused jumper, apply power to terminal 52 of the fuel pump relay socket.

(133) Using a fused jumper, apply power to terminal 87 of the fuel pump relay socket.

(134) Using a fused jumper, apply power to the white/purple wire at the fuel pump relay.

(135) Cycle ignition key.

(136) Fuel Filter.

(137) Fuel rail.

Application Guide/Vehicle Look-up Tables:

Look-up Table Numerical Footnotes: (cont.)

(138) Fuel inlet.

(139) Throttle body.

(140) Tee into pressure line.

(141) On fuel rail below EGR valve.

(142) On fuel rail below throttle body unit.

(143) Jumper pins 1 & 3 of the fuel pump relay.

(144) Jumper pins 3 & 4 of the fuel pump relay.

(145) Between filter & rail.

(146) At pressure regulator.

(147) At main hose to throttle body unit.

(148) Cold start injector.

(149) At fuel filter outlet.

(150) At fuel rail inlet.

(151) Fuel inlet pipe.

(152) Fuel delivery pipe.

(153) At fuel rail loop.

(154) At fuel pipe & main hose.

(155) At fuel rail plug.

(156) Rear of intake manifold, left side.

(157) With a fused jumper, apply power to the blue/black wire at the fuel pump relay, under the center of the instrument panel next to the ECM.

(158) T-connection for pressure regulator.

(159) Do not exceed pressure listed. Slowly block return line until pressure is reached, then release.

Application Guide/ Vehicle Look-up Tables:
Footnote Diagrams (cont.)
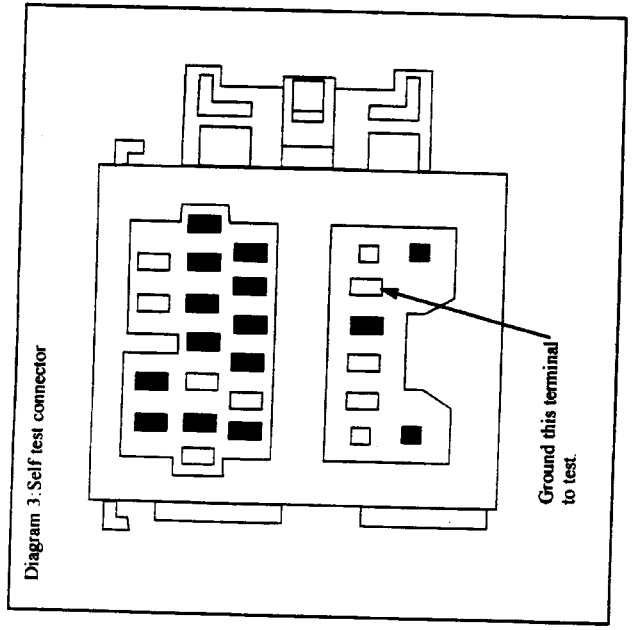
Diagram 3: Self test connector
Ground this terminal to test.
Application Guide/ Vehicle Look-up Tables:
Footnote Diagrams
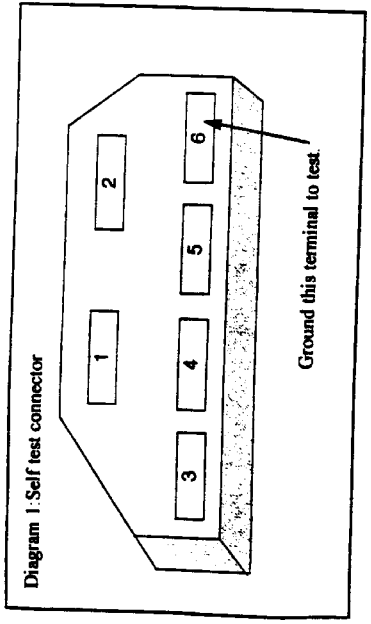
Diagram 1: Self test connector
Ground this terminal to test.
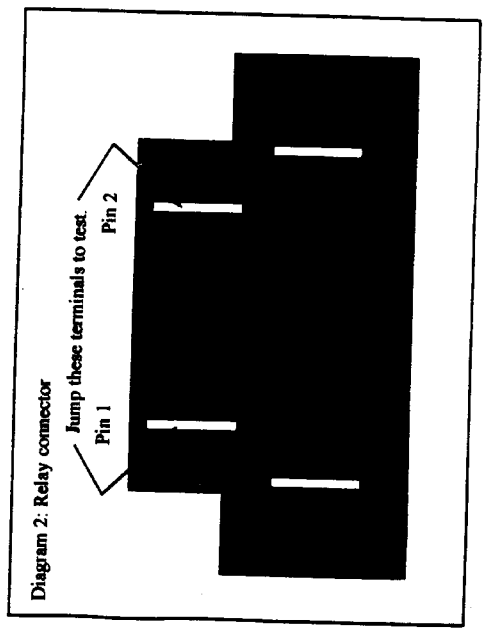
Diagram 2: Relay connector
Jump these terminals to test.
Pin 1  Pin 2

Appendix B

PAGE 1

LOC OBJECT CODE    LINE SOURCE TEXT
VALUE

```
00001 ;FILE:2001v603.ASM
00002 ;This is the source file for the T2001V5 pressure gauge based on 2001v337.asm
00003 ;March 4th 1997
00004 ;Fixed point divide routine is in Page 1.
00005 ;Dual slope ADC (Linear). 85 mS wait period to let analog settle before taking first reading.
00006 ;7 Constant tables.
00007 ;Unit starts up in Average mode with a NON blinking display.
00008 ;Hi res mode gives a blinking display.
00009 ;Display reads 00.0 for Pressures 0.6 PSI and lower(or the equivalent KPA).
00010 ;Offset temperature compensation is enabled. Span temperature compensation is enabled.
00011 ;Battery comparison is enabled. Reads battery every 256 samples.
00012 ;Battery voltage drop is compensated for by adding a factor to the pressure reading
00013 ;Temperature in place.
00014 ;Display the first reading in AVE mode.
00015 ;RS232 added (Display blinks when transmitting).
00016 ;RS232 subroutine in page 1.
00017 ;Zener diode used for temperature readings. (Forward biased) (12/18/96).
00018 ;ADC subroutines modified 12/23/96: TRISE,1 is set before each use to guarantee its state .
00019 ;Average mode: ':' sign is enabled along with a non-blinking display.
00020 ;Average mode: 12/28/96 ':' sign is disabled.
00021 ;12/28/96 ADC math is incorrect.The temperature differences were not cancelled out. It has been modified t
      o work properly.
00022 ;12/30/96 Still showing a 2% change over 100 F temperature differential. modifting the dual slope mechanis
      m.
00023 ;Dual slope modified to sawtooth .Now shows 1% change over same differential.(32F - 121F).
00024 ;Display starts to fade under 32F due to mechanical limitation of LCD.
00025 ;Calibration communication is two way 1/2/97.
00026 ;Peak hold sign reacts as soon as the switch is pressed 1/7/97.
00027 ;Switches more responsive : checks in between ADC reads (maybe check after Vref as well?).
00028 ;Reading pressure over 99.9 the display shows the 1 digit for 100 (moves display over one).
00029 ;Could only access 7 tables. Fixed to give a full complement of 8 (1/13/96).
00030 ;Temperature is now calculated correctly below 0 ( both F & C ) (1/16/96). Range: -50 > +260 F
00031 ;Dummy table installed in table 1 to allow functional testing before assembly. (2/18/97)
00032 ;Calibration: RS232 output line is activated as output and made hi as soon as calibration sequence is ente
      red (2/18/97)
00033 ;Calibration: 2nd 700 mS Time Delay removed from calibration sequence (2/18/97)
00034 ;Display is truncated when in Lo res mode (2/21/97)    x.0 - x.2 = x.0
00035 ;                                                      x.3 - x.7 = x.5
00036 ;                                                      x.8 - x.9 = x+1.0
00037 ;Truncation is applied to all 4 digits before any other mods are made to the display (e.g. shifting the di
      gits over)
00038 ;Truncation is disabled below 1.0 PSI and also for KPA(2/22/97)
00039 ;Average routine is implemented with the truncation(2/22/97)
00040 ;Average 4 samples then update the screen (2/24/97)
00041 ;Display showing numbers below 0.7 psi (3/4/97)
00042 ;Five integrator slopes to remove anomolous readings(3/4/97)
00043 ;Analog stays high between Pressure and Temperature readings(3/4/97)
00044 ;Four integrator slopes. first to avoid anomolies second for reference voltage third and fourth for readin
      gs(3/5/97)
00045 ;Integrator precharges while the analog is powering up. Three slopes follow for Reference, Pressure then T
      emperature(3/5/97)
00046 ;Fixed display bug: Hi res mode not shifting over when above 100 psi (3/5/97)
00047 ;Display Interrupt routine moved to second page (needed more room) (4/15/97)
```

```
MPASM 01.30.01 Intermediate  2001V603.ASM   4-15-1997  10:51:29    PAGE 2

LOC  OBJECT CODE      LINE SOURCE TEXT
     VALUE

00048 ;Lines added to control extra segment {4/15/97}
                      00049 ;DISPTABLE and DISPLAY subroutines swapped in memory. DISPTABLE is located in the bottom of Page0 to guara
                            ntee it is within a 256 ;    byte boundry for the indirect call.{4/15/97}
                      00050 ;
                      00051 ;
                      00052 ;PROBLEMS:
                      00053 ;
                      00054 ;*********************************************************************************
                            ******************
                      00055
                      00056
                      00057                 LIST  P=16C65
     2007 3FB1        00058                 __CONFIG  B'11111110110001'
                      00059
                      00060 ;*********************************************************************************
                            ******************
                      00061
                      00062 ;Set up assembler definitions
                      00063
                      00064 ;    STATUS bit definitions
                      00065
                      00066                 #define    _C        STATUS,0
                      00067                 #define    _Z        STATUS,2
                      00068                 #define    LSB       0       ;For Double precision math routine
                      00069                 #define    DX1       .2
                      00070
                      00071 ;---------------------------------------------------------------------------------
                            -----------------
                      00072 ;Set up the special function registers
                      00073
  00000000            00074 INDF     EQU    00h        ;Indirect addressing register
  00000001            00075 TMR0     EQU    01h        ;Timer register
  00000002            00076 PCL      EQU    02h        ;Low byte of program counter
  00000003            00077 STATUS   EQU    03h        ;Status register
  00000004            00078 FSR      EQU    04h        ;File select register
  00000005            00079 PORTA    EQU    05h        ;Set the name for port A
  00000006            00080 PORTB    EQU    06h        ;Set the name for port B
  00000007            00081 PORTC    EQU    07h        ;Set the name for port C
  00000008            00082 PORTD    EQU    08H        ;Set the name for port D
  00000009            00083 PORTE    EQU    09H        ;Set name for Port E
  0000000A            00084 PCLATH   EQU    0Ah        ;
  0000000B            00085 INTCON   EQU    0Bh        ;Interrupt control register
  0000000C            00086 PIR1     EQU    0Ch        ;Peripheral interrupt register 1
  0000000E            00087 TMR1L    EQU    0Eh        ;Timer 1 least significant byte
  0000000F            00088 TMR1H    EQU    0Fh        ;Timer 1 most significant byte
  00000010            00089 T1CON    EQU    10h        ;Timer 1 control
  00000011            00090 TMR2     EQU    11h        ;Timer 2
  00000012            00091 T2CON    EQU    12h        ;Timer 2 control
  00000013            00092 SSPBUF   EQU    13h        ;Serial synchronous port rx buffer, tx register
  00000014            00093 SSPCON   EQU    14h        ;Serial synchronous port control
  00000015            00094 CCPR1L   EQU    15h        ;Capture compare duty cycle register 1 low byte
  00000016            00095 CCPR1H   EQU    16h        ;Capture compare duty cycle register 1 high byte
  00000017            00096 CCP1CON  EQU    17h        ;Capture compare 1 control
```

MPASM 01.30.01 Intermediate 2001V603.ASM   4-15-1997  10:51:29    PAGE 3

```
LOC  OBJECT CODE    LINE  SOURCE TEXT
VALUE 00000018           00097 RCSTA        EQU     18h         ;Receive status and control register
                   00098
                   00099
00000001           00100 OPTION_REG   EQU     01h         ;BANK 1 - Option register
00000005           00101 TRISA        EQU     05h         ;BANK 1 - Port A direction register 1=in, 0=out
00000006           00102 TRISB        EQU     06h         ;BANK 1 - Port B direction register 1=in, 0=out
00000007           00103 TRISC        EQU     07h         ;BANK 1 - Port C direction register
00000008           00104 TRISD        EQU     08H         ;BANK 1
00000009           00105 TRISE        EQU     09H         ;BANK 1
0000000C           00106 PIE1         EQU     0Ch         ;BANK 1 - Peripheral interrupt enable register 1
0000000E           00107 PCON         EQU     0Eh         ;BANK 1 - Power on control register
00000012           00108 PR2          EQU     12h         ;BANK 1 - Timer 2 period register
00000013           00109 SSPADD       EQU     13h         ;BANK 1 - Serial synchronous port (I2C) address register
00000014           00110 SSPSTAT      EQU     14h         ;BANK 1 - Serial synchronous port status register
0000001F           00111 ADCON1       EQU     1Fh         ;BANK 1 - A/D converter control- for emulator only
                   00112
                   00113 ;--------------------------------------------------------------------------------
                         -----------------
                   00114 ;Allocate RAM Registers for Bank 0
                   00115
00000020           00116 TEMP         EQU     20h         ;Allocate memory for temporary value
00000021           00117 TEMP1        EQU     21h         ;Allocate memory for temporary value
00000022           00118 TEMP2        EQU     22h         ;Allocate memory for beep
00000023           00119 WAITCNTR     EQU     23h         ;Allocate memory for wait counter
00000024           00120 EWAITCNTR    EQU     24h         ;Allocate memory for wait counter
00000025           00121 BEEPTIME     EQU     25h         ;Allocate memory for passing number of 10 ms intervals for beeper
00000026           00122 BATTH        EQU     26h         ;Allocate memory for high byte of battery voltage reading
00000027           00123 BATTL        EQU     27h         ;Allocate memory for low byte of battery voltage reading
00000028           00124 TREFH        EQU     28h         ;Allocate memory for high byte of ADC reference time reading
00000029           00125 TREFL        EQU     29h         ;Allocate memory for low byte of ADC reference time reading
0000002A           00126 TEMPSH       EQU     2Ah         ;Allocate memory for high byte of temperature reading
0000002B           00127 TEMPSL       EQU     2Bh         ;Allocate memory for low byte of temperature reading
0000002C           00128 LOOPY        EQU     2Ch         ;Wait loop before display refresh
0000002D           00129 COUNT        EQU     2Dh         ;Allocate memory for counter
0000002E           00130 DISPL_TP     EQU     2Eh         ;Temporary registers for display values
0000002F           00131 DISPH_TP     EQU     2Fh         ;used in 5 minute shut down routine
                   00132
                   00133
00000030           00134 DISPH        EQU     30h         ;Allocate memory for high byte of display
                   00135                                  ; Low nibble is 100s digit
                   00136                                  ; High nibble is 1000s digit
00000031           00137 DISPL        EQU     31h         ;Allocate memory for low byte of display
                   00138                                  ; Low nibble is 1s digit
                   00139                                  ; High nibble is 10s digit
00000032           00140 spare1       EQU     32h         ;Allocate
00000033           00141 spare2       EQU     33h         ;Allocate
00000034           00142 spare3       EQU     34h         ;Allocate
00000035           00143 spare4       EQU     35h         ;Allocate
00000036           00144 RX_REG       EQU     36h         ;Receive register for calibration RS232
00000037           00145 FCTN_PH      EQU     37h         ;Peak hold needs some duplicate flags setting for minus sign etc
                   00146                                  ;Bit allocations:
                   00147                                  ;0 =              4 =
                   00148                                  ;1 =              5 =
```

MPASM 01.30.01 Intermediate 2001V603.ASM   4-15-1997   10:51:29      PAGE  4

```
LOC  OBJECT CODE     LINE  SOURCE TEXT
VALUE

00149                                ;2 =             6 = Pressure over 99.9 PSI
                     00150                                ;3 =             7 = Turns on minus sign if pressure negative
00000038             00151  CALPRESH    EQU    38h        ;Allocate memory for high byte of pressure calibration
00000039             00152  CALPRESL    EQU    39h        ;Allocate memory for low byte of pressure calibration
0000003A             00153  CALBATTH    EQU    3Ah        ;Allocate memory for high byte of battery voltage comparasin
0000003B             00154  PRESS_DIFH  EQU    3Bh        ;Difference in pressures
0000003C             00155  CALTEMPH    EQU    3Ch        ;Allocate memory for high byte of temperature calibration
0000003D             00156  CALTEMPL    EQU    3Dh        ;Allocate memory for low byte of temperature calibration
0000003E             00157  ZPRESH      EQU    3Eh        ;Allocate memory for high byte of zero pressure reading
0000003F             00158  ZPRESL      EQU    3Fh        ;Allocate memory for low byte of zero pressure reading
                     00159
00000040             00160  CALBATTL    EQU    40h        ;
00000041             00161  CALOFFSH    EQU    41h        ;
00000042             00162  CALOFFSL    EQU    42h        ;
00000043             00163  VOLTH       EQU    43h        ;Register to hold the high byte of the value of voltage computed
00000044             00164  VOLTL       EQU    44h        ;Register to hold the low byte of the value of voltage computed
00000045             00165  RPRESH      EQU    45h        ;Register to hold the high byte of the final pressure reading
00000046             00166  RPRESL      EQU    46h        ;Register to hold the low byte of the final pressure reading
00000047             00167  DISPST      EQU    47h        ;Register to hold the current state of the display counter (0 to 3)
00000048             00168  DISPT       EQU    48h        ;Register to store temporary data for the display state
00000049             00169  WHOLD       EQU    49h        ;Register to hold W during interrupt(Mirrored in Bank1)
0000004A             00170  BATTANN     EQU    4Ah        ;Register for whether to show battery annunciator- 1 if on, 0 if off
0000004B             00171  WTEMP       EQU    4Bh        ;Used in display for swap command
0000004C             00172  FCTN_MDE    EQU    4Ch        ;Used for setting symbols and function
                     00173                                ;Bit allocations:
                     00174                                ;0 = PSI          4 = Pressure
                     00175                                ;1 = kPa          5 = Temperature
                     00176                                ;2 = degrees C    6 = Recalibrate on fire up
                     00177                                ;3 = degrees F    7 = Turns on minus sign if pressure negative
                     00178
0000004D             00179  DISPSTOE    EQU    4Dh        ;Memory for port E display
0000004E             00180  DISPST1E    EQU    4Eh        ;Memory for port E display
0000004F             00181  DISPST2E    EQU    4Fh        ;Memory for port E display
                     00182
00000050             00183  ACCaHI      EQU    50h        ;Allocate memory for double precision math
00000051             00184  ACCaLO      EQU    51h        ;Allocate memory for double precision math
00000052             00185  ACCbHI      EQU    52h        ;Allocate memory for double precision math
00000053             00186  ACCbLO      EQU    53h        ;Allocate memory for double precision math
00000054             00187  ACCcHI      EQU    54h        ;Allocate memory for double precision math
00000055             00188  ACCcLO      EQU    55h        ;Allocate memory for double precision math
00000056             00189  ACCdHI      EQU    56h        ;Allocate memory for double precision math
00000057             00190  ACCdLO      EQU    57h        ;Allocate memory for double precision math
00000058             00191  ACCeHI      EQU    58h        ;Allocate memory for double precision math
00000059             00192  ACCeLO      EQU    59h        ;Allocate memory for double precision math
0000005A             00193  MTEMP       EQU    5Ah        ;Allocate memory for temporary math register
0000005B             00194  SWITCHES    EQU    5Bh        ;Register to determine mode selection from switches
                     00195                                ;Bit allocations:
                     00196                                ;0 = Temp flag (Ave)    4 = Average Not Finished
                     00197                                ;1 = Average Activate   5 = On/Off flag
                     00198                                ;2 = Peak Activate      6 = Display first reading in AVE mode.
                     00199                                ;3 = Temp flag (Peak)   7 =
                     00200
0000005C             00201  CALSPANH    EQU    5Ch        ;High byte for Span multiplier
```

```
MPASM 01.30.01 Intermediate 2001V603.ASM   4-15-1997  10:51:29      PAGE 5

LOC  OBJECT CODE    LINE SOURCE TEXT
VALUE 0000005D          00202 CALSPANL    EQU    5Dh       ;Low byte for span multiplier
0000005E          00203 PCLATH_HOLD EQU    5Eh       ;Temporary register for PCLATH which interupt updates display(Mirrored
                        in Bank1)
0000005F          00204 LOOPY2      EQU    5Fh       ;Number of samples for averaging routine
                  00205
00000060          00206 DISPST0B    EQU    60h       ;Memory for port B part of display for state 0
00000061          00207 DISPST0C    EQU    61h       ;Memory for port C part of display for state 0
00000062          00208 DISPST1B    EQU    62h       ;Memory for port B part of display for state 1
00000063          00209 DISPST1C    EQU    63h       ;Memory for port C part of display for state 1
00000064          00210 DISPST2B    EQU    64h       ;Memory for port B part of display for state 2
00000065          00211 DISPST2C    EQU    65h       ;Memory for port C part of display for state 2
00000066          00212 DISPST3B    EQU    66h       ;Memory for port B part of display for state 3
00000067          00213 DISPST3C    EQU    67h       ;Memory for port C part of display for state 3
00000068          00214 AVERAGEH    EQU    68h       ;Storage for HIGH third byte of Average calculation
00000069          00215 AVERAGEM    EQU    69h       ;Storage for MIDDLE second byte of Average calculation
0000006A          00216 AVERAGEL    EQU    6Ah       ;Storage for LOW first byte of Average calculation
0000006B          00217 DISPST0D    EQU    6Bh       ;Memory for port D part of display for state 0
0000006C          00218 DISPST1D    EQU    6Ch       ;Memory for port D part of display for state 1
0000006D          00219 DISPST2D    EQU    6Dh       ;Memory for port D part of display for state 2
0000006E          00220 DISPST3D    EQU    6Eh       ;Memory for port D part of display for state 3
0000006F          00221 DISPST3E    EQU    6Fh       ;Memory for port E
                  00222
00000070          00223 BATTCNT     EQU    70h       ;Counter for battery sample.
00000071          00224 TESTFLAGS   EQU    71h       ;
                  00225                              ;Bit allocations:
                  00226                              ;0 = Calibrating        4 =
                  00227                              ;1 = Testing            5 =
                  00228                              ;2 =                    6 =
                  00229                              ;3 =                    7 =
                  00230
00000072          00231 OLDDISPH    EQU    72h       ;Previous reading high byte
00000073          00232 OLDDISPL    EQU    73h       ;Previous reading low byte
00000074          00233 TIME_ON     EQU    74h       ;Counter for number of reading cycles
00000076          00234 XMIT        EQU    76h       ;Rotation buffer for serial output routine
00000077          00235 TBLOS       EQU    77h       ;Table offset variable
00000078          00236 TEMPSH1     EQU    78h       ;Temporary temperature register (high byte)
00000079          00237 TEMPCAL     EQU    79h       ;Temperature calibration factor from the cal system
0000007A          00238 STATUS_HOLD EQU    7Ah       ;Status hold register for use during interrupt (mirrored in Bank1)
0000007B          00239 ADJ_ZEROH   EQU    7Bh       ;Adjusted zero temp reading
0000007C          00240 ADJ_ZEROL   EQU    7Ch       ;Adjusted zero temp reading
0000007D          00241 ZTEMPSH     EQU    7Dh       ;Zero baseline temp value
0000007E          00242 ZTEMPSL     EQU    7Eh       ;Zero baseline temp value
0000007F          00243 PRESS_DIFL  EQU    7Fh       ;Pressure difference
                  00244
                  00245                              ;Allocate RAM registers for FXD3216U
                  00246
                  00247                              ; Fixed point divide routine
                  00248                              ; These locations match those for the double precision math routines.
                  00249
00000050          00250 BARG        EQU    50h       ; most significant byte of argument B
00000050          00251 BARGB0      EQU    50h
00000051          00252 BARGB1      EQU    51h
00000052          00253 AARG        EQU    52h       ; most significant byte of argument A
```

```
MPASM 01.30.01 Intermediate  2001V603.ASM   4-15-1997  10:51:29     PAGE  6

LOC  OBJECT CODE    LINE SOURCE TEXT
VALUE 00000052            00254 AARGB0        EQU     52h
00000053            00255 AARGB1        EQU     53h
00000054            00256 AARGB2        EQU     54h
00000055            00257 AARGB3        EQU     55h
00000052            00258 ACC           EQU     52h    ; most significant byte of contiguous 8 byte accumulator
00000052            00259 ACCB0         EQU     52h    ; these locations match those for argument A
00000053            00260 ACCB1         EQU     53h
00000054            00261 ACCB2         EQU     54h
00000055            00262 ACCB3         EQU     55h
00000056            00263 REMB0         EQU     56h    ; most significant byte of remainder
00000057            00264 REMB1         EQU     57h
00000058            00265 LOOPCOUNT     EQU     58h    ; loop counter
                    00266
                    00267 ;-------------------------------------------------------------------------------------
                    00268 ;Allocate RAM registers for Bank 1
                    00269
00000020            00270 TEMPERHI              EQU     20h    ;High byte of 16 bit ADC reading for 150 F
00000021            00271 TEMPERLO              EQU     21h    ;Low byte of 16 bit ADC reading for 150 F
00000022            00272 TREADHI       EQU     22h    ;High byte of actual temperature reading in 0.1 F increments (@ 150 F)
00000023            00273 TREADLO       EQU     23h    ;Low byte of actual temperature reading in 0.1 F increments (@ 150 F)
00000024            00274 OFF_ST_HI     EQU     24h    ;High byte for Offset Storage when linearizing thermistor
00000025            00275 OFF_ST_LO     EQU     25h    ;Low byte for Offset Storage when linearizing thermistor
00000026            00276 INITBATTH     EQU     26h    ;High byte for initial battery reading (Battery compensation)
00000027            00277 INITBATTL     EQU     27h    ;Low byte for initial battery reading (Battery compensation)
00000028            00278 NEWBATTH              EQU     28h    ;High byte for new battery reading (Battery compensation)
00000029            00279 NEWBATTL              EQU     29h    ;Low byte for new battery reading (Battery compensation)
                    00280
0000002A            00281 PBUFF1H       EQU     2Ah    ;Filter buffer: pressure
0000002B            00282 PBUFF1L       EQU     2Bh    ;Filter buffer: pressure
0000002C            00283 PBUFF2H       EQU     2Ch    ;Filter buffer: pressure
0000002D            00284 PBUFF2L       EQU     2Dh    ;Filter buffer: pressure
0000002E            00285 PFCOUNT       EQU     2Eh    ;Filter counter: pressure
                    00286
0000002F            00287 TBUFF1H       EQU     2Fh    ;Filter buffer: temperature
00000030            00288 TBUFF1L       EQU     30h    ;Filter buffer: temperature
00000031            00289 TBUFF2H       EQU     31h    ;Filter buffer: temperature
00000032            00290 TBUFF2L       EQU     32h    ;Filter buffer: temperature
00000033            00291 TFCOUNT       EQU     33h    ;Filter counter: temperature
                    00292
                    00293
00000034            00294 SBUFF1        EQU     34h    ;VOLTH: adc reading Pre Math (Pressure)
00000035            00295 SBUFF2        EQU     35h    ;VOLTL: adc reading Pre Math (Pressure)
00000036            00296 SBUFF3        EQU     36h    ;BATTH: adc reading Pre Math (Battery)
00000037            00297 SBUFF4        EQU     37h    ;BATTL: adc reading Pre Math (Battery)
00000038            00298 SBUFF5        EQU     38h    ;TEMPSH: adc reading Pre Math (Temperature)
00000039            00299 SBUFF6        EQU     39h    ;TEMPSL: adc reading Pre Math (Temperature)
0000003A            00300 SBUFF7        EQU     3Ah    ;DISPH: Output to display after Math
0000003B            00301 SBUFF8        EQU     3Bh    ;DISPL: Output to display after Math
0000003C            00302 SBUFF9        EQU     3Ch    ;FCTN_MDE
0000003D            00303 SBUFF10       EQU     3Dh    ;SWITCHES
0000003E            00304 SBUFF11       EQU     3Eh    ;CALPRESSH
0000003F            00305 SBUFF12       EQU     3Fh    ;CALPRESSL
```

MPASM 01.30.01 Intermediate  2001V603.ASM   4-15-1997  10:51:29        PAGE  7

LOC  OBJECT CODE     LINE  SOURCE TEXT
     VALUE 00000040        00306 SBUFF13    EQU    40h      ;CALOFFH
     00000041        00307 SBUFF14    EQU    41h      ;CALOFFL
     00000042        00308 SBUFF15    EQU    42h      ;CALSPANH
     00000043        00309 SBUFF16    EQU    43h      ;CALSPANL
     00000044        00310 SBUFF17    EQU    44h      ;CALTEMPH
     00000045        00311 SBUFF18    EQU    45h      ;CALTEMPL
     00000046        00312 SBUFF19    EQU    46h      ;ADJ_ZEROH
     00000047        00313 SBUFF20    EQU    47h      ;ADJ_ZEROL
     00000048        00314 SBUFF21    EQU    48h      ;VOLTH after compensation
     00000049        00315 WHOLDB1    EQU    49h      ;Temporary holding register for W reg in Bank1
     0000004A        00316 SBUFF22    EQU    4Ah      ;VOLTL after compensation
     0000004B        00317 SBUFF23    EQU    4Bh      ;RPRESH before BCD adj
     0000004C        00318 SBUFF24    EQU    4Ch      ;RPRESL before BCD adj
     0000004D        00319 SBUFF25    EQU    4Dh      ;ZPRESH
     0000004E        00320 SBUFF26    EQU    4Eh      ;ZRESL
     0000004F        00321 SBUFF27    EQU    4Fh      ;ZTEMPS
     00000050        00322 SBUFF28    EQU    50h      ;ZTEMPSL
     00000051        00323 SBUFF29    EQU    51h      ;TEMPERHI
     00000052        00324 SBUFF30    EQU    52h      ;TEMPERLO
     00000053        00325 SBUFF31    EQU    53h      ;TREADHI
     00000054        00326 SBUFF32    EQU    54h      ;TREADLO
     00000055        00327 SBUFF33    EQU    55h      ;BATTCNT
     00000056        00328 SBUFF34    EQU    56h      ;TIME_ON
     00000057        00329 TINFHI     EQU    57h      ;Temperature in F
     00000058        00330 TINFLO     EQU    58h      ;Temperature in F
                     00331
                     00332 ;********************************************************************************
                           *****************
                     00333 ;********************************************************************************
                           *****************
                     00334
                     00335 ;         START HERE
                     00336
                     00337 ;********************************************************************************
                           *****************
                     00338 ;********************************************************************************
                           *****************
                     00339
                     00340
0000                 00341           ORG     H'0'      ;Set the origin of the code to 0
0000 28C0            00342           GOTO    START     ;Jump over interrupt area and table pointer area
                     00343
                     00344                             ;Set up the pointers
0001                 00345           ORG     H'01'     ;Set up table for the pointers to the tables
0001 0782            00346 PNTRTBL   ADDWF   PCL,1     ;Add the offset to the Program counter low byte
0002 34FE            00347           RETLW   H'FE'     ;"FF" = NOT PROGRAMMED "FE" Gives table 1,"FC" table 2
                     00348
                     00349 ;********************************************************************************
                           *****************
                     00350
                     00351 ;Display refresh interupt.
                     00352 ;GIE (Global Interrupt Enable) is cleared on any interrupt call and set on interupt return (RETFIE)
                     00353 ;The periferal interupt flag needs to be cleared sometime within the interupt (preferably first)

MPASM 01.30.01 Intermediate  2001V603.ASM   4-15-1997  10:51:29     PAGE  8

LOC  OBJECT CODE    LINE SOURCE TEXT
     VALUE

```
                    00354 ;to avoid recursion.
                    00355 ;TMR2 is set to generate an interupt every 8mS.
                    00356 ;The PIR flag is cleared 8 instructions into the routine .Approximately 60 uS. Recursion is not a problem
                          here.
                    00357
                    00358
0004                00359             ORG     H'4'         ;Set origin for interrupt handler
0004 0000           00360 INT_VECTOR  NOP                  ;Emulator Breakpoint
0005 00C9           00361             MOVWF   WHOLD        ;Store away the W register
0006 0E03           00362             SWAPF   STATUS,0     ;SWAPF does not affect the status bits
0007 1283           00363             BCF     STATUS,5     ;Bank 0 Registers for other byte storage
0008 00FA           00364             MOVWF   STATUS_HOLD  ;Store status register
0009 080A           00365             MOVF    PCLATH,0     ;
000A 00DE           00366             MOVWF   PCLATH_HOLD  ;Store PCLATH register
000B 158A           00367             BSF     PCLATH,3     ;Page 1 code space
000C 1283           00368             BCF     STATUS,5     ;Bank 0 Registers
000D 108C           00369             BCF     PIR1,1       ;Clear the interrupt bit
Message[306]: Crossing page boundary -- ensure page bits are set.
000E 2800           00370             GOTO    INTER        ;Go to interrupt handler
                    00371
                    00372 ;************************************************************************************
                          ******************
                    00373
                    00374                                  ;LOOKUP TABLES FOR CALIBRATION CONSTANTS
                    00375                                  ;8 tables each with 20 bytes of space.
                    00376                                  ;only using 10 spaces (redundancy for 'ron)
                    00377
0010                00378             ORG     H'10'        ;Set up table for the constants
0010 0782           00379 CONSTBL     ADDWF   PCL,1        ;Add the offset to the Program counter low byte
0025                00380             ORG     H'25'        ;Put in the code space just above the startup vectors
0025 0782           00381             ADDWF   PCL,1        ;Add the offset to the Program counter low byte
003A                00382             ORG     H'3A'        ;Put in the code space just above the startup vectors
003A 0782           00383             ADDWF   PCL,1        ;Add the offset to the Program counter low byte
004F                00384             ORG     H'4F'
004F 0782           00385             ADDWF   PCL,1        ;Add the offset to the Program counter low byte
0064                00386             ORG     H'64'        ;Put in the code space just above the startup vectors
0064 0782           00387             ADDWF   PCL,1        ;Add the offset to the Program counter low byte
0079                00388             ORG     H'79'        ;Put in the code space just above the startup vectors
0079 0782           00389             ADDWF   PCL,1        ;Add the offset to the Program counter low byte
008E                00390             ORG     H'8E'        ;Put in the code space just above the startup vectors
008E 0782           00391             ADDWF   PCL,1        ;Add the offset to the Program counter low byte
00A3                00392             ORG     H'A3'        ;Put in the code space just above the startup vectors
00A3 0782           00393             ADDWF   PCL,1        ;Add the offset to the Program counter low byte
                    00394
                    00395                                  ;Dummy table for test purposes
                    00396 ;                       UNIT #
0011                00397             ORG     H'0011'
0011 342D           00398             RETLW   H'2D'        ;Calpresh
0012 3426           00399             RETLW   H'26'        ;Calpresl
0013 3401           00400             RETLW   H'01'        ;Caloffsh
0014 349A           00401             RETLW   H'9A'        ;Caloffsl
0015 3401           00402             RETLW   H'01'        ;Calspanh
0016 3495           00403             RETLW   H'95'        ;Calspanl
```

MPASM 01.30.01 Intermediate 2001V603.ASM   4-15-1997  10:51:29      PAGE 9

```
LOC  OBJECT CODE   LINE  SOURCE TEXT
     VALUE 0017 3438          00404         RETLW  H'38'         ;Calbatth
0018 3489          00405         RETLW  H'89'         ;Calbattl
0019 343B          00406         RETLW  H'3B'         ;Caltemph
001A 34E4          00407         RETLW  H'E4'         ;Caltempl
001B 342E          00408         RETLW  H'2E'         ;TEMPERHI (@ 85 F) 16 bit offset
001C 346A          00409         RETLW  H'6A'         ;TEMPERLO (@ 85 F)
001D 3402          00410         RETLW  H'02'         ;TREADHI (Exact temperature in 0.1 F increments)
001E 34F1          00411         RETLW  H'F1'         ;TREADLO (85 F = 850 decimal = 0352 hex)
001F 34FF          00412         RETLW  H'FF'         ;PcountaH
0020 34FF          00413         RETLW  H'FF'         ;PcountaL
0021 34FF          00414         RETLW  H'FF'         ;PcountbH
0022 34FF          00415         RETLW  H'FF'         ;PcountbL
0023 34FF          00416         RETLW  H'FF'         ;50_PSIHI (@ 85 F)
0024 34FF          00417         RETLW  H'FF'         ;50_PSILO (@ 85 F)
                   00418
                   00419
                   00420
00C0               00421         ORG    H'00C0'
                   00422
                   00423                              ;Initialize registers
00C0 1683          00424 START   BSF    STATUS,5      ;Set to address register bank 1
00C1 3034          00425         MOVLW  B'00110100'   ;Bring input output pattern for port A into W.
                   00426                              ;RA0 control for reading the battery voltage (output low to input)
                   00427                              ;RA1 power to the display backplanes (output)
                   00428                              ;RA2 control for reading the temperature voltage (output low to input)
                   00429                              ;RA3 integrator drive (output)
                   00430                              ;RA4 control for reading the pressure voltage (output low to input)
                                                      ;RA5 power for the op amp and comparator (output) (set as inp
00C2 0085          00431         MOVWF  TRISA         ;
00C3 3000          00432         MOVLW  B'00000000'   ;Bring input output pattern for port B into W.
                   00433                              ;RB0 is LCD 11 (output)
                   00434                              ;RB1 is LCD 10 (output)
                   00435                              ;RB2 is LCD 15 (output)
                   00436                              ;RB3 is LCD 14 (output)
                   00437                              ;RB4 is LCD 9 common (output)
                   00438                              ;RB5 is LCD 8 common (output)
                   00439                              ;RB6 is LCD 18 (output) & Programming pin
                   00440                              ;RB7 is LCD 17 (output) & Programming pin
00C4 0086          00441         MOVWF  TRISB         ;
00C5 3005          00442         MOVLW  B'00000101'   ;Bring input output pattern for port C into W.
                   00443                              ;RC0 is Average button (input) & beeper (output only when in BEEP)
                   00444                              ;RC1 is LCD 13(output)
                   00445                              ;RC2 is comparator output (input)
                   00446                              ;RC3 is LCD 12 (output)
                   00447                              ;RC4 is LCD 6 (output)
                   00448                              ;RC5 is LCD 5 (output)
                   00449                              ;RC6 is LCD 21(output)
                   00450                              ;RC7 is LCD 22(output)
00C6 0087          00451         MOVWF  TRISC         ;
00C7 3000          00452         MOVLW  B'00000000'   ;Bring output pattern for port D into W.
                   00453                              ;RD0 is LCD 24 (output) BATTERY
                   00454                              ;RD1 is LCD 22 (output) HOLD LCD
                   00455                              ;RD2 is LCD 16 (output) CENT/FARENHIET
```

MPASM 01.30.01 Intermediate 2001V603.ASM   4-15-1997  10:51:29      PAGE 10

LOC  OBJECT CODE   LINE SOURCE TEXT
     VALUE

```
                   00456                              ;RD3 is LCD 1  (output) +/-
                   00457                              ;RD4 is LCD 3  (ouput)
                   00458                              ;RD5 is LCD 2  (output)
                   00459                              ;RD6 is LCD 23 (output)
                   00460                              ;RD7 is LCD 22 (output)
00C8 0088          00461           MOVWF  TRISD
00C9 3006          00462           MOVLW  B'00000110'  ;Bring Input pattern for port E into W.
                   00463                              ;RE0 is LCD 4 (ouput) KPA
                   00464                              ;RE1 Reference voltage for ADC (input initialy)
                   00465                              ;RE2 Peak Hold button (input)
00CA 0089          00466           MOVWF  TRISE
                   00467
00CB 308F          00468           MOVLW  B'10001111'  ;Set OPTION register for WDT on longest delay -2 sec, timer internal,
                              port B internal
00CC 0081          00469           MOVWF  OPTION_REG ;
00CD 3020          00470           MOVLW  B'00100000'  ;Enable asynch receive interrupt, disable all others including timers
                              and A/D
00CE 008C          00471           MOVWF  PIE1       ;
                   00472          ;CLRF   PCON        ;Clear power on reset register
00CF 3006          00473           MOVLW  B'00000110'  ;Make all of the Port A lines digital- for emulator only
00D0 009F          00474           MOVWF  ADCON1     ;
00D1 307D          00475           MOVLW  .125        ;Load value for T2 timer for 8 ms
00D2 0092          00476           MOVWF  PR2         ;Preload the timer period register
00D3 3001          00477           MOVLW  H'01'       ;Preload value for PFILTER AND TFILTER counters
00D4 00AE          00478           MOVWF  PFCOUNT ;
00D5 00B3          00479           MOVWF  TFCOUNT ;
00D6 1283          00480           BCF    STATUS,5    ;Set to address register bank 0
                   00481
00D7 3000          00482           MOVLW  B'00000000'  ;Port A - All controls off
00D8 0085          00483           MOVWF  PORTA       ;
00D9 3000          00484           MOVLW  B'00000000'  ;Port B - All lines low
00DA 0086          00485           MOVWF  PORTB       ;
00DB 3000          00486           MOVLW  B'00000000'  ;Port C - All lines low
00DC 0087          00487           MOVWF  PORTC       ;
00DD 3000          00488           MOVLW  B'00000000'  ;Port D - All lines low
00DE 0088          00489           MOVWF  PORTD       ;
00DF 3000          00490           MOVLW  B'00000000'  ;Port E - All lines low
00E0 0089          00491           MOVWF  PORTE       ;
00E1 018C          00492           CLRF   PIR1        ;Clear peripheral register 1
00E2 3000          00493           MOVLW  B'00000000'  ;Disable Timer 1
                   00494
00E3 0090          00495           MOVWF  T1CON       ;
00E4 3000          00496           MOVLW  B'00000000'  ;Disable Timer 2
00E5 0092          00497           MOVWF  T2CON       ;
00E6 3000          00498           MOVLW  B'00000000'  ;Disable sync serial system
00E7 0094          00499           MOVWF  SSPCON      ;
00E8 3000          00500           MOVLW  B'00000000'  ;turn off capture compare 1
00E9 0097          00501           MOVWF  CCP1CON     ;
00EA 3030          00502           MOVLW  30h         ;Initial value
00EB 0084          00503           MOVWF  FSR         ;
00EC 30C0          00504           MOVLW  B'11000000'  ;Disable all interrupts except peripheral interrupts enabled by PIE1.
00ED 008B          00505           MOVWF  INTCON      ;Write to interrupt control register.
00EE 01CA          00506           CLRF   BATTANN     ;Clear the battery annunciator
```

MPASM 01.30.01 Intermediate 2001V603.ASM   4-15-1997  10:51:29    PAGE 11

LOC  OBJECT CODE    LINE SOURCE TEXT
     VALUE

```
00EF 01B7          00507                CLRF    FCTN_PH  ;Clear Peak Hold holding register for minus sign
                   00508
                   00509                         ;Test Mode?
00F0 01F1          00510                CLRF    TESTFLAGS    ;Clear flags before use
00F1 1E85          00511                BTFSS   PORTA,5  ;Tests the PORTA 5 to see if factory test is being invoked (high)
                   00512                         ;It is held low by the load of the op amp and comparator power supplie
                   s
00F2 2900          00513                GOTO    NOTCALIB
                   00514
00F3 1471          00515                BSF     TESTFLAGS,0   ;Set the test bit (outputs RS232 for calibration if set)
00F4 1A85          00516 TESTL1         BTFSC   PORTA,5  ;Loop here till RA 5 is released
00F5 28F4          00517                GOTO    TESTL1  ;
                   00518
00F6 1C07          00519                BTFSS   PORTC,0  ;Ave switch pressed?
00F7 14F1          00520                BSF     TESTFLAGS,1   ;Set test flag if so
00F8 1C07          00521 TESTL2         BTFSS   PORTC,0  ;Loop here till switch is released
00F9 28F8          00522                GOTO    TESTL2  ;
                   00523
00FA 18F1          00524                BTFSC   TESTFLAGS,1   ;Look at testing flag first.
00FB 2900          00525                GOTO    NOTCALIB    ;Go here if set(not calibrating)
                   00526
00FC 1C71          00527                BTFSS   TESTFLAGS,0   ;Calibration flag set?
00FD 2900          00528                GOTO    NOTCALIB    ;no: go here
                   00529
                   00530                         ;yes: do this
00FE 158A          00531                BSF     PCLATH,3     ;Select page 1
Message[306]: Crossing page boundary -- ensure page bits are set.
00FF 292D          00532                GOTO    CALIBRATE    ;Calibtration sequence here
                   00533
                   00534                         ;ON or OFF decision
0100 1ADB          00535 NOTCALIB       BTFSC   SWITCHES,5  ;ON/OFF Flag
0101 2AA7          00536                GOTO    SLEEPY    ;
                   00537
0102 01F0          00538                CLRF    BATTCNT ;Clear counter for battery samples
0103 01DB          00539                CLRF    SWITCHES    ;Clear register to look for switch input's
0104 16DB          00540                BSF     SWITCHES,5  ;Set flag to goto sleep after reset
                   00541
                   00542
0105 1A85          00543 PORTA_UP       BTFSC   PORTA,5  ;Verify that PORTA 5 has been released before continue (prevents d
                   amage to chip)
0106 2905          00544                GOTO    PORTA_UP    ;
                   00545
0107 1683          00546                BSF     STATUS,5    ;Set to address register bank 1
0108 1285          00547                BCF     TRISA,5     ;Make power line to op amp an output
0109 1283          00548                BCF     STATUS,5    ;Set to address register bank 0
                   00549                         ;Fetch the values of pressure and battery voltage calibrations from pr
                   ogram memory
010A 3000          00550                MOVLW   H'0'    ;Set up the program counter for the lowest page
010B 008A          00551                MOVWF   PCLATH  ;
010C 3000          00552                MOVLW   H'0'    ;Point to the first table entry
010D 2001          00553                CALL    PNTRTBL ;Get the first value from the table
010E 00A0          00554                MOVWF   TEMP    ;Put the value into a temporary register
                   00555                         ;Use the lowest bit to indicate that a first set was programmed
```

MPASM 01.30.01 Intermediate 2001V603.ASM   4-15-1997   10:51:29    PAGE 12

```
LOC  OBJECT CODE    LINE SOURCE TEXT
     VALUE 010F 1C20           00556            BTFSS    TEMP,0      ;Test the lowest bit to see if the unit has been programmed
0110 2919           00557            GOTO     ST1         ;If low, then go on and test for other bits
                    00558
0111 2619           00559            CALL     BEEP        ;Long beep
0112 2619           00560            CALL     BEEP        ;
0113 2619           00561            CALL     BEEP        ;
0114 2619           00562            CALL     BEEP        ;
0115 2619           00563            CALL     BEEP        ;
0116 2619           00564            CALL     BEEP        ;
                    00565
0117 2611           00566            CALL     PREPSLEEP   ;Go to sleep if not calibrated or in test mode
0118 0063           00567            SLEEP                ;
                    00568
                    00569 ;*********************************************************************************
                          *****************
                    00570 ;The next highest bit is tested to determine if it is set.
                    00571
0119 1CA0           00572 ST1        BTFSS    TEMP,1      ;Test the second bit- if high, then use the first set of tables
011A 291E           00573            GOTO     ST2         ;If low, then the first set was used so go to the next one
011B 3000           00574            MOVLW    H'0'        ;Make the Table offset 0 (Table 1)
011C 00F7           00575            MOVWF    TBLOS       ;
011D 293F           00576            GOTO     ST9         ;Go on to rest of startup code
011E 1D20           00577 ST2        BTFSS    TEMP,2      ;Test the third bit- if high, then use the second set of tables
011F 2923           00578            GOTO     ST3         ;If low, then the second set was used so go to the next one
0120 3015           00579            MOVLW    H'15'       ;Make the Table offset  21 (Table 2)
0121 00F7           00580            MOVWF    TBLOS       ;
0122 293F           00581            GOTO     ST9         ;Go on to rest of startup code
0123 1DA0           00582 ST3        BTFSS    TEMP,3      ;Test the fourth bit- if high, then use the third set of tables
0124 2928           00583            GOTO     ST4         ;If low, then the third set was used so go to the next one
0125 302A           00584            MOVLW    H'2A'        ;Make the Table offset 42 (Table 3)
0126 00F7           00585            MOVWF    TBLOS       ;
0127 293F           00586            GOTO     ST9         ;Go on to rest of startup code
0128 1E20           00587 ST4        BTFSS    TEMP,4      ;Test the fifth bit- if high, then use the fourth set of tables
0129 292D           00588            GOTO     ST5         ;If low, then the fourth set was used so go to the next one
012A 303F           00589            MOVLW    H'3F'       ;Make the Table offset 63 (Table 4)
012B 00F7           00590            MOVWF    TBLOS       ;
012C 293F           00591            GOTO     ST9
012D 1EA0           00592 ST5        BTFSS    TEMP,5      ;Test the sixth bit- if high, then use the fifth set of tables
012E 2932           00593            GOTO     ST6         ;If low, then the fifth set was used so go to the next one
012F 3054           00594            MOVLW    H'54'       ;Make the Table offset  84 (Table 5)
0130 00F7           00595            MOVWF    TBLOS       ;
0131 293F           00596            GOTO     ST9         ;Go on to rest of startup code
0132 1F20           00597 ST6        BTFSS    TEMP,6      ;Test the seventh bit- if high, then use the sixth set of tables
0133 2937           00598            GOTO     ST7         ;If low, then the sixth set was used so go to the next one
0134 3069           00599            MOVLW    H'69'        ;Make the Table offset 105 (Table 6)
0135 00F7           00600            MOVWF    TBLOS       ;
0136 293F           00601            GOTO     ST9         ;Go on to rest of startup code
0137 1FA0           00602 ST7        BTFSS    TEMP,7      ;Test the eighth bit- if high, then use the seventh set of tables
0138 293C           00603            GOTO     ST8         ;If low, then the seventh set was used so go to the last one
0139 307E           00604            MOVLW    H'7E'       ;Make the Table offset 126 (Table 7)
013A 00F7           00605            MOVWF    TBLOS       ;
013B 293F           00606            GOTO     ST9         ;Go on to rest of startup code
013C 3093           00607 ST8        MOVLW    H'93'       ;Make the Table offset 147 (Table 8)
```

MPASM 01.30.01 Intermediate 2001V603.ASM   4-15-1997  10:51:29     PAGE 13

LOC  OBJECT CODE    LINE SOURCE TEXT
     VALUE

```
013D 00F7          00608              MOVWF    TBLOS     ;
013E 293F          00609              GOTO     ST9
                   00610
013F 018A          00611 ST9          CLRF     PCLATH        ;Guarantee Page 0 table accesses
0140 0877          00612              MOVF     TBLOS,0       ;Bring in the value of the table offset
0141 00A1          00613              MOVWF    TEMP1         ;Put it into a temporary register
0142 0821          00614              MOVF     TEMP1,0       ;Bring into W
0143 2010          00615              CALL     CONSTBL       ;Call for the table
0144 00B8          00616              MOVWF    CALPRESH      ;Put into the high byte of the pressure cal factor
0145 1683          00617              BSF      STATUS,5      ;Set address register to Bank 1
0146 00BE          00618              MOVWF    SBUFF11       ;Store in Serial buffer
0147 1283          00619              BCF      STATUS,5      ;Set address register to bank 0
0148 0AA1          00620              INCF     TEMP1,1       ;Increment the pointer
0149 0821          00621              MOVF     TEMP1,0       ;Bring into W
014A 2010          00622              CALL     CONSTBL       ;Call for the table
014B 00B9          00623              MOVWF    CALPRESL      ;Put into the low byte of the pressure cal factor
014C 1683          00624              BSF      STATUS,5      ;Set address register to Bank 1
014D 00BF          00625              MOVWF    SBUFF12       ;Store in Serial buffer
014E 1283          00626              BCF      STATUS,5      ;Set address register to bank 0
                   00627
                   00628
014F 0AA1          00629              INCF     TEMP1,1       ;Increment the pointer
0150 0821          00630              MOVF     TEMP1,0       ;Bring into W
0151 2010          00631              CALL     CONSTBL       ;Call for the table
0152 00C1          00632              MOVWF    CALOFFSH      ;Put into the high byte of the offset temperature cal factor
0153 1683          00633              BSF      STATUS,5      ;Set address register to Bank 1
0154 00C0          00634              MOVWF    SBUFF13       ;Store in Serial buffer
0155 1283          00635              BCF      STATUS,5      ;Set address register to bank 0
0156 0AA1          00636              INCF     TEMP1,1       ;Increment the pointer
0157 0821          00637              MOVF     TEMP1,0       ;Bring into W
0158 2010          00638              CALL     CONSTBL       ;Call for the table
0159 00C2          00639              MOVWF    CALOFFSL      ;Put into the low byte of the offset temperature cal factor
015A 1683          00640              BSF      STATUS,5      ;Set address register to Bank 1
015B 00C1          00641              MOVWF    SBUFF14       ;Store in Serial buffer
015C 1283          00642              BCF      STATUS,5      ;Set address register to bank 0
                   00643
015D 0AA1          00644              INCF     TEMP1,1       ;Increment the pointer
015E 0821          00645              MOVF     TEMP1,0       ;Bring into W
015F 2010          00646              CALL     CONSTBL       ;Call for the table
0160 00DC          00647              MOVWF    CALSPANH      ;Put into the high byte of the span temperature cal factor
0161 1683          00648              BSF      STATUS,5      ;Set address register to Bank 1
0162 00C2          00649              MOVWF    SBUFF15       ;Store in Serial buffer
0163 1283          00650              BCF      STATUS,5      ;Set address register to bank 0
0164 0AA1          00651              INCF     TEMP1,1       ;Increment the pointer
0165 0821          00652              MOVF     TEMP1,0       ;Bring into W
0166 2010          00653              CALL     CONSTBL       ;Call for the table
0167 00DD          00654              MOVWF    CALSPANL      ;Put into the low byte of the span temperature cal factor
0168 1683          00655              BSF      STATUS,5      ;Set address register to Bank 1
0169 00C3          00656              MOVWF    SBUFF16       ;Store in Serial buffer
016A 1283          00657              BCF      STATUS,5      ;Set address register to bank 0
                   00658
016B 0AA1          00659              INCF     TEMP1,1       ;Increment the pointer
016C 0821          00660              MOVF     TEMP1,0       ;Bring into W
```

MPASM 01.30.01 Intermediate 2001V603.ASM   4-15-1997  10:51:29      PAGE 14

LOC  OBJECT CODE    LINE SOURCE TEXT
     VALUE

| LOC | OBJECT CODE | LINE | | | |
|---|---|---|---|---|---|
| 016D | 2010 | 00661 | CALL | CONSTBL | ;Call for the table |
| 016E | 00BA | 00662 | MOVWF | CALBATTH | ;Move the result into the battery high calibration |
| 016F | 0AA1 | 00663 | INCF | TEMP1,1 | ;Increment the pointer |
| 0170 | 0821 | 00664 | MOVF | TEMP1,0 | ;Bring into W |
| 0171 | 2010 | 00665 | CALL | CONSTBL | ;Call for the table |
| 0172 | 00C0 | 00666 | MOVWF | CALBATTL | ;Move the result into the battery low calibration |
| | | 00667 | | | |
| 0173 | 0AA1 | 00668 | INCF | TEMP1,1 | ;Increment the pointer |
| 0174 | 0821 | 00669 | MOVF | TEMP1,0 | ;Bring into W |
| 0175 | 2010 | 00670 | CALL | CONSTBL | ;Call for the table |
| 0176 | 00BC | 00671 | MOVWF | CALTEMPH | ;Put into the high byte of the temperature cal factor |
| 0177 | 1683 | 00672 | BSF | STATUS,5 | ;Set address register to Bank 1 |
| 0178 | 00C4 | 00673 | MOVWF | SBUFF17 | ;Store in Serial buffer |
| 0179 | 1283 | 00674 | BCF | STATUS,5 | ;Set address register to bank 0 |
| 017A | 0AA1 | 00675 | INCF | TEMP1,1 | ;Increment the pointer |
| 017B | 0821 | 00676 | MOVF | TEMP1,0 | ;Bring into W |
| 017C | 2010 | 00677 | CALL | CONSTBL | ;Call for the table |
| 017D | 00BD | 00678 | MOVWF | CALTEMPL | ;Put into the low byte of the temperature cal factor |
| 017E | 1683 | 00679 | BSF | STATUS,5 | ;Set address register to Bank 1 |
| 017F | 00C5 | 00680 | MOVWF | SBUFF18 | ;Store in Serial buffer |
| 0180 | 1283 | 00681 | BCF | STATUS,5 | ;Set address register to bank 0 |
| | | 00682 | | | |
| 0181 | 0AA1 | 00683 | INCF | TEMP1,1 | ;Increment the pointer |
| 0182 | 0821 | 00684 | MOVF | TEMP1,0 | ;Bring into W |
| 0183 | 2010 | 00685 | CALL | CONSTBL | ;Call for the table |
| 0184 | 1683 | 00686 | BSF | STATUS,5 | ;Bank 1 registers |
| 0185 | 00A0 | 00687 | MOVWF | TEMPERHI | ;Put into the high byte of the temperature adc reading for 150 F |
| 0186 | 1283 | 00688 | BCF | STATUS,5 | ;Bank 0 registers |
| 0187 | 0AA1 | 00689 | INCF | TEMP1,1 | ;Increment the pointer |
| 0188 | 0821 | 00690 | MOVF | TEMP1,0 | ;Bring into W |
| 0189 | 2010 | 00691 | CALL | CONSTBL | ;Call for the table |
| 018A | 1683 | 00692 | BSF | STATUS,5 | ;Bank 1 registers |
| 018B | 00A1 | 00693 | MOVWF | TEMPERLO | ;Put into the low byte of the temperature adc reading for 150 F |
| 018C | 1283 | 00694 | BCF | STATUS,5 | ;Bank 0 registers |
| | | 00695 | | | |
| 018D | 0AA1 | 00696 | INCF | TEMP1,1 | ;Increment the pointer |
| 018E | 0821 | 00697 | MOVF | TEMP1,0 | ;Bring into W |
| 018F | 2010 | 00698 | CALL | CONSTBL | ;Call for the table |
| 0190 | 1683 | 00699 | BSF | STATUS,5 | ;Bank 1 registers |
| 0191 | 00A2 | 00700 | MOVWF | TREADHI | ;Put into the high byte of the actual temperature reading for 150 F |
| 0192 | 1283 | 00701 | BCF | STATUS,5 | ;Bank 0 registers |
| 0193 | 0AA1 | 00702 | INCF | TEMP1,1 | ;Increment the pointer |
| 0194 | 0821 | 00703 | MOVF | TEMP1,0 | ;Bring into W |
| 0195 | 2010 | 00704 | CALL | CONSTBL | ;Call for the table |
| 0196 | 1683 | 00705 | BSF | STATUS,5 | ;Bank 1 registers |
| 0197 | 00A3 | 00706 | MOVWF | TREADLO | ;Put into the low byte of the actual temperature reading for 150 F |
| 0198 | 1283 | 00707 | BCF | STATUS,5 | ;Bank 0 registers |
| | | 00708 | | | |
| 0199 | 0AA1 | 00709 | INCF | TEMP1,1 | ;Increment the pointer (Empty table entry) |
| 019A | 0AA1 | 00710 | INCF | TEMP1,1 | ;Increment the pointer (Empty table entry) |
| 019B | 0AA1 | 00711 | INCF | TEMP1,1 | ;Increment the pointer (0_PSIHI @ 150 F) |
| 019C | 0AA1 | 00712 | INCF | TEMP1,1 | ;Increment the pointer (0_PSILO @ 150 F) |
| 019D | 0AA1 | 00713 | INCF | TEMP1,1 | ;Increment the pointer (50_PSIHI @ 150 F) |

MPASM 01.30.01 Intermediate 2001V603.ASM   4-15-1997  10:51:29      PAGE 15

LOC  OBJECT CODE    LINE  SOURCE TEXT
VALUE 019E 0AA1          00714                INCF    TEMP1,1     ;Increment the pointer (50_PSILO @150 F)
                   00715
                   00716 ;************************************************************************************************
                         ******************
                   00717
                   00718                                    ;MAIN PROGRAM
                   00719                                    ;Take the initial readings
019F 2517          00720 MAIN           CALL    REFERENCE   ;
01A0 251D          00721                CALL    PRESSENS
01A1 2546          00722                CALL    BATTSENS    ;Call the routine to read the battery voltage
01A2 0826          00723                MOVF    BATTH,0     ;   Move Battery values to registers for use
01A3 1683          00724                BSF     STATUS,5    ;Set to address register bank 1
01A4 00A6          00725                MOVWF   INITBATTH   ;   in the battery compensation routine
01A5 00A8          00726                MOVWF   NEWBATTH    ;       Initialize the new reading the same as the first
01A6 1283          00727                BCF     STATUS,5    ;Address register Bank 0
01A7 0827          00728                MOVF    BATTL,0     ;
01A8 1683          00729                BSF     STATUS,5    ;Set to address register bank 1
01A9 00A7          00730                MOVWF   INITBATTL   ;
01AA 00A9          00731                MOVWF   NEWBATTL    ;       Initialize the new reading the same as the first
01AB 1283          00732                BCF     STATUS,5    ;Address register Bank 0
                   00733
01AC 01F2          00734                CLRF    OLDDISPH    ;Clear old display for maximum pressure display
01AD 01F3          00735                CLRF    OLDDISPL    ;
01AE 3088          00736                MOVLW   H'88'       ;Put on all segments for the initial display
01AF 00B1          00737                MOVWF   DISPL       ;
01B0 3088          00738                MOVLW   H'88'       ;
01B1 00B0          00739                MOVWF   DISPH       ;
01B2 144A          00740                BSF     BATTANN,0   ;Set bit in display for annunciator
01B3 26FC          00741                CALL    DISPLAY     ;Call the routine to set up an initial display
01B4 1485          00742                BSF     PORTA,1     ;Turn on RA1
01B5 178B          00743                BSF     INTCON,7    ;Enable GIE mask
                   00744
01B6 2619          00745                CALL    BEEP        ;
01B7 0191          00746                CLRF    TMR2        ;Timer 2 setup-Clear the timer
01B8 3006          00747                MOVLW   B'00000110' ;Timer on internal clock, 16 prescale, start timer
01B9 0092          00748                MOVWF   T2CON       ;
01BA 108C          00749                BCF     PIR1,1      ;Clear timer 2 interrupt bit
01BB 1683          00750                BSF     STATUS,5    ;Set to address register bank 1
01BC 3002          00751                MOVLW   B'00000010' ;Enable timer 2 interrupt
01BD 008C          00752                MOVWF   PIE1        ;
01BE 1C8E          00753                BTFSS   PCON,1      ;Test power up bit to see if new batteries
01BF 22D7          00754                CALL    FUNCTION2   ;If new batteries then set function mode
01C0 1683          00755                BSF     STATUS,5    ;Set to address register bank 1
01C1 148E          00756                BSF     PCON,1      ;Set power up bit
01C2 1283          00757                BCF     STATUS,5    ;Set to address register bank 0.
                   00758
01C3 1B4C          00759                BTFSC   FCTN_MDE,6  ;Recalibrate on setting new function
01C4 24D3          00760                CALL    INITCALC    ;Calculate the base line readings after new batteries
01C5 1D09          00761                BTFSS   PORTE,2     ;Calibrate if peak hold is pushed during fire-up
01C6 24D3          00762                CALL    INITCALC    ;Calculate the base line readings
01C7 2505          00763                CALL    CHK_BATT             ;Check battery every time.
01C8 01C7          00764                CLRF    DISPST      ;Clear the display state counter
01C9 01B0          00765                CLRF    DISPH       ;Clear display to zeros- battery annunciator will be calculated by bat MPASM 01.30.01 Intermediate 2001V603.ASM   4-15-1997  10:51:29     PAGE 16

LOC  OBJECT CODE    LINE SOURCE TEXT
     VALUE tery routine
                    00766
01CA 1ACC           00767              BTFSC   FCTN_MDE,5    ;Temperature set?
01CB 29D0           00768              GOTO    JUMP          ;Yes so jump
                    00769
01CC 1CCC           00770              BTFSS   FCTN_MDE,1    ;Checking to see if KPA is set
01CD 29D0           00771              GOTO    JUMP
                    00772
01CE 01B1           00773              CLRF    DISPL         ;Clear least significant 2 digits only if in KPA mode
01CF 29D2           00774              GOTO    JUMP1
                    00775
01D0 300F           00776 JUMP         MOVLW   H'0F'         ;Blank least significant digit if in PSI mode
01D1 00B1           00777              MOVWF   DISPL         ;
01D2 14DB           00778 JUMP1        BSF     SWITCHES,1    ;Set average mode on startup
01D3 175B           00779              BSF     SWITCHES,6    ;Set bit to display first reading for average mode
                    00780
01D4 307D           00781 STILL_ON     MOVLW   07Dh          ;Bring in the number of readings to take
01D5 00F4           00782              MOVWF   TIME_ON       ;1 reading = 1.2 seconds. 2.5 minutes =125 cycles
                    00783
                    00784
01D6                00785 MAIN_M
                    00786
01D6 3009           00787 MAIN0        MOVLW   09h           ;9 Times round wait for 770 mS
01D7 00AC           00788              MOVWF   LOOPY         ;
01D8                00789 MAIN1
                    00790
01D8 2679           00791              CALL    WAIT          ;Wait for rest of a sample period- total 1 second per reading
01D9 22AA           00792              CALL    SWCH_TEST     ;Test for switches
01DA 0BAC           00793              DECFSZ  LOOPY,1       ;
01DB 29D8           00794              GOTO    MAIN1         ;Check switches as you go round
                    00795
01DC 1283           00796              BCF     STATUS,5      ;Set to bank 0 registers
01DD 1CF1           00797              BTFSS   TESTFLAGS,1   ;No serial if not in test mode
01DE 29E4           00798              GOTO    NO_RS232
                    00799
01DF 158A           00800              BSF     PCLATH,3      ;Select page 1
Message[306]: Crossing page boundary -- ensure page bits are set.
01E0 217F           00801              CALL    LOADREGS      ;Built a subroutine to save some space in this page
01E1 158A           00802              BSF     PCLATH,3      ;Select page 1
                    00803                                    ;Doesn't seem to recognize page 1 if a call to another subroutine in page 1 immedi
                         ately follows first call
Message[306]: Crossing page boundary -- ensure page bits are set.
01E2 206E           00804              CALL    RS232OUT1
01E3 118A           00805              BCF     PCLATH,3      ;select page 0
                    00806
01E4 1283           00807 NO_RS232     BCF     STATUS,5      ;Set to bank 0 registers
01E5 108C           00808              BCF     PIR1,1        ;Clear the interupt bit to prevent unexpected call
01E6 1683           00809 INTER_ON     BSF     STATUS,5      ;Set to Bank1 registers
01E7 148C           00810              BSF     PIE1,1        ;Set interupt enable flag
01E8 1C8C           00811              BTFSS   PIE1,1        ;Is the bit on?
01E9 29E6           00812              GOTO    INTER_ON      ;If not then set again
                    00813
01EA 1283           00814              BCF     STATUS,5      ;Set to bank 0 registers MPASM 01.30.01 Intermediate 2001V603.ASM   4-15-1997  10:51:29    PAGE 17

```
LOC  OBJECT CODE    LINE SOURCE TEXT
     VALUE

01EB 18DB           00815            BTFSC   SWITCHES,1  ;Skip if in Hi Res mode
01EC 29F5           00816            GOTO    NO_BLINK
                    00817
01ED 1683           00818            BSF     STATUS,5    ;Set to bank 1 registers
01EE 108C           00819            BCF     PIE1,1      ;Disable Timer2 interupt (Display)
01EF 1283           00820            BCF     STATUS,5    ;Set to bank 0 registers
01F0 1085           00821            BCF     PORTA,1     ;Turn off RA1 to power off LCD
01F1 0186           00822            CLRF    PORTB       ;Turn off display
01F2 0187           00823            CLRF    PORTC       ;(everything to logic 0 )
01F3 0188           00824            CLRF    PORTD       ;
01F4 0189           00825            CLRF    PORTE       ;
                    00826
01F5 0870           00827 NO_BLINK   MOVF    BATTCNT,0   ;Move Battery counter into serial buffer
01F6 1683           00828            BSF     STATUS,5    ;Set address register to Bank 1
01F7 00D5           00829            MOVWF   SBUFF33     ;Store in Serial buffer
01F8 1283           00830            BCF     STATUS,5    ;Set address register to bank 0
01F9 0BF0           00831            DECFSZ  BATTCNT,1
01FA 2A09           00832            GOTO    NOTESTBATT
                    00833
01FB 2517           00834 TESTBATT   CALL    REFERENCE   ;
01FC 251D           00835            CALL    PRESSENS    ;
01FD 2546           00836            CALL    BATTSENS    ;
01FE 22AA           00837            CALL    SWCH_TEST
01FF 0826           00838            MOVF    BATTH,0     ;Move Battery values to registers for use
0200 1683           00839            BSF     STATUS,5    ;Address register Bank 1
0201 00A8           00840            MOVWF   NEWBATTH    ;in the battery compensation routine
0202 1283           00841            BCF     STATUS,5    ;Address register Bank 0
0203 0827           00842            MOVF    BATTL,0     ;
0204 1683           00843            BSF     STATUS,5    ;Address register Bank 1
0205 00A9           00844            MOVWF   NEWBATTL    ;
0206 1283           00845            BCF     STATUS,5    ;Address register Bank 0
0207 2505           00846            CALL    CHK_BATT    ;Check battery reading against calibrated value
0208 2A0D           00847            GOTO    MAIN2       ;
                    00848
0209 2517           00849 NOTESTBATT CALL    REFERENCE
020A 251D           00850            CALL    PRESSENS    ;
020B 2570           00851            CALL    TEMPSENS    ;
020C 22AA           00852            CALL    SWCH_TEST
                    00853
020D 1D5B           00854 MAIN2      BTFSS   SWITCHES,2  ;When Switches,2 is set Peak Hold is enabled
020E 13B7           00855            BCF     FCTN_PH,7   ;If Peak Hold finished then clear minus sign holding bit
                    00856
020F 1B5B           00857            BTFSC   SWITCHES,6  ;If first reading then jump to display it.
0210 2A15           00858            GOTO    FIRST_READ  ;
                    00859
0211 18DB           00860            BTFSC   SWITCHES,1  ;When Switches,1 is set Average is enabled
0212 2A1C           00861            GOTO    AVERAGE     ;Do averaging
                    00862
0213 195B           00863            BTFSC   SWITCHES,2  ;When Switches,2 is set Peak Hold is enabled
0214 2A44           00864            GOTO    PEAK        ;Do Peak Hold
                    00865
0215 135B           00866 FIRST_READ BCF     SWITCHES,6  ;Clear the flag to indicate first reading
0216 2314           00867            CALL    CALC        ;
```

MPASM 01.30.01 Intermediate 2001V603.ASM   4-15-1997   10:51:29        PAGE 18

LOC  OBJECT CODE    LINE  SOURCE TEXT
     VALUE

| LOC | OBJECT CODE | LINE | LABEL | OP | OPERANDS | COMMENT |
|---|---|---|---|---|---|---|
| 0217 | 0830 | 00868 | | MOVF | DISPH,0 | ;Move display values to temp registers for use |
| 0218 | 00AF | 00869 | | MOVWF | DISPH_TP | ;in the five minute count down routine |
| 0219 | 0831 | 00870 | | MOVF | DISPL,0 | ; |
| 021A | 00AE | 00871 | | MOVWF | DISPL_TP | ; |
| 021B | 2A6F | 00872 | | GOTO | MAIN3 | ;Jump to display real time reading |
| | | 00873 | | | | |
| | | 00874 | | | | |
| 021C | 1A5B | 00875 | AVERAGE | BTFSC | SWITCHES,4 | ;If bit 4 is set then averaging routine is not finished |
| 021D | 2A24 | 00876 | | GOTO | MORE_AV | ;so go do another calculation |
| 021E | 01E8 | 00877 | | CLRF | AVERAGEH | ;Clear registers |
| 021F | 01E9 | 00878 | | CLRF | AVERAGEM | ; |
| 0220 | 01EA | 00879 | | CLRF | AVERAGEL | ; |
| 0221 | 3004 | 00880 | | MOVLW | 04h | ;Number of readings to take for |
| 0222 | 00DF | 00881 | | MOVWF | LOOPY2 | ;low resulotion-either 16,8,4,2 |
| 0223 | 165B | 00882 | | BSF | SWITCHES,4 | ;Set bit 4 to detect when Average routine has finished cycle |
| 0224 | 0844 | 00883 | MORE_AV | MOVF | VOLTL,0 | ;Bring in low byte of display value |
| 0225 | 07EA | 00884 | | ADDWF | AVERAGEL,1 | ;Add to average low byte |
| 0226 | 1803 | 00885 | | BTFSC | STATUS,0 | ;See if there was an overflow and add one to the |
| 0227 | 0AE9 | 00886 | | INCF | AVERAGEM,1 | ;next order byte if so |
| 0228 | 0843 | 00887 | | MOVF | VOLTH,0 | ;High byte of display value |
| 0229 | 07E9 | 00888 | | ADDWF | AVERAGEM,1 | ;Add to average medium byte |
| 022A | 1803 | 00889 | | BTFSC | STATUS,0 | ;See if there was an overflow and add one to the |
| 022B | 0AE8 | 00890 | | INCF | AVERAGEH,1 | ;next order byte if so |
| 022C | 0BDF | 00891 | | DECFSZ | LOOPY2,1 | ; |
| 022D | 2A6F | 00892 | | GOTO | MAIN3 | ; |
| | | 00893 | | | | |
| 022E | 3002 | 00894 | | MOVLW | 02h | ;2 Rotates for divide by 4 |
| 022F | 00DF | 00895 | | MOVWF | LOOPY2 | ; |
| 0230 | 1003 | 00896 | AGAIN | BCF | STATUS,0 | ; |
| 0231 | 0CE8 | 00897 | | RRF | AVERAGEH,1 | ;Rotate right through carry |
| 0232 | 0CE9 | 00898 | | RRF | AVERAGEM,1 | ;to implement division |
| 0233 | 0CEA | 00899 | | RRF | AVERAGEL,1 | ; |
| 0234 | 0BDF | 00900 | | DECFSZ | LOOPY2,1 | ; |
| 0235 | 2A30 | 00901 | | GOTO | AGAIN | ; |
| | | 00902 | | | | |
| 0236 | 0869 | 00903 | | MOVF | AVERAGEM,0 | ;Put result of divide into display registers |
| 0237 | 00C3 | 00904 | | MOVWF | VOLTH | ; |
| 0238 | 086A | 00905 | | MOVF | AVERAGEL,0 | ;Put result of divide into display registers |
| 0239 | 00C4 | 00906 | | MOVWF | VOLTL | ; |
| 023A | 125B | 00907 | | BCF | SWITCHES,4 | ;Clear flag to show averaging routine finished |
| 023B | 2314 | 00908 | | CALL | CALC | ;Get BCD value for display |
| 023C | 0830 | 00909 | | MOVF | DISPH,0 | ;Move display values to temp registers for use |
| 023D | 00AF | 00910 | | MOVWF | DISPH_TP | ;in the five minute count down routine |
| 023E | 0831 | 00911 | | MOVF | DISPL,0 | ; |
| 023F | 00AE | 00912 | | MOVWF | DISPL_TP | ; |
| 0240 | 1D5B | 00913 | | BTFSS | SWITCHES,2 | ;Test to see if Peak Hold is enabled |
| 0241 | 2619 | 00914 | | CALL | BEEP | ;If NOT beep now before diplay routine |
| 0242 | 1D5B | 00915 | | BTFSS | SWITCHES,2 | ;Test to see if Peak Hold is enabled |
| 0243 | 2A6F | 00916 | | GOTO | MAIN3 | ;If NOT go straight to display routine |
| | | 00917 | | | | |
| | | 00918 | | | | |
| | | 00919 | | | | ;PEAK HOLD SECTION |
| 0244 | 1A5B | 00920 | PEAK | BTFSC | SWITCHES,4 | ;Finished Averaging??? |

MPASM 01.30.01 Intermediate 2001V603.ASM   4-15-1997  10:51:29      PAGE 19

LOC  OBJECT CODE    LINE SOURCE TEXT
     VALUE

| LOC | OBJECT CODE | LINE | | | | |
|---|---|---|---|---|---|---|
| 0245 | 2A4C | 00921 | | GOTO | PEAK0 | ;No, then jump |
| | | 00922 | | | | |
| 0246 | 1CDB | 00923 | | BTFSS | SWITCHES,1 | ;Skip if in averaging mode |
| 0247 | 2314 | 00924 | | CALL | CALC | ;If not averaging then calc BCD value for Display routine |
| 0248 | 0830 | 00925 | | MOVF | DISPH,0 | ;Move display values to temp registers for use |
| 0249 | 00AF | 00926 | | MOVWF | DISPH_TP | ;in the five minute count down routine |
| 024A | 0831 | 00927 | | MOVF | DISPL,0 | ; |
| 024B | 00AE | 00928 | | MOVWF | DISPL_TP | ; |
| 024C | 0972 | 00929 | PEAK0 | COMF | OLDDISPH,0 | ;Bring into W the high byte of the old pressure reading |
| 024D | 0730 | 00930 | | ADDWF | DISPH,0 | ;Subtract the present value |
| 024E | 1803 | 00931 | | BTFSC | STATUS,0 | ;Test status to see if there was a cary |
| 024F | 2A58 | 00932 | | GOTO | PEAK1 | ;If carry then new is higher or the same so jump |
| | | 00933 | | | | ;Goes to PEAK1 if new high byte is not the same as old one |
| | | 00934 | | | | |
| 0250 | 0830 | 00935 | | MOVF | DISPH,0 | ;Bring into W the high byte of the old pressure reading |
| 0251 | 0272 | 00936 | | SUBWF | OLDDISPH,0 | ;Subtract the present value |
| 0252 | 1D03 | 00937 | | BTFSS | STATUS,2 | ;Test status to see if there was a zero |
| 0253 | 2A68 | 00938 | | GOTO | PEAK2 | ;If carry then new is higher or the same so jump |
| | | 00939 | | | | |
| 0254 | 0931 | 00940 | | COMF | DISPL,0 | ;Bring into W the low byte of the old pressure reading |
| 0255 | 0773 | 00941 | | ADDWF | OLDDISPL,0 | ;Subtract the present value |
| 0256 | 1803 | 00942 | | BTFSC | STATUS,0 | ;Test Status to see if there was a carry |
| 0257 | 2A68 | 00943 | | GOTO | PEAK2 | ;If new is higher, jump |
| | | 00944 | | | | |
| 0258 | 0830 | 00945 | PEAK1 | MOVF | DISPH,0 | ;Check to see if old and new are the same |
| 0259 | 0272 | 00946 | | SUBWF | OLDDISPH,0 | ;If they are then don't beep |
| 025A | 1D03 | 00947 | | BTFSS | STATUS,2 | ;If zero then move on to check low byte |
| 025B | 2A5F | 00948 | | GOTO | LOAD_IT | ; |
| | | 00949 | | | | |
| 025C | 0831 | 00950 | | MOVF | DISPL,0 | ;Check to see if old and new are the same |
| 025D | 0273 | 00951 | | SUBWF | OLDDISPL,0 | ; |
| 025E | 1D03 | 00952 | | BTFSS | STATUS,2 | ;If zero then don't beep |
| 025F | 2619 | 00953 | LOAD_IT | CALL | BEEP | |
| 0260 | 0830 | 00954 | | MOVF | DISPH,0 | ;Since the new value is higher, copy it to the old register for next time |
| 0261 | 00F2 | 00955 | | MOVWF | OLDDISPH | ; |
| 0262 | 0831 | 00956 | | MOVF | DISPL,0 | ; |
| 0263 | 00F3 | 00957 | | MOVWF | OLDDISPL | ; |
| 0264 | 13B7 | 00958 | | BCF | FCTN_PH,7 | ;Clear old value minus sign |
| 0265 | 1FCC | 00959 | | BTFSS | FCTN_MDE,7 | ;Set only if minus sign should be on |
| 0266 | 17B7 | 00960 | | BSF | FCTN_PH,7 | ; |
| 0267 | 2A6F | 00961 | | GOTO | MAIN3 | ;Jump around update |
| | | 00962 | | | | |
| 0268 | 0872 | 00963 | PEAK2 | MOVF | OLDDISPH,0 | ;Since old value is higher, put it into the display registers |
| 0269 | 00B0 | 00964 | | MOVWF | DISPH | ; |
| 026A | 0873 | 00965 | | MOVF | OLDDISPL,0 | ; |
| 026B | 00B1 | 00966 | | MOVWF | DISPL | ; |
| 026C | 13CC | 00967 | | BCF | FCTN_MDE,7 | ;Clear old value minus sign |
| 026D | 1FB7 | 00968 | | BTFSS | FCTN_PH,7 | ;Set only if minus sign should be on |
| 026E | 17CC | 00969 | | BSF | FCTN_MDE,7 | ; |
| | | 00970 | | | | |
| | | 00971 | | | | |
| | | 00972 | | | | |

MPASM 01.30.01 Intermediate 2001V603.ASM   4-15-1997  10:51:29      PAGE 20

LOC  OBJECT CODE    LINE SOURCE TEXT
VALUE

```
                    00973
                    00974
                    00975              ;Start of the display modify section
026F 194C           00976 MAIN3    BTFSC  FCTN_MDE,2    ;Deg C?
0270 2A9C           00977          GOTO   MAIN7         ;Yes: miss out the display modify sections
                    00978
0271 19CC           00979          BTFSC  FCTN_MDE,3    ;Deg F?
0272 2A9C           00980          GOTO   MAIN7         ;Yes: miss out the display modify sections
                    00981
0273 1B37           00982          BTFSC  FCTN_PH,6     ;Pressure over 99.9 PSI?
0274 2A9C           00983          GOTO   MAIN7         ;Yes: miss out the display modify sections
                    00984
0275 1D5B           00985          BTFSS  SWITCHES,2    ;Peak Hold?
0276 2A7C           00986          GOTO   NOTPEAK       ;no: goto notpeak
                    00987                               ;Check for peak hold first in case Peak Hold and average are both
                    enabled
                    00988
0277 0830           00989          MOVF   DISPH,0       ;If peak hold active then Need to use the display registers for 0.
                    5 PSI decision
0278 00D8           00990          MOVWF  ACCeHI        ;
0279 0831           00991          MOVF   DISPL,0       ;
027A 00D9           00992          MOVWF  ACCeLO        ;
027B 2A80           00993          GOTO   BOTH          ;
                    00994
027C 082F           00995 NOTPEAK  MOVF   DISPH_TP,0    ;If average then need to use the temporary registers for 0.5 PSI d
                    ecision
027D 00D8           00996          MOVWF  ACCeHI        ;
027E 082E           00997          MOVF   DISPL_TP,0    ;
027F 00D9           00998          MOVWF  ACCeLO        ;
                    00999
0280 3000           01000 BOTH     MOVLW  00h           ;
0281 00D4           01001          MOVWF  ACCcHI        ;
0282 1C4C           01002          BTFSS  FCTN_MDE,0    ;PSI set = FCTN_MDE,0 set
0283 2A87           01003          GOTO   MAIN4
                    01004
0284 307F           01005          MOVLW  7Fh           ;PSI set therefore minimum is 0.7 psi (high nibble = 10ths, low n.
                    bble = blank)
0285 00D5           01006          MOVWF  ACCcLO        ;
0286 2A89           01007          GOTO   MAIN5         ;
                    01008
0287 3047           01009 MAIN4    MOVLW  47h           ;KPA set therefore minimum is 4.7 kpa
0288 00D5           01010          MOVWF  ACCcLO        ;
0289 2660           01011 MAIN5    CALL   DSUB          ;Subtract minimum pressure from temporary display
028A 1C03           01012          BTFSS  STATUS,0              ;Skip if positive (display pressure is higher than minimum
                    pressure)
028B 2A8D           01013          GOTO   MAIN6         ;If negative (temp display lower than minimum) then zero display a
                    nd modify auto off                                                ;counter.
028C 2A9C           01014          GOTO   MAIN7         ;If equal to or higher then continue for further mods if needed
                    01015
                    01016                               ;Modify displayed pressure reading: below 0.7 PSI
028D 13CC           01017 MAIN6    BCF    FCTN_MDE,7    ;Turn off minus sign
028E 1C4C           01018          BTFSS  FCTN_MDE,0    ;PSI or KPA ?    (psi = FCTN_MDE,0 set)
028F 2A92           01019          GOTO   MAIN8         ;
```

MPASM 01.30.01 Intermediate 2001V603.ASM   4-15-1997  10:51:29      PAGE 21

```
LOC  OBJECT CODE    LINE SOURCE TEXT
     VALUE 01020
0290 300F           01021           MOVLW   0Fh         ;PSI: Zero out the display with blank last digit
0291 2A93           01022           GOTO    MAIN9       ;
                    01023
0292 3000           01024 MAIN8     MOVLW   00h         ;KPA: Zero out display with zero last digit
                    01025
0293 00B1           01026 MAIN9     MOVWF   DISPL       ;Comment out this line if pressure below 0.7 PSI is to be read
0294 26FC           01027           CALL    DISPLAY     ;Display the new pressure reading
0295 1485           01028           BSF     PORTA,1     ;Turn on RA1 to power up the LCD
0296 1683           01029           BSF     STATUS,5        ;Set to bank 1 registers
0297 148C           01030           BSF     PIE1,1      ;Enable Timer2 interupt (Display)
0298 1283           01031           BCF     STATUS,5        ;Set to bank 0 registers
0299 0BF4           01032           DECFSZ  TIME_ON,1   ;Test to see if the number of loops is exceeded
029A 29D6           01033           GOTO    MAIN_M      ;Loop if not
                    01034
029B 2AA2           01035           GOTO    AUTO_OFF        ;2.5 minute time out therefore turn off.
                    01036                               ;Display pressure 'as is' if above 0.7 PSI
029C 26FC           01037 MAIN7     CALL    DISPLAY     ;Display the new pressure reading based on the choice made
029D 1485           01038           BSF     PORTA,1     ;Turn on RA1 to power up the LCD
029E 1683           01039           BSF     STATUS,5        ;Set to bank 1 registers
029F 148C           01040           BSF     PIE1,1      ;Enable Timer2 interupt (Display)
02A0 1283           01041           BCF     STATUS,5        ;Set to bank 0 registers
02A1 29D4           01042           GOTO    STILL_ON        ;Loop to clear Auto_off counter.
                    01043
                    01044
02A2 300F           01045 AUTO_OFF          MOVLW   0Fh     ;15 Times round for extra long beep
02A3 00AC           01046           MOVWF   LOOPY       ;before going to sleep
02A4 2619           01047 ZZZZZZ    CALL    BEEP        ;Indicate that the reading has been taken
02A5 0BAC           01048           DECFSZ  LOOPY,1     ;Long beep
02A6 2AA4           01049           GOTO    ZZZZZZ      ;
                    01050
02A7 2611           01051 SLEEPY    CALL    PREPSLEEP   ;Prepare for sleep
02A8 0063           01052           SLEEP               ;Go to sleep
02A9 0000           01053           NOP                 ;Prevents unexpected stuff happening on wake up
                    01054
                    01055
                    01056 ;**********************************************************************************
                          ******************
02AA 1683           01057 SWCH_TEST BSF     STATUS,5    ;Address register Bank 1
02AB 1407           01058           BSF     TRISC,0     ;Make beeper line input
02AC 1283           01059           BCF     STATUS,5    ;Address register Bank 0
02AD 1807           01060           BTFSC   PORTC,0     ;Is AVERAGE button released??
02AE 105B           01061           BCF     SWITCHES,0  ;Yes clear mode bit (switches,0)
02AF 1909           01062           BTFSC   PORTE,2     ;Is Peak Hold button released??
02B0 11DB           01063           BCF     SWITCHES,3  ;Yes, Clear mode bit (switches,3)
02B1 1C5B           01064           BTFSS   SWITCHES,0  ;If mode bit set don't goto switches routine
02B2 22B6           01065           CALL    AVA_SW      ;Set Average Mode
02B3 1DDB           01066           BTFSS   SWITCHES,3  ;If mode bit set don't goto switches routine
02B4 22C7           01067           CALL    MODE_SW     ;Set Peak Hold Mode
02B5 0008           01068           RETURN
                    01069 ;**********************************************************************************
                          ******************
                    01070 ;**********************************************************************************
```

MPASM 01.30.01 Intermediate 2001V603.ASM   4-15-1997  10:51:29     PAGE 22

```
LOC  OBJECT CODE    LINE SOURCE TEXT
     VALUE

******************
               01071
               01072
02B6 1683      01073 AVA_SW      BSF     STATUS,5    ;Switch to register bank 1
02B7 1407      01074             BSF     TRISC,0     ;Buzzer pin input
02B8 1283      01075             BCF     STATUS,5    ;Register Bank 0
02B9 1807      01076             BTFSC   PORTC,0     ;Average Button pushed???
02BA 0008      01077             RETURN              ;Switch not pushed
02BB 3003      01078             MOVLW   B'00000011' ;Set switch buffer pattern
02BC 06DB      01079             XORWF   SWITCHES,1  ;Flip bit,1-Set bit,0
02BD 18DB      01080             BTFSC   SWITCHES,1     ;If put into average mode set the flag to display the first readin
                    g.
02BE 175B      01081             BSF     SWITCHES,6     ;
02BF 2619      01082             CALL    BEEP        ;
02C0 2619      01083             CALL    BEEP        ;
02C1 125B      01084             BCF     SWITCHES,4  ;Clear to enable Peak Hold program flow to work
02C2 01F3      01085             CLRF    OLDDISPL    ;Clear old peak values
02C3 01F2      01086             CLRF    OLDDISPH    ;Clear old peak values
02C4 1D09      01087             BTFSS   PORTE,2     ;Change temp/pressure features if Peak hold also pressed
02C5 22DA      01088             CALL    FUNCTION    ;
02C6 0008      01089             RETURN              ;
               01090
02C7 1909      01091 MODE_SW     BTFSC   PORTE,2     ;Peak Button Pushed????
02C8 0008      01092             RETURN              ;Switch not pushed
02C9 300C      01093             MOVLW   B'00001100' ;Set switch buffer pattern
02CA 06DB      01094             XORWF   SWITCHES,1  ;Flip bit,2-Set bit,3
02CB 2619      01095             CALL    BEEP        ;
02CC 2619      01096             CALL    BEEP        ;
02CD 2679      01097             CALL    SW_WAIT ;Buzzer needs time to stop resonating before read switch
02CE 01F3      01098             CLRF    OLDDISPL    ;Clear old peak values
02CF 01F2      01099             CLRF    OLDDISPH    ;Clear old peak values
02D0 1683      01100             BSF     STATUS,5        ;Address register Bank 1
02D1 1407      01101             BSF     TRISC,0     ;Make beeper line input to read switch
02D2 1283      01102             BCF     STATUS,5        ;Adress register Bank 0
02D3 1C07      01103             BTFSS   PORTC,0     ;Change temp/pressure features if Ave also pressed
02D4 22DA      01104             CALL    FUNCTION    ;
02D5 26FC      01105             CALL    DISPLAY ;Update peak Hold symbol immediately
02D6 0008      01106             RETURN              ;
               01107
               01108 ;********************************************************************************************
                    ******************
               01109 ;********************************************************************************************
                    ******************
               01110 ;Function Mode routine - User presses both Peak Hold and Average buttons at the same time
               01111  ;to access this section. From here the user can now select the TEMP or PRESSURE
               01112  ;read out type either C or F & PSI or kPa
               01113
02D7 1283      01114 FUNCTION2   BCF     STATUS,5    ;Switch to register bank 0
02D8 3041      01115             MOVLW   B'01000001' ;Set initally for PSI & Recal at fireup
02D9 00CC      01116             MOVWF   FCTN_MDE    ;
02DA 3063      01117 FUNCTION    MOVLW   B'01100011' ;Sets averaging bit + clear peak hold bit for exit, set bit t
                    o display first reading (AVE)
02DB 00DB      01118             MOVWF   SWITCHES    ;
```

MPASM 01.30.01 Intermediate 2001V603.ASM   4-15-1997  10:51:29       PAGE 23

```
LOC  OBJECT CODE    LINE SOURCE TEXT
 VALUE

02DC 30FF           01119                MOVLW   H'FF'        ;Clear all segments
02DD 00B1           01120                MOVWF   DISPL        ;
02DE 30FF           01121                MOVLW   H'FF'        ;
02DF 00B0           01122                MOVWF   DISPH        ;
02E0 26FC           01123                CALL    DISPLAY      ;
                    01124
02E1 1683           01125 FUNCTION3      BSF     STATUS,5     ;Set to Bank1 registers
02E2 148C           01126                BSF     PIE1,1       ;Set interupt enable flag
02E3 1C8C           01127                BTFSS   PIE1,1       ;Is the bit on?
02E4 2AE1           01128                GOTO    FUNCTION3    ;If not then set again
                    01129
02E5 1683           01130 FUNCTION1      BSF     STATUS,5            ;Address register Bank 1
02E6 1407           01131                BSF     TRISC,0      ;Make beeper line input to read switch
02E7 1283           01132                BCF     STATUS,5            ;Adress register Bank 0
02E8 1D09           01133                BTFSS   PORTE,2      ;wait for button de-bounce
02E9 2AE5           01134                GOTO    FUNCTION1
02EA 1C07           01135                BTFSS   PORTC,0      ;wait for button de-bounce
02EB 2AE5           01136                GOTO    FUNCTION1    ;
02EC 2619           01137                CALL    BEEP         ;
02ED 2679           01138                CALL    SW_WAIT      ;Buzzer needs to stop resonating before read switch
02EE 1C07           01139 SET_PSI        BTFSS   PORTC,0      ;If Average button pushed then goto
02EF 2B00           01140                GOTO    EXIT_RET     ;exit routine
02F0 1909           01141                BTFSC   PORTE,2      ;If Peak button pushed then go and set
02F1 2AEE           01142                GOTO    SET_PSI      ;bit patern to flip from Psi to kPa C or F
02F2 1B4C           01143                BTFSC   FCTN_MDE,6   ;If bit 6 is set then it's initial fireup
02F3 16CC           01144                BSF     FCTN_MDE,5   ;so set bit 5 so after rotate bit 6 is still set
02F4 1003           01145                BCF     STATUS,0     ;Clear carry before rotate
02F5 0DCC           01146                RLF     FCTN_MDE,1   ;Rotate flag bit
                    01147                                    ;Next line: Temperature & Pressure = FCTN_MDE,4
                    01148                                    ;Next line: Pressure only = FCTN_MDE,2
02F6 1A4C           01149                BTFSC   FCTN_MDE,4   ;End of lable flags so go back to start
02F7 144C           01150                BSF     FCTN_MDE,0   ;
                    01151                                    ;Next line: Temperature & Pressure = FCTN_MDE,4
                    01152                                    ;Next line: Pressure only = FCTN_MDE,2
02F8 124C           01153                BCF     FCTN_MDE,4   ;
02F9 13CC           01154                BCF     FCTN_MDE,7   ;Stop minus sign coming on
02FA 2619           01155                CALL    BEEP         ;
02FB 26FC           01156                CALL    DISPLAY      ;
02FC 1D09           01157 LOOPY4         BTFSS   PORTE,2      ;wait for button de-bounce
02FD 2AFC           01158                GOTO    LOOPY4       ;
02FE 2679           01159                CALL    WAIT         ;
02FF 2AEE           01160                GOTO    SET_PSI      ;Go around again
                    01161
0300 2619           01162 EXIT_RET       CALL    BEEP         ;
0301 2619           01163                CALL    BEEP         ;Beep and return to main program
                    01164                                    ;Set up the screen depending on the chosen mode
0302 194C           01165                BTFSC   FCTN_MDE,2   ;TEMPERATURE? (C)
0303 2B08           01166                GOTO    PSI_SCRN
                    01167
0304 19CC           01168                BTFSC   FCTN_MDE,3   ;TEMPERATURE? (F)
0305 2B08           01169                GOTO    PSI_SCRN
                    01170
0306 1C4C           01171                BTFSS   FCTN_MDE,0   ;PSI?
```

MPASM 01.30.01 Intermediate 2001V603.ASM  4-15-1997  10:51:29      PAGE 24

```
LOC  OBJECT CODE     LINE SOURCE TEXT
     VALUE 0307 2B0E            01172                   GOTO    KPA_SCRN
                     01173
0308 3000            01174 PSI_SCRN          MOVLW   H'00'
0309 00B0            01175                   MOVWF   DISPH
030A 300F            01176                   MOVLW   H'0F'
030B 00B1            01177                   MOVWF   DISPL
030C 26FC            01178                   CALL    DISPLAY
030D 0008            01179                   RETURN          ;
                     01180
030E 3000            01181 KPA_SCRN          MOVLW   H'00'
030F 00B0            01182                   MOVWF   DISPH
0310 3000            01183                   MOVLW   H'00'
0311 00B1            01184                   MOVWF   DISPL
0312 26FC            01185                   CALL    DISPLAY
0313 0008            01186                   RETURN          ;
                     01187
                     01188 ;************************************************************************
                           ******************
                     01189
                     01190
                     01191
                     01192                                   ;COMPUTE ACTUAL PRESSURE-Return value in RPRESH and RPRESL
                     01193                                   ;  and then convert to BCD in DISPH and DISPL
                     01194                                   ;  Compute the voltage under pressure
                     01195                                   ;  For presssure, subtract the zero and correct for temperature and c
                           alibration factor
                     01196
0314 194C            01197 CALC              BTFSC   FCTN_MDE,2  ;Check temp bits C
0315 2458            01198                   CALL    TEMPERATURE ;
0316 19CC            01199                   BTFSC   FCTN_MDE,3  ;Check temp bit F
0317 2458            01200                   CALL    TEMPERATURE ;
0318 184C            01201                   BTFSC   FCTN_MDE,0  ;Check pressure bit
0319 231D            01202                   CALL    PRES_OUT
031A 18CC            01203                   BTFSC   FCTN_MDE,1  ;Check pressure bit
031B 231D            01204                   CALL    PRES_OUT
031C 0008            01205                   RETURN
                     01206
031D 158A            01207 PRES_OUT          BSF     PCLATH,3    ;Select page 1
Message[306]: Crossing page boundary -- ensure page bits are set.
031E 214E            01208                   CALL    BATT_ADJ    ;
031F 118A            01209                   BCF     PCLATH,3    ;Reselect page 0
                     01210
0320 23AB            01211                   CALL    ZERO_ADJ    ;
                     01212
0321 1283            01213                   BCF     STATUS,5    ;Set address register to bank 0
0322 087B            01214                   MOVF    ADJ_ZEROH,0 ;Bring adjusted zero byte in
0323 1683            01215                   BSF     STATUS,5    ;Set address register to Bank 1
0324 00C6            01216                   MOVWF   SBUFF19     ;Store in Serial buffer
0325 1283            01217                   BCF     STATUS,5    ;Set address register to bank 0
0326 087C            01218                   MOVF    ADJ_ZEROL,0 ;
0327 1683            01219                   BSF     STATUS,5    ;Set address register to Bank 1
0328 00C7            01220                   MOVWF   SBUFF20     ;Store in Serial buffer
0329 1283            01221                   BCF     STATUS,5    ;Set address register to bank 0
```

MPASM 01.30.01 Intermediate 2001V603.ASM   4-15-1997  10:51:29      PAGE 25

LOC  OBJECT CODE    LINE SOURCE TEXT
     VALUE 01222
032A 23E9           01223          CALL    SPAN_ADJ    ;
                    01224
032B 1283           01225          BCF     STATUS,5    ;Set address register to bank 0
032C 0843           01226          MOVF    VOLTH,0     ;Bring adjusted pressure in
032D 1683           01227          BSF     STATUS,5    ;Set address register to Bank 1
032E 00C8           01228          MOVWF   SBUFF21     ;Store in Serial buffer
032F 1283           01229          BCF     STATUS,5    ;Set address register to bank 0
0330 0844           01230          MOVF    VOLTL,0     ;
0331 1683           01231          BSF     STATUS,5    ;Set address register to Bank 1
0332 00CA           01232          MOVWF   SBUFF22     ;Store in Serial buffer
0333 1283           01233          BCF     STATUS,5    ;Set address register to bank 0
                    01234
                    01235 ;---------------------------------------------------------------------------------
                    01236          ;For testing purposes the temperature compensation has been removed. Remove this section when done
                    01237          ;MOVF    ZPRESH,0    ;Bring in the zero temp
                    01238          ;MOVWF   ADJ_ZEROH   ;
                    01239          ;MOVF    ZPRESL,0    ;Bring in the zero temp
                    01240          ;MOVWF   ADJ_ZEROL   ;
                    01241 ;---------------------------------------------------------------------------------
                    01242
0334 0843           01243          MOVF    VOLTH,0     ;Adjusted pressure reading now has
0335 00D8           01244          MOVWF   ACCeHI      ;adjusted zero offset subtracted from it
0336 0844           01245          MOVF    VOLTL,0     ;1st operand
0337 00D9           01246          MOVWF   ACCeLO      ;
0338 087B           01247          MOVF    ADJ_ZEROH,0 ;Put ZPRES into ACCc for subtraction
0339 00D4           01248          MOVWF   ACCcHI      ;2nd operand
033A 087C           01249          MOVF    ADJ_ZEROL,0 ;
033B 00D5           01250          MOVWF   ACCcLO      ;
033C 13CC           01251          BCF     FCTN_MDE,7  ;turns off minus sign
033D 2660           01252          CALL    DSUB        ;Result is in ACCe
033E 1803           01253          BTFSC   STATUS,0    ;Test to see if the second reading was lower than the first
033F 2B4A           01254          GOTO    CALC2       ;If not go on
                    01255
                    01256 ;---------------------------------------------------------------------------------
                    01257          ;Comment out this section if not want vaccuum
                    01258                  ;Re calculate to provide a positive number
0340 0843           01259          MOVF    VOLTH,0     ; Adjusted zero offset now has
0341 00D4           01260          MOVWF   ACCcHI      ;adjusted pressure reading subtracted from it
0342 0844           01261          MOVF    VOLTL,0     ;1st operand
0343 00D5           01262          MOVWF   ACCcLO      ;
0344 087B           01263          MOVF    ADJ_ZEROH,0 ;Put ZPRES into ACCc for subtraction
0345 00D8           01264          MOVWF   ACCeHI      ;2nd operand
0346 087C           01265          MOVF    ADJ_ZEROL,0 ;
0347 00D9           01266          MOVWF   ACCeLO      ;
0348 2660           01267          CALL    DSUB        ;Result is in ACCe
0349 17CC           01268          BSF     FCTN_MDE,7  ;turns minus sign ON
                    01269 ;---------------------------------------------------------------------------------

MPASM 01.30.01 Intermediate 2001V603.ASM   4-15-1997  10:51:29    PAGE 26

```
LOC  OBJECT CODE   LINE SOURCE TEXT
VALUE

01270              ;Comment out this section if want vaccuum
                   01271       ;CLRF   ACCeHI    ;If lower, then zero the rest
                   01272       ;CLRF   ACCeLO    ;
                   01273 ;-----------------------------------------------------------------------------
                         -----------------
                   01274                          ;Multiply by the calibration factor to put in range of 0 to 999 (3E7H)
034A 0858          01275 CALC2  MOVF   ACCeHI,0  ;Bring in result of previous subtraction
034B 00D0          01276        MOVWF  ACCaHI    ;Put it into acc A
034C 0859          01277        MOVF   ACCeLO,0  ;Bring in result of previous subtraction
034D 00D1          01278        MOVWF  ACCaLO    ;Put it into acc A
034E 0838          01279        MOVF   CALPRESH,0 ;Bring in calibration factor
034F 00D2          01280        MOVWF  ACCbHI    ;Put it into acc B
0350 0839          01281        MOVF   CALPRESL,0 ;Bring in calibration factor
0351 00D3          01282        MOVWF  ACCbLO    ;Put it into acc B
0352 2636          01283        CALL   DMPY      ;Multiply the two
                   01284                          ;Result is in ACCbHI and LO
0353 0852          01285        MOVF   ACCbHI,0  ;Bring in the result
0354 00C5          01286        MOVWF  RPRESH    ;Put it into the final data register
0355 0853          01287        MOVF   ACCbLO,0  ;Bring in the result
0356 00C6          01288        MOVWF  RPRESL    ;Put it into the final data register
0357 184C          01289        BTFSC  FCTN_MDE,0 ;If PSI bit clear then convert number to KPA
0358 2B5C          01290        GOTO   PSI
                   01291
0359 158A          01292 KPA    BSF    PCLATH,3        ;Select page 1
Message[306]: Crossing page boundary -- ensure page bits are set.
035A 22F0          01293        CALL   KPACONVERT ;
035B 118A          01294        BCF    PCLATH,3        ;Select page 0
                   01295
035C 0845          01296 PSI    MOVF   RPRESH,0  ;Bring Pressure byte in
035D 1683          01297        BSF    STATUS,5  ;Set address register to Bank 1
035E 00CB          01298        MOVWF  SBUFF23   ;Store in Serial buffer
035F 1283          01299        BCF    STATUS,5  ;Set address register to bank 0
0360 0846          01300        MOVF   RPRESL,0  ;Bring Pressure byte in
0361 1683          01301        BSF    STATUS,5  ;Set address register to Bank 1
0362 00CC          01302        MOVWF  SBUFF24   ;Store in Serial buffer
0363 1283          01303        BCF    STATUS,5  ;Set address register to bank 0
                   01304
                   01305                          ;Correct into BCD into DISPH (100s digit) and DISPL (10s and 1s di
                         gits)
0364 1003          01306 BCD_CONV BCF  STATUS,0  ;Clear carry
0365 3010          01307        MOVLW  .16       ;Set up a counter for the 16 bits to be converted
0366 00AD          01308        MOVWF  COUNT     ;
0367 01B1          01309        CLRF   DISPL     ;Clear three registers to hold result
0368 01B0          01310        CLRF   DISPH     ;
0369 01A1          01311        CLRF   TEMP1     ;
036A 0DC6          01312 CALC1  RLF    RPRESL,1  ;Rotate low byte thru carry
036B 0DC5          01313        RLF    RPRESH,1  ;Rotate high byte
036C 0DB1          01314        RLF    DISPL,1   ;Rotate low output byte
036D 0DB0          01315        RLF    DISPH,1   ;Rotate middle output byte
036E 0DA1          01316        RLF    TEMP1,1   ;Rotate high output byte
036F 0BAD          01317        DECFSZ COUNT,1   ;Check cycle count
0370 2B8A          01318        GOTO   ADJDEC    ;Call routine to decimal adjust
0371 1CCC          01319        BTFSS  FCTN_MDE,1 ;Skip if in kPa mode
```

```
MPASM 01.30.01 Intermediate 2001V603.ASM   4-15-1997  10:51:29        PAGE 27

LOC  OBJECT CODE    LINE SOURCE TEXT
     VALUE 0372 2B74           01320                   GOTO    BCD_CONV1     ;Adjust nibble placing for PSI (if under 99.9) & temperatures
                    01321
                    01322 ;TRUNCATE HERE?
                    01323
                    01324 ;        BTFSS   SWITCHES,1    ;When Switches,1 is set Low Res is enabled
                    01325 ;        GOTO    DISP_ADJ      ;Hi Res: do not truncate
                    01326
                    01327 ;        BSF     PCLATH,3              ;Select page 1
                    01328 ;        CALL    TRUNCATE3     ;Truncate 3 digit display
                    01329 ;        BCF     PCLATH,3              ;select page 0
                    01330
0373 0008           01331                   RETURN                ;Return if KPA ( display not need mods)
                    01332
0374 1C4C           01333 BCD_CONV1 BTFSS   FCTN_MDE,0    ;PSI mode?
0375 2B9F           01334           GOTO    DISP_ADJ              ;Not PSI :. Temp. - needs mods
                    01335
0376 1CDB           01336           BTFSS   SWITCHES,1    ;When Switches,1 is set Low res is enabled
0377 2B82           01337           GOTO    TEST100       ;Hi res: do not truncate
                    01338
                    01339                                 ;TRUNCATE HERE
0378 0830           01340           MOVF    DISPH,0       ;Move High byte display register into W: zero flag is affected
0379 1D03           01341           BTFSS   STATUS,2              ;Test zero flag
037A 2B7F           01342           GOTO    TRUNCATE              ;Go here if not zero
                    01343
037B 0831           01344           MOVF    DISPL,0       ;Move low byte display register into W
037C 39F0           01345           ANDLW   0F0h          ;Mask out hi nibble
037D 1903           01346           BTFSC   STATUS,2              ;Test zero flag
037E 2B9F           01347           GOTO    DISP_ADJ              ;Less than 1.0 psi so no truncate
                    01348
037F 158A           01349 TRUNCATE          BSF     PCLATH,3              ;Select page 1
Message[306]: Crossing page boundary -- ensure page bits are set.
0380 22C2           01350           CALL    TRUNCATE4     ;Truncate 4 digit display
0381 118A           01351           BCF     PCLATH,3              ;select page 0
                    01352
0382 1337           01353 TEST100   BCF     FCTN_PH,6     ;Clear 'OVER 99.9' bit
0383 0830           01354           MOVF    DISPH,0       ;Move high display byte into W
0384 39F0           01355           ANDLW   b'11110000'   ;Mask off the low nibble
0385 1D03           01356           BTFSS   _Z            ;Is the result 0? (no hundreds digit)
0386 1737           01357           BSF     FCTN_PH,6     ;Set the OVER bit only if hundreds digit needs display
0387 1B37           01358           BTFSC   FCTN_PH,6     ;Test OVER bit
0388 0008           01359           RETURN                ;Return if OVER bit is set. needs no mods
0389 2B9F           01360           GOTO    DISP_ADJ              ;Pressure under 99.9 so modify
                    01361
                    01362
                    01363
038A 3031           01364 ADJDEC    MOVLW   DISPL         ;Bring in location of low byte of result
038B 0084           01365           MOVWF   FSR           ;Put in FSR
038C 2394           01366           CALL    ADJBCD        ;Call routine to BCD adjust
038D 3030           01367           MOVLW   DISPH         ;Bring in location of next byte
038E 0084           01368           MOVWF   FSR           ;Put in FSR
038F 2394           01369           CALL    ADJBCD        ;Call routine to BCD adjust
0390 3021           01370           MOVLW   TEMP1         ;Bring in location of next byte
0391 0084           01371           MOVWF   FSR           ;Put in FSR
```

MPASM 01.30.01 Intermediate  2001V603.ASM   4-15-1997  10:51:29        PAGE 28

LOC  OBJECT CODE    LINE SOURCE TEXT
     VALUE

```
0392 2394          01372                    CALL    ADJBCD      ;Call routine to BCD adjust
0393 2B6A          01373                    GOTO    CALC1       ;Loop
                   01374
0394 3003          01375 ADJBCD             MOVLW   H'3'        ;Put 3 in W
0395 0700          01376                    ADDWF   INDF,0      ;Add W to the location pointed to by FSR
0396 00A2          01377                    MOVWF   TEMP2       ;Put in temporary register
0397 19A2          01378                    BTFSC   TEMP2,3     ;Test if result is above 7
0398 0080          01379                    MOVWF   INDF        ;Put into register pointed to by FSR
0399 3030          01380                    MOVLW   H'30'       ;Bring in the number 30h
039A 0700          01381                    ADDWF   INDF,0      ;Add W to the location pointed to by FSR
039B 00A2          01382                    MOVWF   TEMP2       ;Put in temporary register
039C 1BA2          01383                    BTFSC   TEMP2,7     ;Test if result is above 7
039D 0080          01384                    MOVWF   INDF        ;Put into register pointed to by FSR
039E 0008          01385                    RETURN              ;Return
                   01386
039F 3004          01387 DISP_ADJ           MOVLW   04H         ;
03A0 00AC          01388                    MOVWF   LOOPY       ;Rotate four times to move the nibbles over
03A1 300F          01389                    MOVLW   B'00001111' ;zero out high nibble of high display byte
03A2 05B0          01390                    ANDWF   DISPH,1     ;
03A3 1003          01391                    BCF     STATUS,0    ;
03A4 0DB1          01392 SOME_MORE          RLF     DISPL,1         ;Rotate thro carry low byte
03A5 0DB0          01393                    RLF     DISPH,1         ;rotate thro carry high byte
03A6 0BAC          01394                    DECFSZ  LOOPY,1     ;again?
03A7 2BA4          01395                    GOTO    SOME_MORE   ;yes
03A8 300F          01396                    MOVLW   B'00001111' ;Put F in LSB to blank digit (PSI)
03A9 04B1          01397                    IORWF   DISPL,1     ;
03AA 0008          01398                    RETURN              ;
                   01399
                   01400 ;************************************************************************************
                         ******************
                   01401
03AB               01402 ZERO_ADJ
03AB 087D          01403                    MOVF    ZTEMPSH,0   ;Bring in the zero temp
03AC 00D8          01404                    MOVWF   ACCeHI      ;
03AD 087E          01405                    MOVF    ZTEMPSL,0   ;Bring in the zero temp
03AE 00D9          01406                    MOVWF   ACCeLO      ;
03AF 082A          01407                    MOVF    TEMPSH,0    ;
03B0 00D4          01408                    MOVWF   ACCcHI      ;Subtract new temp from zero temp
03B1 082B          01409                    MOVF    TEMPSL,0    ;
03B2 00D5          01410                    MOVWF   ACCcLO      ;
03B3 2660          01411                    CALL    DSUB        ;
03B4 1803          01412                    BTFSC   STATUS,0    ;No carry means negative result (temp went up)
                   01413                                        ;(subtraction of larger (hotter) input produced a negative number)
03B5 2BD6          01414                    GOTO    TEMP_DOWN
                   01415
                   01416                    ;Temperature up:
                   01417                    ;The new temperature is higher than the calibrated temperature which makes the transducer offset look
                   01418                    ;like it is dropping.
                   01419                    ;Therefore subtract the Offset movement from the calibrated zero line to give the Adjusted zero line.
03B6               01420 TEMP_UP
03B6 082A          01421                    MOVF    TEMPSH,0    ;Recalculate temperature difference to get a positive integer for even
```

MPASM 01.30.01 Intermediate 2001V603.ASM  4-15-1997 10:51:29      PAGE 29

```
LOC  OBJECT CODE   LINE  SOURCE TEXT
     VALUE tual subtraction
03B7 00D8          01422             MOVWF  ACCeHI     ;
03B8 082B          01423             MOVF   TEMPSL,0   ;
03B9 00D9          01424             MOVWF  ACCeLO     ;
03BA 087D          01425             MOVF   ZTEMPSH,0  ;Bring in the zero temp
03BB 00D4          01426             MOVWF  ACCcHI     ;
03BC 087E          01427             MOVF   ZTEMPSL,0  ;Bring in the zero temp
03BD 00D5          01428             MOVWF  ACCcLO     ;
03BE 2660          01429             CALL   DSUB       ;Subtract zero temp from new temp
                   01430                               ;Result in ACCe
03BF 0858          01431             MOVF   ACCeHI,0   ;Put into variables for divide by Offset temp factor
03C0 00D0          01432             MOVWF  ACCaHI     ;
03C1 0859          01433             MOVF   ACCeLO,0   ;
03C2 00D1          01434             MOVWF  ACCaLO     ;
03C3 0841          01435             MOVF   CALOFFSH,0 ;
03C4 00D2          01436             MOVWF  ACCbHI     ;Mulitply by Offset factor
03C5 0842          01437             MOVF   CALOFFSL,0 ;
03C6 00D3          01438             MOVWF  ACCbLO     ;
03C7 2636          01439             CALL   DMPY       ;Result in ACCb & ACCc
                   01440                               ;Divide by 65536 by taking only the top 2 bytes from the multiply routine
                         (ACCb)
                   01441                               ;Move them into ACCc for subtraction from Zero offset baseline (moves the
                         baseline down)
03C8 0852          01442             MOVF   ACCbHI,0   ;
03C9 00D4          01443             MOVWF  ACCcHI     ;
03CA 0853          01444             MOVF   ACCbLO,0   ;
03CB 00D5          01445             MOVWF  ACCcLO     ;
                   01446                               ;Zero temperature baseline goes in ACCe
03CC 083E          01447             MOVF   ZPRESH,0   ;Temp movement
03CD 00D8          01448             MOVWF  ACCeHI     ;subtracted from Base line pressure
03CE 083F          01449             MOVF   ZPRESL,0   ;
03CF 00D9          01450             MOVWF  ACCeLO     ;
03D0 2660          01451             CALL   DSUB       ;Result in ACCeHI + LO
                   01452
03D1 0858          01453             MOVF   ACCeHI,0   ;
03D2 00FB          01454             MOVWF  ADJ_ZEROH  ;New temp comped value
03D3 0859          01455             MOVF   ACCeLO,0   ;
03D4 00FC          01456             MOVWF  ADJ_ZEROL  ;
03D5 0008          01457             RETURN            ;
                   01458
                   01459
                   01460                      ;Temperature down:
                   01461                      ;The new temperature is lower than the calibrated temperature which makes
                         the transducer offset
                   01462                      ;look like it is climbing.
                   01463                      ;Therefore add the Offset movement to the calibrated zero line to give the
                         Adjusted zero line.
                   01464
03D6               01465  TEMP_DOWN           ;Positive integer result from previous subtraction is in ACCe.
                   01466                      ;Need to move result into ACCa for multiplication by Cal Factor
03D6 0858          01467             MOVF   ACCeHI,0   ;
03D7 00D0          01468             MOVWF  ACCaHI
03D8 0859          01469             MOVF   ACCeLO,0   ;
```

MPASM 01.30.01 Intermediate 2001V603.Asm   4-15-1997  10:51:29     PAGE 30

```
LOC  OBJECT CODE   LINE SOURCE TEXT
     VALUE

03D9 00D1          01470                   MOVWF   ACCaLO     ;
03DA 0841          01471                   MOVF    CALOFFSH,0 ;Multiply by Offset factor
03DB 00D2          01472                   MOVWF   ACCbHI     ;
03DC 0842          01473                   MOVF    CALOFFSL,0 ;
03DD 00D3          01474                   MOVWF   ACCbLO     ;
03DE 2636          01475                   CALL    DMPY       ;Result in Accb & ACCc
                   01476                                      ;Using just the top two bytes effectively divides the result by 65536
                   01477                                      ;Put the Zero offset baseline in ACCc to add it to the factored temperatur
              e movement
03DF 083E          01478                   MOVF    ZPRESH,0   ;
03E0 00D0          01479                   MOVWF   ACCaHI     ;
03E1 083F          01480                   MOVF    ZPRESL,0   ;Add temp change to base line reading to move baseline up
03E2 00D1          01481                   MOVWF   ACCaLO     ;
03E3 264B          01482                   CALL    DADD       ;Result in ACCbHI + LO
                   01483
03E4 0852          01484                   MOVF    ACCbHI,0   ;
03E5 00FB          01485                   MOVWF   ADJ_ZEROH  ;New temp comped value
03E6 0853          01486                   MOVF    ACCbLO,0   ;
03E7 00FC          01487                   MOVWF   ADJ_ZEROL  ;
03E8 0008          01488                   RETURN             ;
                   01489
                   01490
                   01491 ;*************************************************************************************
                         *****************
                   01492
03E9 0843          01493 SPAN_ADJ          MOVF    VOLTH,0    ;Bring in pressure reading
03EA 00D8          01494                   MOVWF   ACCeHI     ;& subtract it from the zero adjusted
03EB 0844          01495                   MOVF    VOLTL,0    ;value to give the change in pressure
03EC 00D9          01496                   MOVWF   ACCeLO     ;
03ED 087B          01497                   MOVF    ADJ_ZEROH,0 ;
03EE 00D4          01498                   MOVWF   ACCcHI     ;
03EF 087C          01499                   MOVF    ADJ_ZEROL,0 ;
03F0 00D5          01500                   MOVWF   ACCcLO     ;
03F1 2660          01501                   CALL    DSUB       ;Result in ACCeHI+LO
03F2 1803          01502                   BTFSC   STATUS,0   ;
03F3 2BFF          01503                   GOTO    POS_PRESH  ;
                   01504
                   01505 ;-----------------------------------------------------------------------------------
                         ------------------
                   01506 ;                 Comment out this section if not want vaccuum
03F4 0843          01507                   MOVF    VOLTH,0    ;Bring in zero adjusted reading
03F5 00D4          01508                   MOVWF   ACCcHI     ;& subtract it from the pressure
03F6 0844          01509                   MOVF    VOLTL,0    ;value to give the change in pressure as a possitive integer
03F7 00D5          01510                   MOVWF   ACCcLO     ;
03F8 087B          01511                   MOVF    ADJ_ZEROH,0 ;
03F9 00D8          01512                   MOVWF   ACCeHI     ;
03FA 087C          01513                   MOVF    ADJ_ZEROL,0 ;
03FB 00D9          01514                   MOVWF   ACCeLO     ;
03FC 2660          01515                   CALL    DSUB       ;Result in ACCeHI+LO
03FD 17CC          01516                   BSF     FCTN_MDE,7 ;turns minus sign ON
03FE 2C00          01517                   GOTO    PRESH      ;Skips the section that turns off the minus sign
                   01518
                   01519 ;-----------------------------------------------------------------------------------
```

MPASM 01.30.01 Intermediate 2001V603.ASM   4-15-1997  10:51:29     PAGE 31

LOC  OBJECT CODE    LINE  SOURCE TEXT
     VALUE

```
                    01520 ;              Comment out this section if want vaccuum
                    01521        ;CLRF   ACCeHI    ;If negative then show it as zero
                    01522        ;CLRF   ACCeLO    ;
                    01523 ;-------------------------------------------------------------------------------
                    01524
03FF 13CC           01525 POS_PRESH      BCF   FCTN_MDE,7    ;Turns minus sign OFF
0400 0858           01526 PRESH          MOVF  ACCeHI,0      ;
0401 00BB           01527                MOVWF PRESS_DIFH    ;Zero pressure compensated pressure difference.
0402 0859           01528                MOVF  ACCeLO,0      ;Still needs to be span compensated.
0403 00FF           01529                MOVWF PRESS_DIFL    ;
0404 1683           01530                BSF   STATUS,5      ;Set address register to Bank 1
0405 0820           01531                MOVF  TEMPERHI,0    ;Bring in the calibration temp (Defined at calibration)
0406 1283           01532                BCF   STATUS,5      ;Set address register to Bank 0
0407 00D4           01533                MOVWF ACCcHI        ;
0408 1683           01534                BSF   STATUS,5      ;Set address register to Bank 1
0409 0821           01535                MOVF  TEMPERLO,0    ;Bring in the calibration temp (Defined at calibration)
040A 1283           01536                BCF   STATUS,5      ;Set address register to Bank 0
040B 00D5           01537                MOVWF ACCcLO        ;
040C 082A           01538                MOVF  TEMPSH,0      ;
040D 00D8           01539                MOVWF ACCeHI        ;Subtract calibration temp from new temp.
                    01540                              ;The result will be a positive integer describing Temp. change higher than
                          85 F
040E 082B           01541                MOVF  TEMPSL,0      ;
040F 00D9           01542                MOVWF ACCeLO        ;
0410 2660           01543                CALL  DSUB          ;
0411 1803           01544                BTFSC STATUS,0      ;See if temp has gone higher or lower than zero temp. Status clear if
                          lower
0412 2C3C           01545                GOTO  SPAN_TEMP_HI  ;
                    01546
0413                01547 SPAN_TEMP_LOW                      ;Recalculate if Temp. was lower than 85 F.
0413 1683           01548                BSF   STATUS,5      ;Set address register to Bank 1
0414 0820           01549                MOVF  TEMPERHI,0    ;Bring in the calibration temp (Defined at calibration)
0415 1283           01550                BCF   STATUS,5      ;Set address register to Bank 0
0416 00D8           01551                MOVWF ACCeHI        ;
0417 1683           01552                BSF   STATUS,5      ;Set address register to Bank 1
0418 0821           01553                MOVF  TEMPERLO,0    ;Bring in the calibration temp (Defined at calibration)
0419 1283           01554                BCF   STATUS,5      ;Set address register to Bank 0
041A 00D9           01555                MOVWF ACCeLO        ;
041B 082A           01556                MOVF  TEMPSH,0      ;
041C 00D4           01557                MOVWF ACCcHI        ;Subtract new temp from calibration temp.
                    01558                              ;The result will be a positive integer describing the Temp. change lower t
                          han 85 F
041D 082B           01559                MOVF  TEMPSL,0      ;
041E 00D5           01560                MOVWF ACCcLO        ;
041F 2660           01561                CALL  DSUB          ;
0420 0859           01562                MOVF  ACCeLO,0      ;Multiply temp change by pressure change
0421 00D3           01563                MOVWF ACCbLO        ;
0422 0858           01564                MOVF  ACCeHI,0      ;
0423 00D2           01565                MOVWF ACCbHI        ;
0424 083B           01566                MOVF  PRESS_DIFH,0  ;
0425 00D0           01567                MOVWF ACCaHI        ;
```

MPASM 01.30.01 Intermediate 2001V603.AsM   4-15-1997  10:51:29     PAGE 32

LOC  OBJECT CODE   LINE  SOURCE TEXT
     VALUE

```
0426 087F        01568              MOVF   PRESS_DIFL,0;
0427 00D1        01569              MOVWF  ACCaLO     ;
0428 2636        01570              CALL   DMPY       ;
                 01571                            ;Result needs to be divided by 65536 by taking only the top two bytes
                 01572                            ;These bytes are already in ACCb
                 01573                                   ;
0429 085C        01574              MOVF   CALSPANH,0   ;Multiply adjusted temp change by span factor
042A 00D0        01575              MOVWF  ACCaHI     ;
042B 085D        01576              MOVF   CALSPANL,0   ;
042C 00D1        01577              MOVWF  ACCaLO     ;
042D 2636        01578              CALL   DMPY       ;
042E 0854        01579              MOVF   ACCcHI,0     ;Divide by 256 by using just the middle two bytes (ACCbLO & ACCcHI)
042F 00D5        01580              MOVWF  ACCcLO     ;
0430 0853        01581              MOVF   ACCbLO,0    ;
0431 00D4        01582              MOVWF  ACCcHI     ;
0432 0843        01583              MOVF   VOLTH,0     ;SUBTRACT results from the pressure reading
0433 00D8        01584              MOVWF  ACCeHI     ;
0434 0844        01585              MOVF   VOLTL,0     ;
0435 00D9        01586              MOVWF  ACCeLO     ;
0436 2660        01587              CALL   DSUB       ;
0437 0858        01588              MOVF   ACCeHI,0    ;Move result into VOLTH + L
0438 00C3        01589              MOVWF  VOLTH      ;
0439 0859        01590              MOVF   ACCeLO,0    ;
043A 00C4        01591              MOVWF  VOLTL      ;
043B 0008        01592              RETURN
                 01593
043C             01594  SPAN_TEMP_HI
043C 0859        01595              MOVF   ACCeLO,0    ;Multiply temp change by pressure change
043D 00D3        01596              MOVWF  ACCbLO     ;
043E 0858        01597              MOVF   ACCeHI,0    ;
043F 00D2        01598              MOVWF  ACCbHI     ;
0440 083B        01599              MOVF   PRESS_DIFH,0;
0441 00D0        01600              MOVWF  ACCaHI     ;
0442 087F        01601              MOVF   PRESS_DIFL,0;
0443 00D1        01602              MOVWF  ACCaLO     ;
0444 2636        01603              CALL   DMPY       ;
                 01604                            ;Result needs to be divided by 65536 by taking only the top two bytes
                 01605                            ;These bytes are already in ACCb
                 01606                                   ;
0445 085C        01607              MOVF   CALSPANH,0   ;Multiply adjusted temp change by span factor
0446 00D0        01608              MOVWF  ACCaHI     ;
0447 085D        01609              MOVF   CALSPANL,0   ;
0448 00D1        01610              MOVWF  ACCaLO     ;
0449 2636        01611              CALL   DMPY       ;
044A 0853        01612              MOVF   ACCbLO,0    ;Divide by 256 by using just the middle two bytes (ACCbLO & ACCcHI)
044B 00D2        01613              MOVWF  ACCbHI     ;
044C 0854        01614              MOVF   ACCcHI,0    ;
044D 00D3        01615              MOVWF  ACCbLO     ;
044E 0843        01616              MOVF   VOLTH,0     ;ADD results to the pressure reading
044F 00D0        01617              MOVWF  ACCaHI     ;
0450 0844        01618              MOVF   VOLTL,0     ;
```

```
MPASM 01.30.01 Intermediate 2001V603.Asm   4-15-1997  10:51:29        PAGE 33

LOC  OBJECT CODE    LINE SOURCE TEXT
     VALUE 0451 00D1           01619                   MOVWF   ACCaLO      ;
0452 264B           01620                   CALL    DADD        ;
0453 0852           01621                   MOVF    ACCbHI,0    ;Move result into VOLTH + L
0454 00C3           01622                   MOVWF   VOLTH       ;
0455 0853           01623                   MOVF    ACCbLO,0    ;
0456 00C4           01624                   MOVWF   VOLTL       ;
0457 0008           01625                   RETURN
                    01626
                    01627
                    01628 ;********************************************************************************
                          *****************
                    01629 ;********************************************************************************
                          *****************
                    01630
                    01631
0458 245F           01632 TEMPERATURE       CALL    DEGREESF
0459 1D4C           01633                   BTFSS   FCTN_MDE,2  ;Check C bit Skip if set
045A 2B64           01634                   GOTO    BCD_CONV                ;Go here if F
                    01635
                    01636                                       ;Do this lot if converting to C
045B 158A           01637                   BSF     PCLATH,3    ;Select page 1
Message[306]: Crossing page boundary -- ensure page bits are set.
045C 219E           01638                   CALL    CONVERTC    ;
045D 118A           01639                   BCF     PCLATH,3    ;Select page 0
045E 2B64           01640                   GOTO    BCD_CONV    ;Go do BCD conversion
                    01641
                    01642 ;--------------------------------------------------------------------------------
                          -----------------
                    01643
045F 13CC           01644 DEGREESF          BCF     FCTN_MDE,7  ;Clear minus sign flag
                    01645                               ;Subtract incoming 16 bit ADC reading from 16 bit constant offset
0460 1683           01646                   BSF     STATUS,5    ;Set address register to Bank 1
0461 0820           01647                   MOVF    TEMPERHI,0  ;
0462 1283           01648                   BCF     STATUS,5    ;Set address register to Bank 0
0463 00D8           01649                   MOVWF   ACCeHI ;
0464 1683           01650                   BSF     STATUS,5    ;Set address register to Bank 1
0465 0821           01651                   MOVF    TEMPERLO,0  ;
0466 1283           01652                   BCF     STATUS,5    ;Set address register to Bank 0
0467 00D9           01653                   MOVWF   ACCeLO ;
0468 082A           01654                   MOVF    TEMPSH,0        ;
0469 00D4           01655                   MOVWF   ACCcHI ;
046A 082B           01656                   MOVF    TEMPSL,0        ;
046B 00D5           01657                   MOVWF   ACCcLO ;
046C 2660           01658                   CALL    DSUB        ;
046D 1C03           01659                   BTFSS   STATUS,0    ;ACCc < ACCe = +Ve RESULT = STATUS,0 = SET
046E 2CA2           01660                   GOTO    HIGHER  ;Incoming reading is higher than constant 16 bit value
                    01661
046F                01662 LOWER                         ;Incoming reading is lower than constant
046F 0858           01663                   MOVF    ACCeHI,0    ;Transfer result of subtraction to ACCa for multiplication by temp
                          erature calibration factor
0470 00D0           01664                   MOVWF   ACCaHI ;
0471 0859           01665                   MOVF    ACCeLO,0    ;
0472 00D1           01666                   MOVWF   ACCaLO ;
```

MPASM 01.30.01 Intermediate 2001V603.ASM  4-15-1997  10:51:29     PAGE 34

LOC  OBJECT CODE    LINE SOURCE TEXT
     VALUE

| LOC | OBJECT CODE | LINE | | | | |
|---|---|---|---|---|---|---|
| 0473 | 083C | 01667 | | MOVF | CALTEMPH,0 | ; |
| 0474 | 00D2 | 01668 | | MOVWF | ACCbHI | ; |
| 0475 | 083D | 01669 | | MOVF | CALTEMPL,0 | ; |
| 0476 | 00D3 | 01670 | | MOVWF | ACCbLO | ; |
| 0477 | 2636 | 01671 | | CALL | DMPY | ;Result in ACCbACCc |
| | | 01672 | | | | ;Needs to be divided by 65536 therefore use only the upper two bytes (ACCb) |
| | | 01673 | | | | ;DSUB inputs in ACCe and ACCc. Result in ACCe |
| 0478 | 0852 | 01674 | | MOVF | ACCbHI,0 | ;Transfer result of multiplication to ACCc for subtraction from temperature. |
| | | 01675 | | | | ;Store also in holding registers for later calculations |
| 0479 | 00D4 | 01676 | | MOVWF | ACCcHI | ; |
| 047A | 1683 | 01677 | | BSF | STATUS,5 | ;Set address register to Bank 1 |
| 047B | 00D7 | 01678 | | MOVWF | TINFHI | ; |
| 047C | 1283 | 01679 | | BCF | STATUS,5 | ;Set address register to Bank 0 |
| 047D | 0853 | 01680 | | MOVF | ACCbLO,0 | ; |
| 047E | 00D5 | 01681 | | MOVWF | ACCcLO | ; |
| 047F | 1683 | 01682 | | BSF | STATUS,5 | ;Set address register to Bank 1 |
| 0480 | 00D8 | 01683 | | MOVWF | TINFLO | ; |
| 0481 | 0822 | 01684 | | MOVF | TREADHI,0 | ; |
| 0482 | 1283 | 01685 | | BCF | STATUS,5 | ;Set address register to Bank 0 |
| 0483 | 00D8 | 01686 | | MOVWF | ACCeHI | ; |
| 0484 | 1683 | 01687 | | BSF | STATUS,5 | ;Set address register to Bank 1 |
| 0485 | 0823 | 01688 | | MOVF | TREADLO,0 | ; |
| 0486 | 1283 | 01689 | | BCF | STATUS,5 | ;Set address register to Bank 0 |
| 0487 | 00D9 | 01690 | | MOVWF | ACCeLO | ; |
| 0488 | 2660 | 01691 | | CALL | DSUB | ;Subtract temperature movement from baseline temperature (85 F) |
| | | 01692 | | | | |
| 0489 | 1803 | 01693 | | BTFSC | STATUS,0 | ;Skip if negative |
| 048A | 2C9D | 01694 | | GOTO | POSF | ;Go here if not negative |
| | | 01695 | | | | ;Recalculate Degrees F for negative values |
| 048B | 1683 | 01696 | | BSF | STATUS,5 | ;Set address register to Bank 1 |
| 048C | 0857 | 01697 | | MOVF | TINFHI,0 | ; |
| 048D | 1283 | 01698 | | BCF | STATUS,5 | ;Set address register to Bank 0 |
| 048E | 00D8 | 01699 | | MOVWF | ACCeHI | ; |
| 048F | 1683 | 01700 | | BSF | STATUS,5 | ;Set address register to Bank 1 |
| 0490 | 0858 | 01701 | | MOVF | TINFLO,0 | ; |
| 0491 | 1283 | 01702 | | BCF | STATUS,5 | ;Set address register to Bank 0 |
| 0492 | 00D9 | 01703 | | MOVWF | ACCeLO | ; |
| 0493 | 1683 | 01704 | | BSF | STATUS,5 | ;Set address register to Bank 1 |
| 0494 | 0822 | 01705 | | MOVF | TREADHI,0 | ; |
| 0495 | 1283 | 01706 | | BCF | STATUS,5 | ;Set address register to Bank 0 |
| 0496 | 00D4 | 01707 | | MOVWF | ACCcHI | ; |
| 0497 | 1683 | 01708 | | BSF | STATUS,5 | ;Set address register to Bank 1 |
| 0498 | 0823 | 01709 | | MOVF | TREADLO,0 | ; |
| 0499 | 1283 | 01710 | | BCF | STATUS,5 | ;Set address register to Bank 0 |
| 049A | 00D5 | 01711 | | MOVWF | ACCcLO | ; |
| 049B | 2660 | 01712 | | CALL | DSUB | ;Subtract baseline temperature(85 F) from temperature movement |
| 049C | 17CC | 01713 | | BSF | FCTN_MDE,7 | ;Set minus sign flag |
| | | 01714 | | | | |
| | | 01715 | | | | |
| | | 01716 | | | | |
| 049D | 0858 | 01717 POSF | | MOVF | ACCeHI,0 | ;Transfer result of subtraction to RPRESH |

MPASM 01.30.01 Intermediate 2001V603.ASM  4-15-1997  10:51:29      PAGE 35

```
LOC  OBJECT CODE   LINE SOURCE TEXT
     VALUE 049E 00C5          01718           MOVWF   RPRESH      ;
049F 0859          01719           MOVF    ACCeLO,0             ;
04A0 00C6          01720           MOVWF   RPRESL      ;
04A1 2CC5          01721           GOTO    EXIT_DEGREES ;
                   01722
04A2               01723 HIGHER                        ;Incoming reading is higher than constant
                   01724                               ;Recalculate reading from offset
04A2 1683          01725           BSF     STATUS,5    ;Set address register to Bank 1
04A3 0820          01726           MOVF    TEMPERHI,0  ;Subtract 16 bit constant offset from incoming 16 bit ADC reading
04A4 1283          01727           BCF     STATUS,5         ;Set address register to Bank 0
04A5 00D4          01728           MOVWF   ACCcHI      ;
04A6 1683          01729           BSF     STATUS,5         ;Set address register to Bank 1
04A7 0821          01730           MOVF    TEMPERLO,0  ;
04A8 1283          01731           BCF     STATUS,5         ;Set address register to Bank 0
04A9 00D5          01732           MOVWF   ACCcLO      ;
04AA 082A          01733           MOVF    TEMPSH,0             ;
04AB 00D8          01734           MOVWF   ACCeHI      ;
04AC 082B          01735           MOVF    TEMPSL,0             ;
04AD 00D9          01736           MOVWF   ACCeLO      ;
04AE 2660          01737           CALL    DSUB        ;Result in ACCe
                   01738
04AF 0858          01739           MOVF    ACCeHI,0    ;Transfer to ACCa for multiplication by temperature calibration fa
                        ctor
04B0 00D0          01740           MOVWF   ACCaHI ;
04B1 0859          01741           MOVF    ACCeLO,0            ;
04B2 00D1          01742           MOVWF   ACCaLO ;
04B3 083C          01743           MOVF    CALTEMPH,0  ;
04B4 00D2          01744           MOVWF   ACCbHI ;
04B5 083D          01745           MOVF    CALTEMPL,0  ;
04B6 00D3          01746           MOVWF   ACCbLO ;
04B7 2636          01747           CALL    DMPY        ;Result in ACCbACCc
                   01748                               ;Needs to be divided by 65536 therefore use only the upper two bytes (ACCb)
                   01749                               ;DADD inputs in ACCa and ACCb. Result in ACCb
04B8 1683          01750           BSF     STATUS,5    ;Set address register to Bank 1
04B9 0822          01751           MOVF    TREADHI,0           ;
04BA 1283          01752           BCF     STATUS,5    ;Set address register to Bank 0
04BB 00D0          01753           MOVWF   ACCaHI ;
04BC 1683          01754           BSF     STATUS,5    ;Set address register to Bank 1
04BD 0823          01755           MOVF    TREADLO,0           ;
04BE 1283          01756           BCF     STATUS,5    ;Set address register to Bank 0
04BF 00D1          01757           MOVWF   ACCaLO ;
04C0 264B          01758           CALL    DADD        ;Add temperature movement to baseline temperature (150 F)
04C1 0852          01759           MOVF    ACCbHI,0    ;Transfer result of addition to RPRESH
04C2 00C5          01760           MOVWF   RPRESH ;
04C3 0853          01761           MOVF    ACCbLO,0             ;
04C4 00C6          01762           MOVWF   RPRESL ;
                   01763
                   01764
                   01765
                   01766
04C5               01767 EXIT_DEGREES                  ;Divide temperature result by 10 for units of Degrees rather than 10 ths
                   01768                               ;Multiply by 6554 then divide by 65536
```

MPASM 01.30.01 Intermediate 2001V603.ASM 4-15-1997 10:51:29    PAGE 36

LOC  OBJECT CODE   LINE  SOURCE TEXT
     VALUE

01769                        ;the Fixed point 32/16 bit subroutine does not like numbers lower than 000
                                 6.
04C5 0845          01770          MOVF   RPRESH,0    ;Move operands for multiplication into two bytes
04C6 00D0          01771          MOVWF  ACCaHI      ;
04C7 0846          01772          MOVF   RPRESL,0    ;
04C8 00D1          01773          MOVWF  ACCaLO      ;
04C9 3019          01774          MOVLW  19h         ;Move 6554 into other two bytes
04CA 00D2          01775          MOVWF  ACCbHI      ;
04CB 309A          01776          MOVLW  9Ah         ;
04CC 00D3          01777          MOVWF  ACCbLO      ;
04CD 2636          01778          CALL   DMPY        ;
04CE 0852          01779          MOVF   ACCbHI,0    ;Transfer UPPER two bytes of result of multiplication to RPRESH
04CF 00C5          01780          MOVWF  RPRESH      ;(effectively divides by 65536 )
04D0 0853          01781          MOVF   ACCbLO,0    ;
04D1 00C6          01782          MOVWF  RPRESL      ;
04D2 0008          01783          RETURN             ;
                   01784
                   01785
                   01786 ;*******************************************************************************************
                         ******************
                   01787
                   01788                        ;COMPUTE ZERO PRESSURE, BATTERY STATE, AND TEMPERATURE-
                   01789                        ;  Compute the three voltage readings to 10 bit accuracy
                   01790                        ;  Compare the battery voltage with reference factor, and set bit if ind
                                 icator should be set
                   01791
04D3 30CF          01792 INITCALC         MOVLW  H'CF'       ;Write CAL on screen
04D4 00B1          01793          MOVWF  DISPL       ;
04D5 30AB          01794          MOVLW  H'AB'       ;
04D6 00B0          01795          MOVWF  DISPH       ;
04D7 13CC          01796          BCF    FCTN_MDE,7  ;Stop minus sign coming on
04D8 26FC          01797          CALL   DISPLAY     ;
04D9 3005          01798          MOVLW  05h         ;Half second beep
04DA 00AC          01799          MOVWF  LOOPY       ;to tell user that they are in cal mode
04DB 2619          01800 MOORON   CALL   BEEP        ;
04DC 0BAC          01801          DECFSZ LOOPY,1     ;
04DD 2CDB          01802          GOTO   MOORON      ;
                   01803
04DE 1D09          01804 MOOR     BTFSS  PORTE,2     ;Wait to see if button has been released
04DF 2CDE          01805          GOTO   MOOR        ;
                   01806
04E0 3009          01807          MOVLW  09h         ;9 Times round wait for 770 mS
04E1 00AC          01808          MOVWF  LOOPY       ;
04E2 2679          01809 INITCALC1  CALL WAIT        ;Wait for rest of a sample period- total 1 second per reading
04E3 0BAC          01810          DECFSZ LOOPY,1     ;
04E4 2CE2          01811          GOTO   INITCALC1   ;
                   01812
04E5 2517          01813          CALL   REFERENCE   ;
04E6 251D          01814          CALL   PRESSENS    ;Read the pressure
04E7 2570          01815          CALL   TEMPSENS    ;Read the temperature
04E8 22AA          01816          CALL   SWCH_TEST   ;
                   01817
04E9 0843          01818          MOVF   VOLTH,0     ;Bring in high byte of pressure reading MPASM 01.30.01 Intermediate 2001V603.ASM   4-15-1997  10:51:29    PAGE 37

LOC  OBJECT CODE    LINE SOURCE TEXT
   VALUE

```
04EA 00BE          01819              MOVWF   ZPRESH      ;Store zero pressure reading
04EB 0844          01820              MOVF    VOLTL,0     ;Bring in the low byte
04EC 00BF          01821              MOVWF   ZPRESL      ;Store zero pressure reading
                   01822
04ED 083E          01823              MOVF    ZPRESH,0    ;Bring zero pressure high byte in
04EE 1683          01824              BSF     STATUS,5    ;Set address register to Bank 1
04EF 00CD          01825              MOVWF   SBUFF25     ;Store in Serial buffer
04F0 00AC          01826              MOVWF   PBUFF2H ;Pre load filter buffer with zero pressure value
04F1 1283          01827              BCF     STATUS,5    ;Set address register to bank 0
04F2 083F          01828              MOVF    ZPRESL,0    ;Bring zero pressure low byte in
04F3 1683          01829              BSF     STATUS,5    ;Set address register to Bank 1
04F4 00CE          01830              MOVWF   SBUFF26     ;Store in Serial buffer
04F5 00AD          01831              MOVWF   PBUFF2L ;Pre load filter buffer with zero pressure value
04F6 1283          01832              BCF     STATUS,5    ;Set address register to bank 0
                   01833
                   01834
04F7 082A          01835              MOVF    TEMPSH,0    ;Bring in the result of the temperature
04F8 00FD          01836              MOVWF   ZTEMPSH     ;Store zero temp reading
04F9 082B          01837              MOVF    TEMPSL,0    ;Bring in the result of the temperature
04FA 00FE          01838              MOVWF   ZTEMPSL     ;Store zero temp reading
                   01839
04FB 087D          01840              MOVF    ZTEMPSH,0   ;Bring zero temperature high byte in
04FC 1683          01841              BSF     STATUS,5    ;Set address register to Bank 1
04FD 00CF          01842              MOVWF   SBUFF27     ;Store in Serial buffer
04FE 00B1          01843              MOVWF   TBUFF2H ;Pre load filter buffer with zero temperature value
04FF 1283          01844              BCF     STATUS,5    ;Set address register to bank 0
0500 087E          01845              MOVF    ZTEMPSL,0   ;Bring zero temperature low byte in
0501 1683          01846              BSF     STATUS,5    ;Set address register to Bank 1
0502 00D0          01847              MOVWF   SBUFF28     ;Store in Serial buffer
0503 00B2          01848              MOVWF   TBUFF2L ;Pre load filter buffer with zero temperature value
0504 1283          01849              BCF     STATUS,5    ;Set address register to bank 0
                   01850
                   01851
0505 104A          01852 CHK_BATT      BCF     BATTANN,0   ;Clear the bit in the display for the annunciator
0506 083A          01853              MOVF    CALBATTH,0  ;
0507 00D8          01854              MOVWF   ACCeHI      ;
0508 0840          01855              MOVF    CALBATTL,0  ;
0509 00D9          01856              MOVWF   ACCeLO      ;
050A 0826          01857              MOVF    BATTH,0     ;
050B 00D4          01858              MOVWF   ACCcHI      ;
050C 0827          01859              MOVF    BATTL,0     ;
050D 00D5          01860              MOVWF   ACCcLO      ;
050E 2660          01861              CALL    DSUB        ;Subtract Battery reading from Calibration value.
050F 1C03          01862              BTFSS   STATUS,0    ;Carry means positive result: Battery is reading lower than calibrated
                                    value (5.00 V)
0510 2D14          01863              GOTO    SYMBOL_OFF  ;
                   01864
0511 144A          01865 SYMBOL_ON    BSF     BATTANN,0   ;Set Battery bit for display
0512 134C          01866              BCF     FCTN_MDE,6  ;Clear initial cal routine
0513 0008          01867              RETURN              ;
                   01868
0514 104A          01869 SYMBOL_OFF   BCF     BATTANN,0   ;Clear battery bit for display
0515 134C          01870              BCF     FCTN_MDE,6  ;Clear initial cal routine
```

MPASM 01.30.01 Intermediate 2001V603.ASM    4-15-1997  10:51:29    PAGE 38

LOC  OBJECT CODE    LINE  SOURCE TEXT
VALUE

```
0516 0008           01871              RETURN    ;
                    01872
                    01873 ;**********************************************************************************
                          ******************
                    01874 ;The analog is turned on external to TVOLTSENS because each subroutine causes the integrating capacitor to
                          ramp up
                    01875 ;then ramp down. Turning off the analog during this process will cause problems.
                    01876
0517 25CA           01877 REFERENCE    CALL    ADCSETUP       ;Powers up and integrates up at the same time
0518 2679           01878              CALL    WAIT
                    01879              ;CALL   TREFSENS       ;Call trefsens twice to eliminate anomolies
0519 25C0           01880              CALL    ZERO_CAP       ;Allow integrator output to settle to ground
051A 259A           01881              CALL    TREFSENS
051B 25C0           01882              CALL    ZERO_CAP       ;Allow integrator output to settle to ground
051C 0008           01883              RETURN
                    01884
                    01885              ;READ PRESSURE SENSOR- Return value in VOLTH and VOLTL
                    01886
                    01887
051D 25F1           01888 PRESSENS     CALL    TRISAALLOUT
051E 0805           01889              MOVF    PORTA,0        ;Move port into W for modification
051F 390A           01890              ANDLW   B'00001010'    ;Leave PortA,1 & 3 alone
0520 3820           01891              IORLW   B'00100000'    ;Set outputs as needed (power on, RA 0,2,4 LOW)
0521 0085           01892              MOVWF   PORTA          ;Move the pattern back into the port
0522 25DA           01893              CALL    VREFTOGND
0523 3004           01894              MOVLW   B'00000100'    ;Set up capture mode register- capture on falling edge
0524 0097           01895              MOVWF   CCP1CON        ;Write to the control register
0525 25AA           01896              CALL    TVOLTSENS      ;Detect 50mV crossing after saturation
0526 1683           01897              BSF     STATUS,5       ;Set address register to Bank 1
0527 0805           01898              MOVF    TRISA,0        ;Move port into W for modification
0528 392A           01899              ANDLW   B'00101010'    ;Leave TRISA 1,3 & 5 alone
0529 3810           01900              IORLW   B'00010000'    ;Set tristates as needed(RA4 in) (press multiplexer)
052A 0085           01901              MOVWF   TRISA          ;Move the pattern back into the port
052B 25EC           01902              CALL    VREFHIZ
052C 1283           01903              BCF     STATUS,5       ;Set address register to bank 0
052D 0805           01904              MOVF    PORTA,0        ;Move port into W for modification
052E 393A           01905              ANDLW   B'00111010'    ;Leave PortA,5,4,3,1,& 0 alone
052F 3800           01906              IORLW   B'00000000'    ;Set outputs as needed ( RA 0 & 2 low)
0530 0085           01907              MOVWF   PORTA          ;Move the pattern back into the port
0531 3004           01908              MOVLW   B'00000100'    ;Set up capture mode register- capture on falling edge
0532 0097           01909              MOVWF   CCP1CON        ;Write to the control register
0533 25AA           01910              CALL    TVOLTSENS      ;Detect unknown voltage
0534 2600           01911              CALL    CALCV
0535 25F1           01912              CALL    TRISAALLOUT
0536 25F8           01913              CALL    RAMPUP         ;Continue to ramp up to maintain a consistent time for display bli
                          nking
0537 25E3           01914              CALL    VREFUP
0538 25AA           01915              CALL    TVOLTSENS      ;
0539 25C0           01916              CALL    ZERO_CAP                       ;Allow integrator output to settle to ground
053A 0855           01917              MOVF    ACCcLO,0       ;Bring resulting low byte in
053B 00C4           01918              MOVWF   VOLTL          ;Store in result register
053C 1683           01919              BSF     STATUS,5       ;Set address register to Bank 1
053D 00B5           01920              MOVWF   SBUFF2         ;Store in Serial buffer
```

MPASM 01.30.01 Intermediate  2001V603.ASM   4-15-1997  10:51:29      PAGE 39

```
LOC  OBJECT CODE    LINE  SOURCE TEXT
     VALUE 053E 1283           01921           BCF     STATUS,5    ;Set address register to bank 0
053F 0854           01922           MOVF    ACCcHI,0    ;Bring resulting high byte in
0540 00C3           01923           MOVWF   VOLTH       ;Store in result register
0541 1683           01924           BSF     STATUS,5    ;Set address register to Bank 1
0542 00B4           01925           MOVWF   SBUFF1      ;Store in Serial buffer
0543 1283           01926           BCF     STATUS,5    ;Set address register to bank 0
                    01927           ;BCF    PORTA,5     ;Turn off analog
0544 1185           01928           BCF     PORTA,3     ;Turn off integrating line
0545 0008           01929           RETURN
                    01930                               ;READ BATTERY VOLTAGE- Return reading in BATTL and BATTH
                    01931
0546                01932 BATTSENS          ;CALL   TREFSENS
                    01933           ;CALL   ZERO_CAP    ;Allow integrator output to settle to ground
0546 25F1           01934           CALL    TRISAALLOUT
0547 0805           01935           MOVF    PORTA,0 ;Move port into W for modification
0548 390A           01936           ANDLW   B'00001010'     ;Leave PortA,1 & 3 alone
0549 3820           01937           IORLW   B'00100000'     ;Set outputs as needed (power on, RA 0,2,4 LOW)
054A 0085           01938           MOVWF   PORTA   ;Move the pattern back into the port
054B 25DA           01939           CALL    VREFTOGND
054C 3004           01940           MOVLW   B'00000100' ;Set up capture mode register- capture on falling edge
054D 0097           01941           MOVWF   CCP1CON     ;Write to the control register
054E 25AA           01942           CALL    TVOLTSENS   ;Detect 50mV crossing after saturation
054F 1683           01943           BSF     STATUS,5    ;Set address register to Bank 1
0550 0805           01944           MOVF    TRISA,0 ;Move port into W for modification
0551 392A           01945           ANDLW   B'00101010'     ;Leave TRISA 1,3 & 5 alone
0552 3801           01946           IORLW   B'00000001'     ;Set tristates as needed (RA0 in) (batt multiplexer)
0553 0085           01947           MOVWF   TRISA   ;Move the pattern back into the port
0554 25EC           01948           CALL    VREFHIZ
0555 1283           01949           BCF     STATUS,5    ;Set address register to bank 0
0556 0805           01950           MOVF    PORTA,0 ;Move port into W for modification
0557 392B           01951           ANDLW   B'00101011'     ;Leave PortA,5,3,1,& 0 alone
0558 3800           01952           IORLW   B'00000000'     ;Set outputs as needed ( RA 2 & 4 low)
0559 0085           01953           MOVWF   PORTA   ;Move the pattern back into the port
055A 3004           01954           MOVLW   B'00000100' ;Set up capture mode register- capture on falling edge
055B 0097           01955           MOVWF   CCP1CON     ;Write to the control register
055C 25AA           01956           CALL    TVOLTSENS   ;Detect unknown voltage
055D 2600           01957           CALL    CALCV
055E 25F1           01958           CALL    TRISAALLOUT
055F 25F8           01959           CALL    RAMPUP  ;Continue to ramp up to maintain a consistent time for display blinking
0560 25E3           01960           CALL    VREFUP
0561 25AA           01961           CALL    TVOLTSENS   ;
0562 25C0           01962           CALL    ZERO_CAP    ;Allow integrator output to settle to ground
0563 0855           01963           MOVF    ACCcLO,0    ;Bring resulting low byte in
0564 00A7           01964           MOVWF   BATTL       ;Store in result register
0565 1683           01965           BSF     STATUS,5    ;Set address register to Bank 1
0566 00B7           01966           MOVWF   SBUFF4      ;Store in Serial buffer
0567 1283           01967           BCF     STATUS,5    ;Set address register to bank 0
0568 0854           01968           MOVF    ACCcHI,0    ;Bring resulting high byte in
0569 00A6           01969           MOVWF   BATTH       ;Store in result register
056A 1683           01970           BSF     STATUS,5    ;Set address register to Bank 1
056B 00B6           01971           MOVWF   SBUFF3      ;Store in Serial buffer
056C 1283           01972           BCF     STATUS,5    ;Set address register to bank 0
056D 1285           01973           BCF     PORTA,5     ;Turn off analog
```

MPASM 01.30.01 Intermediate  2001V603.ASM   4-15-1997  10:51:29        PAGE 40

```
LOC  OBJECT CODE    LINE  SOURCE TEXT
     VALUE 056E 1185           01974           BCF     PORTA,3   ;Turn off integrating line
056F 0008           01975           RETURN            ;Return
                    01976
                    01977                             ;READ TEMPERATURE SENSOR- Return reading in TEMPSH & TEMPSL
0570                01978 TEMPSENS  ;CALL   TREFSENS
                    01979           ;CALL  ZERO_CAP   ;Allow integrator output to settle to ground
0570 25F1           01980           CALL    TRISAALLOUT
0571 0805           01981           MOVF    PORTA,0   ;Move port into W for modification
0572 390A           01982           ANDLW   B'00001010'   ;Leave PortA,1 & 3 alone
0573 3820           01983           IORLW   B'00100000'   ;Set outputs as needed (power on, RA 0,2,4 LOW)
0574 0085           01984           MOVWF   PORTA     ;Move the pattern back into the port
0575 25DA           01985           CALL    VREFTOGND
0576 3004           01986           MOVLW   B'00000100'  ;Set up capture mode register- capture on falling edge
0577 0097           01987           MOVWF   CCP1CON   ;Write to the control register
0578 25AA           01988           CALL    TVOLTSENS ;Detect 50mV crossing after saturation
0579 1683           01989           BSF     STATUS,5  ;Set address register to Bank 1
057A 0805           01990           MOVF    TRISA,0   ;Move port into W for modification
057B 392A           01991           ANDLW   B'00101010'   ;Leave TRISA 1,3 & 5 alone
057C 3804           01992           IORLW   B'00000100'   ;Set tristates as needed (RA2 in) (temp multiplexer)
057D 0085           01993           MOVWF   TRISA     ;Move the pattern back into the port
057E 25EC           01994           CALL    VREFHIZ
057F 1283           01995           BCF     STATUS,5  ;Set address register to bank 0
0580 0805           01996           MOVF    PORTA,0   ;Move port into W for modification
0581 392E           01997           ANDLW   B'00101110'   ;Leave PortA,5,3,2 & 1 alone
0582 3800           01998           IORLW   B'00000000'   ;Set outputs as needed ( RA 0 & 4 low)
0583 0085           01999           MOVWF   PORTA     ;Move the pattern back into the port
0584 3004           02000           MOVLW   B'00000100'  ;Set up capture mode register- capture on falling edge
0585 0097           02001           MOVWF   CCP1CON   ;Write to the control register
0586 25AA           02002           CALL    TVOLTSENS ;Detect unknown voltage
0587 2600           02003           CALL    CALCV
0588 25F1           02004           CALL    TRISAALLOUT
0589 25F8           02005           CALL    RAMPUP    ;Continue to ramp up to maintain a consistent time for display blinking
058A 25E3           02006           CALL    VREFUP
058B 25AA           02007           CALL    TVOLTSENS ;
058C 25C0           02008           CALL    ZERO_CAP  ;Allow integrator output to settle to ground
058D 0855           02009           MOVF    ACCcLO,0  ;Bring resulting low byte in
058E 1683           02010           BSF     STATUS,5  ;Set address register to Bank 1
058F 00B9           02011           MOVWF   SBUFF6    ;Store in Serial buffer
0590 1283           02012           BCF     STATUS,5  ;Set address register to bank 0
0591 00AB           02013           MOVWF   TEMPSL    ;Store in result register
0592 0854           02014           MOVF    ACCcHI,0  ;Bring resulting high byte in
0593 00AA           02015           MOVWF   TEMPSH    ;Store in result register
0594 1683           02016           BSF     STATUS,5  ;Set address register to Bank 1
0595 00B8           02017           MOVWF   SBUFF5    ;Store in Serial buffer
0596 1283           02018           BCF     STATUS,5  ;Set address register to bank 0
0597 1285           02019           BCF     PORTA,5   ;Turn off analog
0598 1185           02020           BCF     PORTA,3   ;Turn off integrating line
0599 0008           02021           RETURN            ;Return
                    02022
                    02023
                    02024                             ;READ THE TIME FOR REFERENCE VOLTAGE - Return reading in TREFH & TREFL
059A 25F1           02025 TREFSENS          CALL    TRISAALLOUT
059B 0805           02026           MOVF    PORTA,0   ;Move port into W for modification
```

MPASM 01.30.01 Intermediate 2001V603.ASM   4-15-1997  10:51:29      PAGE 41

LOC  OBJECT CODE    LINE  SOURCE TEXT
     VALUE

```
059C 390A          02027                  ANDLW   B'00001010'   ;Leave PortA,1 & 3 alone
059D 3820          02028                  IORLW   B'00100000'   ;Set outputs as needed (RA5 HI all others low)(power on all multip
              lex lines low)
059E 0085          02029                  MOVWF   PORTA   ;Move the pattern back into the port
059F 25DA          02030                  CALL    VREFTOGND
05A0 3004          02031                  MOVLW   B'00000100'  ;Set up capture mode register- capture on falling edge
05A1 0097          02032                  MOVWF   CCP1CON    ;Write to the control register
05A2 25AA          02033                  CALL    TVOLTSENS   ;Detect 50mV crossing after saturation
05A3 25E3          02034                  CALL    VREFUP
05A4 25AA          02035                  CALL    TVOLTSENS   ;Detect Vref crossing
05A5 0815          02036                  MOVF    CCPR1L,0    ;Bring resulting low byte in
05A6 00A9          02037                  MOVWF   TREFL   ;Store in result register
05A7 0816          02038                  MOVF    CCPR1H,0    ;Bring resulting high byte in
05A8 00A8          02039                  MOVWF   TREFH   ;Store in result register
05A9 0008          02040                  RETURN             ;Return
                   02041
                   02042                          ;INITIATE THE TIMER AND WAIT FOR INTERUPT - returned values in CCPR1H & L
05AA 1683          02043 TVOLTSENS        BSF     STATUS,5   ;Set address register to Bank 1
05AB 110C          02044                  BCF     PIE1,2  ;Disable interupt enable for CCP1: Just looking at the request bit.(PIR1,2
              )
05AC 1283          02045                  BCF     STATUS,5   ;Set address register to bank 0
05AD 018E          02046                  CLRF    TMR1L   ;Clear low byte of timer
05AE 018F          02047                  CLRF    TMR1H   ;Clear high byte of timer
05AF 110C          02048                  BCF     PIR1,2   ;Clear the capture bit
05B0 100C          02049                  BCF     PIR1,0   ;Clear the timer overflow bit
05B1 3001          02050                  MOVLW   B'00000001'  ;Timer on internal clock, no prescale, start timer
05B2 0090          02051                  MOVWF   T1CON   ;
                   02052                          ;Start integration up by bringing capacitor line low
05B3 0805          02053                  MOVF    PORTA,0 ;Move port into W for modification
05B4 39F7          02054                  ANDLW   B'11110111'    ;Leave PortA,0,1,2,4,5,6, & 7 alone
05B5 3800          02055                  IORLW   B'00000000'    ;Set outputs as needed (RA3 low) (Integrate up)
05B6 0085          02056                  MOVWF   PORTA   ;Move the pattern back into the port
05B7 180C          02057 TVOLT1           BTFSC   PIR1,0   ;Make sure that the timer hasn't overrun
05B8 2DBB          02058                  GOTO    TVOLT2   ;Skip around and exit if so- capture values will be zero
                   02059
05B9 1D0C          02060                  BTFSS   PIR1,2   ;Wait until capture occurs testing interrupt bit
05BA 2DB7          02061                  GOTO    TVOLT1  ;
                   02062
05BB 110C          02063 TVOLT2           BCF     PIR1,2   ;Clear the capture bit
05BC 100C          02064                  BCF     PIR1,0   ;Clear the timer bit
05BD 3000          02065                  MOVLW   B'00000000'    ;Stop timer
05BE 0090          02066                  MOVWF   T1CON
05BF 0008          02067                  RETURN             ;Return
                   02068
                   02069
                   02070                          ;ZERO_CAP Garantees that the integrator output is at zero volts
05C0 1683          02071 ZERO_CAP         BSF     STATUS,5   ;Set address register to Bank 1
05C1 0185          02072                  CLRF    TRISA   ;TRISA to all outputs
05C2 1283          02073                  BCF     STATUS,5   ;Set address register to bank 0
05C3 0805          02074                  MOVF    PORTA,0 ;Move port into W for modification
05C4 3902          02075                  ANDLW   B'00000010'   ;Leave PortA,1 alone
05C5 3828          02076                  IORLW   B'00101000'    ;Set outputs as needed (3 & 5 hi) (power on and integrate down)
05C6 0085          02077                  MOVWF   PORTA   ;Move the pattern back into the port
```

MPASM 01.30.01 Intermediate 2001V603.ASM   4-15-1997  10:51:29      PAGE 42

```
LOC  OBJECT CODE    LINE SOURCE TEXT
     VALUE

05C7 25DA           02078              CALL   VREFTOGND
05C8 2674           02079              CALL   QUICK_WAIT    ;Delay for 4 mS to let integrator settle to 0v
05C9 0008           02080              RETURN               ;Return
                    02081
                    02082
05CA                02083 ADCSETUP
05CA 1683           02084 ADCSETUP1    BSF    STATUS,5      ;Set address register to Bank 1
05CB 1089           02085              BCF    TRISE,1       ;Vref control line output
05CC 1889           02086              BTFSC  TRISE,1       ;Verify control set correctly
05CD 2DCA           02087              GOTO   ADCSETUP1     ;Do again if not
                    02088
05CE 1283           02089 ADCSETUP2    BCF    STATUS,5      ;Set address register to bank 0
05CF 1089           02090              BCF    PORTE,1       ;Vref voltage sensing line to ground
05D0 1889           02091              BTFSC  PORTE,1       ;Verify that the line is 0
05D1 2DCE           02092              GOTO   ADCSETUP2     ;Do again if not
                    02093                                   ;SETUP Port A
05D2 1683           02094              BSF    STATUS,5      ;Set address register to Bank 1
05D3 0185           02095              CLRF   TRISA         ;TRISA to all outputs
05D4 1283           02096              BCF    STATUS,5      ;Set address register to bank 0
05D5 0805           02097              MOVF   PORTA,0       ;Move port into W for modification
05D6 3902           02098              ANDLW  B'00000010'   ;Leave PortA,1 alone
05D7 3820           02099              IORLW  B'00100000'   ;Set outputs as needed (3 & 5 hi) (power on and integrate up)
05D8 0085           02100              MOVWF  PORTA         ;Move the pattern back into the port
05D9 0008           02101              RETURN               ;Return
                    02102
                    02103
05DA                02104 VREFTOGND
05DA 1683           02105 VREFS1       BSF    STATUS,5      ;Set address register to Bank 1
05DB 1089           02106              BCF    TRISE,1       ;Vref control line output
05DC 1889           02107              BTFSC  TRISE,1       ;Verify control set correctly
05DD 2DDA           02108              GOTO   VREFS1        ;Do again if not
                    02109
05DE 1283           02110 VREFS2       BCF    STATUS,5      ;Set address register to bank 0
05DF 1089           02111              BCF    PORTE,1       ;Vref voltage sensing line to ground (50mV threshold detect)
05E0 1889           02112              BTFSC  PORTE,1       ;Verify that the line is 0
05E1 2DDE           02113              GOTO   VREFS2        ;Do again if not
05E2 0008           02114              RETURN
                    02115
                    02116
05E3                02117 VREFUP
05E3 1683           02118 VREFS3       BSF    STATUS,5      ;Set address register to Bank 1
05E4 1089           02119              BCF    TRISE,1       ;Vref control line output
05E5 1889           02120              BTFSC  TRISE,1       ;Verify control set correctly
05E6 2DE3           02121              GOTO   VREFS3        ;Do again if not
                    02122
05E7 1283           02123 VREFS4       BCF    STATUS,5      ;Set address register to bank 0
05E8 1489           02124              BSF    PORTE,1       ;Vref voltage sensing line to supply
05E9 1C89           02125              BTFSS  PORTE,1       ;Verify that the line is 1
05EA 2DE7           02126              GOTO   VREFS4        ;Do again if not
05EB 0008           02127              RETURN
                    02128
                    02129
05EC 1683           02130 VREFHIZ      BSF    STATUS,5      ;Set address register to Bank 1
```

MPASM 01.30.01 Intermediate 2001V603.ASM  4-15-1997  10:51:29     PAGE 43

```
LOC  OBJECT CODE    LINE SOURCE TEXT
     VALUE

05ED 1489          02131                BSF     TRISE,1    ;Vref control line input
05EE 1C89          02132                BTFSS   TRISE,1    ;Verify control set correctly
05EF 2DEC          02133                GOTO    VREFHIZ    ;Do again if not
05F0 0008          02134                RETURN
                   02135
                   02136
05F1 1683          02137 TRISAALLOUT    BSF     STATUS,5   ;Set address register to Bank 1
05F2 0805          02138                MOVF    TRISA,0    ;Move port into W for modification
05F3 3902          02139                ANDLW   B'00000010'    ;Leave TRISA 1 alone
05F4 3800          02140                IORLW   B'00000000'    ;Set tristates as needed ALL OUT
05F5 0085          02141                MOVWF   TRISA      ;Move the pattern back into the port
05F6 1283          02142                BCF     STATUS,5   ;Set address register to bank 0
05F7 0008          02143                RETURN
                   02144
                   02145
05F8 1283          02146 RAMPUP         BCF     STATUS,5   ;Set address register to bank 0
05F9 0805          02147                MOVF    PORTA,0    ;Move port into W for modification
05FA 392A          02148                ANDLW   B'00101010'    ;Leave PortA,5,3,1 alone
05FB 3800          02149                IORLW   B'00000000'    ;Set outputs as needed (RA 0, 2 & 4 low)
05FC 0085          02150                MOVWF   PORTA      ;Move the pattern back into the port
05FD 3004          02151                MOVLW   B'00000100'    ;Set up capture mode register- capture on falling edge
05FE 0097          02152                MOVWF   CCP1CON    ;Write to the control register
05FF 0008          02153                RETURN
                   02154
                   02155 ;*********************************************************************************
                         *****************
                   02156 ;The ADC reading is calcullated as follows: (tVin * 25000)/tVref
                   02157 ;The resulting time is directly proportional to the input voltage in approximately 100uV steps
                   02158
0600               02159 CALCV
0600 0815          02160                MOVF    CCPR1L,0   ;tVin is the time for the capacitor to integrate up to the input
0601 00D1          02161                MOVWF   ACCaLO
0602 0816          02162                MOVF    CCPR1H,0
0603 00D0          02163                MOVWF   ACCaHI
0604 3061          02164                MOVLW   H'61'      ;Move constant multiplier for multiplication
0605 00D2          02165                MOVWF   ACCbHI     ;Put it into acc B
0606 30A8          02166                MOVLW   H'A8'      ;Move constant multiplier for multiplication
0607 00D3          02167                MOVWF   ACCbLO     ;Put it into acc B
0608 2636          02168                CALL    DMPY       ;Multiply the two
                   02169                                   ;Result is in ACCbACCc: Leave there for FXD3216U
                   02170
0609 0828          02171                MOVF    TREFH,0    ;Move tVref into registers for divide
060A 00D0          02172                MOVWF   ACCaHI
060B 0829          02173                MOVF    TREFL,0
060C 00D1          02174                MOVWF   ACCaLO
060D 158A          02175                BSF     PCLATH,3   ;Select page 1
Message[306]: Crossing page boundary -- ensure page bits are set.
060E 21DC          02176                CALL    FXD3216U   ;
060F 118A          02177                BCF     PCLATH,3   ;Reselect page 0
                   02178
0610 0008          02179                RETURN
                   02180
                   02181 ;*********************************************************************************
```

MPASM 01.30.01 Intermediate 2001V603.ASM   4-15-1997  10:51:29   PAGE 44

LOC  OBJECT CODE    LINE  SOURCE TEXT
     VALUE

```
                    02182   ******************
                    02183                                           ;SLEEP ROUTINE- Turn off everything and prepare for sleep
                    02184
0611 1283           02185 PREPSLEEP         BCF     STATUS,5       ;Set address register to bank 0
0612 0186           02186           CLRF    PORTB                  ;Clear the display pins
0613 0187           02187           CLRF    PORTC                  ;Clear the rest of the display pins
0614 0188           02188           CLRF    PORTD                  ;
0615 0185           02189           CLRF    PORTA                  ;Turn off all other pins
0616 0189           02190           CLRF    PORTE                  ;
0617 01DB           02191           CLRF    SWITCHES               ;Clear switches flag for on/off
0618 0008           02192           RETURN
                    02193
                    02194
                    02195
                    02196 ;*************************************************************************************
                          **********
                    02197
                    02198 ;*************************************************************************************
                          **********
                    02199
                    02200
                    02201                                          ;BEEP ROUTINE- beep in 10 ms intervals- number of intervals passed in
                          BEEPTIME
                    02202
0619 1683           02203 BEEP      BSF     STATUS,5               ;Address register bank 1
061A 1007           02204           BCF     TRISC,0                ;Make beeper line output
061B 1283           02205           BCF     STATUS,5               ;Address register bank 0
061C 300A           02206           MOVLW   .10                    ;Set up number of 10ms intervals desired for beeper
061D 00A5           02207           MOVWF   BEEPTIME               ;Load into the parameter
061E 3028           02208 BEEP4     MOVLW   .40                    ;Put in a constant for 10 ms
061F 00A1           02209           MOVWF   TEMP1                  ;Put into a temporary counter for the inner counter loop
0620 1407           02210 BEEP3     BSF     PORTC,0                ;Raise the beeper line
0621 3009           02211           MOVLW   .9                     ;Put constant into a register to count a time delay
0622 00A2           02212           MOVWF   TEMP2                  ;
0623 0000           02213           NOP                            ;Pad out the time
0624 0000           02214           NOP                            ;
0625 0BA2           02215 BEEP1     DECFSZ  TEMP2,1                ;Decrement the register and loop until zero
0626 2E25           02216           GOTO    BEEP1                  ;
0627 1007           02217           BCF     PORTC,0                ;Lower the beeper line
0628 3008           02218           MOVLW   .8                     ;Put constant into a register to count a time delay
0629 00A2           02219           MOVWF   TEMP2                  ;
062A 0000           02220           NOP                            ;Pad out the time
062B 0000           02221           NOP                            ;
062C 0BA2           02222 BEEP2     DECFSZ  TEMP2,1                ;Decrement the register and loop until zero
062D 2E2C           02223           GOTO    BEEP2                  ;
062E 0BA1           02224           DECFSZ  TEMP1,1                ;Decrement the inner counter loop
062F 2E20           02225           GOTO    BEEP3                  ;
0630 0BA5           02226           DECFSZ  BEEPTIME,1             ;Decrement the counter of 10 ms intervals
0631 2E1E           02227           GOTO    BEEP4                  ;Outer loop until total time has passed
0632 1683           02228           BSF     STATUS,5               ;Address register bank 1
0633 1407           02229           BSF     TRISC,0                ;Make beeper line input
0634 1283           02230           BCF     STATUS,5               ;Address register bank 0
```

MPASM 01.30.01 Intermediate 2001V603.ASM 4-15-1997 10:51:29    PAGE 45

```
LOC  OBJECT CODE   LINE  SOURCE TEXT
     VALUE 0635 0008          02231          RETURN              ;Return
                   02232
                   02233
                   02234 ;*********************************************************************************
                         **********
                   02235
                   02236
                   02237                               ;UNSIGNED DOUBLE PRECISION MULTIPLY
                   02238                               ;  Load 1st operand in location ACCaLO and HI
                   02239                               ;  Load 2nd operand in location ACCbLO and HI
                   02240                               ;The 32 bit result is in locations: High word in ACCbHI, ACCbLO, Low w
                         ord in ACCcHI, ACCcLO
                   02241
0636 2642          02242 DMPY      CALL    SETUP       ;Call routine to set up for math
0637 0CD6          02243 MLOOP     RRF     ACCdHI,1    ;Rotate d right
0638 0CD7          02244           RRF     ACCdLO,1    ;
0639 1803          02245           BTFSC   STATUS,0    ;Test carry
063A 264B          02246           CALL    DADD        ;Call double precsion add
063B 0CD2          02247           RRF     ACCbHI,1    ;Rotate b right
063C 0CD3          02248           RRF     ACCbLO,1    ;Rotate b right
063D 0CD4          02249           RRF     ACCcHI,1    ;Rotate c right
063E 0CD5          02250           RRF     ACCcLO,1    ;Rotate c right
063F 0BDA          02251           DECFSZ  MTEMP,1     ;Loop until all bits are checked
0640 2E37          02252           GOTO    MLOOP       ;
0641 3400          02253           RETLW   0           ;Return
                   02254
0642 3010          02255 SETUP     MOVLW   .16         ;Put number of loops into loop variable
0643 00DA          02256           MOVWF   MTEMP       ;
0644 0852          02257           MOVF    ACCbHI,0    ;Copy ACCb to ACCd
0645 00D6          02258           MOVWF   ACCdHI      ;
0646 0853          02259           MOVF    ACCbLO,0    ;
0647 00D7          02260           MOVWF   ACCdLO      ;
0648 01D2          02261           CLRF    ACCbHI      ;
0649 01D3          02262           CLRF    ACCbLO      ;
064A 3400          02263           RETLW   0           ;Return
                   02264
                   02265                               ;Double precision addition ACCb + ACCa -> ACCb
064B 0851          02266 DADD      MOVF    ACCaLO,0    ;Add low byte
064C 07D3          02267           ADDWF   ACCbLO,1    ;
064D 1803          02268           BTFSC   STATUS,0    ;Add in carry
064E 0AD2          02269           INCF    ACCbHI,1    ;
064F 0850          02270           MOVF    ACCaHI,0    ;Add high byte
0650 07D2          02271           ADDWF   ACCbHI,1    ;
0651 3400          02272           RETLW   0           ;
                   02273
                   02274                               ;ONE BYTE MULTIPLY 8 x 8 with 2 byte result
                   02275                               ;Enter ACCaLO and ACCbLO, result in ACCcHI and ACCcLO
                   02276
0652 01D4          02277 MPY       CLRF    ACCcHI      ;Clear the result register
0653 01D5          02278           CLRF    ACCcLO      ;
0654 3008          02279           MOVLW   .8          ;Put 8 into counter
0655 00AD          02280           MOVWF   COUNT       ;
0656 0851          02281           MOVF    ACCaLO,0    ;Bring in one of the numbers
```

MPASM 01.30.01 Intermediate 2001V603.ASM   4-15-1997  10:51:29     PAGE 46

```
LOC  OBJECT CODE    LINE SOURCE TEXT
     VALUE 0657 1003           02282              BCF     STATUS,0    ;Clear carry
0658 0CD3           02283 MPYLOOP      RRF     ACCbLO,1    ;Rotate the other number
0659 1803           02284              BTFSC   STATUS,0    ;Test carry
065A 07D4           02285              ADDWF   ACCcHI,1    ;Add the number to the high byte of the result
065B 0CD4           02286              RRF     ACCcHI,1    ;Rotate high byte right
065C 0CD5           02287              RRF     ACCcLO,1    ;Rotate low byte right
065D 0BAD           02288              DECFSZ  COUNT,1     ;Test for end of operation
065E 2E58           02289              GOTO    MPYLOOP     ;Loop
065F 3400           02290              RETLW   0           ;Return
                    02291
                    02292
                    02293                                  ;DOUBLE PRECSION SUBTRACTION  (ACCe - ACCc -> ACCe)
                    02294                                  ;   Load 1st operand in location ACCeLO and HI
                    02295                                  ;   Load 2nd operand in location ACCcLO and HI
                    02296                                  ;The result is in location ACCeLO and HI
                    02297
0660 09D5           02298 DSUB         COMF    ACCcLO,1    ;Negate data to subtract
0661 0AD5           02299              INCF    ACCcLO,1    ;Increment the low byte
0662 1903           02300              BTFSC   STATUS,2    ;Check for zero
0663 03D4           02301              DECF    ACCcHI,1    ;Decrement the low byte
0664 09D4           02302              COMF    ACCcHI,1    ;Complement the high byte
0665 0855           02303              MOVF    ACCcLO,0    ;Bring in low byte of negated data
0666 07D9           02304              ADDWF   ACCeLO,1    ;Add the low bytes
0667 1803           02305              BTFSC   STATUS,0    ;Check carry
0668 0AD8           02306              INCF    ACCeHI,1    ;If carry on low byte, increment high byte
0669 0854           02307              MOVF    ACCcHI,0    ;Bring in high byte of negated data
066A 07D8           02308              ADDWF   ACCeHI,1    ;Add high bytes
066B 3400           02309              RETLW   0           ;Return
                    02310
                    02311
                    02312
                    02313                                  ;QUAD PRECISION ROTATE RIGHT
                    02314                                  ;  Number of places to rotate is passed in TEMP2
                    02315                                  ;  Four bytes to rotate is output of DMPY- High word in ACCbHI, ACCbLO, Low wo
                          rd in ACCcHI, ACCcLO
                    02316                                  ;  Result will be in the two lower bytes- ACCcHI, ACCcLO
                    02317
066C 1003           02318 QRR          BCF     STATUS,0    ;Clear the carry bit
066D 0CD2           02319              RRF     ACCbHI,1    ;Rotate highest byte right
066E 0CD3           02320              RRF     ACCbLO,1    ;Rotate next byte
066F 0CD4           02321              RRF     ACCcHI,1    ;
0670 0CD5           02322              RRF     ACCcLO,1    ;Rotate last byte
0671 0BA2           02323              DECFSZ  TEMP2,1     ;Loop until all bits are checked
0672 2E6C           02324              GOTO    QRR         ;
0673 3400           02325              RETLW   0           ;Return
                    02326
                    02327
                    02328 ;********************************************************************************
                          **********
                    02329
                    02330
                    02331
                    02332                                  ;WAIT ROUTINES
```

MPASM 01.30.01 Intermediate 2001V603.ASM   4-15-1997  10:51:29        PAGE 47

LOC  OBJECT CODE     LINE SOURCE TEXT
     VALUE

```
                02333 ;SW_WAIT Set up for the Average switch. When the buzzer sounds it takes some time time for the ringing to
                      die down.
                02334 ;While this ringing is present the switch input appears, to the processor, to be activated. A delay enable
                      s the ringing
                02335 ;to die down to acceptable levels before reading the switch
                02336
                02337                                        ; 8.2 ms  = < ( (1+1+2)* 256) + ( ((1+1+2)* 256) + (1+2) )* 01 ) > * 4
                      uS
0674 30FF       02338 QUICK_WAIT   MOVLW   0FFh       ;Put a constant into W
0675 00A3       02339              MOVWF   WAITCNTR   ;Put into a counter
0676 3001       02340              MOVLW   01h        ;Put a constant into W
0677 00A4       02341              MOVWF   EWAITCNTR  ;Put into a counter
0678 2E7D       02342              GOTO    WAIT1
0679            02343 SW_WAIT
                      * 4 uS                          ; 85.616 ms  = < ( (1+1+2)* 216) + ( ((1+1+2)* 256) + (1+2) )* 20 ) >
0679 30D8       02344 WAIT         MOVLW   0D8h       ;Put a constant into W
067A 00A3       02345              MOVWF   WAITCNTR   ;Put into a counter
067B 3014       02346              MOVLW   014h       ;Put a constant into W
067C 00A4       02347              MOVWF   EWAITCNTR  ;Put into a counter
067D 0000       02348 WAIT1        NOP                ;Put in extra delay
067E 0BA3       02349              DECFSZ  WAITCNTR,1 ;Decrement and test to see if the counter has gone to zero
067F 2E7D       02350              GOTO    WAIT1      ;Loop if so, otherwise, go on
0680 0BA4       02351              DECFSZ  EWAITCNTR,1;Decrement and test to see if the counter has gone to zero
0681 2E7D       02352              GOTO    WAIT1      ;Loop if so, otherwise, go on
0682 0008       02353              RETURN             ;Return
                02354
                02355 ;********************************************************************************************************
                      **********
                02356 ;********************************************************************************************************
                      **********
                02357
                02358
07DF            02359              ORG     H'07DF'    ;Places table at bottom of Page0
                02360
07DF 0782       02361 DISPTABLE    ADDWF   PCL,1      ;Go to the set of table entries pointed to for the high digit plus the
                      decimal
07E0 3414       02362              RETLW   B'00010100' ;State 0&1, for 0
07E1 34EB       02363              RETLW   B'11101011' ;State 2&3
                02364
07E2 3477       02365              RETLW   B'01110111' ;State 0&1, for 1
07E3 3488       02366              RETLW   B'10001000' ;State 2&3
                02367
07E4 3438       02368              RETLW   B'00111000' ;State 0&1, for 2
07E5 34C7       02369              RETLW   B'11000111' ;State 2&3
                02370
07E6 3432       02371              RETLW   B'00110010' ;State 0&1, for 3
07E7 34CD       02372              RETLW   B'11001101' ;State 2&3
                02373
07E8 3453       02374              RETLW   B'01010011' ;State 0&1, for 4
07E9 34AC       02375              RETLW   B'10101100' ;State 2&3
                02376
07EA 3492       02377              RETLW   B'10010010' ;State 0&1, for 5
07EB 346D       02378              RETLW   B'01101101' ;State 2&3
```

MPASM 01.30.01 Intermediate 2001V603.ASM 4-15-1997 10:51:29     PAGE 48

LOC  OBJECT CODE   LINE SOURCE TEXT
     VALUE 02379
07EC 3490          02380          RETLW   B'10010000'  ;State 0&1, for 6
07ED 346F          02381          RETLW   B'01101111'  ;State 2&3
                   02382
07EE 3437          02383          RETLW   B'00110111'  ;State 0&1, for 7
07EF 34C8          02384          RETLW   B'11001000'  ;State 2&3
                   02385
07F0 3410          02386          RETLW   B'00010000'  ;State 0&1, for 8
07F1 34EF          02387          RETLW   B'11101111'  ;State 2
                   02388
07F2 3413          02389          RETLW   B'00010011'  ;State 0&1, for 9
07F3 34EC          02390          RETLW   B'11101100'  ;State 2&3
                   02391
07F4 349C          02392          RETLW   B'10011100'  ;State 0&1, for C
07F5 3463          02393          RETLW   B'01100011'  ;State 2&3
                   02394
07F6 3411          02395          RETLW   B'00010001'  ;State 0&1, for A
07F7 34EE          02396          RETLW   B'11101110'  ;State 2&3
                   02397
07F8 34CC          02398          RETLW   B'11001100'  ;State 0&1, for L
07F9 3423          02399          RETLW   B'00100011'  ;State 2&3
                   02400
07FA 3451          02401          RETLW   B'01010001'  ;State 0&1, for H
07FB 34AE          02402          RETLW   B'10101110'  ;State 2&3
                   02403
07FC 34FF          02404          RETLW   B'11111111'  ;State 0&1, for Blank
07FD 3400          02405          RETLW   B'00000000'  ;State 2&3
                   02406
07FE 34FF          02407          RETLW   B'11111111'  ;State 0&1, for Blank
07FF 3400          02408          RETLW   B'00000000'  ;State 2&3
                   02409
                   02410
                   02411
                   02412 ;************************************************************************************
                   **********
                   02413
                   02414
                   02415                  ;LOOKUP TABLES FOR DISPLAY
                   02416
                   02417                  ;PUT A NEW VALUE IN DISPLAY- compute display bits from corrected pressure- val
                   ues stored in DISPH & DISPL
                   02418                  ;Update the four nibbles for the four digits and look up the bit patterns and
                        the battery indicator           ;Put the bit patterns into DISPSTOB & DISPST
                   02419                  ;Units digit is wired to RB0-RB3
                   02420                  ;Tens digit is wired to RB4-RB7
                   02421                  ;Hundreds digit is wired to RC4-RC7
                   02422                  ;Thousands digit is wired to RD4-RD7
                   02423                  ;Extra symbols are wired to RD0-RD3 & RE0
                   02424
                   02425          ;Adding extra lines of code: modify the ORG statement to accomodate
                   02426
                   02427 ;************************************************************************************
                   **********

MPASM 01.30.01 Intermediate 2001V603.ASM   4-15-1997  10:51:29      PAGE 49

LOC  OBJECT CODE    LINE SOURCE TEXT
     VALUE 02428
                    02429
                    02430
                    02431
06FC                02432           ORG    H'06FC'          ;Put in the upper K of code space just above Display table
                    02433
06FC 01E0           02434 DISPLAY   CLRF   DISPST0B         ;Clear the display bit pattern bytes
06FD 01E1           02435           CLRF   DISPST0C         ;
06FE 01EB           02436           CLRF   DISPST0D
06FF 01CD           02437           CLRF   DISPST0E
0700 01E2           02438           CLRF   DISPST1B         ;
0701 01E3           02439           CLRF   DISPST1C         ;
0702 01EC           02440           CLRF   DISPST1D
0703 01CE           02441           CLRF   DISPST1E
0704 01E4           02442           CLRF   DISPST2B         ;
0705 01E5           02443           CLRF   DISPST2C         ;
0706 01ED           02444           CLRF   DISPST2D
0707 01CF           02445           CLRF   DISPST2E
0708 01E6           02446           CLRF   DISPST3B         ;
0709 01E7           02447           CLRF   DISPST3C         ;
070A 01EE           02448           CLRF   DISPST3D
070B 01EF           02449           CLRF   DISPST3E
                    02450
070C 3007           02451           MOVLW  H'07'            ;Make high byte of program counter point to this page for these tables
070D 008A           02452           MOVWF  PCLATH           ;
                    02453
                    02454 ;Units
070E 0831           02455           MOVF   DISPL,0          ;Bring in the low byte
070F 390F           02456           ANDLW  B'00001111'      ;Mask off the high nibble
0710 00A2           02457           MOVWF  TEMP2            ;Put into a temporary register
0711 1003           02458           BCF    STATUS,0         ;Clear the carry
0712 0D22           02459           RLF    TEMP2,0          ;Rotate left 1 time to get reference in increments of 2
0713 00A2           02460           MOVWF  TEMP2            ;Put into a temporary register
0714 27DF           02461           CALL   DISPTABLE        ;Call the table
0715 39F0           02462           ANDLW  B'11110000'      ;Mask off lower nibble leaving state0 pattern in w
0716 04E0           02463           IORWF  DISPST0B,1       ;Set the returned bits in the display register (state 0)
0717 0EE0           02464           SWAPF  DISPST0B,1       ;Swapping the nibbles places the state 0 nibble correctly
0718 0822           02465           MOVF   TEMP2,0          ;
0719 27DF           02466           CALL   DISPTABLE        ;Call the table
071A 390F           02467           ANDLW  B'00001111'      ;Mask off upper nibble leaving state1 pattern in w
071B 04E2           02468           IORWF  DISPST1B,1       ;Set the masked bits in the display reg (state 1)
071C 0AA2           02469           INCF   TEMP2,1          ;Increment the pointer
071D 0822           02470           MOVF   TEMP2,0          ;Bring into W
071E 27DF           02471           CALL   DISPTABLE        ;
071F 39F0           02472           ANDLW  B'11110000'      ;Mask off lower nibble leaving upper in w
0720 04E4           02473           IORWF  DISPST2B,1       ;Set the returned bits in the display register (state 2)
0721 0EE4           02474           SWAPF  DISPST2B,1       ;Swapping the nibbles places the state 2 nibble correctly
0722 0822           02475           MOVF   TEMP2,0          ;
0723 27DF           02476           CALL   DISPTABLE        ;
0724 390F           02477           ANDLW  B'00001111'      ;Mask off upper nibble leaving lower in W
0725 04E6           02478           IORWF  DISPST3B,1       ;Set the masked bits in the display reg (state 3)
                    02479 ;Tens
0726 0831           02480           MOVF   DISPL,0          ;Bring in the low byte

LOC  OBJECT CODE   LINE  SOURCE TEXT
VALUE

```
0727 39F0         02481              ANDLW   B'11110000'  ;Mask off the high nibble
0728 00A2         02482              MOVWF   TEMP2        ;Put into a temporary register
0729 0EA2         02483              SWAPF   TEMP2,1      ;Swap the two nibbles to get the correct offset
072A 1003         02484              BCF     STATUS,0     ;Clear the carry
072B 0D22         02485              RLF     TEMP2,0      ;Rotate left 1 time to get reference in increments of 2
072C 00A2         02486              MOVWF   TEMP2        ;
072D 27DF         02487              CALL    DISPTABLE    ;Call the table
072E 39F0         02488              ANDLW   B'11110000'  ;Mask off lower nibble leaving state0 pattern in w
072F 04E0         02489              IORWF   DISPST0B,1   ;Set the returned bits in the display register (state 0)
0730 0822         02490              MOVF    TEMP2,0      ;
0731 27DF         02491              CALL    DISPTABLE    ;Call the table
0732 390F         02492              ANDLW   B'00001111'  ;Mask off upper nibble leaving state1 pattern in w
0733 00CB         02493              MOVWF   WTEMP        ;
0734 0E4B         02494              SWAPF   WTEMP,0      ;Swap nibbles to place state1 pattern in correct place
0735 04E2         02495              IORWF   DISPST1B,1   ;Set the masked bits in the display reg (state 1)
0736 0AA2         02496              INCF    TEMP2,1      ;Increment the pointer
0737 0822         02497              MOVF    TEMP2,0      ;Bring into W
0738 27DF         02498              CALL    DISPTABLE    ;
0739 39F0         02499              ANDLW   B'11110000'  ;Mask off lower nibble leaving upper in w
073A 04E4         02500              IORWF   DISPST2B,1   ;Set the returned bits in the display register (state 2)
073B 0822         02501              MOVF    TEMP2,0      ;
073C 27DF         02502              CALL    DISPTABLE    ;
073D 390F         02503              ANDLW   B'00001111'  ;Mask off upper nibble leaving lower in W
073E 00CB         02504              MOVWF   WTEMP        ;
073F 0E4B         02505              SWAPF   WTEMP,0      ;Swap nibbles to place state1 pattern in correct place
0740 04E6         02506              IORWF   DISPST3B,1   ;Set the masked bits in the display reg (state 3)
                  02507 ;Hundreds
0741 0830         02508              MOVF    DISPH,0      ;Bring in the hi byte
0742 390F         02509              ANDLW   B'00001111'  ;Mask off the low nibble
0743 00A2         02510              MOVWF   TEMP2        ;Put into a temporary register
0744 1003         02511              BCF     STATUS,0     ;Clear the carry
0745 0D22         02512              RLF     TEMP2,0      ;Rotate left 1 time to get reference in increments of 2
0746 00A2         02513              MOVWF   TEMP2        ;
0747 27DF         02514              CALL    DISPTABLE    ;Call the table
0748 39F0         02515              ANDLW   B'11110000'  ;Mask off lower nibble leaving state0 pattern in w
0749 04E1         02516              IORWF   DISPST0C,1   ;Set the returned bits in the display register (state 0)
074A 0822         02517              MOVF    TEMP2,0      ;
074B 27DF         02518              CALL    DISPTABLE    ;Call the table
074C 390F         02519              ANDLW   B'00001111'  ;Mask off upper nibble leaving state1 pattern in w
074D 00CB         02520              MOVWF   WTEMP        ;
074E 0E4B         02521              SWAPF   WTEMP,0      ;Swap nibbles to place state1 pattern in correct place
074F 04E3         02522              IORWF   DISPST1C,1   ;Set the masked bits in the display reg (state 1)
0750 0AA2         02523              INCF    TEMP2,1      ;Increment the pointer
0751 0822         02524              MOVF    TEMP2,0      ;Bring into W
0752 27DF         02525              CALL    DISPTABLE    ;
0753 39F0         02526              ANDLW   B'11110000'  ;Mask off lower nibble leaving upper in w
0754 04E5         02527              IORWF   DISPST2C,1   ;Set the returned bits in the display register (state 2)
0755 0822         02528              MOVF    TEMP2,0      ;
0756 27DF         02529              CALL    DISPTABLE    ;
0757 390F         02530              ANDLW   B'00001111'  ;Mask off upper nibble leaving lower in W
0758 00CB         02531              MOVWF   WTEMP        ;
0759 0E4B         02532              SWAPF   WTEMP,0      ;Swap nibbles to place state1 pattern in correct place
075A 04E7         02533              IORWF   DISPST3C,1   ;Set the masked bits in the display reg (state 3)
```

MPASM 01.30.01 Intermediate 2001V603.ASM   4-15-1997  10:51:29      PAGE 51

LOC  OBJECT CODE    LINE  SOURCE TEXT
     VALUE

02534 ;Thousands
075B 0830           02535        MOVF   DISPH,0     ;Bring in the hi byte
075C 39F0           02536        ANDLW  B'11110000' ;Mask off the high nibble
075D 00A2           02537        MOVWF  TEMP2       ;Put into a temporary register
075E 0EA2           02538        SWAPF  TEMP2,1     ;Swap the two nibbles to get the correct offset
075F 1003           02539        BCF    STATUS,0    ;Clear the carry
0760 0D22           02540        RLF    TEMP2,0     ;Rotate left 1 time to get reference in increments of 2
0761 00A2           02541        MOVWF  TEMP2       ;
0762 27DF           02542        CALL   DISPTABLE   ;Call the table
0763 39F0           02543        ANDLW  B'11110000' ;Mask off lower nibble leaving state0 pattern in w
0764 04EB           02544        IORWF  DISPST0D,1  ;Set the returned bits in the display register (state 0)
0765 0822           02545        MOVF   TEMP2,0     ;
0766 27DF           02546        CALL   DISPTABLE   ;Call the table
0767 390F           02547        ANDLW  B'00001111' ;Mask off upper nibble leaving state1 pattern in w
0768 00CB           02548        MOVWF  WTEMP
0769 0E4B           02549        SWAPF  WTEMP,0     ;Swap nibbles to place state1 pattern in correct place
076A 04EC           02550        IORWF  DISPST1D,1  ;Set the masked bits in the display req (state 1)
076B 0AA2           02551        INCF   TEMP2,1     ;Increment the pointer
076C 0822           02552        MOVF   TEMP2,0     ;Bring into W
076D 27DF           02553        CALL   DISPTABLE   ;
076E 39F0           02554        ANDLW  B'11110000' ;Mask off lower nibble leaving upper in w
076F 04ED           02555        IORWF  DISPST2D,1  ;Set the returned bits in the display register (state 2)
0770 0822           02556        MOVF   TEMP2,0     ;
0771 27DF           02557        CALL   DISPTABLE   ;
0772 390F           02558        ANDLW  B'00001111' ;Mask off upper nibble leaving lower in W
0773 00CB           02559        MOVWF  WTEMP       ;
0774 0E4B           02560        SWAPF  WTEMP,0     ;Swap nibbles to place state1 pattern in correct place
0775 04EE           02561        IORWF  DISPST3D,1  ;Set the masked bits in the display reg (state 3)
0776 2780           02562        CALL   BAT_SYM     ;
0777 2788           02563        CALL   PEAK_SYM    ;
0778 2794           02564        CALL   CENT_SYM    ;
0779 279C           02565        CALL   FART_SYM    ;
077A 27C0           02566        CALL   KPA_SYM     ;
077B 27CC           02567        CALL   INHG_SYM           ;
077C 27A4           02568        CALL   PSI_SYM     ;
077D 27D4           02569        CALL   AVE_SYM     ;
                    02570       ;BTFSS  SWITCHES,1  ;Do not do minus sign if in average mode
077E 27B9           02571        CALL   MINUS_SYM   ;
077F 0008           02572        RETURN
                    02573
0780 1C4A           02574 BAT_SYM    BTFSS  BATTANN,0  ;Test to see if annunciator is to be turned on. If not, get out
0781 2F85           02575        GOTO   BATT_OFF    ;
0782 146E           02576        BSF    DISPST3D,0  ;Turn the symbol off
0783 106C           02577        BCF    DISPST1D,0  ;
0784 0008           02578        RETURN             ;
0785 146C           02579 BATT_OFF   BSF    DISPST1D,0  ;Turn the symbol on
0786 106E           02580        BCF    DISPST3D,0  ;
0787 0008           02581        RETURN             ;
                    02582
0788 1D5B           02583 PEAK_SYM   BTFSS  SWITCHES,2  ;
0789 2F8F           02584        GOTO   PEAK_OFF    ;
078A 146D           02585        BSF    DISPST2D,0  ; Turns PEAK and HOLD symbols on
078B 106B           02586        BCF    DISPST0D,0  ;

MPASM 01.30.01 Intermediate 2001V603.ASM  4-15-1997  10:51:29      PAGE 52

```
LOC  OBJECT CODE    LINE  SOURCE TEXT
     VALUE 078C 10EB           02587              BCF    DISPST0D,1 ;
078D 14ED           02588              BSF    DISPST2D,1 ;
078E 0008           02589              RETURN
078F 146B           02590 PEAK_OFF     BSF    DISPST0D,0 ;
0790 106D           02591              BCF    DISPST2D,0 ;Turns PEAK and HOLD symbols off
0791 10ED           02592              BCF    DISPST2D,1 ;
0792 14EB           02593              BSF    DISPST0D,1 ;
0793 0008           02594              RETURN            ;
                    02595
0794 1D4C           02596 CENT_SYM     BTFSS  FCTN_MDE,2 ; This for CENTIGRADE
0795 2F99           02597              GOTO   CENT_OFF   ;
0796 116C           02598              BCF    DISPST1D,2 ;This turns the symbol on
0797 156E           02599              BSF    DISPST3D,2 ;
0798 0008           02600              RETURN
0799 156C           02601 CENT_OFF     BSF    DISPST1D,2 ;This turns the symbol on
079A 116E           02602              BCF    DISPST3D,2 ;
079B 0008           02603              RETURN
                    02604
079C 1DCC           02605 FART_SYM     BTFSS  FCTN_MDE,3 ; This for FARENHEIGHT
079D 2FA1           02606              GOTO   FART_OFF   ;
079E 116B           02607              BCF    DISPST0D,2 ;This turns the symbol on
079F 156D           02608              BSF    DISPST2D,2 ;
07A0 0008           02609              RETURN
07A1 156B           02610 FART_OFF     BSF    DISPST0D,2 ;This turns the symbol off
07A2 116D           02611              BCF    DISPST2D,2 ;
07A3 0008           02612              RETURN
                    02613
07A4 1C4C           02614 PSI_SYM      BTFSS  FCTN_MDE,0 ;
07A5 2FAD           02615              GOTO   PSI_OFF
07A6 1060           02616              BCF    DISPST0B,0 ;Set PSI symbol
07A7 1464           02617              BSF    DISPST2B,0 ;
                    02618
07A8 1B37           02619              BTFSC  FCTN_PH,6        ;Over 99.9?
07A9 2FB2           02620              GOTO   PSI100 ;Yes go here
07AA 1665           02621              BSF    DISPST2C,4 ;Set decimal point at digit 3
07AB 1261           02622              BCF    DISPST0C,4 ;
07AC 0008           02623              RETURN
07AD 1460           02624 PSI_OFF      BSF    DISPST0B,0 ;Clear PSI symbol
07AE 1064           02625              BCF    DISPST2B,0 ;
07AF 1265           02626              BCF    DISPST2C,4 ;Clear decimal point at digit 3
07B0 1661           02627              BSF    DISPST0C,4 ;
07B1 0008           02628              RETURN
07B2 1060           02629 PSI100       BCF    DISPST0B,0 ;Set PSI symbol
07B3 1464           02630              BSF    DISPST2B,0 ;
07B4 1265           02631              BCF    DISPST2C,4 ;Clear decimal point at digit 3
07B5 1661           02632              BSF    DISPST0C,4 ;
07B6 1664           02633              BSF    DISPST2B,4 ;Set decimal point at digit 2
07B7 1260           02634              BCF    DISPST0B,4 ;
07B8 0008           02635              RETURN
                    02636
07B9 15EB           02637 MINUS_SYM    BSF    DISPST0D,3 ;Turns off plus/minus sign
07BA 11ED           02638              BCF    DISPST2D,3
07BB 1FCC           02639              BTFSS  FCTN_MDE,7 ;Test to see if negative pressure
```

MPASM 01.30.01 Intermediate  2001V603.ASM   4-15-1997  10:51:29      PAGE 53

```
LOC  OBJECT CODE    LINE  SOURCE TEXT
     VALUE

07BC 0008           02640             RETURN
07BD 11EB           02641             BCF     DISPST0D,3  ;Turns on plus/minus sign
07BE 15ED           02642             BSF     DISPST2D,3  ;
07BF 0008           02643             RETURN              ;Return
                    02644
07C0 1CCC           02645 KPA_SYM     BTFSS   FCTN_MDE,1  ;
07C1 2FC7           02646             GOTO    KPA_OFF
07C2 104E           02647             BCF     DISPST1E,0  ;Set KPA symbol
07C3 146F           02648             BSF     DISPST3E,0  ;
07C4 1664           02649             BSF     DISPST2B,4  ;Set decimal point at digit 2
07C5 1260           02650             BCF     DISPST0B,4  ;
07C6 0008           02651             RETURN
07C7 144E           02652 KPA_OFF     BSF     DISPST1E,0  ;Clear KPA symbol
07C8 106F           02653             BCF     DISPST3E,0  ;
07C9 1264           02654             BCF     DISPST2B,4  ;Clear decimal point at digit 2
07CA 1660           02655             BSF     DISPST0B,4  ;
07CB 0008           02656             RETURN
                    02657
07CC 0000           02658 INHG_SYM    NOP                 ;Reserved space for future bit test operation (don't need
                          to mod ORG statement)
07CD 2FD1           02659             GOTO    INHG_OFF
07CE 104D           02660             BCF     DISPST0E,0  ;Set INHG symbol
07CF 144F           02661             BSF     DISPST2E,0  ;
07D0 0008           02662             RETURN
07D1 144D           02663 INHG_OFF    BSF     DISPST0E,0  ;Clear INHG symbol
07D2 104F           02664             BCF     DISPST2E,0  ;
07D3 0008           02665             RETURN
                    02666
                    02667
07D4                02668 AVE_SYM     ;BTFSS   SWITCHES,1  ;
07D4 2FDA           02669             GOTO    AVE_OFF     ;
07D5 11EC           02670             BCF     DISPST1D,3  ;Turns on : sign
07D6 15EE           02671             BSF     DISPST3D,3  ;
07D7 11EB           02672             BCF     DISPST0D,3  ;Turns on plus/minus sign
07D8 15ED           02673             BSF     DISPST2D,3  ;
07D9 0008           02674             RETURN
07DA 15EC           02675 AVE_OFF     BSF     DISPST1D,3  ;Turns off : sign
07DB 11EE           02676             BCF     DISPST3D,3  ;
07DC 15EB           02677             BSF     DISPST0D,3  ;Turns off plus/minus sign
07DD 11ED           02678             BCF     DISPST2D,3
07DE 0008           02679             RETURN              ;Return
                    02680
                    02681
                    02682 ;********************************************************************************************
                          *****************
                    02683 ;********************************************************************************************
                          *****************
                    02684 ;********************************************************************************************
                          *****************
                    02685
                    02686
                    02687
0800                02688             ORG     H'0800'     ;Start on Page 1
```

MPASM 01.30.01 Intermediate  2001V603.ASM   4-15-1997  10:51:29        PAGE 54

LOC  OBJECT CODE    LINE SOURCE TEXT
     VALUE

```
                    02689
                    02690
                    02691 ;*********************************************************************************
                          *********
                    02692
                    02693
                    02694                              ;INTERRUPT HANDLER- For display refresh
                    02695
0800                02696 INTER
                    02697
                    02698                              ;Set up the four states and the corresponding display tables
                    02699                              ;State 0 = C1 = +5V (RC1), C2 = +2.5V (RC3)
                    02700                              ;State 1 = C1 = +2.5V, C2 = 5V
                    02701                              ;State 2 = C1 = +0V, C2 = +2.5V
                    02702                              ;State 3 = C1 = +2.5V, C2 = 0V
0800 0A47           02703          INCF    DISPST,0    ;Increment the display state counter and put it into W
0801 3903           02704          ANDLW   B'00000011' ;Mask all but low bits
0802 00C7           02705          MOVWF   DISPST      ;Put back into state counter
0803 00C8           02706          MOVWF   DISPT       ;Put the state into a temporary register
0804 1903           02707          BTFSC   STATUS,2    ;Test display counter to see if state 0 is requested
0805 280D           02708          GOTO    STATE0      ;Go to appropriate routine for that state selected
0806 03C8           02709          DECF    DISPT,1     ;Decrement the tenporary display state counter
0807 1903           02710          BTFSC   STATUS,2    ;Test display counter to see if state 0 is requested
0808 2824           02711          GOTO    STATE1      ;Go to appropriate routine for that state selected
0809 03C8           02712          DECF    DISPT,1     ;Decrement the tenporary display state counter
080A 1903           02713          BTFSC   STATUS,2    ;Test display counter to see if state 0 is requested
080B 283A           02714          GOTO    STATE2      ;Go to appropriate routine for that state selected
080C 2850           02715          GOTO    STATE3      ;Go to appropriate routine for that state selected
                    02716
                    02717                              ;First update the segments, then update the com lines
080D 086B           02718 STATE0   MOVF    DISPST0D,0  ;Bring in the pattern to display the bits
080E 0088           02719          MOVWF   PORTD       ;Put out to port D
080F 084D           02720          MOVF    DISPST0E,0  ;Bring in the pattern to display the bits for port B for state 0
0810 0809           02721          MOVF    PORTE,0     ;Bring into W the present value of Port E
0811 39FE           02722          ANDLW   B'11111110' ;Zero out the low bit
0812 044D           02723          IORWF   DISPST0E,0  ;Combine with the pattern to display the bits for port E for state 0

0813 0089           02724          MOVWF   PORTE       ;Put out to port E
0814 0860           02725          MOVF    DISPST0B,0  ;Bring in the pattern to display the bits for port B for state 0
0815 0086           02726          MOVWF   PORTB       ;Put out to port B
0816 0807           02727          MOVF    PORTC,0     ;Bring into W the present value of Port C
0817 390F           02728          ANDLW   B'00001111' ;Zero out the high nibble
0818 0461           02729          IORWF   DISPST0C,0  ;Combine with the pattern to display the bits for port C for state 0 (
                          only high nibble)
0819 0087           02730          MOVWF   PORTC       ;Put out to the port C
081A 1683           02731          BSF     STATUS,5    ;Set to address register bank 1
081B 0807           02732          MOVF    TRISC,0     ;Read current state of Dir Reg into W
081C 3901           02733          ANDLW   B'00000001' ;Clear everything except C,0 Direction
081D 380C           02734          IORLW   B'00001100' ;Superimpose input output pattern for port C into W- RC3 is C2
                    02735                              ; make input to tristate to make C2 = 2.5V
081E 0087           02736          MOVWF   TRISC       ;
081F 1509           02737          BSF     TRISE,2     ;Make sure input for buttons are high
0820 1283           02738          BCF     STATUS,5    ;Set to address register bank 0
```

MPASM 01.30.01 Intermediate 2001V603.ASM    4-15-1997  10:51:29      PAGE 55

```
LOC  OBJECT CODE    LINE SOURCE TEXT
   VALUE 0821 3002           02739              MOVLW   B'00000010' ;Put mask into W
0822 0487           02740              IORWF   PORTC,1     ;Make RC1 high to make C1 = +5V
0823 2866           02741              GOTO    INTER_EXIT
                    02742
                    02743
                    02744                                  ;First update the segments, then update the com lines
0824 086C           02745 STATE1       MOVF    DISPST1D,0  ;Bring in the pattern to display the bits
0825 0088           02746              MOVWF   PORTD       ;Put out to port D
0826 0809           02747              MOVF    PORTE,0     ;Bring into W the present value of Port E
0827 39FE           02748              ANDLW   B'11111110' ;Zero out the low bit
0828 044E           02749              IORWF   DISPST1E,0  ;Combine with the pattern to display the bits for port E for state 1

0829 0089           02750              MOVWF   PORTE       ;Put out to port E
082A 0862           02751              MOVF    DISPST1B,0  ;Bring in the pattern to display the bits for port B for state 1
082B 0086           02752              MOVWF   PORTB       ;Put out to port B
082C 0807           02753              MOVF    PORTC,0     ;Bring into W the present value of Port C
082D 390F           02754              ANDLW   B'00001111' ;Zero out the high nibble
082E 0463           02755              IORWF   DISPST1C,0  ;Combine with the pattern to display the bits for port C for state 1 (
                                only high nibble)
082F 0087           02756              MOVWF   PORTC       ;Put out to the port C
0830 1683           02757              BSF     STATUS,5    ;Set to address register bank 1
0831 0807           02758              MOVF    TRISC,0 ;Read current state of Dir Reg into W
0832 3901           02759              ANDLW   B'00000001' ;Clear everything except C,0 Direction
0833 3806           02760              IORLW   B'00000110' ;Superimpose input output pattern for port C into W- RC1 is C1
                    02761                                  ;    make input to tristate to make C1 = 2.5V
0834 0087           02762              MOVWF   TRISC       ;
0835 1509           02763              BSF     TRISE,2     ;Make sure input for buttons are high
0836 1283           02764              BCF     STATUS,5    ;Set to address register bank 0
0837 3008           02765              MOVLW   B'00001000' ;Put mask into W
0838 0487           02766              IORWF   PORTC,1     ;Make RC3 high to make C2 = +5V
0839 2866           02767              GOTO    INTER_EXIT
                    02768
                    02769
                    02770                                  ;First update the segments, then update the com lines
083A 086D           02771 STATE2       MOVF    DISPST2D,0  ;Bring in the pattern to display the bits
083B 0088           02772              MOVWF   PORTD       ;Put out to port D
083C 0809           02773              MOVF    PORTE,0     ;Bring into W the present value of Port E
083D 39FE           02774              ANDLW   B'11111110' ;Zero out the low bit
083E 044F           02775              IORWF   DISPST2E,0  ;Combine with the pattern to display the bits for port E for state 2

083F 0089           02776              MOVWF   PORTE       ;Put out to port E
0840 0864           02777              MOVF    DISPST2B,0  ;Bring in the pattern to display the bits for port B for state 2
0841 0086           02778              MOVWF   PORTB       ;Put out to port B
0842 0807           02779              MOVF    PORTC,0     ;Bring into W the present value of Port C
0843 390F           02780              ANDLW   B'00001111' ;Zero out the high nibble
0844 0465           02781              IORWF   DISPST2C,0  ;Combine with the pattern to display the bits for port C for state 2
                                only high nibble)
0845 0087           02782              MOVWF   PORTC       ;Put out to the port C
0846 1683           02783              BSF     STATUS,5    ;Set to address register bank 1
0847 0807           02784              MOVF    TRISC,0 ;Read current state of Dir Reg into W
0848 3901           02785              ANDLW   B'00000001' ;Clear everything except C,0 Direction
0849 380C           02786              IORLW   B'00001100' ;Superimpose input output pattern for port C into W- RC3 is C2
                    02787                                  ;    make input to tristate to make C2 = 2.5V
```

MPASM 01.30.01 Intermediate 2001V603.ASM  4-15-1997  10:51:29      PAGE 56

```
LOC  OBJECT CODE   LINE SOURCE TEXT
     VALUE 084A 0087          02788              MOVWF   TRISC       ;
084B 1509          02789              BSF     TRISE,2     ;Make sure input for button is high
084C 1283          02790              BCF     STATUS,5    ;Set to address register bank 0
084D 30FD          02791              MOVLW   B'11111101' ;Put mask into W
084E 0587          02792              ANDWF   PORTC,1     ;Make RC1 high to make C1 = 0V
084F 2866          02793              GOTO    INTER_EXIT
                   02794
                   02795
                   02796                                  ;First update the segments, then update the com lines
0850 086E          02797 STATE3       MOVF    DISPST3D,0  ;Bring in the pattern to display the bits
0851 0088          02798              MOVWF   PORTD       ;Put out to port D
0852 0809          02799              MOVF    PORTE,0     ;Bring into W the present value of Port E
0853 39FE          02800              ANDLW   B'11111110' ;Zero out the low bit
0854 046F          02801              IORWF   DISPST3E,0  ;Combine with the pattern to display the bits for port E for state 2

0855 0089          02802              MOVWF   PORTE       ;Put out to port E
0856 0866          02803              MOVF    DISPST3B,0  ;Bring in the pattern to display the bits for port B for state 0
0857 0086          02804              MOVWF   PORTB       ;Put out to port B
0858 0807          02805              MOVF    PORTC,0     ;Bring into W the present value of Port C
0859 390F          02806              ANDLW   B'00001111' ;Zero out the high nibble
085A 0467          02807              IORWF   DISPST3C,0  ;Combine with the pattern to display the bits for port C for state 0 (
                                      only high nibble)
085B 0087          02808              MOVWF   PORTC       ;Put out to the port C
085C 1683          02809              BSF     STATUS,5    ;Set to address register bank 1
085D 0807          02810              MOVF    TRISC,0     ;Read current state of Dir Reg into W
085E 3901          02811              ANDLW   B'00000001' ;Clear everything except C,0 Direction
085F 3806          02812              IORLW   B'00000110' ;Superimpose input output pattern for port C into W- RC1 is C1
                   02813                                  ; make input to tristate to make C1 = 2.5V
0860 0087          02814              MOVWF   TRISC       ;
0861 1509          02815              BSF     TRISE,2     ;Make sure input for button is high
0862 1283          02816              BCF     STATUS,5    ;Set to address register bank 0
0863 30F7          02817              MOVLW   B'11110111' ;Put mask into W
0864 0587          02818              ANDWF   PORTC,1     ;Make RC3 high to make C2 = 0V
0865 2866          02819              GOTO    INTER_EXIT
                   02820
                   02821
0866 1283          02822 INTER_EXIT   BCF     STATUS,5    ;Address register bank 0
0867 085E          02823              MOVF    PCLATH_HOLD,0
0868 008A          02824              MOVWF   PCLATH      ;Restore PCLATH register
0869 0E7A          02825              SWAPF   STATUS_HOLD,0 ;
086A 0083          02826              MOVWF   STATUS      ;Restore status register
086B 0EC9          02827              SWAPF   WHOLD,1     ;Swap Whold
086C 0E49          02828              SWAPF   WHOLD,0     ;Swap W into W reg (no flags are affected doing it this way)
086D 0009          02829              RETFIE              ;Return
                   02830
                   02831 ;*******************************************************************************************
                         ******************
                   02832 ;RS232 Baud rate = 2400 bps
                   02833 ;RS232 Bit time  = 416 uSecs
                   02834 ;Oscillator frequency = 1 Mhz
                   02835 ;Clock frequency = 250 Khz
                   02836 ;Baud cycles = Clock F/ Baud Rate = 104.166
                   02837
```

MPASM 01.30.01 Intermediate 2001V603.ASM   4-15-1997  10:51:29     PAGE 57

```
LOC  OBJECT CODE    LINE SOURCE TEXT
     VALUE 00000007       02838 _TX       EQU     7
     00000006       02839 _RX       EQU     6
                    02840                                         ;BAUD_1 = (Baud Cycles - 6) / 3
                    02841               #define BAUD_1  .31       ;One bit time for receive @ 2400 baud
                    02842                                         ;BAUD_3 = ((Baud Cycles/2) - 6) / 3
                    02843               #define BAUD_3  .15       ;Half bit time @ 2400 baud
                    02844                                         ;BAUD_X = (Baud Cycles - 6) / 3
                    02845               #define BAUD_X  .31       ;One bit time for transmit @ 2400 baud
                    02846
                    02847 ;*********************************************************************************
                          *****************
                    02848
086E                02849 RS2320UT1
086E  1683          02850               BSF     STATUS,5   ;Set to bank 1 registers
086F  108C          02851 RS2321        BCF     PIE1,1     ;Disable Timer2 interupt (Display)
0870  188C          02852               BTFSC   PIE1,1     ;Verify interupt turned off
0871  286F          02853               GOTO    RS2321
                    02854
0872  1109          02855               BCF     TRISE,DX1  ;Serial line o/p
0873  1283          02856               BCF     STATUS,5   ;Set to address register bank 0
0874  1509          02857               BSF     PORTE,DX1  ;Set RS232 pin to high: ready for start bit which is low
0875  2125          02858               CALL    Delay1
0876  1683          02859               BSF     STATUS,5   ;Set to address register bank 1
                    02860
0877  3002          02861               MOVLW   H'02'      ;Output 02h on RS232 (start character)
0878  20C9          02862               CALL    SENDIT1
0879  0834          02863               MOVF    SBUFF1,0   ;Move display values to transmit register for use
087A  20C9          02864               CALL    SENDIT1
087B  0835          02865               MOVF    SBUFF2,0   ;Move display values to transmit register for use
087C  20C9          02866               CALL    SENDIT1
087D  0836          02867               MOVF    SBUFF3,0   ;Move display values to transmit register for use
087E  20C9          02868               CALL    SENDIT1
087F  0837          02869               MOVF    SBUFF4,0   ;Move display values to transmit register for use
0880  20C9          02870               CALL    SENDIT1
0881  0838          02871               MOVF    SBUFF5,0   ;Move display values to transmit register for use
0882  20C9          02872               CALL    SENDIT1
0883  0839          02873               MOVF    SBUFF6,0   ;Move display values to transmit register for use
0884  20C9          02874               CALL    SENDIT1
0885  083A          02875               MOVF    SBUFF7,0   ;Move display values to transmit register for use
0886  20C9          02876               CALL    SENDIT1
0887  083B          02877               MOVF    SBUFF8,0   ;Move display values to transmit register for use
0888  20C9          02878               CALL    SENDIT1
0889  083C          02879               MOVF    SBUFF9,0   ;Move display values to transmit register for use
088A  20C9          02880               CALL    SENDIT1
088B  083D          02881               MOVF    SBUFF10,0  ;Move display values to transmit register for use
088C  20C9          02882               CALL    SENDIT1
088D  083E          02883               MOVF    SBUFF11,0  ;Move display values to transmit register for use
088E  20C9          02884               CALL    SENDIT1
088F  083F          02885               MOVF    SBUFF12,0  ;Move display values to transmit register for use
0890  20C9          02886               CALL    SENDIT1
0891  0840          02887               MOVF    SBUFF13,0  ;Move display values to transmit register for use
0892  20C9          02888               CALL    SENDIT1
0893  0841          02889               MOVF    SBUFF14,0  ;Move display values to transmit register for use
```

MPASM 01.30.01 Intermediate 2001V603.ASM   4-15-1997  10:51:29    PAGE 58

LOC  OBJECT CODE    LINE SOURCE TEXT
     VALUE

```
0894 20C9          02890              CALL    SENDIT1
0895 0842          02891              MOVF    SBUFF15,0    ;Move display values to transmit register for use
0896 20C9          02892              CALL    SENDIT1
0897 0843          02893              MOVF    SBUFF16,0    ;Move display values to transmit register for use
0898 20C9          02894              CALL    SENDIT1
0899 0844          02895              MOVF    SBUFF17,0    ;Move display values to transmit register for use
089A 20C9          02896              CALL    SENDIT1
089B 0845          02897              MOVF    SBUFF18,0    ;Move display values to transmit register for use
089C 20C9          02898              CALL    SENDIT1
089D 0846          02899              MOVF    SBUFF19,0    ;Move display values to transmit register for use
089E 20C9          02900              CALL    SENDIT1
089F 0847          02901              MOVF    SBUFF20,0    ;Move display values to transmit register for use
08A0 20C9          02902              CALL    SENDIT1
08A1 0848          02903              MOVF    SBUFF21,0    ;Move display values to transmit register for use
08A2 20C9          02904              CALL    SENDIT1
08A3 084A          02905              MOVF    SBUFF22,0    ;Move display values to transmit register for use
08A4 20C9          02906              CALL    SENDIT1
08A5 084B          02907              MOVF    SBUFF23,0    ;Move display values to transmit register for use
08A6 20C9          02908              CALL    SENDIT1
08A7 084C          02909              MOVF    SBUFF24,0    ;Move display values to transmit register for use
08A8 20C9          02910              CALL    SENDIT1
08A9 084D          02911              MOVF    SBUFF25,0    ;Move display values to transmit register for use
08AA 20C9          02912              CALL    SENDIT1
08AB 084E          02913              MOVF    SBUFF26,0    ;Move display values to transmit register for use
08AC 20C9          02914              CALL    SENDIT1
08AD 084F          02915              MOVF    SBUFF27,0    ;Move display values to transmit register for use
08AE 20C9          02916              CALL    SENDIT1
08AF 0850          02917              MOVF    SBUFF28,0    ;Move display values to transmit register for use
08B0 20C9          02918              CALL    SENDIT1
08B1 0851          02919              MOVF    SBUFF29,0    ;Move display values to transmit register for use
08B2 20C9          02920              CALL    SENDIT1
08B3 0852          02921              MOVF    SBUFF30,0    ;Move display values to transmit register for use
08B4 20C9          02922              CALL    SENDIT1
08B5 0853          02923              MOVF    SBUFF31,0    ;Move display values to transmit register for use
08B6 20C9          02924              CALL    SENDIT1
08B7 0854          02925              MOVF    SBUFF32,0    ;Move display values to transmit register for use
08B8 20C9          02926              CALL    SENDIT1
08B9 0855          02927              MOVF    SBUFF33,0    ;Move display values to transmit register for use
08BA 20C9          02928              CALL    SENDIT1
08BB 0856          02929              MOVF    SBUFF34,0    ;Move display values to transmit register for use
08BC 20C9          02930              CALL    SENDIT1
08BD 3000          02931              MOVLW   H'00'        ;Output 00h on RS232 (Blank character)
08BE 20C9          02932              CALL    SENDIT1
08BF 30FF          02933              MOVLW   H'FF'        ;Output FFh on RS232 (End character)
08C0 20C9          02934              CALL    SENDIT1
08C1 30FF          02935              MOVLW   H'FF'        ;Output FFh on RS232 (End character)
08C2 20C9          02936              CALL    SENDIT1
                   02937
08C3 1509          02938              BSF     TRISE,DX1    ;Serial line i/p
                   02939
08C4 148C          02940 S_SET_AGAIN  BSF     PIE1,1       ;Set interupt enable flag
08C5 1C8C          02941              BTFSS   PIE1,1       ;Make sure it is set before moving on
08C6 28C4          02942              GOTO    S_SET_AGAIN
```

MPASM 01.30.01 Intermediate 2001V603.ASM   4-15-1997  10:51:29      PAGE 59

```
LOC  OBJECT CODE   LINE  SOURCE TEXT
VALUE

08C7 1283          02943             BCF    STATUS,5   ;Set to address register bank 0
                   02944
                   02945
08C8 0008          02946             RETURN
                   02947
                   02948 ;************************************************** Send out XMIT Value to Host for data logging**********
                         *************
08C9               02949 SENDIT1
08C9 1283          02950             BCF    STATUS,5   ;Set to address register bank 0
08CA 00F6          02951             MOVWF  XMIT       ;Move previously loaded value into transmit buffer
                   02952
                   02953
08CB 3008          02954             movlw  8
08CC 00A1          02955             movwf  TEMP1
08CD 1109          02956             bcf    PORTE,DX1  ;Start bit
08CE 2125          02957             call   Delay1
                   02958
08CF 1003          02959 SENDIT1L0   bcf    _C         ;Send out data bits
08D0 0CF6          02960             rrf    XMIT,1
08D1 1803          02961             btfsc  _C         ;Check carry flag (_C defined up top as STATUS,0)
08D2 1509          02962             bsf    PORTE,DX1
08D3 1C03          02963             btfss  _C
08D4 1109          02964             bcf    PORTE,DX1
08D5 2123          02965             call   DelayX
08D6 0BA1          02966             decfsz TEMP1,1
08D7 28CF          02967             goto   SENDIT1L0
08D8 1509          02968             bsf    PORTE,DX1  ;Stop bit
08D9 2125          02969             call   Delay1
08DA 1683          02970             BSF    STATUS,5   ;Set to address register bank 1
08DB 0008          02971             return
                   02972 ;*********************************************************************************************
                         ******************
                   02973
08DC               02974 TRANSMIT
08DC 1683          02975             BSF    STATUS,5   ;Set to bank 1 registers
08DD 108C          02976 TRANS1      BCF    PIE1,1     ;Disable Timer2 interupt (Display)
08DE 188C          02977             BTFSC  PIE1,1     ;Verify interupt turned off
08DF 28DD          02978             GOTO   TRANS1
                   02979
08E0 1386          02980             BCF    TRISB,_TX  ;Serial line o/p
08E1 1283          02981             BCF    STATUS,5   ;Set to address register bank 0
08E2 1786          02982             BSF    PORTB,_TX  ;Set RS232 pin to high: ready for start bit which is low
08E3 2125          02983             CALL   Delay1
08E4 1683          02984             BSF    STATUS,5   ;Set to address register bank 1
                   02985
08E5 0834          02986             MOVF   SBUFF1,0   ;Move display values to transmit register for use
08E6 20FD          02987             CALL   SENDIT2
08E7 0835          02988             MOVF   SBUFF2,0   ;Move display values to transmit register for use
08E8 20FD          02989             CALL   SENDIT2
08E9 0836          02990             MOVF   SBUFF3,0   ;Move display values to transmit register for use
08EA 20FD          02991             CALL   SENDIT2
08EB 0837          02992             MOVF   SBUFF4,0   ;Move display values to transmit register for use
08EC 20FD          02993             CALL   SENDIT2
```

MPASM 01.30.01 Intermediate 2001V603.ASM   4-15-1997  10:51:29      PAGE 60

```
LOC  OBJECT CODE    LINE SOURCE TEXT
     VALUE

08ED 0838           02994              MOVF    SBUFF5,0    ;Move display values to transmit register for use
08EE 20FD           02995              CALL    SENDIT2
08EF 0839           02996              MOVF    SBUFF6,0    ;Move display values to transmit register for use
08F0 20FD           02997              CALL    SENDIT2
08F1 30FF           02998              MOVLW   H'FF'       ;Output FFh on RS232 (End character)
08F2 20FD           02999              CALL    SENDIT2
08F3 30FF           03000              MOVLW   H'FF'       ;Output FFh on RS232 (End character)
08F4 20FD           03001              CALL    SENDIT2
08F5 3006           03002              MOVLW   H'06'       ;Output 06h on RS232 (FILE END character)
08F6 20FD           03003              CALL    SENDIT2
                    03004
08F7 1786           03005              BSF     TRISB,_TX   ;Serial line i/p
                    03006
08F8 148C           03007 TRANS2       BSF     PIE1,1      ;Set interupt enable flag
08F9 1C8C           03008              BTFSS   PIE1,1      ;Make sure it is set before moving on
08FA 28F8           03009              GOTO    TRANS2
08FB 1283           03010              BCF     STATUS,5    ;Set to address register bank 0
                    03011
08FC 0008           03012              RETURN
                    03013
                    03014 ;***************************************************** Send out XMIT Value to Host for calibrating ******
                          *****************
                    03015
08FD 1283           03016 SENDIT2      BCF     STATUS,5    ;Set to address register bank 0
08FE 00F6           03017              MOVWF   XMIT        ;Move previously loaded value into transmit buffer
08FF 3008           03018              movlw   8
0900 00A1           03019              movwf   TEMP1
0901 1386           03020              bcf     PORTB,_TX   ;Start bit
0902 2125           03021              call    Delay1
                    03022
0903 1003           03023 SENDIT2LO    bcf     _C          ;Send out data bits
0904 0CF6           03024              rrf     XMIT,1
0905 1803           03025              btfsc   _C          ;Check carry flag (_C defined up top as STATUS,0)
0906 1786           03026              bsf     PORTB,_TX
0907 1C03           03027              btfss   _C
0908 1386           03028              bcf     PORTB,_TX
0909 2123           03029              call    DelayX
090A 0BA1           03030              decfsz  TEMP1,1
090B 2903           03031              goto    SENDIT2LO
090C 1786           03032              bsf     PORTB,_TX   ;Stop bit
090D 2125           03033              call    Delay1
090E 1683           03034              BSF     STATUS,5    ;Set to address register bank 1
090F 0008           03035              return
                    03036
                    03037 ;********************************************************************************
                          *********
                    03038 ;********************************************************************************
                          *********
                    03039
                    03040 ;Test for start bit (low level)
                    03041 ;Pause for 1/2 bit time then test start bit again.
                    03042 ;If not valid then keep looking for start bit
                    03043 ;Initialize bit counter
```

MPASM 01.30.01 Intermediate 2001V603.ASM   4-15-1997   10:51:29    PAGE 61

LOC  OBJECT CODE    LINE SOURCE TEXT
     VALUE

```
                    03044 ;If valid start then pause for 1 bit time.
                    03045 ;Set the carry flag to the data bit level
                    03046 ;Rotate the carry flag into the receive register (LSB first)
                    03047 ;Decrement the bit counter and loop if not all bits are in.
                    03048 ;Pause for another 1 bit time to allow the stop bit to appear before exit
                    03049 ;Return
                    03050
0910                03051 RS232IN1
0910 1683           03052          BSF    STATUS,5        ;Set to address register bank 1
0911 1706           03053          BSF    TRISB,_RX        ;Receive pin input
0912 1283           03054          BCF    STATUS,5        ;Set to address register bank 0
                    03055
0913 1B06           03056 RECEIVE  BTFSC  PORTB,_RX
0914 2913           03057          GOTO   RECEIVE         ;Wait for Start bit
0915 2127           03058          CALL   Delay3          ;Delay for 0.5 bit time
0916 1B06           03059          BTFSC  PORTB,_RX        ;Verify Start bit
0917 2913           03060          GOTO   RECEIVE         ;Loop if not start bit
0918 3008           03061          MOVLW  .8
0919 00A1           03062          MOVWF  TEMP1           ;8 Bits to move into receive register
091A 2125           03063 NEXT_BIT CALL   Delay1          ;Delay for 1 bit time
091B 1003           03064          BCF    _C              ;Clear carry bit
091C 1B06           03065          BTFSC  PORTB,_RX       ;If Received bit is clear then skip
091D 1403           03066          BSF    _C              ;Set carry bit
091E 0CB6           03067          RRF    RX_REG,1        ;Rotate bit into receive register
091F 0BA1           03068          DECFSZ TEMP1,1         ;Decrement bit counter
0920 291A           03069          GOTO   NEXT_BIT        ;Not all bits in so loop
0921 2125           03070          CALL   Delay1          ;Wait for stop bit (not tested for)
0922 0008           03071          RETURN                 ;All bits done so Return
                    03072
                    03073
                    03074 ;*******************************************************************************
                          **********
                    03075 ;*******************************************************************************
                          **********
                    03076 ;                       Communications delay subroutine
                    03077
0923 301F           03078 DelayX   movlw  BAUD_X          ;Transmit and Receive bit delay
0924 2929           03079          goto   save
0925 301F           03080 Delay1   movlw  BAUD_1          ;Start and stop bit delay for transmit and receive
0926 2929           03081          goto   save
0927 300F           03082 Delay3   movlw  BAUD_3          ;Half bit delay
0928 2929           03083          goto   save
0929 00A0           03084 save     movwf  TEMP
092A 0BA0           03085 holdit   decfsz TEMP,1
092B 292A           03086          goto   holdit
092C 3400           03087          retlw  0
                    03088
                    03089 ;*******************************************************************************
                          **********
                    03090 ;*******************************************************************************
                          **********
                    03091 ; Do not look for switches here. The unit will go into peak hold mode while calibrating
092D                03092 CALIBRATE
```

MPASM 01.30.01 Intermediate  2001V603.ASM   4-15-1997  10:51:29         PAGE 62

LOC  OBJECT CODE   LINE SOURCE TEXT
     VALUE 092D 1683          03093            BSF     STATUS,5      ;Set to bank 1 registers
092E 1109          03094            BCF     TRISE,DX1     ;Serial line o/p
092F 1283          03095            BCF     STATUS,5      ;Set to address register bank 0
0930 1509          03096            BSF     PORTE,DX1         ;Set RS232 pin to high: ready for start bit which is low
                   03097
0931 2110          03098            CALL    RS232IN1           ;Receive start character before transmit
                   03099
0932 0836          03100            MOVF    RX_REG,0      ;Verify start character
0933 3C02          03101            SUBLW   H'02'
0934 1D03          03102            BTFSS   _Z
0935 292D          03103            GOTO    CALIBRATE     ;Look again if not start character
                   03104
0936 118A          03105            BCF     PCLATH,3          ;Select page 0
Message[306]: Crossing page boundary -- ensure page bits are set.
0937 2517          03106            CALL    REFERENCE
0938 118A          03107            BCF     PCLATH,3          ;Select page 0
Message[306]: Crossing page boundary -- ensure page bits are set.
0939 251D          03108            CALL    PRESSENS
093A 118A          03109            BCF     PCLATH,3          ;Select page 0
Message[306]: Crossing page boundary -- ensure page bits are set.
093B 2570          03110            CALL    TEMPSENS
093C 158A          03111            BSF     PCLATH,3      ;Select page 1
093D 1283          03112            BCF     STATUS,5      ;Address register Bank 0
093E 3009          03113 CALIB0     MOVLW   09h           ;9 Times round wait for 770 mS
093F 00AC          03114            MOVWF   LOOPY
0940 118A          03115 CALIB1     BCF     PCLATH,3      ;Select page 0
Message[306]: Crossing page boundary -- ensure page bits are set.
0941 2679          03116            CALL    WAIT          ;Wait for rest of a sample period- total 1 second per reading
0942 158A          03117            BSF     PCLATH,3      ;Select page 1
0943 0BAC          03118            DECFSZ  LOOPY,1       ;
0944 2940          03119            GOTO    CALIB1
                   03120
0945 118A          03121            BCF     PCLATH,3          ;Select page 0
Message[306]: Crossing page boundary -- ensure page bits are set.
0946 2517          03122            CALL    REFERENCE
0947 118A          03123            BCF     PCLATH,3      ;Select page 0
Message[306]: Crossing page boundary -- ensure page bits are set.
0948 251D          03124            CALL    PRESSENS
0949 118A          03125            BCF     PCLATH,3      ;Select page 0
Message[306]: Crossing page boundary -- ensure page bits are set.
094A 2546          03126            CALL    BATTSENS
094B 158A          03127            BSF     PCLATH,3      ;Select page 1
                   03128 ;CALIB2    MOVLW   09h           ;9 Times round wait for 770 mS
                   03129 ;          MOVWF   LOOPY         ;
                   03130 ;CALIB3    BCF     PCLATH,3      ;Select page 0
                   03131 ;          CALL    WAIT          ;Wait for rest of a sample period- total 1 second per reading
                   03132 ;          BSF     PCLATH,3      ;Select page 1
                   03133 ;          DECFSZ  LOOPY,1       ;
                   03134 ;          GOTO    CALIB3
                   03135
                   03136
094C 20DC          03137            CALL    TRANSMIT      ;transmit adc readings
094D 292D          03138            GOTO    CALIBRATE     ;Do again MPASM 01.30.01 Intermediate 2001V603.ASM  4-15-1997  10:51:29     PAGE 63

LOC  OBJECT CODE    LINE SOURCE TEXT
     VALUE

```
                    03139
                    03140 ;********************************************************************************
                          ******************
                    03141 ;********************************************************************************
                          ******************
                    03142
                    03143
094E 1683           03144 BATT_ADJ           BSF    STATUS,5    ;Set to address register bank 1
094F 0826           03145           MOVF   INITBATTH,0
0950 1283           03146           BCF    STATUS,5    ;Address register Bank 0
0951 00D8           03147           MOVWF  ACCeHI
0952 1683           03148           BSF    STATUS,5    ;Set to address register bank 1
0953 0827           03149           MOVF   INITBATTL,0
0954 1283           03150           BCF    STATUS,5    ;Address register Bank 0
0955 00D9           03151           MOVWF  ACCeLO
0956 1683           03152           BSF    STATUS,5    ;Set to address register bank 1
0957 0828           03153           MOVF   NEWBATTH,0
0958 1283           03154           BCF    STATUS,5    ;Address register Bank 0
0959 00D4           03155           MOVWF  ACCcHI
095A 1683           03156           BSF    STATUS,5    ;Set to address register bank 1
095B 0829           03157           MOVF   NEWBATTL,0
095C 1283           03158           BCF    STATUS,5    ;Address register Bank 0
095D 00D5           03159           MOVWF  ACCcLO
095E 118A           03160           BCF    PCLATH,3    ;Select page 0
Message[306]: Crossing page boundary -- ensure page bits are set.
095F 2660           03161           CALL   DSUB        ;Result in ACCe
0960 158A           03162           BSF    PCLATH,3    ;Select page 1
0961 1803           03163           BTFSC  STATUS,0    ;
0962 2965           03164           GOTO   BATT_ADJ1   ;
                    03165
0963 01D8           03166           CLRF   ACCeHI      ;If a negative result Battery voltage went up (?????)
0964 01D9           03167           CLRF   ACCeLO      ;so set to zero and continue.
                    03168
0965 01D2           03169 BATT_ADJ1          CLRF   ACCbHI      ;Clear high order bytes of dividee
0966 01D3           03170           CLRF   ACCbLO ;
0967 0858           03171           MOVF   ACCeHI,0    ;Move result of battery subtraction into low order bytes for Divid
                          e
0968 00D4           03172           MOVWF  ACCcHI ;
0969 0859           03173           MOVF   ACCeLO,0    ;
096A 00D5           03174           MOVWF  ACCcLO ;
096B 01D0           03175           CLRF   ACCaHI      ;Clear high order byte of dividor
096C 3055           03176           MOVLW  55h         ;Divide by 85dec
096D 00D1           03177           MOVWF  ACCaLO ;
096E 21DC           03178           CALL   FXD3216U    ;Result in ACCc
096F 0854           03179           MOVF   ACCcHI,0    ;Move into registers for DADD
0970 00D2           03180           MOVWF  ACCbHI ;
0971 0855           03181           MOVF   ACCcLO,0    ;
0972 00D3           03182           MOVWF  ACCbLO ;
0973 0843           03183           MOVF   VOLTH,0 ;
0974 00D0           03184           MOVWF  ACCaHI ;
0975 0844           03185           MOVF   VOLTL,0 ;
0976 00D1           03186           MOVWF  ACCaLO ;
0977 118A           03187           BCF    PCLATH,3    ;Select page 0
```

MPASM 01.30.01 Intermediate 2001V603.ASM   4-15-1997   10:51:29   PAGE 64

```
LOC  OBJECT CODE    LINE  SOURCE TEXT
     VALUE

Message[306]: Crossing page boundary -- ensure page bits are set.
0978 264B           03188            CALL    DADD        ;Result in ACCb
0979 158A           03189            BSF     PCLATH,3    ;Select page 1
097A 0852           03190            MOVF    ACCbHI,0    ;Place result in VOLTHL
097B 00C3           03191            MOVWF   VOLTH    ;
097C 0853           03192            MOVF    ACCbLO,0    ;
097D 00C4           03193            MOVWF   VOLTL    ;
097E 0008           03194            RETURN
                    03195
                    03196  ;*****************************************************************************
                    03197  ;                      Had to move this here to make some room in the first code space
                    03198
097F 0830           03199  LOADREGS          MOVF    DISPH,0   ;Bring display high byte in
0980 1683           03200            BSF     STATUS,5    ;Set address register to Bank 1
0981 00BA           03201            MOVWF   SBUFF7      ;Store in Serial buffer
0982 1283           03202            BCF     STATUS,5    ;Set address register to bank 0
0983 0831           03203            MOVF    DISPL,0     ;Bring display low byte in
0984 1683           03204            BSF     STATUS,5    ;Set address register to Bank 1
0985 00BB           03205            MOVWF   SBUFF8      ;Store in Serial buffer
0986 1283           03206            BCF     STATUS,5    ;Set address register to bank 0
                    03207
0987 084C           03208            MOVF    FCTN_MDE,0  ;Bring Function byte in
0988 1683           03209            BSF     STATUS,5    ;Set address register to Bank 1
0989 00BC           03210            MOVWF   SBUFF9      ;Store in Serial buffer
098A 1283           03211            BCF     STATUS,5    ;Set address register to bank 0
098B 085B           03212            MOVF    SWITCHES,0  ;Bring Switches byte in
098C 1683           03213            BSF     STATUS,5    ;Set address register to Bank 1
098D 00BD           03214            MOVWF   SBUFF10     ;Store in Serial buffer
098E 1283           03215            BCF     STATUS,5    ;Set address register to bank 0
                    03216
098F 1683           03217            BSF     STATUS,5    ;Set address register to Bank 1
0990 0820           03218            MOVF    TEMPERHI,0  ;Bring 16bit temperature offset high byte in
0991 00D1           03219            MOVWF   SBUFF29     ;Store in Serial buffer
0992 0821           03220            MOVF    TEMPERLO,0  ;Bring 16bit temperature offset low byte in
0993 00D2           03221            MOVWF   SBUFF30     ;Store in Serial buffer
                    03222
0994 0822           03223            MOVF    TREADHI,0   ;Bring temperature value @ offset high byte in
0995 00D3           03224            MOVWF   SBUFF31     ;Store in Serial buffer
0996 0823           03225            MOVF    TREADLO,0   ;Bring temperature value @ offset low byte in
0997 00D4           03226            MOVWF   SBUFF32     ;Store in Serial buffer
0998 1283           03227            BCF     STATUS,5    ;Set address register to bank 0
                    03228
0999 0874           03229            MOVF    TIME_ON,0   ;Bring countdown byte in
099A 1683           03230            BSF     STATUS,5    ;Set address register to Bank 1
099B 00D6           03231            MOVWF   SBUFF34     ;Store in Serial buffer
099C 1283           03232            BCF     STATUS,5    ;Set address register to bank 0
                    03233
099D 0008           03234            RETURN
                    03235
                    03236  ;-------------------------------------------------------------------------------
                    03237  ;Centigrade equations: If DegF is negative: Add 32dec to DegF then multiply by 5/9.
                    03238  ;                      If DegF is Positive: Subtract 32dec from DegF and check for negative result.
```

MPASM 01.30.01 Intermediate 2001V603.ASM   4-15-1997  10:51:29      PAGE 65

```
LOC  OBJECT CODE    LINE  SOURCE TEXT
     VALUE

03239 ;                            If positive result then multiply by 5/9.
                    03240 ;                            If negative result then subtract DegF from 32dec and multi
                                                       ply by 5/9.
                    03241
099E 1BCC           03242 CONVERTC     BTFSC  FCTN_MDE,7   ;Test minus sign flag. Skip if not set
099F 29BC           03243              GOTO   NEGC         ;Go here if negative F was calculated. That means C is also negative
                    03244
09A0 0845           03245              MOVF   RPRESH,0     ;Move operands for subtraction
09A1 00D8           03246              MOVWF  ACCeHI       ;
09A2 0846           03247              MOVF   RPRESL,0     ;
09A3 00D9           03248              MOVWF  ACCeLO       ;
09A4 01D4           03249              CLRF   ACCcHI       ;
09A5 3020           03250              MOVLW  020h         ;Subtract 32 from DegF
09A6 00D5           03251              MOVWF  ACCcLO       ;
09A7 118A           03252              BCF    PCLATH,3     ;Select page 0
Message[306]: Crossing page boundary -- ensure page bits are set.
09A8 2660           03253              CALL   DSUB         ;
09A9 158A           03254              BSF    PCLATH,3     ;Select page 1
09AA 1803           03255              BTFSC  STATUS,0     ;Skip if negative C
09AB 29B7           03256              GOTO   POSC         ;Go here if positive C was calculated
                    03257
09AC 0845           03258              MOVF   RPRESH,0     ;Move operands for subtraction
09AD 00D4           03259              MOVWF  ACCcHI       ;
09AE 0846           03260              MOVF   RPRESL,0     ;
09AF 00D5           03261              MOVWF  ACCcLO       ;
09B0 01D8           03262              CLRF   ACCeHI       ;
09B1 3020           03263              MOVLW  020h         ;Subtract DegF from 32
09B2 00D9           03264              MOVWF  ACCeLO       ;
09B3 118A           03265              BCF    PCLATH,3     ;Select page 0
Message[306]: Crossing page boundary -- ensure page bits are set.
09B4 2660           03266              CALL   DSUB         ;
09B5 158A           03267              BSF    PCLATH,3     ;Select page 1
09B6 17CC           03268              BSF    FCTN_MDE,7   ;Set minus sign flag
                    03269
09B7 0858           03270 POSC         MOVF   ACCeHI,0     ;Move operands for multiplacation
09B8 00D0           03271              MOVWF  ACCaHI       ;
09B9 0859           03272              MOVF   ACCeLO,0     ;
09BA 00D1           03273              MOVWF  ACCaLO       ;
09BB 29CB           03274              GOTO   EXIT_C       ;
                    03275
09BC                03276 NEGC         ;Minus sign flag already set: do not need to do it again
09BC 0845           03277              MOVF   RPRESH,0     ;Move operands for addition
09BD 00D2           03278              MOVWF  ACCbHI       ;
09BE 0846           03279              MOVF   RPRESL,0     ;
09BF 00D3           03280              MOVWF  ACCbLO       ;
09C0 01D0           03281              CLRF   ACCaHI       ;
09C1 3020           03282              MOVLW  020h         ;Add 32 to DegF
09C2 00D1           03283              MOVWF  ACCaLO       ;
09C3 118A           03284              BCF    PCLATH,3     ;Select page 0
Message[306]: Crossing page boundary -- ensure page bits are set.
09C4 264B           03285              CALL   DADD         ;
09C5 158A           03286              BSF    PCLATH,3     ;Select page 1
                    03287
```

```
MPASM 01.30.01 Intermediate  2001V603.ASM   4-15-1997  10:51:29      PAGE 66

LOC  OBJECT CODE   LINE SOURCE TEXT
  VALUE

09C6 0852          03288             MOVF   ACCbHI,0   ;Move operands for multiplacation
09C7 00D0          03289             MOVWF  ACCaHI     ;
09C8 0853          03290             MOVF   ACCbLO,0   ;
09C9 00D1          03291             MOVWF  ACCaLO     ;
09CA 29CB          03292             GOTO   EXIT_C     ;
                   03293
09CB 3008          03294 EXIT_C      MOVLW  08h        ;Multiply by 2275
09CC 00D2          03295             MOVWF  ACCbHI     ;
09CD 30E3          03296             MOVLW  0E3h       ;
09CE 00D3          03297             MOVWF  ACCbLO     ;
09CF 118A          03298             BCF    PCLATH,3   ;Select page 0
Message[306]: Crossing page boundary -- ensure page bits are set.
09D0 2636          03299             CALL   DMPY       ;
09D1 158A          03300             BSF    PCLATH,3   ;Select page 1
09D2 300C          03301             MOVLW  0Ch        ;Divide by 4096
09D3 00A2          03302             MOVWF  TEMP2      ;
09D4 118A          03303             BCF    PCLATH,3   ;Select page 0
Message[306]: Crossing page boundary -- ensure page bits are set.
09D5 266C          03304             CALL   QRR        ;
09D6 158A          03305             BSF    PCLATH,3   ;Select page 1
09D7 0854          03306             MOVF   ACCcHI,0   ;Transfer result to RPRESH
09D8 00C5          03307             MOVWF  RPRESH     ;
09D9 0855          03308             MOVF   ACCcLO,0   ;
09DA 00C6          03309             MOVWF  RPRESL     ;
09DB 0008          03310             RETURN            ;
                   03311
                   03312 ;------------------------------------------------------------------
                   03313
                   03314
                   03315 ;***********************************************************************
                   03316 ;***********************************************************************
                   03317 ;***********************************************************************
                   03318
                   03319 ;   32/16 PIC16 FIXED POINT DIVIDE ROUTINES VERSION 2.01
                   03320 ;
                   03321 ;   Input: fixed point arguments in AARG and BARG
                   03322 ;
                   03323 ;   Output: quotient AARG/BARG followed by remainder in REM
                   03324 ;
                   03325 ;   All timings are worst case cycle counts
                   03326 ;
                   03327 ;
                   03328 ;       Routine         Clocks      Function
                   03329 ;
                   03330 ;
                   03331 ;       FXD3216U        703  32 bit/16 bit -> 32.16 unsigned fixed point divide
                   03332 ;
                   03333 ;
                   03334 ;***********************************************************************
                   03335 ;***********************************************************************
                   03336
                   03337 ;   32/16 Bit Unsigned Fixed Point Divide 32/16 -> 32.16
```

MPASM 01.30.01 Intermediate  2001V603.ASM   4-15-1997  10:51:29        PAGE 67

LOC  OBJECT CODE    LINE SOURCE TEXT
     VALUE

```
                    03338
                    03339 ;     Input:  32 bit unsigned fixed point dividend in AARGB0, AARGB1,AARGB2,AARGB3
                    03340 ;             16 bit unsigned fixed point divisor in BARGB0, BARGB1
                    03341
                    03342 ;     Use:    CALL    FXD3216U
                    03343
                    03344 ;     Output: 32 bit unsigned fixed point quotient in AARGB0, AARGB1,AARGB2,AARGB3
                    03345 ;             16 bit unsigned fixed point remainder in REMB0, REMB1
                    03346
                    03347 ;     Result: AARG, REM <-- AARG / BARG
                    03348
                    03349 ;     Max Timing:    2+699+2 = 703 clks
                    03350
                    03351 ;     Max Timing:    2+663+2 = 667 clks
                    03352
                    03353 ;     PM: 2+240+1 = 243              DM: 9
                    03354
                    03355
                    03356 ;************************************************************************
                    03357 ;************************************************************************
                    03358
                    03359
                    03360 ;     32/16 Bit Division Subroutine
                    03361
                    03362
                    03363 ;     Max Timing:   16+6*22+21+21+6*22+21+21+6*22+21+21+6*22+21+8 = 699 clks
                    03364
                    03365 ;     Min Timing:   16+6*21+20+20+6*21+20+20+6*21+20+20+6*21+20+3 = 663 clks
                    03366
                    03367 ;     PM: 240                        DM: 9
                    03368
                    03369
09DC 01D6           03370 FXD3216U    CLRF        REMB0
09DD 01D7           03371             CLRF        REMB1
09DE 01A0           03372             CLRF        TEMP
09DF 0D52           03373             RLF         ACCB0,W
09E0 0DD7           03374             RLF         REMB1, F
09E1 0851           03375             MOVF        BARGB1,W
09E2 02D7           03376             SUBWF       REMB1, F
09E3 0850           03377             MOVF        BARGB0,W
09E4 1C03           03378             BTFSS       _C
09E5 0F50           03379             INCFSZ      BARGB0,W
09E6 02D6           03380             SUBWF       REMB0, F
09E7 0100           03381             CLRW
09E8 1C03           03382             BTFSS       _C
09E9 3001           03383             MOVLW       1
09EA 02A0           03384             SUBWF       TEMP, F
09EB 0DD2           03385             RLF         ACCB0, F
                    03386
09EC 3007           03387             MOVLW       7
09ED 00D8           03388             MOVWF       LOOPCOUNT
                    03389
09EE 0D52           03390 LOOPU3216A  RLF         ACCB0,W
```

MPASM 01.30.01 Intermediate  2001V603.ASM   4-15-1997  10:51:29       PAGE 68

```
LOC  OBJECT CODE    LINE  SOURCE TEXT
     VALUE

09EF 0DD7          03391              RLF       REMB1, F
09F0 0DD6          03392              RLF       REMB0, F
09F1 0DA0          03393              RLF       TEMP, F
09F2 0851          03394              MOVF      BARGB1,W
09F3 1C52          03395              BTFSS     ACCB0,LSB
09F4 29FF          03396              GOTO      UADD26LA
                   03397
09F5 02D7          03398              SUBWF     REMB1, F
09F6 0850          03399              MOVF      BARGB0,W
09F7 1C03          03400              BTFSS     _C
09F8 0F50          03401              INCFSZ    BARGB0,W
09F9 02D6          03402              SUBWF     REMB0, F
09FA 0100          03403              CLRW
09FB 1C03          03404              BTFSS     _C
09FC 3001          03405              MOVLW     1
09FD 02A0          03406              SUBWF     TEMP, F
09FE 2A08          03407              GOTO      UOK26LA
                   03408
09FF 07D7          03409 UADD26LA     ADDWF     REMB1, F
0A00 0850          03410              MOVF      BARGB0,W
0A01 1803          03411              BTFSC     _C
0A02 0F50          03412              INCFSZ    BARGB0,W
0A03 07D6          03413              ADDWF     REMB0, F
0A04 0100          03414              CLRW
0A05 1803          03415              BTFSC     _C
0A06 3001          03416              MOVLW     1
0A07 07A0          03417              ADDWF     TEMP, F
                   03418
0A08 0DD2          03419 UOK26LA      RLF       ACCB0, F
                   03420
0A09 0BD8          03421              DECFSZ    LOOPCOUNT, F
0A0A 29EE          03422              GOTO      LOOPU3216A
                   03423
0A0B 0D53          03424              RLF       ACCB1,W
0A0C 0DD7          03425              RLF       REMB1, F
0A0D 0DD6          03426              RLF       REMB0, F
0A0E 0DA0          03427              RLF       TEMP, F
0A0F 0851          03428              MOVF      BARGB1,W
0A10 1C52          03429              BTFSS     ACCB0,LSB
0A11 2A1C          03430              GOTO      UADD26L8
                   03431
0A12 02D7          03432              SUBWF     REMB1, F
0A13 0850          03433              MOVF      BARGB0,W
0A14 1C03          03434              BTFSS     _C
0A15 0F50          03435              INCFSZ    BARGB0,W
0A16 02D6          03436              SUBWF     REMB0, F
0A17 0100          03437              CLRW
0A18 1C03          03438              BTFSS     _C
0A19 3001          03439              MOVLW     1
0A1A 02A0          03440              SUBWF     TEMP, F
0A1B 2A25          03441              GOTO      UOK26L8
                   03442
0A1C 07D7          03443 UADD26L8     ADDWF     REMB1, F
```

MPASM 01.30.01 Intermediate 2001V603.ASM   4-15-1997  10:51:29   PAGE 69

LOC  OBJECT CODE    LINE  SOURCE TEXT
     VALUE

| LOC | OBJECT CODE | LINE | | | |
|---|---|---|---|---|---|
| 0A1D | 0850 | 03444 | | MOVF | BARGB0,W |
| 0A1E | 1803 | 03445 | | BTFSC | _C |
| 0A1F | 0F50 | 03446 | | INCFSZ | BARGB0,W |
| 0A20 | 07D6 | 03447 | | ADDWF | REMB0, F |
| 0A21 | 0100 | 03448 | | CLRW | |
| 0A22 | 1803 | 03449 | | BTFSC | _C |
| 0A23 | 3001 | 03450 | | MOVLW | 1 |
| 0A24 | 07A0 | 03451 | | ADDWF | TEMP, F |
| | | 03452 | | | |
| 0A25 | 0DD3 | 03453 | UOK26L8 | RLF | ACCB1, F |
| | | 03454 | | | |
| 0A26 | 3007 | 03455 | | MOVLW | 7 |
| 0A27 | 00D8 | 03456 | | MOVWF | LOOPCOUNT |
| | | 03457 | | | |
| 0A28 | 0D53 | 03458 | LOOPU3216B | RLF | ACCB1,W |
| 0A29 | 0DD7 | 03459 | | RLF | REMB1, F |
| 0A2A | 0DD6 | 03460 | | RLF | REMB0, F |
| 0A2B | 0DA0 | 03461 | | RLF | TEMP, F |
| 0A2C | 0851 | 03462 | | MOVF | BARGB1,W |
| 0A2D | 1C53 | 03463 | | BTFSS | ACCB1,LSB |
| 0A2E | 2A39 | 03464 | | GOTO | UADD26LB |
| | | 03465 | | | |
| 0A2F | 02D7 | 03466 | | SUBWF | REMB1, F |
| 0A30 | 0850 | 03467 | | MOVF | BARGB0,W |
| 0A31 | 1C03 | 03468 | | BTFSS | _C |
| 0A32 | 0F50 | 03469 | | INCFSZ | BARGB0,W |
| 0A33 | 02D6 | 03470 | | SUBWF | REMB0, F |
| 0A34 | 0100 | 03471 | | CLRW | |
| 0A35 | 1C03 | 03472 | | BTFSS | _C |
| 0A36 | 3001 | 03473 | | MOVLW | 1 |
| 0A37 | 02A0 | 03474 | | SUBWF | TEMP, F |
| 0A38 | 2A42 | 03475 | | GOTO | UOK26LB |
| | | 03476 | | | |
| 0A39 | 07D7 | 03477 | UADD26LB | ADDWF | REMB1, F |
| 0A3A | 0850 | 03478 | | MOVF | BARGB0,W |
| 0A3B | 1803 | 03479 | | BTFSC | _C |
| 0A3C | 0F50 | 03480 | | INCFSZ | BARGB0,W |
| 0A3D | 07D6 | 03481 | | ADDWF | REMB0, F |
| 0A3E | 0100 | 03482 | | CLRW | |
| 0A3F | 1803 | 03483 | | BTFSC | _C |
| 0A40 | 3001 | 03484 | | MOVLW | 1 |
| 0A41 | 07A0 | 03485 | | ADDWF | TEMP, F |
| | | 03486 | | | |
| 0A42 | 0DD3 | 03487 | UOK26LB | RLF | ACCB1, F |
| | | 03488 | | | |
| 0A43 | 0BD8 | 03489 | | DECFSZ | LOOPCOUNT, F |
| 0A44 | 2A28 | 03490 | | GOTO | LOOPU3216B |
| | | 03491 | | | |
| 0A45 | 0D54 | 03492 | | RLF | ACCB2,W |
| 0A46 | 0DD7 | 03493 | | RLF | REMB1, F |
| 0A47 | 0DD6 | 03494 | | RLF | REMB0, F |
| 0A48 | 0DA0 | 03495 | | RLF | TEMP, F |
| 0A49 | 0851 | 03496 | | MOVF | BARGB1,W |

MPASM 01.30.01 Intermediate 2001V603.ASM   4-15-1997  10:51:29       PAGE 70

LOC  OBJECT CODE    LINE  SOURCE TEXT
     VALUE

0A4A 1C53          03497              BTFSS       ACCB1,LSB
0A4B 2A56          03498              GOTO        UADD26L16
                   03499
0A4C 02D7          03500              SUBWF       REMB1, F
0A4D 0850          03501              MOVF        BARGB0,W
0A4E 1C03          03502              BTFSS       _C
0A4F 0F50          03503              INCFSZ      BARGB0,W
0A50 02D6          03504              SUBWF       REMB0, F
0A51 0100          03505              CLRW
0A52 1C03          03506              BTFSS       _C
0A53 3001          03507              MOVLW       1
0A54 02A0          03508              SUBWF       TEMP, F
0A55 2A5F          03509              GOTO        UOK26L16
                   03510
0A56 07D7          03511 UADD26L16    ADDWF       REMB1, F
0A57 0850          03512              MOVF        BARGB0,W
0A58 1803          03513              BTFSC       _C
0A59 0F50          03514              INCFSZ      BARGB0,W
0A5A 07D6          03515              ADDWF       REMB0, F
0A5B 0100          03516              CLRW
0A5C 1803          03517              BTFSC       _C
0A5D 3001          03518              MOVLW       1
0A5E 07A0          03519              ADDWF       TEMP, F
                   03520
0A5F 0DD4          03521 UOK26L16     RLF         ACCB2, F
                   03522
0A60 3007          03523              MOVLW       7
0A61 00D8          03524              MOVWF       LOOPCOUNT
                   03525
0A62 0D54          03526 LOOPU3216C   RLF         ACCB2,W
0A63 0DD7          03527              RLF         REMB1, F
0A64 0DD6          03528              RLF         REMB0, F
0A65 0DA0          03529              RLF         TEMP, F
0A66 0851          03530              MOVF        BARGB1,W
0A67 1C54          03531              BTFSS       ACCB2,LSB
0A68 2A73          03532              GOTO        UADD26LC
                   03533
0A69 02D7          03534              SUBWF       REMB1, F
0A6A 0850          03535              MOVF        BARGB0,W
0A6B 1C03          03536              BTFSS       _C
0A6C 0F50          03537              INCFSZ      BARGB0,W
0A6D 02D6          03538              SUBWF       REMB0, F
0A6E 0100          03539              CLRW
0A6F 1C03          03540              BTFSS       _C
0A70 3001          03541              MOVLW       1
0A71 02A0          03542              SUBWF       TEMP, F
0A72 2A7C          03543              GOTO        UOK26LC
                   03544
0A73 07D7          03545 UADD26LC     ADDWF       REMB1, F
0A74 0850          03546              MOVF        BARGB0,W
0A75 1803          03547              BTFSC       _C
0A76 0F50          03548              INCFSZ      BARGB0,W
0A77 07D6          03549              ADDWF       REMB0, F

MPASM 01.30.01 Intermediate 2001V603.AS.. 4-15-1997 10:51:29    PAGE 71

LOC  OBJECT CODE    LINE SOURCE TEXT
     VALUE

| LOC | OBJECT CODE | LINE | | SOURCE TEXT | |
|---|---|---|---|---|---|
| 0A78 | 0100 | 03550 | | CLRW | |
| 0A79 | 1803 | 03551 | | BTFSC | _C |
| 0A7A | 3001 | 03552 | | MOVLW | 1 |
| 0A7B | 07A0 | 03553 | | ADDWF | TEMP, F |
| | | 03554 | | | |
| 0A7C | 0DD4 | 03555 | UOK26LC | RLF | ACCB2, F |
| | | 03556 | | | |
| 0A7D | 0BD8 | 03557 | | DECFSZ | LOOPCOUNT, F |
| 0A7E | 2A62 | 03558 | | GOTO | LOOPU3216C |
| | | 03559 | | | |
| 0A7F | 0D55 | 03560 | | RLF | ACCB3,W |
| 0A80 | 0DD7 | 03561 | | RLF | REMB1, F |
| 0A81 | 0DD6 | 03562 | | RLF | REMB0, F |
| 0A82 | 0DA0 | 03563 | | RLF | TEMP, F |
| 0A83 | 0851 | 03564 | | MOVF | BARGB1,W |
| 0A84 | 1C54 | 03565 | | BTFSS | ACCB2,LSB |
| 0A85 | 2A90 | 03566 | | GOTO | UADD26L24 |
| | | 03567 | | | |
| 0A86 | 02D7 | 03568 | | SUBWF | REMB1, F |
| 0A87 | 0850 | 03569 | | MOVF | BARGB0,W |
| 0A88 | 1C03 | 03570 | | BTFSS | _C |
| 0A89 | 0F50 | 03571 | | INCFSZ | BARGB0,W |
| 0A8A | 02D6 | 03572 | | SUBWF | REMB0, F |
| 0A8B | 0100 | 03573 | | CLRW | |
| 0A8C | 1C03 | 03574 | | BTFSS | _C |
| 0A8D | 3001 | 03575 | | MOVLW | 1 |
| 0A8E | 02A0 | 03576 | | SUBWF | TEMP, F |
| 0A8F | 2A99 | 03577 | | GOTO | UOK26L24 |
| | | 03578 | | | |
| 0A90 | 07D7 | 03579 | UADD26L24 | ADDWF | REMB1, F |
| 0A91 | 0850 | 03580 | | MOVF | BARGB0,W |
| 0A92 | 1803 | 03581 | | BTFSC | _C |
| 0A93 | 0F50 | 03582 | | INCFSZ | BARGB0,W |
| 0A94 | 07D6 | 03583 | | ADDWF | REMB0, F |
| 0A95 | 0100 | 03584 | | CLRW | |
| 0A96 | 1803 | 03585 | | BTFSC | _C |
| 0A97 | 3001 | 03586 | | MOVLW | 1 |
| 0A98 | 07A0 | 03587 | | ADDWF | TEMP, F |
| | | 03588 | | | |
| 0A99 | 0DD5 | 03589 | UOK26L24 | RLF | ACCB3, F |
| | | 03590 | | | |
| 0A9A | 3007 | 03591 | | MOVLW | 7 |
| 0A9B | 00D8 | 03592 | | MOVWF | LOOPCOUNT |
| | | 03593 | | | |
| 0A9C | 0D55 | 03594 | LOOPU3216D | RLF | ACCB3,W |
| 0A9D | 0DD7 | 03595 | | RLF | REMB1, F |
| 0A9E | 0DD6 | 03596 | | RLF | REMB0, F |
| 0A9F | 0DA0 | 03597 | | RLF | TEMP, F |
| 0AA0 | 0851 | 03598 | | MOVF | BARGB1,W |
| 0AA1 | 1C55 | 03599 | | BTFSS | ACCB3,LSB |
| 0AA2 | 2AAD | 03600 | | GOTO | UADD26LD |
| | | 03601 | | | |
| 0AA3 | 02D7 | 03602 | | SUBWF | REMB1, F |

MPASM 01.30.01 Intermediate  2001V603.ASM   4-15-1997  10:51:29        PAGE 72

LOC  OBJECT CODE    LINE SOURCE TEXT
     VALUE

```
0AA4 0850        03603              MOVF      BARGB0,W
0AA5 1C03        03604              BTFSS     _C
0AA6 0F50        03605              INCFSZ    BARGB0,W
0AA7 02D6        03606              SUBWF     REMB0, F
0AA8 0100        03607              CLRW
0AA9 1C03        03608              BTFSS     _C
0AAA 3001        03609              MOVLW     1
0AAB 02A0        03610              SUBWF     TEMP, F
0AAC 2AB6        03611              GOTO      UOK26LD
                 03612
0AAD 07D7        03613 UADD26LD     ADDWF     REMB1, F
0AAE 0850        03614              MOVF      BARGB0,W
0AAF 1803        03615              BTFSC     _C
0AB0 0F50        03616              INCFSZ    BARGB0,W
0AB1 07D6        03617              ADDWF     REMB0, F
0AB2 0100        03618              CLRW
0AB3 1803        03619              BTFSC     _C
0AB4 3001        03620              MOVLW     1
0AB5 07A0        03621              ADDWF     TEMP, F
                 03622
0AB6 0DD5        03623 UOK26LD      RLF       ACCB3, F
                 03624
0AB7 0BD8        03625              DECFSZ    LOOPCOUNT, F
0AB8 2A9C        03626              GOTO      LOOPU3216D
                 03627
0AB9 1855        03628              BTFSC     ACCB3,LSB
0ABA 2AC1        03629              GOTO      UOK26L
0ABB 0851        03630              MOVF      BARGB1,W
0ABC 07D7        03631              ADDWF     REMB1, F
0ABD 0850        03632              MOVF      BARGB0,W
0ABE 1803        03633              BTFSC     _C
0ABF 0F50        03634              INCFSZ    BARGB0,W
0AC0 07D6        03635              ADDWF     REMB0, F
0AC1             03636 UOK26L
0AC1 3400        03637              RETLW     0x00
                 03638
                 03639
                 03640 ;****************************************************************
                 03641 ;****************************************************************
                 03642                        ;Truncate reading for a FOUR digit display.
                 03643                        ;if in the range .0 to .2 display .0
                 03644                        ;If in the range .3 to .7 display .5
                 03645                        ;If in the range .8 to .9 display .0 and increment DISPH & DISPL a
                       s needed
                 03646
0AC2             03647 TRUNCATE4
0AC2 0831        03648              MOVF      DISPL,0       ;Put low display byte in W
0AC3 390F        03649              ANDLW     0Fh           ;Mask off lower nibble
0AC4 3C02        03650              SUBLW     02h           ;Subtract W from a constant value to determine truncation
0AC5 1C03        03651              BTFSS     STATUS,0         ;Carry flag: Set if result is +Ve or Zero: Clear if -Ve
0AC6 2ACB        03652              GOTO      TRUNC41       ;Go here if result is negative :DISPL = 3F - 9F
                 03653
                 03654                        ;result is positive or zero: DISPL = 0F - 2F
```

MPASM 01.30.01 Intermediate 2001V603.ASM   4-15-1997  10:51:29      PAGE 73

```
LOC  OBJECT CODE    LINE  SOURCE TEXT
     VALUE

0AC7 0831           03655         MOVF   DISPL,0      ;Put low display byte in W
0AC8 39F0           03656         ANDLW  0F0h         ;Mask off higher nibble
0AC9 00B1           03657         MOVWF  DISPL        ;Change display to read .0
0ACA 2AEF           03658         GOTO   EXITRNC4
                    03659
0ACB 0831           03660 TRUNC41 MOVF   DISPL,0      ;Put low display byte in W
0ACC 390F           03661         ANDLW  0Fh          ;Mask off lower nibble
0ACD 3C07           03662         SUBLW  07h          ;Subtract W from a constant value to determine truncation
0ACE 1C03           03663         BTFSS  STATUS,0          ;Carry flag: Set if result is +Ve or Zero: Clear if -Ve
0ACF 2AD5           03664         GOTO   TRUNC42      ;Go here if result is negative :DISPL = 8F - 9F
                    03665
                    03666                             ;result is positive or zero: DISPL = 3F - 7F
0AD0 0831           03667         MOVF   DISPL,0      ;Put low display byte in W
0AD1 39F0           03668         ANDLW  0F0h         ;Mask off higher nibble
0AD2 3805           03669         IORLW  05h          ;
0AD3 00B1           03670         MOVWF  DISPL        ;Change display to read .5
0AD4 2AEF           03671         GOTO   EXITRNC4
                    03672
                    03673                             ;This section rolls over any other digits that need it (Hundreds,
                                                      Tens, Units)
0AD5                03674 TRUNC42                     ;result subtraction (TRUNC41) is positive or zero: DISPL = 8F - 9F
0AD5 0831           03675         MOVF   DISPL,0      ;Change display to read .0
0AD6 39F0           03676         ANDLW  0F0h         ;Mask off higher nibble, setting lower nibble to 0 at the same time
0AD7 3E10           03677         ADDLW  10h          ;Increment next highest nibble by 1 to change reading
0AD8 00B1           03678         MOVWF  DISPL        ;Put W in LOW display byte
0AD9 3C90           03679         SUBLW  90h          ;Subtract W from a constant value to determine if need to roll over
0ADA 1803           03680         BTFSC  STATUS,0          ;Carry flag: Set if result is +Ve or Zero: Clear if -Ve
0ADB 2AEF           03681         GOTO   EXITRNC4          ;Go here if result is positive :DISPL < A0h
                    03682
0ADC 300F           03683         MOVLW  0Fh          ;Load mask into W reg
0ADD 05B1           03684         ANDWF  DISPL,1      ;Modify LOW display byte to show 0x
0ADE 0AB0           03685         INCF   DISPH,1      ;Increment high display byte by 1 to change reading
0ADF 0830           03686         MOVF   DISPH,0      ;Put HIGH display byte in W
0AE0 390F           03687         ANDLW  0Fh          ;Mask off higher nibble
0AE1 3C09           03688         SUBLW  09h          ;Subtract W from a constant value to determine if need roll over
0AE2 1803           03689         BTFSC  STATUS,0          ;Carry flag: Set if result is +Ve or Zero: Clear if -Ve
0AE3 2AEF           03690         GOTO   EXITRNC4          ;Go here if result is positive :DISPH < 0Ah
                    03691
                    03692                             ;Rolled over so increment next highest nibble
0AE4 30F0           03693         MOVLW  0F0h         ;Load mask into W reg
0AE5 05B0           03694         ANDWF  DISPH,1      ;Modify high display byte to show x0
0AE6 3010           03695         MOVLW  10h          ;
0AE7 07B0           03696         ADDWF  DISPH,1      ;Increment highest nibble once
0AE8 0830           03697         MOVF   DISPH,0      ;Put HIGH display byte in W
0AE9 39F0           03698         ANDLW  0F0h         ;Mask off higher nibble
0AEA 3C90           03699         SUBLW  90h          ;Subtract W from a constant value to determine if need roll over
0AEB 1803           03700         BTFSC  STATUS,0          ;Carry flag: Set if result is +Ve or Zero: Clear if -Ve
0AEC 2AEF           03701         GOTO   EXITRNC4          ;Go here if result is positive :DISPH < 0Ah
0AED 300F           03702         MOVLW  0Fh          ;Load mask into W reg
0AEE 05B0           03703         ANDWF  DISPH,1      ;Modify high display byte to show 0x
                    03704
```

MPASM 01.30.01 Intermediate 2001V603.A. 4-15-1997 10:51:29 PAGE 74

LOC OBJECT CODE    LINE SOURCE TEXT
    VALUE

```
                        03705
                        03706
OAEF 0008               03707 EXITRNC4              RETURN
                        03708 ;************************************************************************
                        03709 ;************************************************************************
                              ******************
                        03710
                        03711
                        03712
OAF0 0845               03713 KPACONVERT    MOVFW   RPRESH      ;Move high byte of presssure into w
OAF1 00D0               03714               MOVWF   ACCaHI      ;Move W to HI Multiplier Register
OAF2 0846               03715               MOVFW   RPRESL      ;Move low byte of pressure into w
OAF3 00D1               03716               MOVWF   ACCaLO      ;Move W TO LOW multiplier Register
OAF4 306E               03717               MOVLW   06Eh        ;Load with program constent
OAF5 00D2               03718               MOVWF   ACCbHI      ;Move to operand HI
OAF6 3050               03719               MOVLW   050h        ;Load with program constent
OAF7 00D3               03720               MOVWF   ACCbLO      ;Move to operand LO
OAF8 118A               03721               BCF     PCLATH,3            ;Select page 0
Message[306]: Crossing page boundary -- ensure page bits are set.
OAF9 2636               03722               CALL    DMPY        ;Call multiplier
OAFA 158A               03723               BSF     PCLATH,3            ;Select page 1
OAFB 300C               03724               MOVLW   0Ch         ;Load w with 12dec
OAFC 00A2               03725               MOVWF   TEMP2       ;
OAFD 118A               03726               BCF     PCLATH,3            ;Select page 0
Message[306]: Crossing page boundary -- ensure page bits are set.
OAFE 266C               03727               CALL    QRR         ;Call rotate right routine
OAFF 158A               03728               BSF     PCLATH,3            ;Select page 1
0B00 0854               03729               MOVFW   ACCcHI      ;Bring in result
0B01 00C5               03730               MOVWF   RPRESH      ;Store it for BCD conversion
0B02 0855               03731               MOVFW   ACCcLO      ;Bring in result
0B03 00C6               03732               MOVWF   RPRESL      ;Store it for BCD conversion
0B04 0008               03733               RETURN
                        03734 ;************************************************************************
                              ******************
                        03735
                        03736 ;************************************************************************
                        03737
                        03738               END
```

MPASM 01.30.01 Intermediate  2001V603.ASM   4-15-1997  10:51:29     PAGE 75

SYMBOL TABLE
  LABEL                   VALUE

AARG                      00000052
AARGB0                    00000052
AARGB1                    00000053
AARGB2                    00000054
AARGB3                    00000055
ACC                       00000052
ACCB0                     00000052
ACCB1                     00000053
ACCB2                     00000054
ACCB3                     00000055
ACCaHI                    00000050
ACCaLO                    00000051
ACCbHI                    00000052
ACCbLO                    00000053
ACCcHI                    00000054
ACCcLO                    00000055
ACCdHI                    00000056
ACCdLO                    00000057
ACCeHI                    00000058
ACCeLO                    00000059
ADCON1                    0000001F
ADCSETUP                  000005CA
ADCSETUP1                 000005CA
ADCSETUP2                 000005CE
ADJBCD                    00000394
ADJDEC                    0000038A
ADJ_ZEROH                 0000007B
ADJ_ZEROL                 0000007C
AGAIN                     00000230
AUTO_OFF                  000002A2
AVA_SW                    000002B6
AVERAGE                   0000021C
AVERAGEH                  00000068
AVERAGEL                  0000006A
AVERAGEM                  00000069
AVE_OFF                   000007DA
AVE_SYM                   000007D4
BARG                      00000050
BARGB0                    00000050
BARGB1                    00000051
BATTANN                   0000004A
BATTCNT                   00000070
BATTH                     00000026
BATTL                     00000027
BATTSENS                  00000546
BATT_ADJ                  0000094E
BATT_ADJ1                 00000965
BATT_OFF                  00000785
BAT_SYM                   00000780
BAUD_1                    .31
BAUD_3                    .15
BAUD_X                    .31
BCD_CONV                  00000364

MPASM 01.30.01 Intermediate  2001V603.ASM   4-15-1997  10:51:29      PAGE 76

SYMBOL TABLE
  LABEL                    VALUE

BCD_CONV1                  00000374
BEEP                       00000619
BEEP1                      00000625
BEEP2                      0000062C
BEEP3                      00000620
BEEP4                      0000061E
BEEPTIME                   00000025
BOTH                       00000280
CALBATTH                   0000003A
CALBATTL                   00000040
CALC                       00000314
CALC1                      0000036A
CALC2                      0000034A
CALCV                      00000600
CALIB0                     0000093E
CALIB1                     00000940
CALIBRATE                  0000092D
CALOFFSH                   00000041
CALOFFSL                   00000042
CALPRESH                   00000038
CALPRESL                   00000039
CALSPANH                   0000005C
CALSPANL                   0000005D
CALTEMPH                   0000003C
CALTEMPL                   0000003D
CCP1CON                    00000017
CCPR1H                     00000016
CCPR1L                     00000015
CENT_OFF                   00000799
CENT_SYM                   00000794
CHK_BATT                   00000505
CONSTBL                    00000010
CONVERTC                   0000099E
COUNT                      0000002D
DADD                       0000064B
DEGREESF                   0000045F
DISPH                      00000030
DISPH_TP                   0000002F
DISPL                      00000031
DISPLAY                    000006FC
DISPL_TP                   0000002E
DISPST                     00000047
DISPST0B                   00000060
DISPST0C                   00000061
DISPST0D                   0000006B
DISPST0E                   0000004D
DISPST1B                   00000062
DISPST1C                   00000063
DISPST1D                   0000006C
DISPST1E                   0000004E
DISPST2B                   00000064
DISPST2C                   00000065
DISPST2D                   0000006D

MPASM 01.30.01 Intermediate  2001V603.ASM   4-15-1997  10:51:29     PAGE 77

SYMBOL TABLE
  LABEL                        VALUE

DISPST2E                       0000004F
DISPST3B                       00000066
DISPST3C                       00000067
DISPST3D                       0000006E
DISPST3E                       0000006F
DISPT                          00000048
DISPTABLE                      000007DF
DISP_ADJ                       0000039F
DMPY                           00000636
DSUB                           00000660
DX1                            .2
Delay1                         00000925
Delay3                         00000927
DelayX                         00000923
EWAITCNTR                      00000024
EXITRNC4                       00000AEF
EXIT_C                         000009CB
EXIT_DEGREES                   000004C5
EXIT_RET                       00000300
FART_OFF                       000007A1
FART_SYM                       0000079C
FCTN_MDE                       0000004C
FCTN_PH                        00000037
FIRST_READ                     00000215
FSR                            00000004
FUNCTION                       000002DA
FUNCTION1                      000002E5
FUNCTION2                      000002D7
FUNCTION3                      000002E1
FXD3216U                       000009DC
HIGHER                         000004A2
INDF                           00000000
INHG_OFF                       000007D1
INHG_SYM                       000007CC
INITBATTH                      00000026
INITBATTL                      00000027
INITCALC                       000004D3
INITCALC1                      000004E2
INTCON                         0000000B
INTER                          00000800
INTER_EXIT                     00000866
INTER_ON                       000001E6
INT_VECTOR                     00000004
JUMP                           000001D0
JUMP1                          000001D2
KPA                            00000359
KPACONVERT                     00000AF0
KPA_OFF                        000007C7
KPA_SCRN                       0000030E
KPA_SYM                        000007C0
LOADREGS                       0000097F
LOAD_IT                        0000025F
LOOPCOUNT                      00000058

MPASM 01.30.01 Intermediate  2001V603.ASM    4-15-1997  10:51:29    PAGE 78

SYMBOL TABLE
  LABEL                     VALUE

LOOPU3216A                  000009EE
LOOPU3216B                  00000A28
LOOPU3216C                  00000A62
LOOPU3216D                  00000A9C
LOOPY                       0000002C
LOOPY2                      0000005F
LOOPY4                      000002FC
LOWER                       0000046F
LSB                         0
MAIN                        0000019F
MAIN0                       000001D6
MAIN1                       000001D8
MAIN2                       0000020D
MAIN3                       0000026F
MAIN4                       00000287
MAIN5                       00000289
MAIN6                       0000028D
MAIN7                       0000029C
MAIN8                       00000292
MAIN9                       00000293
MAIN_M                      000001D6
MINUS_SYM                   000007B9
MLOOP                       00000637
MODE_SW                     000002C7
MOOR                        000004DE
MOORON                      000004DB
MORE_AV                     00000224
MPY                         00000652
MPYLOOP                     00000658
MTEMP                       0000005A
NEGC                        000009BC
NEWBATTH                    00000028
NEWBATTL                    00000029
NEXT_BIT                    0000091A
NOTCALIB                    00000100
NOTESTBATT                  00000209
NOTPEAK                     0000027C
NO_BLINK                    000001F5
NO_RS232                    000001E4
OFF_ST_HI                   00000024
OFF_ST_LO                   00000025
OLDDISPH                    00000072
OLDDISPL                    00000073
OPTION_REG                  00000001
PBUFF1H                     0000002A
PBUFF1L                     0000002B
PBUFF2H                     0000002C
PBUFF2L                     0000002D
PCL                         00000002
PCLATH                      0000000A
PCLATH_HOLD                 0000005E
PCON                        0000000E
PEAK                        00000244

MPASM 01.30.01 Intermediate  2001V603.ASM   4-15-1997  10:51:29      PAGE 79

SYMBOL TABLE
  LABEL                    VALUE

PEAK0                      0000024C
PEAK1                      00000258
PEAK2                      00000268
PEAK_OFF                   0000078F
PEAK_SYM                   00000788
PFCOUNT                    0000002E
PIE1                       0000000C
PIR1                       0000000C
PNTRTBL                    00000001
PORTA                      00000005
PORTA_UP                   00000105
PORTB                      00000006
PORTC                      00000007
PORTD                      00000008
PORTE                      00000009
POSC                       000009B7
POSF                       0000049D
POS_PRESH                  000003FF
PR2                        00000012
PREPSLEEP                  00000611
PRESH                      00000400
PRESSENS                   0000051D
PRESS_DIFH                 0000003B
PRESS_DIFL                 0000007F
PRES_OUT                   0000031D
PSI                        0000035C
PSI100                     000007B2
PSI_OFF                    000007AD
PSI_SCRN                   00000308
PSI_SYM                    000007A4
QRR                        0000066C
QUICK_WAIT                 00000674
RAMPUP                     000005F8
RCSTA                      00000018
RECEIVE                    00000913
REFERENCE                  00000517
REMB0                      00000056
REMB1                      00000057
RPRESH                     00000045
RPRESL                     00000046
RS232I                     0000086F
RS232IN1                   00000910
RS232OUT1                  0000086E
RX_REG                     00000036
SBUFF1                     00000034
SBUFF10                    0000003D
SBUFF11                    0000003E
SBUFF12                    0000003F
SBUFF13                    00000040
SBUFF14                    00000041
SBUFF15                    00000042
SBUFF16                    00000043
SBUFF17                    00000044

MPASM 01.30.01 Intermediate  2001V603.ASM    4-15-1997  10:51:29       PAGE 80

SYMBOL TABLE
  LABEL                         VALUE

SBUFF18                         00000045
SBUFF19                         00000046
SBUFF2                          00000035
SBUFF20                         00000047
SBUFF21                         00000048
SBUFF22                         0000004A
SBUFF23                         0000004B
SBUFF24                         0000004C
SBUFF25                         0000004D
SBUFF26                         0000004E
SBUFF27                         0000004F
SBUFF28                         00000050
SBUFF29                         00000051
SBUFF3                          00000036
SBUFF30                         00000052
SBUFF31                         00000053
SBUFF32                         00000054
SBUFF33                         00000055
SBUFF34                         00000056
SBUFF4                          00000037
SBUFF5                          00000038
SBUFF6                          00000039
SBUFF7                          0000003A
SBUFF8                          0000003B
SBUFF9                          0000003C
SENDIT1                         000008C9
SENDIT1L0                       000008CF
SENDIT2                         000008FD
SENDIT2L0                       00000903
SETUP                           00000642
SET_PSI                         000002EE
SLEEPY                          000002A7
SOME_MORE                       000003A4
SPAN_ADJ                        000003E9
SPAN_TEMP_HI                    0000043C
SPAN_TEMP_LOW                   00000413
SSPADD                          00000013
SSPBUF                          00000013
SSPCON                          00000014
SSPSTAT                         00000014
ST1                             00000119
ST2                             0000011E
ST3                             00000123
ST4                             00000128
ST5                             0000012D
ST6                             00000132
ST7                             00000137
ST8                             0000013C
ST9                             0000013F
START                           000000C0
STATE0                          0000080D
STATE1                          00000824
STATE2                          0000083A

MPASM 01.30.01 Intermediate 2001V603.A__  4-15-1997 10:51:29    PAGE 81

SYMBOL TABLE
   LABEL                    VALUE

STATE3                     00000850
STATUS                     00000003
STATUS_HOLD                0000007A
STILL_ON                   000001D4
SWCH_TEST                  000002AA
SWITCHES                   0000005B
SW_WAIT                    00000679
SYMBOL_OFF                 00000514
SYMBOL_ON                  00000511
S_SET_AGAIN                000008C4
T1CON                      00000010
T2CON                      00000012
TBLOS                      00000077
TBUFF1H                    0000002F
TBUFF1L                    00000030
TBUFF2H                    00000031
TBUFF2L                    00000032
TEMP                       00000020
TEMP1                      00000021
TEMP2                      00000022
TEMPCAL                    00000079
TEMPERATURE                00000458
TEMPERHI                   00000020
TEMPERLO                   00000021
TEMPSENS                   00000570
TEMPSH                     0000002A
TEMPSH1                    00000078
TEMPSL                     0000002B
TEMP_DOWN                  000003D6
TEMP_UP                    000003B6
TEST100                    00000382
TESTBATT                   000001FB
TESTFLAGS                  00000071
TESTL1                     000000F4
TESTL2                     000000F8
TFCOUNT                    00000033
TIME_ON                    00000074
TINFHI                     00000057
TINFLO                     00000058
TMR0                       00000001
TMR1H                      0000000F
TMR1L                      0000000E
TMR2                       00000011
TRANS1                     000008DD
TRANS2                     000008F8
TRANSMIT                   000008DC
TREADHI                    00000022
TREADLO                    00000023
TREFH                      00000028
TREFL                      00000029
TREFSENS                   0000059A
TRISA                      00000005
TRISAALLOUT                000005F1

MPASM 01.30.01 Intermediate   2001V603.ASM   4-15-1997  10:51:29       PAGE 82

SYMBOL TABLE
  LABEL                   VALUE

TRISB                   00000006
TRISC                   00000007
TRISD                   00000008
TRISE                   00000009
TRUNC41                 00000ACB
TRUNC42                 00000AD5
TRUNCATE                0000037F
TRUNCATE4               00000AC2
TVOLT1                  000005B7
TVOLT2                  000005BB
TVOLTSENS               000005AA
UADD26L16               00000A56
UADD26L24               00000A90
UADD26L8                00000A1C
UADD26LA                000009FF
UADD26LB                00000A39
UADD26LC                00000A73
UADD26LD                00000AAD
UOK26L                  00000AC1
UOK26L16                00000A5F
UOK26L24                00000A99
UOK26L8                 00000A25
UOK26LA                 00000A08
UOK26LB                 00000A42
UOK26LC                 00000A7C
UOK26LD                 00000AB6
VOLTH                   00000043
VOLTL                   00000044
VREFHIZ                 000005EC
VREFS1                  000005DA
VREFS2                  000005DE
VREFS3                  000005E3
VREFS4                  000005E7
VREFTOGND               000005DA
VREFUP                  000005E3
WAIT                    00000679
WAIT1                   0000067D
WAITCNTR                00000023
WHOLD                   00000049
WHOLDB1                 00000049
WTEMP                   0000004B
XMIT                    00000076
ZERO_ADJ                000003AB
ZERO_CAP                000005C0
ZPRESH                  0000003E
ZPRESL                  0000003F
ZTEMPSH                 0000007D
ZTEMPSL                 0000007E
ZZZZZZ                  000002A4
_C                      STATUS,0
_RX                     00000006
_TX                     00000007
_Z                      STATUS,2

```
MPASM 01.30.01 Intermediate  2001V603.ASm   4-15-1997  10:51:29        PAGE 83

SYMBOL TABLE
  LABEL                    VALUE

__16C65                   00000001
  holdit                   0000092A
  save                     00000929
  spare1                   00000032
  spare2                   00000033
  spare3                   00000034
  spare4                   00000035

MEMORY USAGE MAP ('X' = Used, '-' = Unused)

0000 : XXX-XXXXXXXXXXX- XXXXXXXXXXXXXXXX XXXXXX---------- ---------X-----
0040 : ---------------X ---------------- ----X----------- ---------X-----
0080 : ---------------X- ---------------- ---X------------ ----------------
00C0 : XXXXXXXXXXXXXXXX XXXXXXXXXXXXXXXX XXXXXXXXXXXXXXXX XXXXXXXXXXXXXXXX
0100 : XXXXXXXXXXXXXXXX XXXXXXXXXXXXXXXX XXXXXXXXXXXXXXXX XXXXXXXXXXXXXXXX
0140 : XXXXXXXXXXXXXXXX XXXXXXXXXXXXXXXX XXXXXXXXXXXXXXXX XXXXXXXXXXXXXXXX
0180 : XXXXXXXXXXXXXXXX XXXXXXXXXXXXXXXX XXXXXXXXXXXXXXXX XXXXXXXXXXXXXXXX
01C0 : XXXXXXXXXXXXXXXX XXXXXXXXXXXXXXXX XXXXXXXXXXXXXXXX XXXXXXXXXXXXXXXX
0200 : XXXXXXXXXXXXXXXX XXXXXXXXXXXXXXXX XXXXXXXXXXXXXXXX XXXXXXXXXXXXXXXX
0240 : XXXXXXXXXXXXXXXX XXXXXXXXXXXXXXXX XXXXXXXXXXXXXXXX XXXXXXXXXXXXXXXX
0280 : XXXXXXXXXXXXXXXX XXXXXXXXXXXXXXXX XXXXXXXXXXXXXXXX XXXXXXXXXXXXXXXX
02C0 : XXXXXXXXXXXXXXXX XXXXXXXXXXXXXXXX XXXXXXXXXXXXXXXX XXXXXXXXXXXXXXXX
0300 : XXXXXXXXXXXXXXXX XXXXXXXXXXXXXXXX XXXXXXXXXXXXXXXX XXXXXXXXXXXXXXXX
0340 : XXXXXXXXXXXXXXXX XXXXXXXXXXXXXXXX XXXXXXXXXXXXXXXX XXXXXXXXXXXXXXXX
0380 : XXXXXXXXXXXXXXXX XXXXXXXXXXXXXXXX XXXXXXXXXXXXXXXX XXXXXXXXXXXXXXXX
03C0 : XXXXXXXXXXXXXXXX XXXXXXXXXXXXXXXX XXXXXXXXXXXXXXXX XXXXXXXXXXXXXXXX
0400 : XXXXXXXXXXXXXXXX XXXXXXXXXXXXXXXX XXXXXXXXXXXXXXXX XXXXXXXXXXXXXXXX
0440 : XXXXXXXXXXXXXXXX XXXXXXXXXXXXXXXX XXXXXXXXXXXXXXXX XXXXXXXXXXXXXXXX
0480 : XXXXXXXXXXXXXXXX XXXXXXXXXXXXXXXX XXXXXXXXXXXXXXXX XXXXXXXXXXXXXXXX
04C0 : XXXXXXXXXXXXXXXX XXXXXXXXXXXXXXXX XXXXXXXXXXXXXXXX XXXXXXXXXXXXXXXX
0500 : XXXXXXXXXXXXXXXX XXXXXXXXXXXXXXXX XXXXXXXXXXXXXXXX XXXXXXXXXXXXXXXX
0540 : XXXXXXXXXXXXXXXX XXXXXXXXXXXXXXXX XXXXXXXXXXXXXXXX XXXXXXXXXXXXXXXX
0580 : XXXXXXXXXXXXXXXX XXXXXXXXXXXXXXXX XXXXXXXXXXXXXXXX XXXXXXXXXXXXXXXX
05C0 : XXXXXXXXXXXXXXXX XXXXXXXXXXXXXXXX XXXXXXXXXXXXXXXX XXXXXXXXXXXXXXXX
0600 : XXXXXXXXXXXXXXXX XXXXXXXXXXXXXXXX XXXXXXXXXXXXXXXX XXXXXXXXXXXXXXXX
0640 : XXXXXXXXXXXXXXXX XXXXXXXXXXXXXXXX XXXXXXXXXXXXXXXX XXXXXXXXXXXXXXXX
0680 : XXX------------- ---------------- ---------------- ----------------
06C0 : ---------------- ---------------- ---------------- ------------XXXX
0700 : XXXXXXXXXXXXXXXX XXXXXXXXXXXXXXXX XXXXXXXXXXXXXXXX XXXXXXXXXXXXXXXX
0740 : XXXXXXXXXXXXXXXX XXXXXXXXXXXXXXXX XXXXXXXXXXXXXXXX XXXXXXXXXXXXXXXX
0780 : XXXXXXXXXXXXXXXX XXXXXXXXXXXXXXXX XXXXXXXXXXXXXXXX XXXXXXXXXXXXXXXX
07C0 : XXXXXXXXXXXXXXXX XXXXXXXXXXXXXXXX XXXXXXXXXXXXXXXX XXXXXXXXXXXXXXXX
0800 : XXXXXXXXXXXXXXXX XXXXXXXXXXXXXXXX XXXXXXXXXXXXXXXX XXXXXXXXXXXXXXXX
0840 : XXXXXXXXXXXXXXXX XXXXXXXXXXXXXXXX XXXXXXXXXXXXXXXX XXXXXXXXXXXXXXXX
0880 : XXXXXXXXXXXXXXXX XXXXXXXXXXXXXXXX XXXXXXXXXXXXXXXX XXXXXXXXXXXXXXXX
08C0 : XXXXXXXXXXXXXXXX XXXXXXXXXXXXXXXX XXXXXXXXXXXXXXXX XXXXXXXXXXXXXXXX
```

MPASM 01.30.01 Intermediate  2001V603.ASM   4-15-1997  10:51:29       PAGE 84

MEMORY USAGE MAP ('X' = Used,  '-' = Unused)

```
0900 : XXXXXXXXXXXXXXXX XXXXXXXXXXXXXXXX XXXXXXXXXXXXXXXX XXXXXXXXXXXXXXXX
0940 : XXXXXXXXXXXXXXXX XXXXXXXXXXXXXXXX XXXXXXXXXXXXXXXX XXXXXXXXXXXXXXXX
0980 : XXXXXXXXXXXXXXXX XXXXXXXXXXXXXXXX XXXXXXXXXXXXXXXX XXXXXXXXXXXXXXXX
09C0 : XXXXXXXXXXXXXXXX XXXXXXXXXXXXXXXX XXXXXXXXXXXXXXXX XXXXXXXXXXXXXXXX
0A00 : XXXXXXXXXXXXXXXX XXXXXXXXXXXXXXXX XXXXXXXXXXXXXXXX XXXXXXXXXXXXXXXX
0A40 : XXXXXXXXXXXXXXXX XXXXXXXXXXXXXXXX XXXXXXXXXXXXXXXX XXXXXXXXXXXXXXXX
0A80 : XXXXXXXXXXXXXXXX XXXXXXXXXXXXXXXX XXXXXXXXXXXXXXXX XXXXXXXXXXXXXXXX
0AC0 : XXXXXXXXXXXXXXXX XXXXXXXXXXXXXXXX XXXXXXXXXXXXXXXX XXXXXXXXXXXXXXXX
0B00 : XXXXX----------- ---------------- ---------------- ----------------
0B40 : ---------------- ---------------- ---------------- ----------------
2000 : -------X-------- ---------------- ---------------- ----------------
2040 : ---------------- ---------------- ---------------- ----------------
```

All other memory blocks unused.

Program Memory Words Used: 2550
Program Memory Words Free: 1546

Errors   :    0
Warnings :    0 reported,     0 suppressed
Messages :   25 reported,     0 suppressed Copyright 1997; Waekon Industries, Inc.
All rights reserved.

Appendix C

| Bill Of Materials | | | | | | | |
|---|---|---|---|---|---|---|---|
| Line Item | Schematic Reference | Part Value | Manuf number | Manuf Name | PCB Footprint | Description | Waekon Part |
| 1 | C2 | 4.7uF | NMC1206Y5V475Z16TR | NIC | B CASE SMD | TANTALUM CHIP CAPACITOR | |
| | | | PCT 4.7/10B | NEMCO | | | |
| 2 | C3 | 4.7uF | NMC1206Y5V475Z16TR | NIC | B CASE SMD | TANTALUM CHIP CAPACITOR | |
| | | | PCT 4.7/10B | NEMCO | | | |
| 3 | C5 | 100pF | ECU-V1H101JCG | PANASONIC | 0805 SMD | CER. CHIP CAP. 1206 or 0805 5% | |
| | | | AN12CD0101JBA | THOMPSON | | | |
| 4 | C6 | 100pF | ECU-V1H101JCG | PANASONIC | 0805 SMD | CER. CHIP CAP. 1206 or 0805 5% | |
| | | | AN12CD0101JBA | THOMPSON | | | |
| 5 | C7 | 0.1 uF | NMC1206X7R104K25TR | NIC | 0805 SMD | CER. CHIP CAP. 1206 or 0805 5% | |
| | | | AN20ZD0104JBA | THOMPSON | | | |
| 6 | C9 | 0.039uF | ECH-U1H393JB5 | PANASONIC | 1210 SMD | FILM CAP. 1210 5% | |
| | alternate C9 | | ECH-U1C393JB5 | PANASONIC | 1206 SMD | FILM CAP. 1206 5% | |
| 7 | C10 | 150pF | NMC0805NPO151J50TR | NIC | 0805 SMD | CER. CHIP CAP. 1206 or 0805 5% | |
| | | | AN12CD0151JBA | THOMPSON | | | |
| 8 | C11 | 68UF | NTC-T686M10TRD | NIC | D CASE SMD | TANTALUM CHIP CAPACITOR | |
| | | | FT-D0C0686MBA | THOMPSON | | | |
| 9 | C12 | 3.3UF | NTC-T335M10TRA | NIC | A CASE SMD | TANTULUM CHIP CAPACITOR | |
| | | | FT-A0C0335MBA | THOMPSON | | | |
| 10 | C34 Replaces R34 | 0.1uF | NMC1206X7R104K25TR | NIC | 0805 SMD | CER. CHIP CAP. 1206 or 0805 5% | |
| | | | AN20ZD0104JBA | THOMPSON | | | |
| 11 | Q1 | NPN | FMMT2369 | ZETEX | SOT 23 | Transistor High Speed | |
| | alternate Q1 | NPN | MMBT2369ALT1 | MOTOROLA | SOT 23 | Transistor High Speed | |
| | alternate Q1 | NPN | BC846 | PHILIPS | SOT 23 | Transistor High Speed | |
| 12 | R1 | 10K | CRCW08051002F | DALE | 0805 SMD | METAL FILM 1% | |
| | | | NRC10F1002TR | NIC | | | |
| 13 | R2 | 97.6K | CRCW08059762F | DALE | 0805 SMD | METAL FILM 1% | |
| | | | NRC10F9762TR | NIC | | | |
| 14 | R3 | 75K | CRCW08057502F | DALE | 0805 SMD | METAL FILM 1% | |
| | | | NRC10F7502TR | NIC | | | |
| 15 | R5 | 10k | CRCW08051002F | DALE | 0805 SMD | METAL FILM 1% | |
| | | | NRC10F1002TR | NIC | | | |
| 16 | R6 | 2.21M | CRCW08052214F | DALE | 0805 SMD | METAL FILM 1% | |
| | | | NRC10F2214TR | NIC | | | |
| 17 | R7 | 1.0M | CRCW08051004F | DALE | 0805 SMD | METAL FILM 1% | |
| | | | NRC10F1004TR | NIC | | | |
| 18 | R8 | 10k | CRCW08051002F | DALE | 0805 SMD | METAL FILM 1% | |
| | | | NRC10F1002TR | NIC | | | |
| 19 | R9 | 162K | CRCW08051623F | DALE | 0805 SMD | METAL FILM 1% | |
| | | | NRC10F1623TR | NIC | | | |
| 20 | R11 | 10K | CRCW08051002F | DALE | 0805 SMD | METAL FILM 1% | |
| | | | NRC10F1002TR | NIC | | | |
| 21 | R12 | 10k | CRCW08051002F | DALE | 0805 SMD | METAL FILM 1% | |
| | | | NRC10F1002TR | NIC | | | |
| 22 | | | | | | | |
| 23 | R14 | 100K | CRCW08051003F | DALE | 0805 SMD | METAL FILM 1% | |
| | | | NRC10F1003TR | NIC | | | |
| 24 | R15 | 5.11K | CRCW08051003F | DALE | 0805 SMD | METAL FILM 1% | |
| | | | NRC10F1003TR | NIC | | | |
| 25 | R16 | 10k | CRCW08051002F | DALE | 0805 SMD | METAL FILM 1% | |
| | | | NRC10F1002TR | NIC | | | |
| 26 | R17 | 100K | CRCW08051003F | DALE | 0805 SMD | METAL FILM 1% | |
| | | | NRC10F1003TR | NIC | | | |
| 27 | R18 | 100K | CRCW08051003F | DALE | 0805 SMD | METAL FILM 1% | |
| | | | NRC10F1003TR | NIC | | | |
| 28 | R19 | 100K | CRCW08051003F | DALE | 0805 SMD | METAL FILM 1% | |
| | | | NRC10F1003TR | NIC | | | |
| 29 | R20 | 100K | CRCW08051003F | DALE | 0805 SMD | METAL FILM 1% | |
| | | | NRC10F1003TR | NIC | | | |
| 30 | R21 | 24.3K | CRCW08052432F | DALE | 0805 SMD | METAL FILM 1% | |
| | | | NRC10F2432TR | NIC | | | |
| 31 | R22 | 100K | CRCW08051003F | DALE | 0805 SMD | METAL FILM 1% | |
| | | | NRC10F1003TR | NIC | | | |
| 32 | R23 | 24.3K | CRCW08052432F | DALE | 0805 SMD | METAL FILM 1% | |
| | | | NRC10F2432TR | NIC | | | |
| 33 | R24 | 100K | CRCW08051003F | DALE | 0805 SMD | METAL FILM 1% | |
| | | | NRC10F1003TR | NIC | | | |
| 34 | R25 | 100K | CRCW08051003F | DALE | 0805 SMD | METAL FILM 1% | |
| | | | NRC10F1003TR | NIC | | | |
| 35 | R26 | 10k | CRCW08051002F | DALE | 0805 SMD | METAL FILM 1% | |
| | | | NRC10F1002TR | NIC | | | |
| 36 | R27 | 100K | CRCW08051003F | DALE | 0805 SMD | METAL FILM 1% | |
| | | | NRC10F1003TR | NIC | | | |
| 37 | R28 | 100K | CRCW08051003F | DALE | 0805 SMD | METAL FILM 1% | |
| | | | NRC10F1003TR | NIC | | | |
| 38 | R29 | 150K | CRCW08051003F | DALE | 0805 SMD | METAL FILM 1% | |
| | | | NRC10F1003TR | NIC | | | |
| 39 | R30 | 200K | CRCW08052003F | DALE | 0805 SMD | METAL FILM 1% | |

| # | Ref | Value | Part Number | Mfr | Package | Description | Notes |
|---|---|---|---|---|---|---|---|
| 40 | R31 | 39.2K | NRC10F2003TR | NIC | | | |
| | | | CRCW08053922F | DALE | 0805 SMD | METAL FILM | |
| | | | NRC10F3922TR | NIC | | | |
| 41 | R32 | 24.9K | CRCW08052492F | DALE | 0805 SMD | METAL FILM | |
| | | | NRC10F2492TR | NIC | | | |
| 42 | R33 | 24.9K | CRCW08052492F | DALE | 0805 SMD | METAL FILM 1% | |
| | | | NRC10F2492TR | NIC | | | |
| 43 | R35 | 10k | CRCW08051002F | DALE | 0805 SMD | METAL FILM 1% | |
| | | | NRC10F1002TR | NIC | | | |
| 44 | R36 | 10K | CRCW08051002F | DALE | 0805 SMD | METAL FILM 1% | |
| | | | NRC10F1002TR | NIC | | | |
| 45 | R37 | 39.2K | CRCW08053922F | DALE | 0805 SMD | METAL FILM 1% | |
| | | | NRC10F3922TR | NIC | | | |
| 46 | R38 | 100 | CRCW08051000F | DALE | 0805 SMD | METAL FILM 1% | |
| | | | NRC10F1000TR | NIC | | | |
| 47 | R40 | 24.3K | CRCW08052432F | DALE | 0805 SMD | METAL FILM 1% | |
| | | | NRC10F2432TR | NIC | | | |
| 48 | R41 | 6.19k | CRCW08056191F | DALE | 0805 SMD | METAL FILM 1% | |
| | | | NRC10F6191TR | NIC | | | |
| 49 | R44 | 49.9k | CRCW08054992F | DALE | 0805 SMD | METAL FILM 1% | |
| | | | NRC10F4992TR | NIC | | | |
| 50 | X1 | 1MHz | LXZT1000D | ABRACON | 0.1" SPACING thro'h | CERAMIC RESONATOR THRO' HOLE | |
| 51 | U2 | | 324 LM324 M14A | NAT SEMI | SOIC 14 | QUAD OP AMP | |
| | | | LM324DT | SGS THOMPSON | | | |
| | | | NJM324M | NJRC | | | |
| | | | NJM324E | NJRC | | | |
| | | | LM324 | TI | | | |
| 52 | U3 | | 324 LM324 M14A | NAT SEMI | SOIC 14 | QUAD OP AMP | |
| | | | NJM324E | NJRC | | | |
| | | | LM324DT | SGS THOMPSON | | | |
| | | | NJM324M | NJRC | | | |
| | | | LM324 | TI | | | |
| 53 | U4 | 4.0V | S-81240PG-PJ-X | | SOT-89 | 4V REGULATOR | |
| | alternate U4 | 4.0V | TC55RP4002ECB713 | TELCOM | SOT-23-5 | U4 : ALTERNATE PART | |
| | alternate U4 | | S-81240PG-QJ-X | SEIKO | TO92 | U4 : ALTERNATE PART | |
| *54 | S1 | SPST | KSC341GB | ITT | 6mm x 6mm | SW PUSHBUTTON | T2001-6 |
| *55 | S2 | SPST | KSC341GB | ITT | 6mm x 6mm | SW PUSHBUTTON | T2001-6 |
| *56 | S3 | SPST | KSC341GB | ITT | 6mm x 6mm | SW PUSHBUTTON | T2001-6 |
| *57 | S4 | SPST | KSC341GB | ITT | 6mm x 6mm | SW PUSHBUTTON | T2001-6 |
| *58 | U5 | | SP4422ACN | SIPEX | SOIC 8 | EL BACKLIGHT DRIVE | T2001-15 |
| *59 | U1 | 16C65 | PIC16C65A-04-\L | MICROCHIP | PLCC 44 | uPROC | T2001-27 |
| *60 | K1 | PIEZO | 65PZ14400Z-PH | DB PRODUCTS | SPKR1 | BUZZER/PIEZO | T2001-7 |
| *61 | B1-B2 | BATT CL | T2000-20 | CLOVER | BATTERY Y3 | BATTERY CLIPS | |
| *62 | L1 | 20mH | CH5070AS-203K-006 | CTC COILS | INDUCTOR | BACKLIGHT INDUCTOR | T2001-17 |
| | | | 9250-226 | JW MILLER | INDUCTOR | 22 mH | |
| *63 | PCB | 0.047 | PCB | Q-TECH | PCB | PRINTED CIRCUIT BOARD | T2001-26 |
| *64 | LCD SOCKET | | SOCKET - LCD | | 1*12 | SOCKET | T2001-9 |
| *65 | LCD SOCKET | | SOCKET - LCD | | 1*12 | SOCKET | T2001-9 |
| *66 | LCD | LCD | GD-227 | American Zettler | 0.1" Spacing thro'h | LIQUID CRYSTAL DISPLAY | T2001-LCD |
| *67 | 1.48"X1.32" | EL | QF-961017 | MKS | AVIATION GREEN | EL BACKLIGHT | T2001-14 |

Note: Line items 64,65,66,67 Either LCD sockets (64,65) or LCD SUBASSEMBLY [LCD+EL (66,67)] will be supplied.

* all parts with an asterisk to be supplied by WAEKON, the remainder of the parts to be supplied by the PCB stuffing contractor.

PCB to be held to IPC specifications class 1 for electronic assemblies as listed in IPC A-610 Revision B December,94 and amended January, 96

The stuffing house is authorized to replace the listed above manufacturers of resistors with KOA, ROHM, CAL-CHIP, as long as the values and the tolerances are kept as specified above.

The stuffing house is authorized to replace the above manufacturers of capacitors with KEMET, NEMCO, AVX, as long as the values, the tolerances, and the thermal characteristics of the capacitors are kept as specified above.

I claim:

1. A digital pressure or temperature gauge, comprising:

a gauge body dimensioned to be held in the palm of a user's hand, the gauge body having microprocessor controlled circuitry therein, an altitude and temperature compensation means in communication with said microprocessor, and keys for actuating said microprocessor;

a display disposed on said gauge body for informing the user of readings taken in a mode of operation of said device;

a probe assembly remote from said gauge body; and, a multi-conductor shielded cable connecting said gauge body and said probe assembly, said cable providing a communication link between said probe assembly and said circuitry, and said cable being dimensioned and constructed to allow a user to manipulate said keys on said gauge body while said probe assembly is in an actual test position on a component of a vehicle, while said vehicle is in motion and while said user is operating said vehicle, and said digital pressure gauge being self-powered and having roaming and remote use capability, said gauge body housing no more than four pressure sensitive function buttons actuating said modes of operation of said device, whereby said user can easily manipulate a change in the modes of operation of said gauge while said vehicle is in motion.

2. The gauge of claim 1 further comprising routines providing a plurality of said modes of operation of said gauge, said modes of operation including, in combination, a PSI mode which said display presents a pressure read in pounds per square inch measurement, a KPA mode in which said display presents a pressure read in kilo pascal measurement, a PEAK HOLD mode in which said display presents a highest pressure read during a sample of measurements taken by said gauge, a HI/LO resolution mode in which said display displays one of a LO resolution mode which presents an average pressure taken from a batch of at least 8 consecutive readings or a HI resolution mode which presents the pressure in a system being measured in real time, and a temperature mode in which said display presents a temperature of a fluid being tested in either °C. (Centigrade) or °F. (Fahrenheit).

3. The gauge of claim 1 in which said gauge body includes an anodized aluminum casing which protects said microprocessor and microprocessor controlled circuitry, whereby said gauge is ruggedly built and capable of withstanding use in a shop environment.

4. The gauge of claim 1 in which said probe assembly houses said pressure transducer and a temperature compensation component, said probe assembly includes a JIC connector, and said probe assembly is constructed of a heat passive alloy.

5. The gauge of claim 1 further comprising at least one pliable, water-resistant seal protecting a connection between said cable, said gauge body, and said probe assembly.

6. The gauge of claim 1 further comprising a durable and pliable protective sleeve slidably positioned on said cable for protection of said cable when said gauge is used remotely.

7. The gauge of claim 1 further comprising automatic temperature compensation means in communication with said circuitry.

8. The gauge of claim 7 in which said circuitry further comprises diodes.

9. The gauge of claim 1 in which voice circuitry audibly describing said measurement is substituted for said display.

10. The gauge of claim 1 in which said probe addition communication port is an RS 232 compatible interface.

11. The gauge of claim 1 in which said display alternates between a measurement taken by said temperature probe and said probe assembly, said measurements being displayed for a predetermined period of time.

12. The gauge of claim 1 further comprising at least five gauge accessories, said accessories selected from the group consisting of batteries, a gauge boot, an adapter kit manual & look-up tables; adapters selected from the group consisting of an F1AS adapter, an F2AS adapter, an F3AS adapter, an F4AS adapter, an F5AS adapter, an F6 adapter, an F7AS adapter, an F8 adapter, an F9 adapter, an F10AS adapter, an F11 adapter, an F12 adapter, an F13AS adapter, an F14 adapter, an F15 adapter, an F16AS adapter, an F17AS adapter, an F18AS adapter, an F19AS adapter, an F20AS adapter, an F21AS adapter, an F22AS adapter, an F23 adapter, an F24AS adapter, an F25 adapter, an F26AS/2 adapter, screws (M6×1.0×50 mm), an F27 adapter, an F28 adapter, an F29 adapter, an F30AS adapter, an F31 adapter, an F32 adapter, a 45° elbow, a 90° elbow, hose clamps, a ⅜" ID Hose/3" length, a ¼" ID Hose/3" length, ¼" ID fuel flex tubing, a w/male 7/16 JIC/4" length, a manifold assembly, a manifold extension hose, an accessory gag, 5" Zip strips, 8" Zip strips, a knee-board attachment, an air chuck, a bottle, and a blow-molded case.

13. The gauge of claim 1 in which said pressure is selected from the group consisting gas pressure and liquid pressure.

14. The gauge of claim 1 in which said pressure is selected from the group consisting of fuel pressure, transmission pressure, steering pressure, brake fluid pressure, vacuum pressure, water pressure, oil pressure, air conditioning pressure, gas tank gas pressure, fuel pressure, cooling pressure, and air pressure.

15. The gauge of claim 1 further comprising a probe addition communication port, a temperature probe mating with said communication pot and a routine on said device providing for a simultaneous measurement of temperature with said temperature probe, and measurement of pressure with said probe assembly.

16. A digital pressure or temperature gauge, comprising:

a gauge body dimensioned to be held in the palm of a user's hand, the gauge body having microprocessor controlled circuitry therein, an altitude and temperature compensation means in communication with said microprocessor, and keys for actuating said microprocessor;

a display disposed on said gauge body for informing the user of readings taken in a mode of operation of said device;

a probe assembly remote from said gauge body; and, a multi-conductor shielded cable connecting said gauge body and said probe assembly, said cable providing a communication link between said probe assembly and said circuitry, and said cable being dimensioned and constructed to allow a user to manipulate said keys on said gauge body while said probe assembly is in an actual test position on a component of a vehicle, while said vehicle is in motion and while said user is operating said vehicle, and said digital pressure gauge being self-powered and having roaming and remote use capability, a sleeve being made of a substantially rigid material and being sized and dimensioned to slide along said cable, whereby positioning of said sleeve and said cable in a passenger or driver's side window is greatly facilitated while test driving this vehicle.

17. The gauge of claim 16 further comprising at least five gauge accessories, said accessories selected from the group consisting of batteries, a gauge boot, an adapter kit manual & look-up tables; adapters selected from the group consisting of an F1AS adapter, an F2AS adapter, an F3AS adapter, an F4AS adapter, an F5AS adapter, an F6 adapter, an F7AS adapter, an F8 adapter, an F9 adapter, an F10AS adapter, an F11 adapter, an F12 adapter, an F13AS adapter, an F14 adapter, an F15 adapter, an F16AS adapter, an F17AS adapter, an F18AS adapter, an F19AS adapter, an F20AS adapter, an F21AS adapter, an F22AS adapter, an F23 adapter, an F24AS adapter, an F25 adapter, an F26AS/2 adapter, screws (M6×1.0×50 mm), an F27 adapter, an F28 adapter, an F29 adapter, an F30AS adapter, an F31 adapter, an F32 adapter, a 45° elbow, a 90° elbow, hose clamps, a ⅜" ID Hose/3" length, a ¼" ID Hose/3" length, ¼" ID fuel flex tubing, a w/male ⁷⁄₁₆ JIC/4" length, a manifold assembly, a manifold extension hose, an accessory gag, 5" Zip strips, 8" Zip strips, a knee-board attachment, an air chuck, a bottle, and a blow-molded case.

18. The gauge of claim 16 in which said pressure is selected from the group consisting gas pressure and liquid pressure.

19. The gauge of claim 16 in which said pressure is selected from the group consisting of fuel pressure, transmission pressure, steering pressure, brake fluid pressure, vacuum pressure, water pressure, oil pressures air conditioning pressure, gas tank gas pressure, fuel pressure, cooling pressure, and air pressure.

20. The gauge of claim 16 further comprising a probe addition communication port, a temperature probe mating with said communication port, and a routine on said device providing for a simultaneous measurement of temperature with said temperature probe, and measurement of pressure with said probe assembly.

21. A digital pressure or temperature gauge comprising:
a gauge body dimensioned to be held in the palm of a user's hand, the gauge body having microprocessor controlled circuitry therein, an altitude and temperature compensation means in communication with said microprocessor, and keys for actuating said microprocessor;
a display disposed on said gauge body for informing the user of readings taken in a mode of operation of said device;
a probe assembly remote from said gauge body; and,
a multi-conductor shielded cable connecting said gauge body and said probe assembly, said cable providing a communication link between said probe assembly and said circuitry, and said cable being dimensioned and constructed to allow a user to manipulate said kevs on said gauge body while said probe assembly is in an actual test position on a component of a vehicle, while said vehicle is in motion and while said user is operating said vehicle, and said digital pressure gauge being self-powered and having roaming and remote use capability, a removable protective boot to provide added protection to said gauge body, said boot being molded to fit said gauge body snugly and designed for a comfortable and effective hand grip.

22. A method of measuring a pressure or temperature on a component of a vehicle while said vehicle is moving and in operation, comprising the steps of:

providing a digital pressure or temperature gauge, said gauge having a gauge body dimensioned to be held in the palm of a user's hand, said gauge body having microprocessor controlled circuitry therein, an altitude and temperature compensated pressure transducer in communication with said microprocessor, and keys for actuating said microprocessor; a display disposed on said gauge body for informing the user of readings taken in a mode of operation of said device; a probe assembly; and, a multi-conductor shielded cable connecting said gauge body and said probe assembly, said cable providing a communication link between said probe assembly and said circuitry, and said cable of a length sufficient to allow a user to manipulate said keys on said gauge body while said probe assembly is in an actual test position on a component of a vehicle and while said vehicle is actually in motion and while said user is operating said vehicle;

connecting said probe assembly to said component of said vehicle while said vehicle is stationary, said component being remote from a passenger compartment of said vehicle;

positioning said gauge body in a convenient, easily viewable position with respect to said user in said passenger compartment of said vehicle;

actuating movement of said vechicle; and, viewing readings on said display in response to actuating said keys on said gauge while said vehicle is moving.

23. The method of claim 22 in which said component is selected from the group consisting of a fuel system, an engine, and a fuel injector system; and, said vehicle is selected from the group of vehicles that move on land, vehicles that move in air, vehicles that move on water, vehicles that move under water, and vehicles that move under ground.

24. The method of claim 23 in which said vehicle is a vehicle that travels on land, and further comprising the step of positioning said sleeve where a passenger side window of said vehicle closes on said cable when said gauge is being used to read pressure while test driving this vehicle.

25. The method of claim 22 further comprising the steps of actuating a mode of operation of said gauge, said mode of operation including, a PSI mode which said display presents a pressure read in pounds per square inch measurement, a KPA mode is in which said display presents a pressure read in kilo pascal measurement, a PEAK HOLD mode in which said display presents a highest pressure read during a sample of measurements taken by said gauge, a HI/LO resolution mode in which said display displays one of a LO resolution mode which presents an average pressure taken from a batch of at least 8 consecutive readings or a HI resolution mode which presents the pressure in a system being measured in real time, and a temperature mode in which said display presents a temperature of a fluid being tested in either °C. (Centigrade) or °F. (Fahrenheit).

26. The method of claim 22 further comprising the step of sensing a pressure or temperature at said probe assembly with a pressure transducer or a temperature compensation component, and communicating a signal correlated to said pressure or temperature from said probe assembly through said cable.

27. The method of claim 22 further comprising the step of sliding a durable and pliable protective sleeve along said cable to a predetermined position that may result in damage to said cable for protection of said cable when said gauge is used remotely.

28. The method of claim 22 further comprising the step of placing a removable protective boot on said gauge body.

29. The method of claim 22 in which said gauge body includes a magnetically attracting material and further comprising the step of positioning said gauge body on a magnetically attracted material to assist said user in viewing said display.

30. The method of claim 22 further comprising the step of periodically calibrating said gauge when said vehicle is stationary.

31. The method of claim 22 further comprising the step of automatically compensating for temperature with said microprocessor.

* * * * *